United States Patent [19]

Kirigaya et al.

[11] Patent Number: 5,682,558
[45] Date of Patent: Oct. 28, 1997

[54] CAMERA WITH LEARNING FUNCTION

[75] Inventors: Tadayuki Kirigaya; Hideaki Tsuji; Isamu Hirai; Yasuyuki Haneishi; Masato Yamamoto; Masaaki Haga, all of Tokyo; Masashi Furuno, Oonojyou; Akio Takahashi; Koji Sato, both of Tokyo, all of Japan

[73] Assignee: Asahi Kogaku Kogyo Kabushiki Kaisha, Tokyo, Japan

[21] Appl. No.: 418,471

[22] Filed: Apr. 7, 1995

Related U.S. Application Data

[63] Continuation of Ser. No. 114,441, Aug. 31, 1993, abandoned.

[30] Foreign Application Priority Data

| Oct. 20, 1992 | [JP] | Japan | 4-78949 |
| Oct. 20, 1992 | [JP] | Japan | 4-78956 |
| Oct. 20, 1992 | [JP] | Japan | 4-282080 |
| Oct. 20, 1992 | [JP] | Japan | 4-282081 |
| Oct. 20, 1992 | [JP] | Japan | 4-282082 |
| Oct. 20, 1992 | [JP] | Japan | 4-282083 |
| Oct. 20, 1992 | [JP] | Japan | 4-282085 |
| Oct. 20, 1992 | [JP] | Japan | 4-282086 |
| Oct. 21, 1992 | [JP] | Japan | 4-73361 |
| Oct. 21, 1992 | [JP] | Japan | 4-73362 |
| Oct. 21, 1992 | [JP] | Japan | 4-73363 |
| Oct. 21, 1992 | [JP] | Japan | 4-282589 |

[51] Int. Cl.⁶ .................................................. G03B 7/00
[52] U.S. Cl. ...................................... 396/63; 396/49
[58] Field of Search ............................. 354/443, 412, 354/441; 396/63, 49

[56] References Cited

U.S. PATENT DOCUMENTS

| 4,123,764 | 10/1978 | Uno et al. |
| 4,253,756 | 3/1981 | Kurei et al. |
| 4,320,944 | 3/1982 | Nakai |
| 4,352,548 | 10/1982 | Toyoda ............................. 354/443 |
| 4,431,287 | 2/1984 | Sakai et al. |
| 4,527,882 | 7/1985 | Maida |
| 4,529,291 | 7/1985 | Mizogui |
| 4,629,305 | 12/1986 | Sato et al. |
| 4,794,418 | 12/1988 | Kabayashi et al. |
| 4,849,780 | 7/1989 | Amano et al. |
| 4,945,380 | 7/1990 | Katoh et al. ....................... 354/443 |

(List continued on next page.)

FOREIGN PATENT DOCUMENTS

| 0444685 | 9/1991 | European Pat. Off. |
| 1300237 | 12/1989 | Japan |
| 4149527 | 5/1992 | Japan |
| 4199112 | 7/1992 | Japan |
| 2072358 | 9/1981 | United Kingdom |
| 2255649 | 11/1992 | United Kingdom |
| 2270389 | 3/1994 | United Kingdom |
| 9211563 | 7/1992 | WIPO |

OTHER PUBLICATIONS

Three European Search Reports.
United Kingdom Search Report dated Oct. 7, 1993 counterpart U.K. Application No. 9316194.1.

(List continued on next page.)

Primary Examiner—Russell E. Adams
Attorney, Agent, or Firm—Greenblum & Bernstein P.L.C.

[57] ABSTRACT

A camera having a zoom lens. The camera includes a shutter, an aperture and program exposure mode control. The program exposure control includes one or more reference program characteristics representing combinations of shutter speed and aperture corresponding to one or more of a portrait mode, a landscape mode and a close up mode. Each reference program characteristics define a predetermined aperture in a first range from a low shutter speed to a hand-induced vibration limit and defines a different aperture in a second range beyond the hand-induced vibration limit. One of the reference program characteristics is selected, wherein the hand-induced vibration limit is defined in accordance with a focal length of said zoom lens.

19 Claims, 151 Drawing Sheets

U.S. PATENT DOCUMENTS

| | | |
|---|---|---|
| 4,978,990 | 12/1990 | Yamasaki et al. . |
| 5,070,357 | 12/1991 | Kazami et al. . |
| 5,159,364 | 10/1992 | Yanagisawa et al. . |
| 5,220,364 | 6/1993 | Kobayshi et al. ............... 354/443 |
| 5,227,835 | 7/1993 | Anagnostopoulos . |
| 5,253,009 | 10/1993 | Satou et al. . |
| 5,266,984 | 11/1993 | Muramatsu et al. . |
| 5,374,984 | 12/1994 | Hamada et al. ............... 354/443 |

OTHER PUBLICATIONS

U.K. Search Report for counterpart Application No. GB 9316194.1, completed on Nov. 1, 1994.

U.K. Search Report for counterpart Application No. 9316194.1, completed on Nov. 2, 1994.

U.K. Search Report for counterpart Application No. 9316194.1, completed on Nov. 3, 1994.

French Search Report with respect to counterpart French Application No. 9310384 on Apr. 21, 1995.

Patent Abstracts of Japan vol. 16, No. 433 (P–1418), Sep. 10, 1992.

Patent Abstracts of Japan vol. 14, No. 92 (P–1009), Feb. 20, 1990.

Patent Abstracts of Japan vol. 16, No. 532 (P–1448), Oct. 30, 1992.

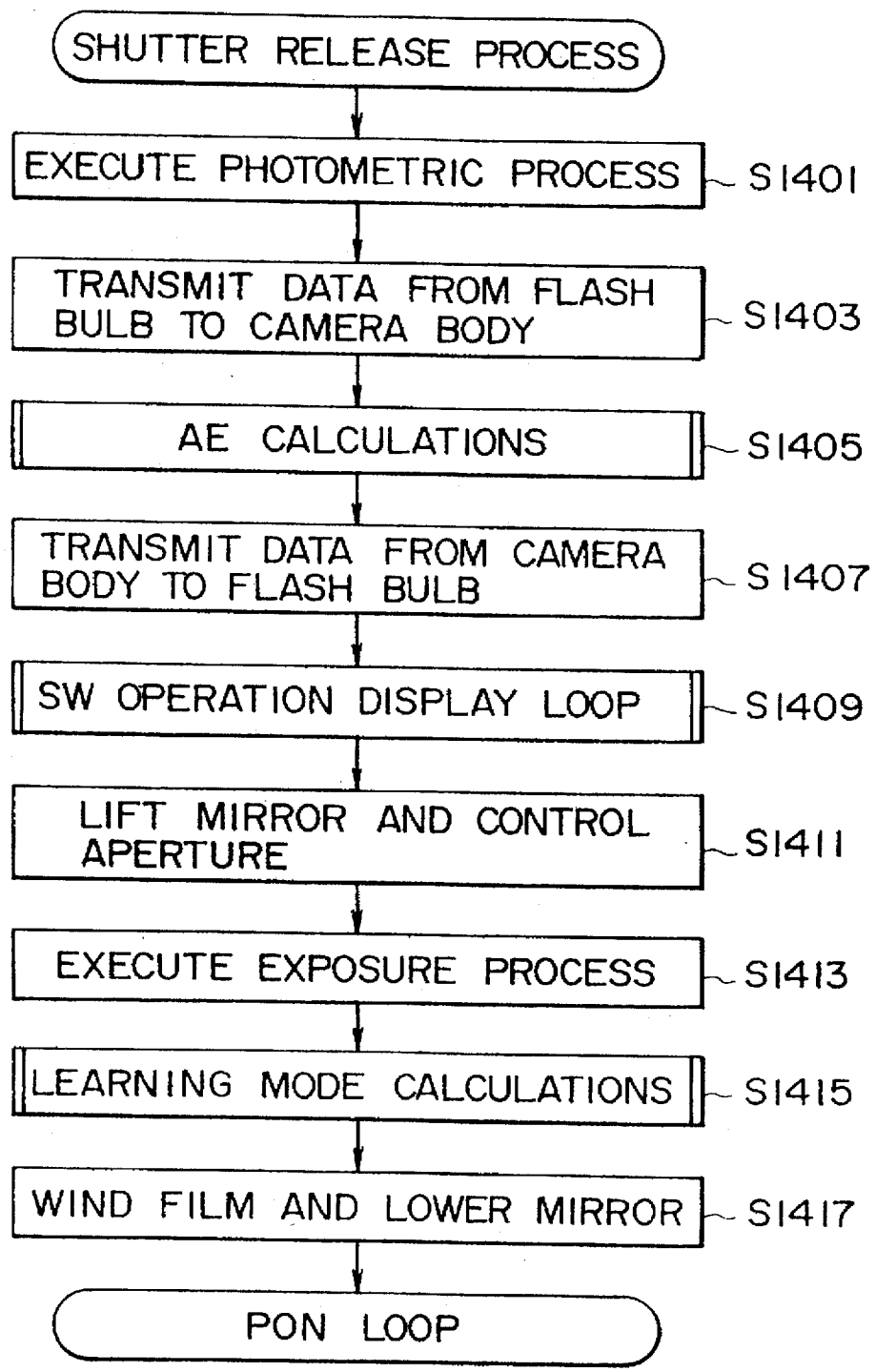

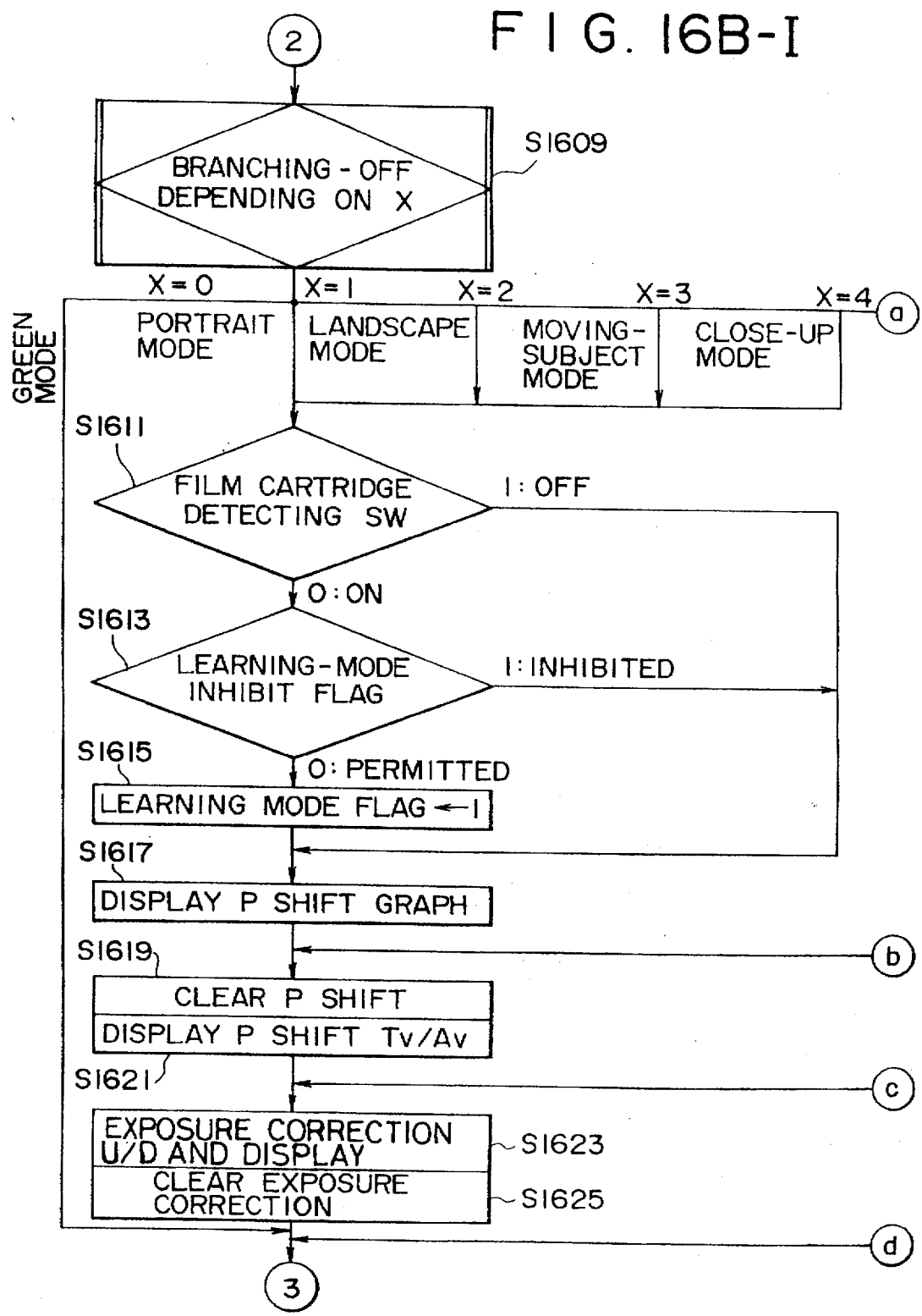
FIG. 16B-I

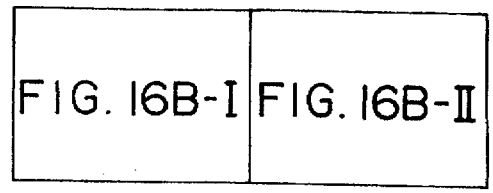
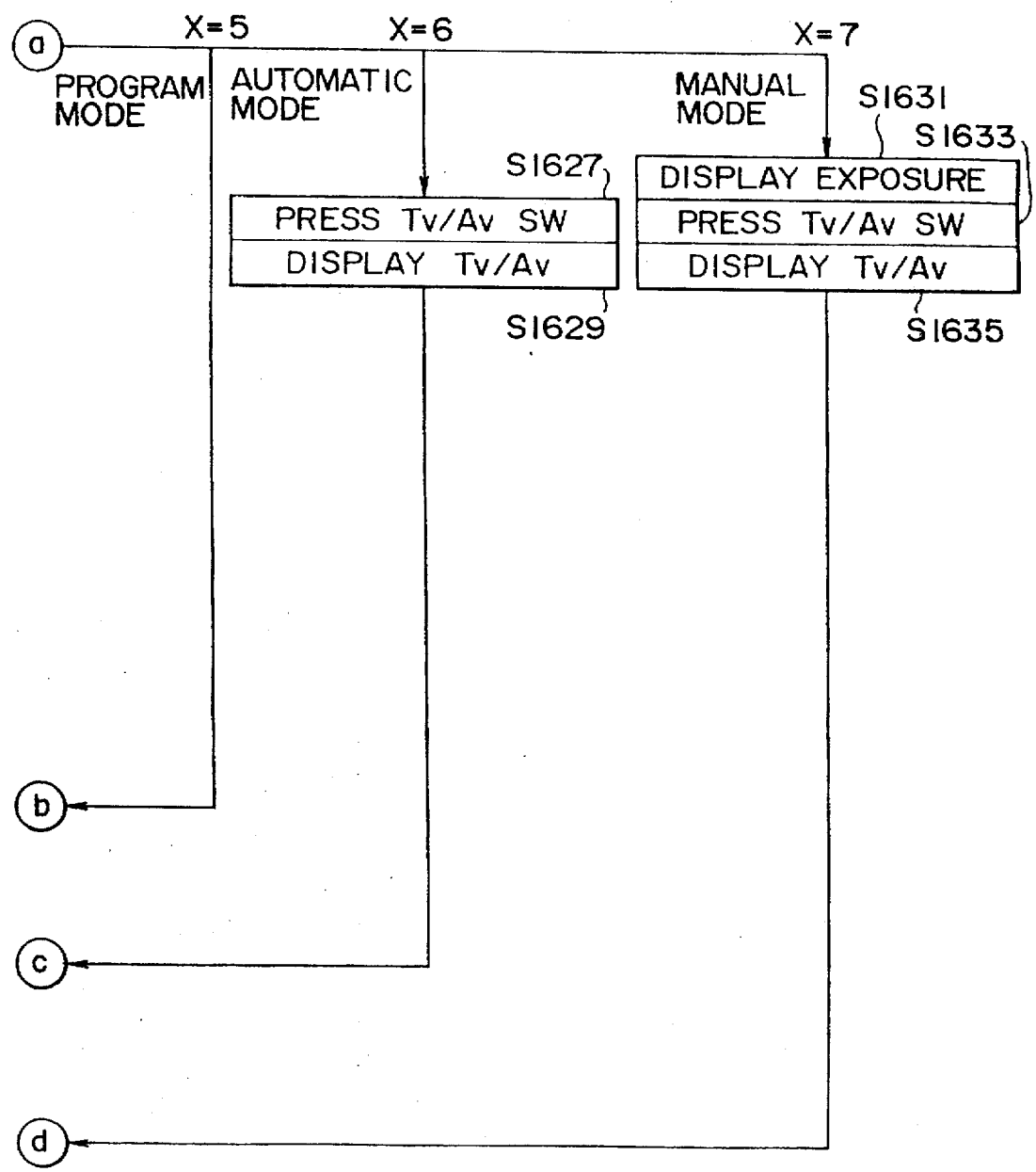

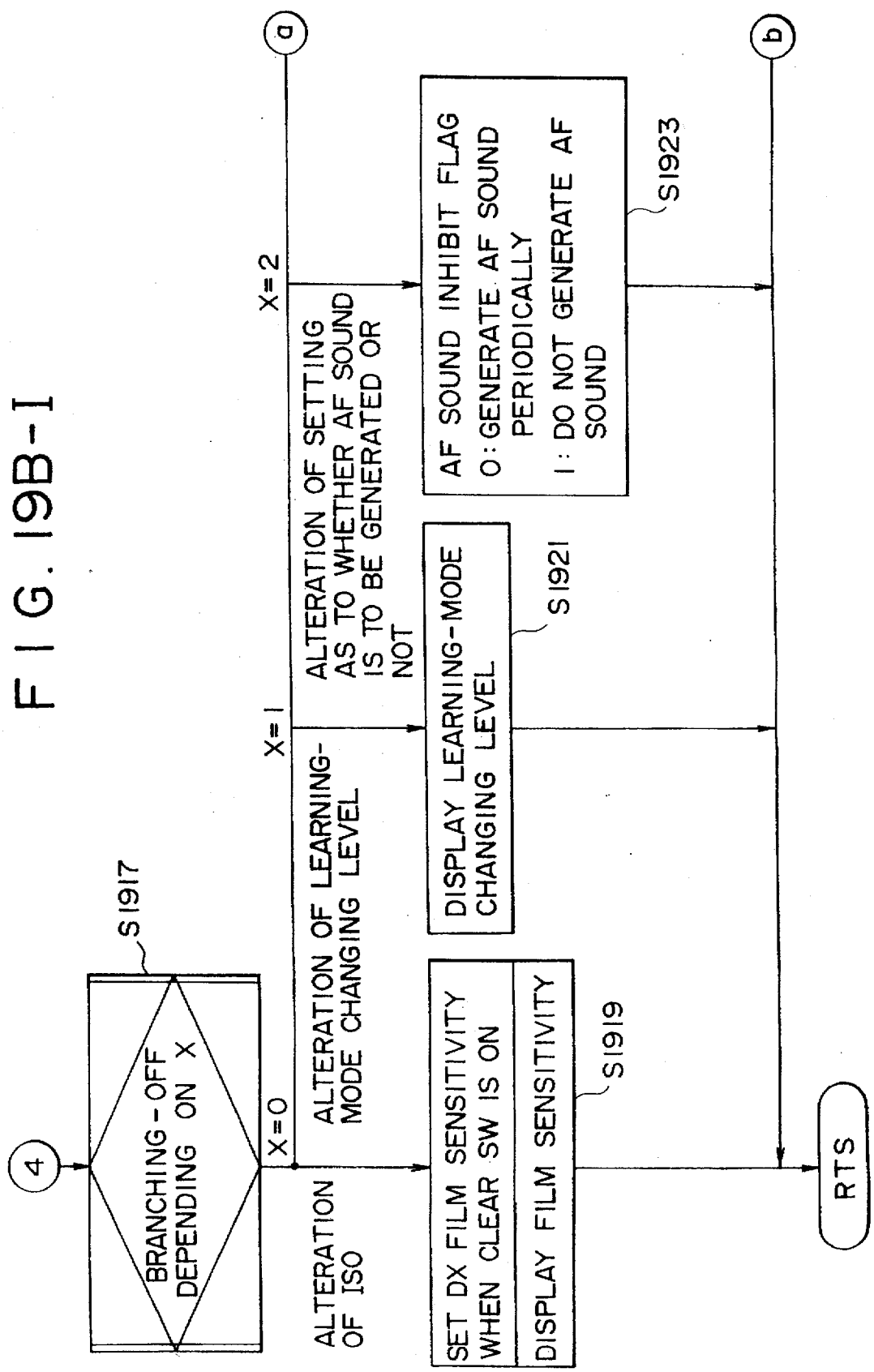

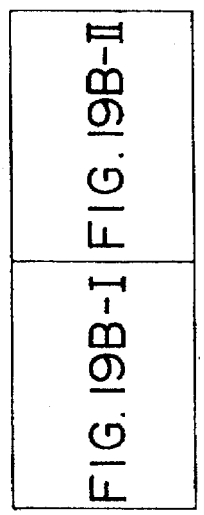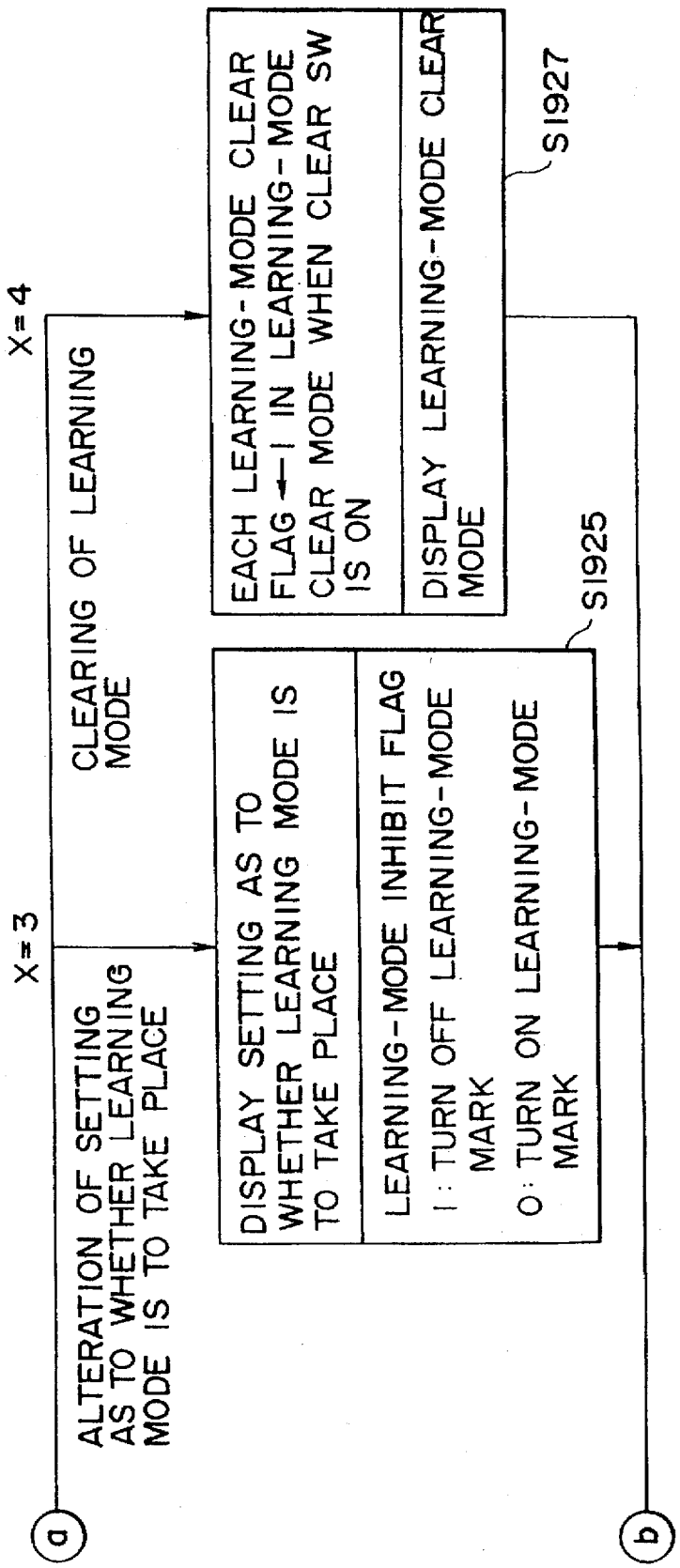
FIG. 19B-II

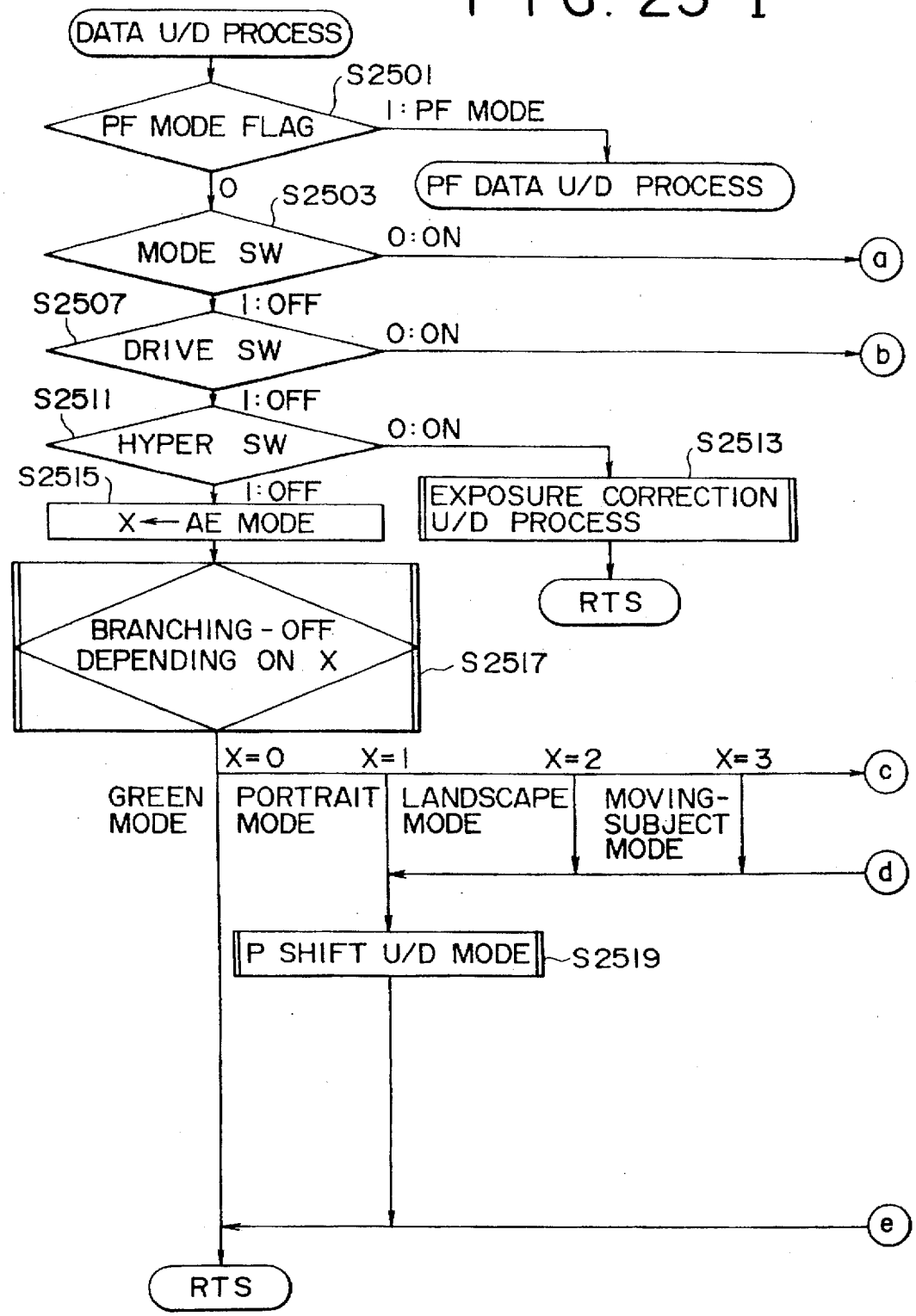
FIG. 25-I

FIG. 25-II
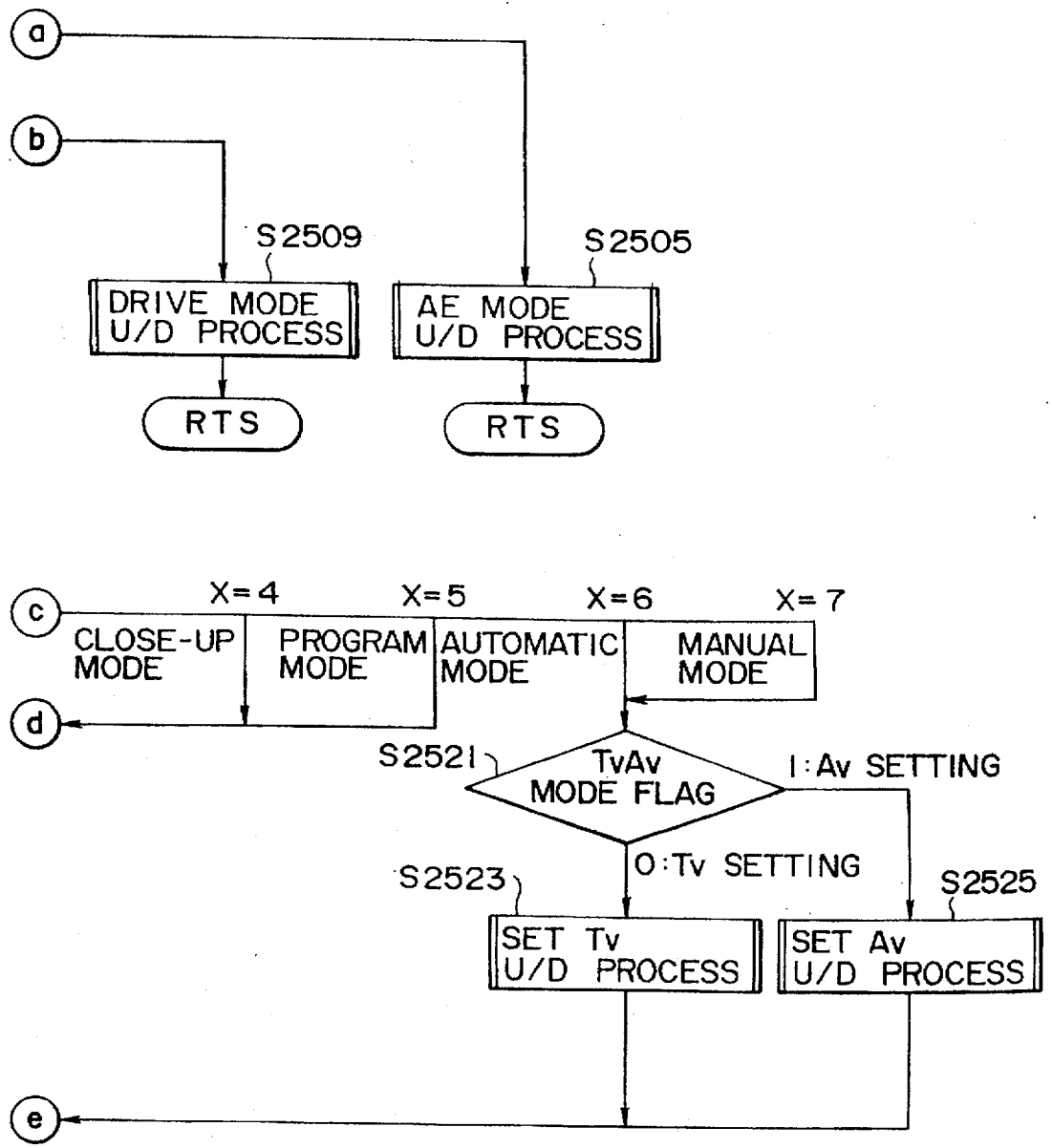

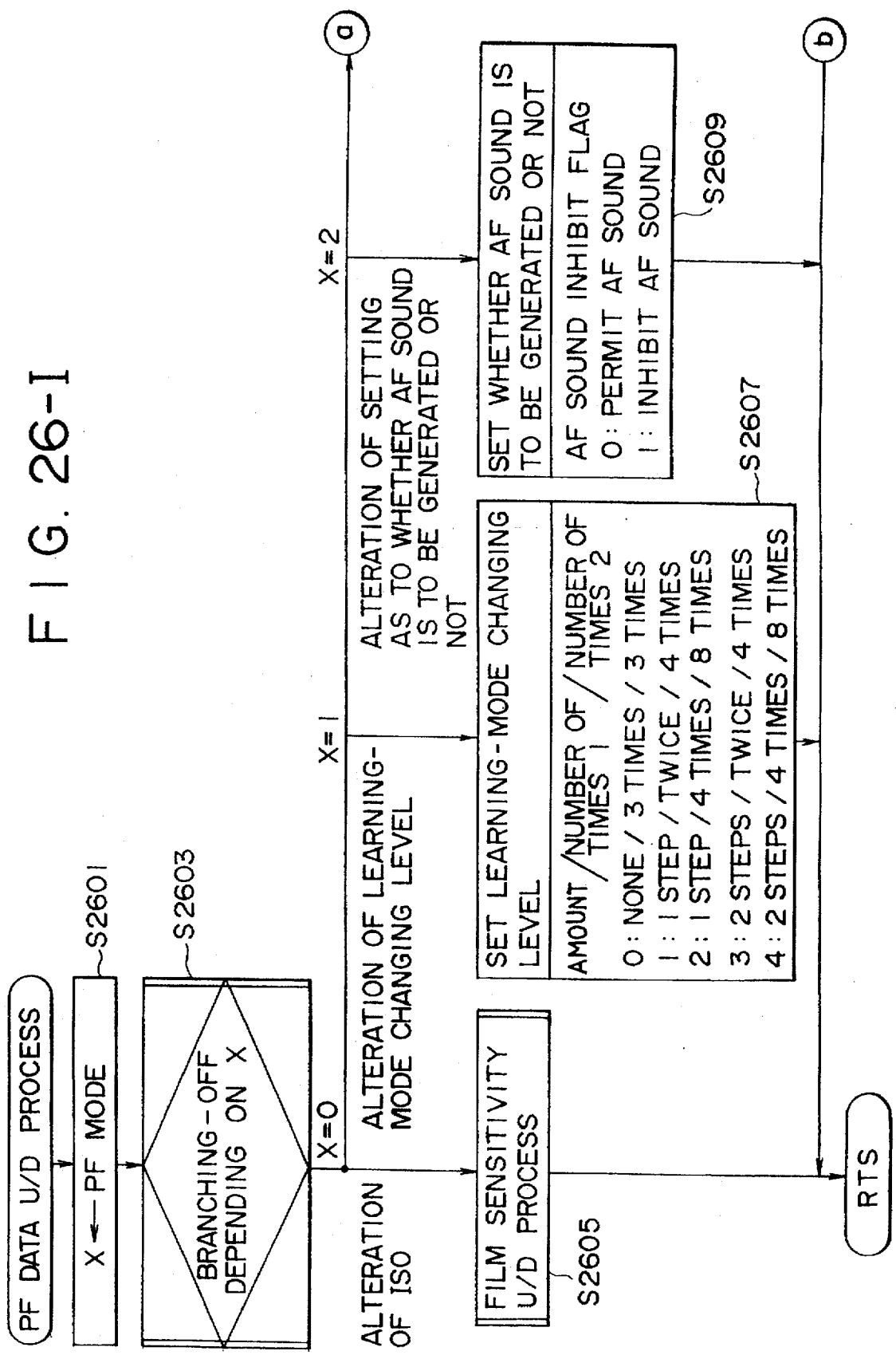
FIG. 26-I

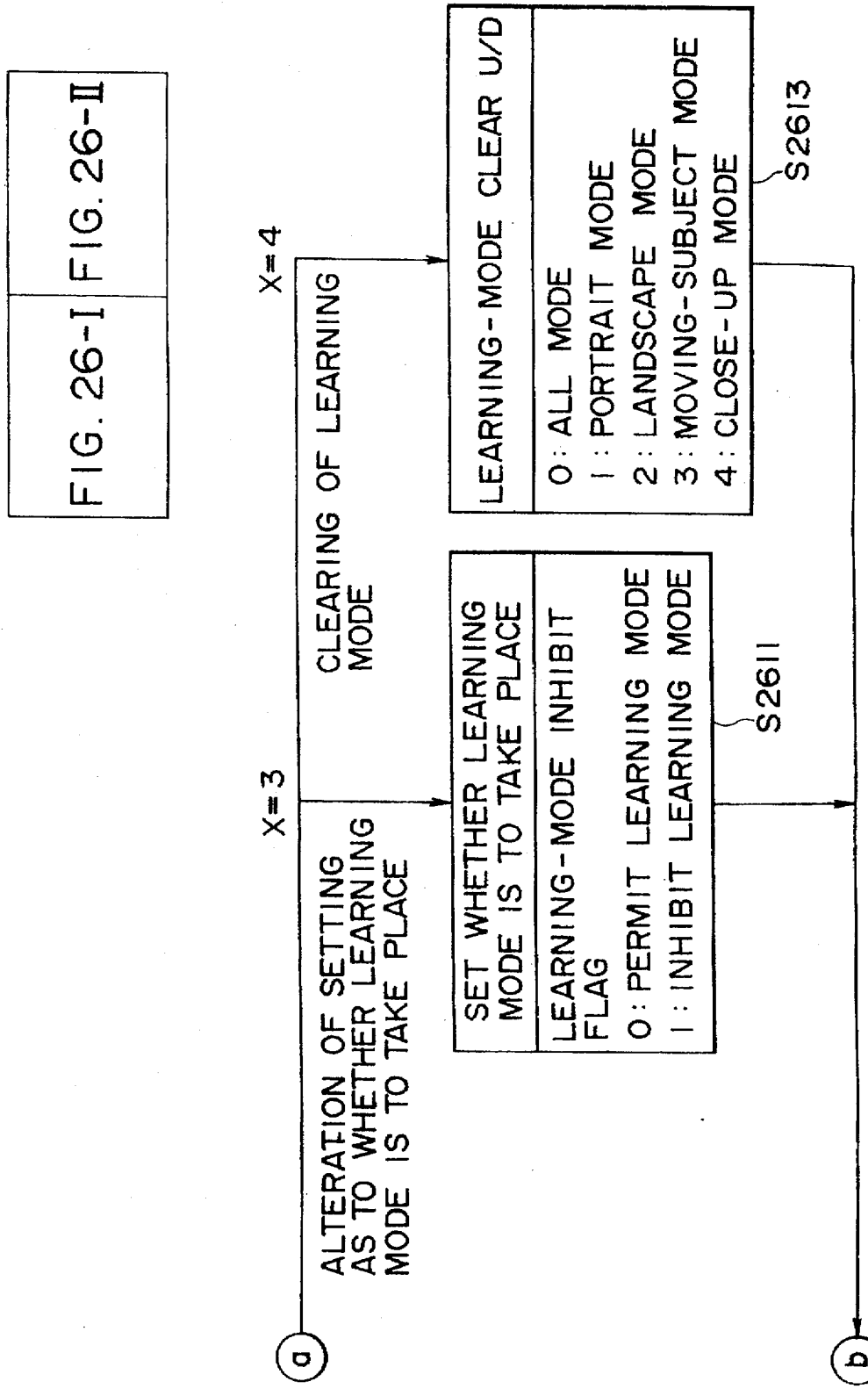

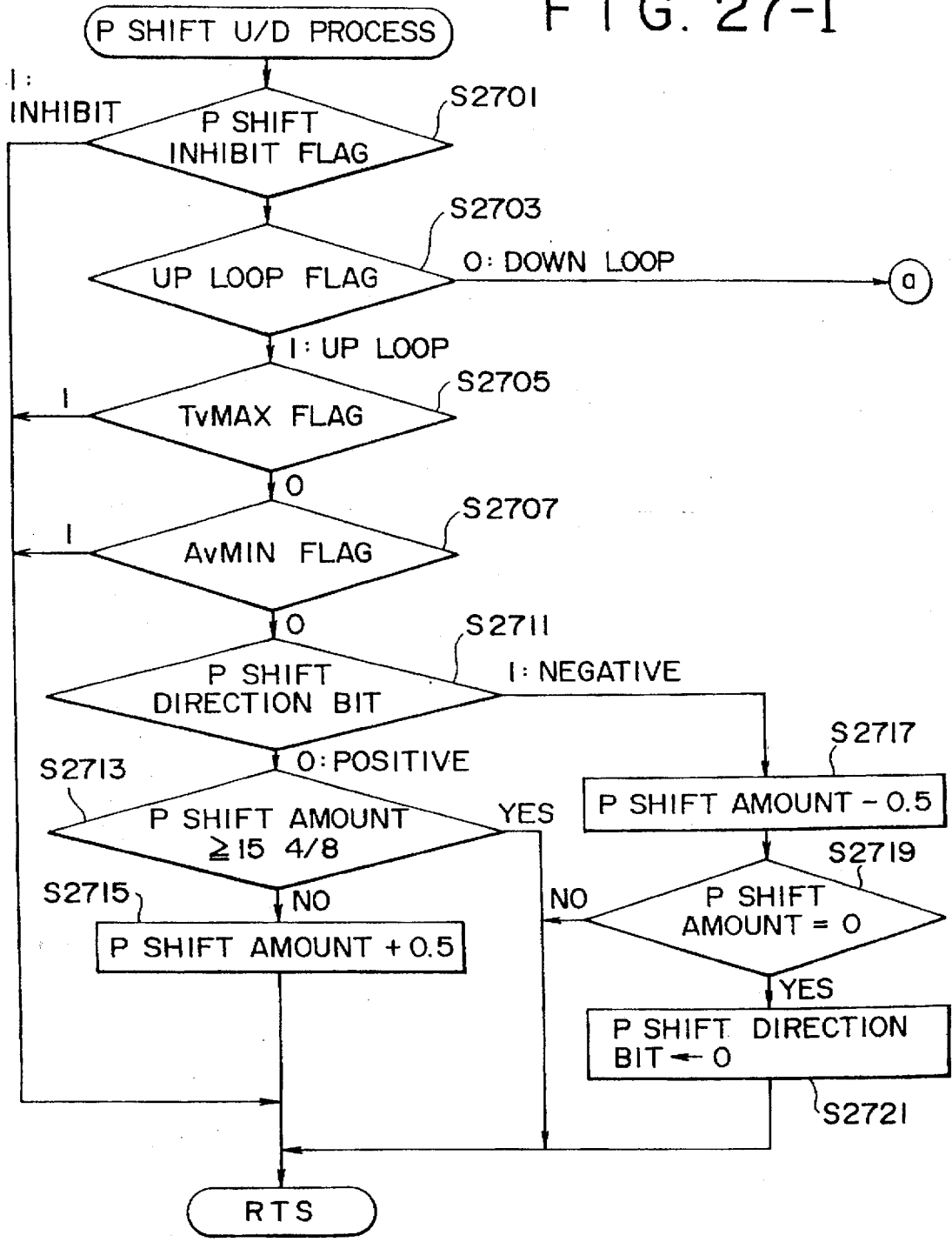
FIG. 27-I

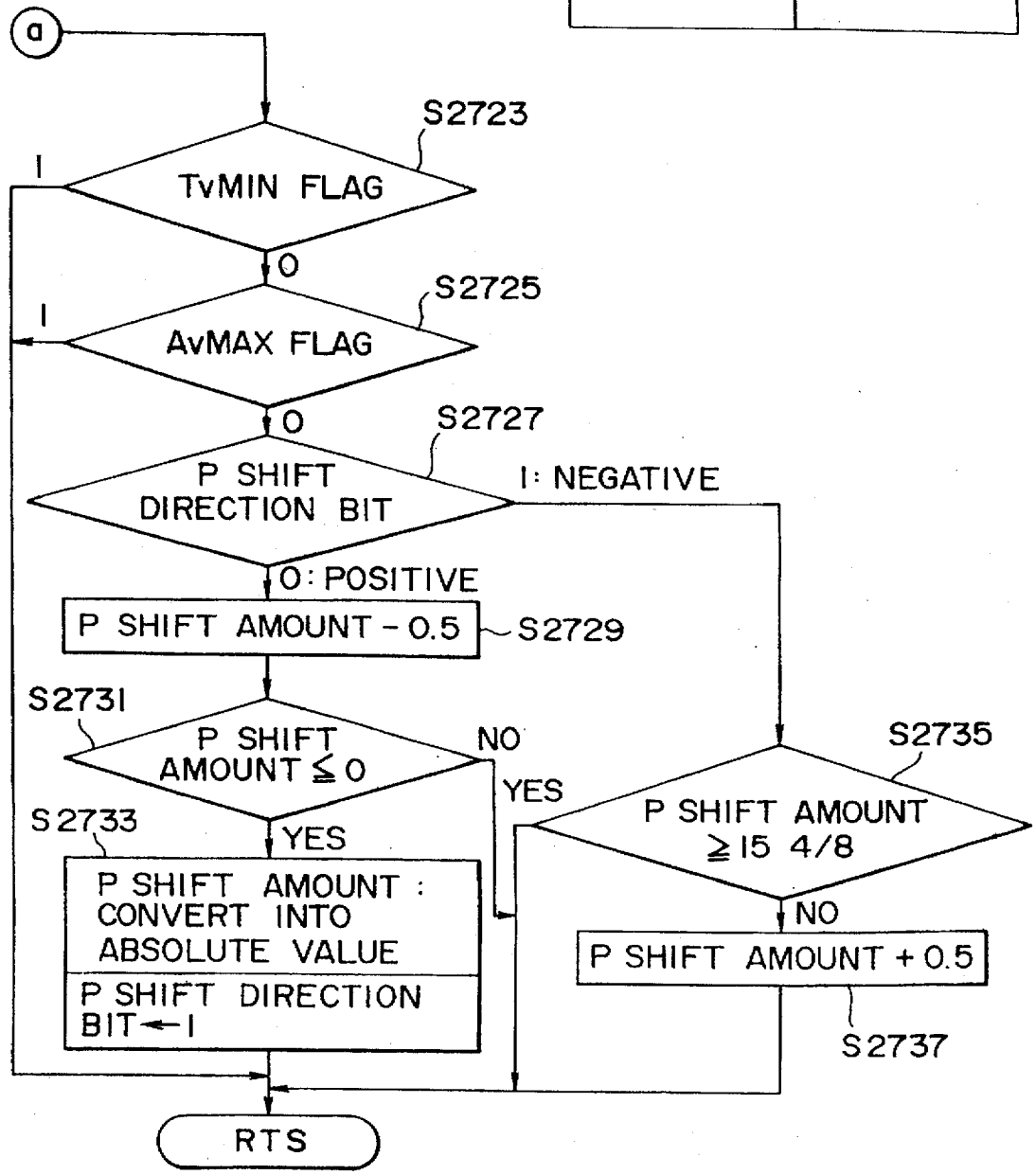

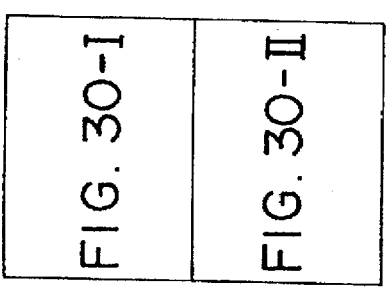
FIG. 30-I
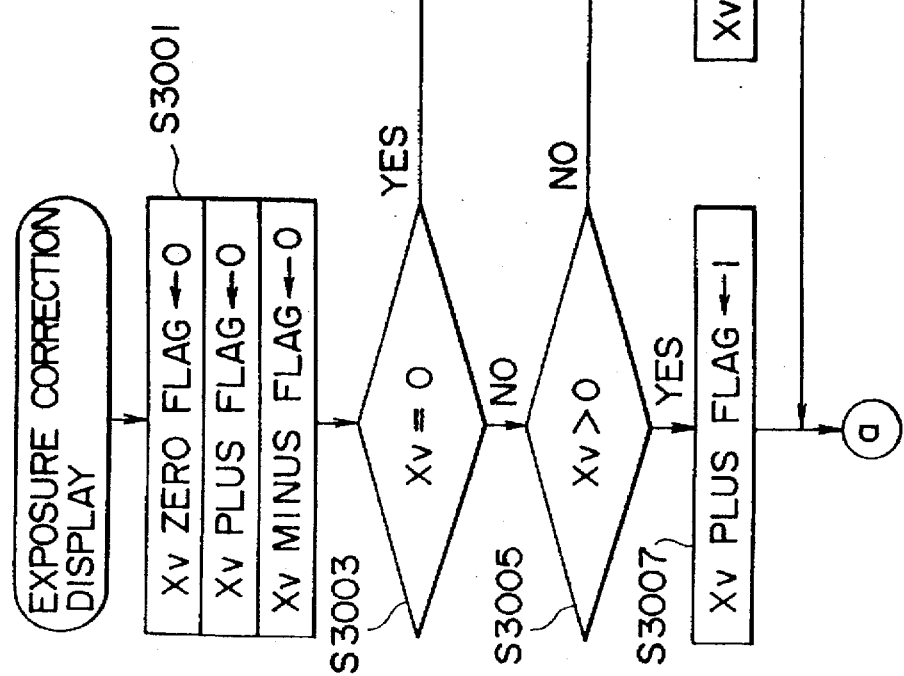

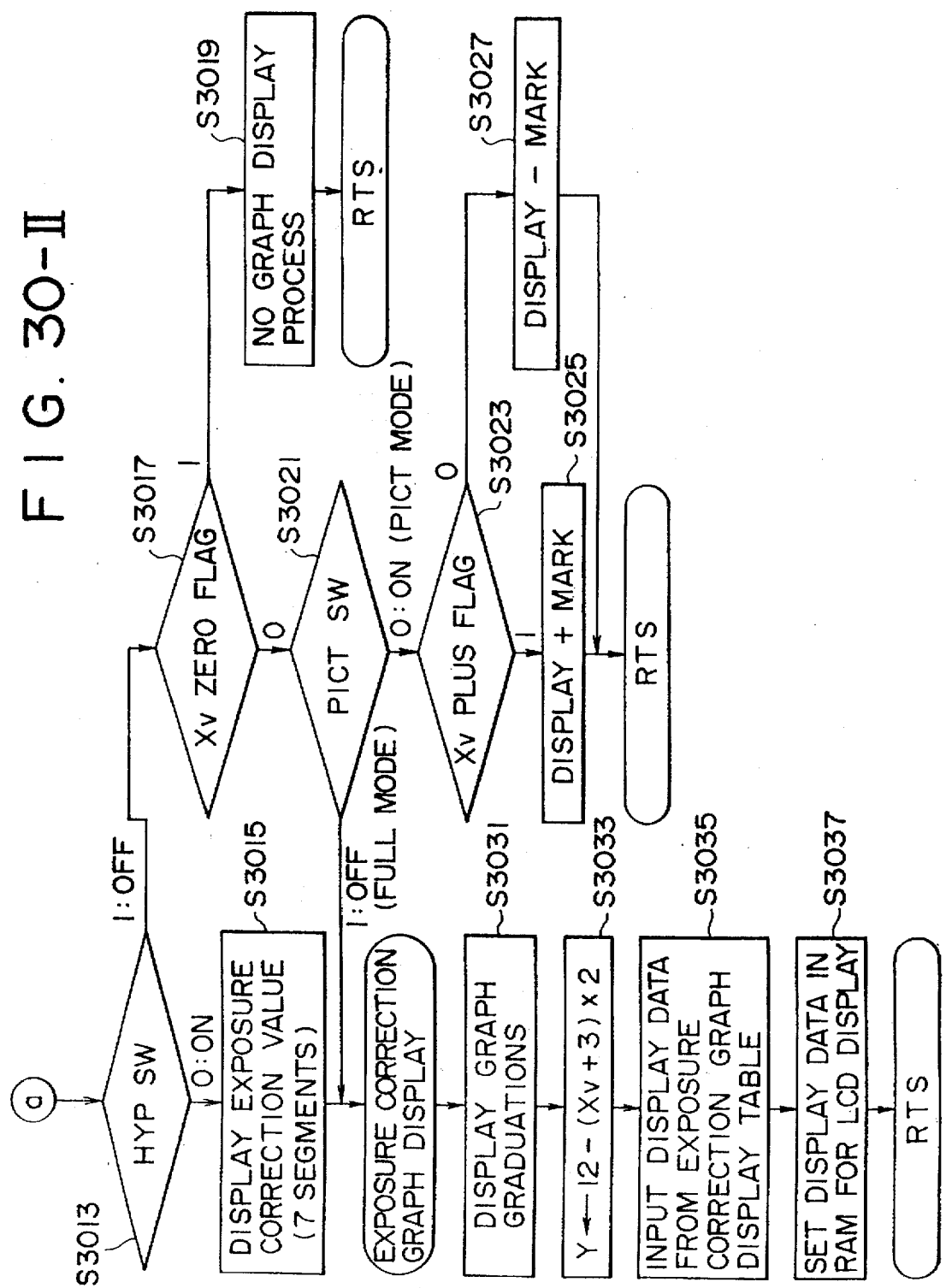

FIG. 31

P SHIFT DISPLAY TABLE

FIG. 36

| AE MODE | EXPOSURE MODE |
|---|---|
| 0 | GREEN |
| 1 | PORTRAIT |
| 2 | LANDSCAPE |
| 3 | MOVING-SUBJECT |
| 4 | CLOSE-UP |
| 5 | PROGRAM (P) |
| 6 | AUTOMATIC (A) |
| 7 | MANUAL (M) |

FIG. 37

| PF TIMER | PF TIMER DISPLAY DATA |
|---|---|
| 0~3 | ○●●●●●●●● |
| 4~7 | ○○●●●●●●● |
| 8~11 | ○○○●●●●●● |
| 12~15 | ○○○○●●●●● |
| 16~19 | ○○○○○●●●● |
| 20~23 | ○○○○○○●●● |
| 24~27 | ○○○○○○○●● |
| 28~31 | ○○○○○○○○● |

FIG. 40

EXPOSURE CORRECTION
GRAPH DISPLAY TABLE

| Y | GRAPH DATA |
|---|---|
| 0 | ○ ○ ○ ○ ○ ○ ○ ○ ✹ |
| 1 | ○ ○ ○ ○ ○ ○ ○ ○ ✹ |
| 2 | ○ ○ ○ ○ ○ ○ ○ ○ ● |
| 3 | ○ ○ ○ ○ ○ ○ ○ ● ○ |
| 4 | ○ ○ ○ ○ ○ ○ ● ○ ○ |
| 5 | ○ ○ ○ ○ ○ ● ○ ○ ○ |
| 6 | ○ ○ ○ ○ ● ○ ○ ○ ○ |
| 7 | ○ ○ ○ ● ○ ○ ○ ○ ○ |
| 8 | ○ ○ ● ○ ○ ○ ○ ○ ○ |
| 9 | ○ ● ○ ○ ○ ○ ○ ○ ○ |
| 10 | ● ○ ○ ○ ○ ○ ○ ○ ○ |
| 11 | ✹ ○ ○ ○ ○ ○ ○ ○ ○ |
| 12 | ✹ ○ ○ ○ ○ ○ ○ ○ ○ |

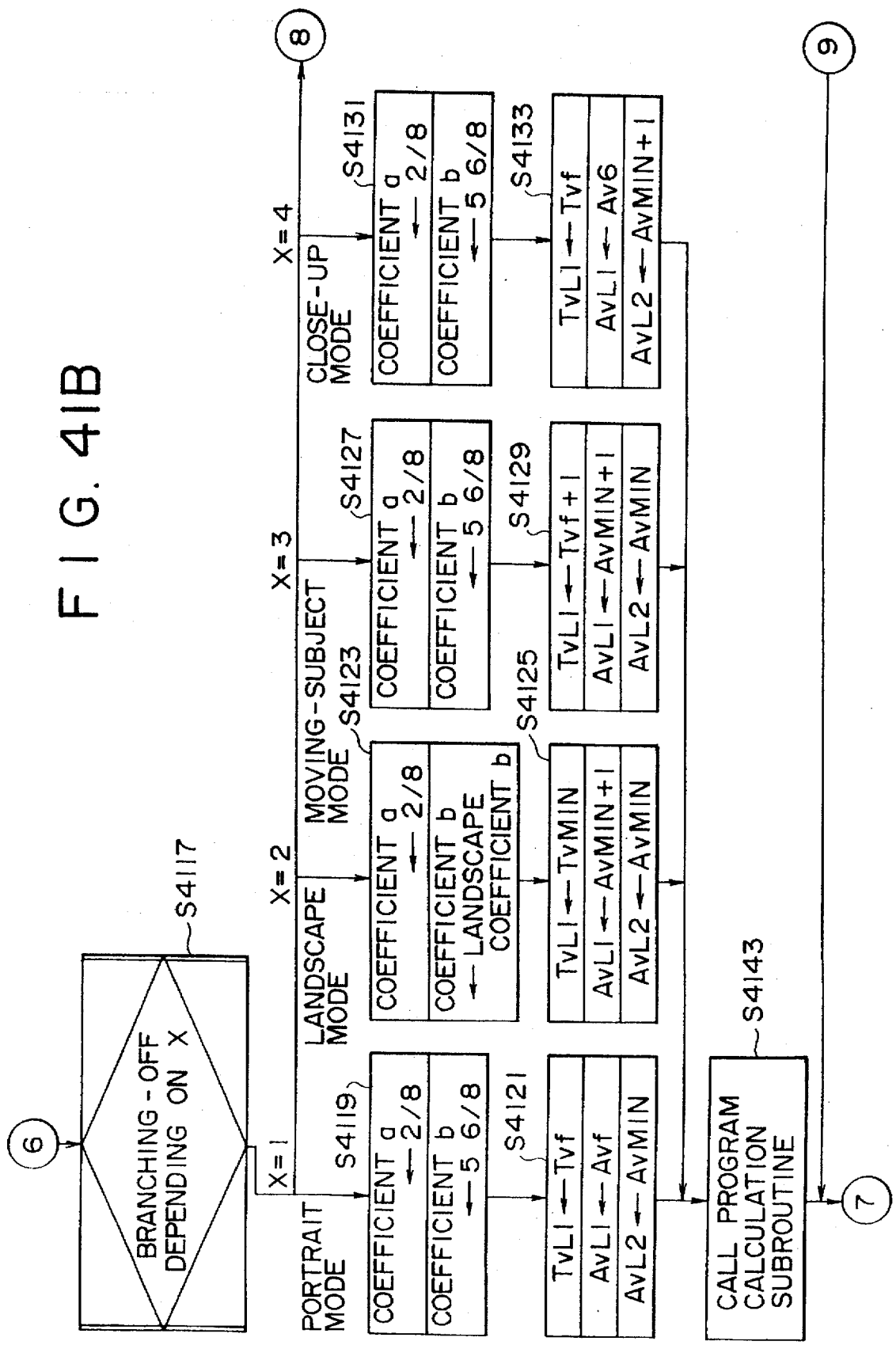

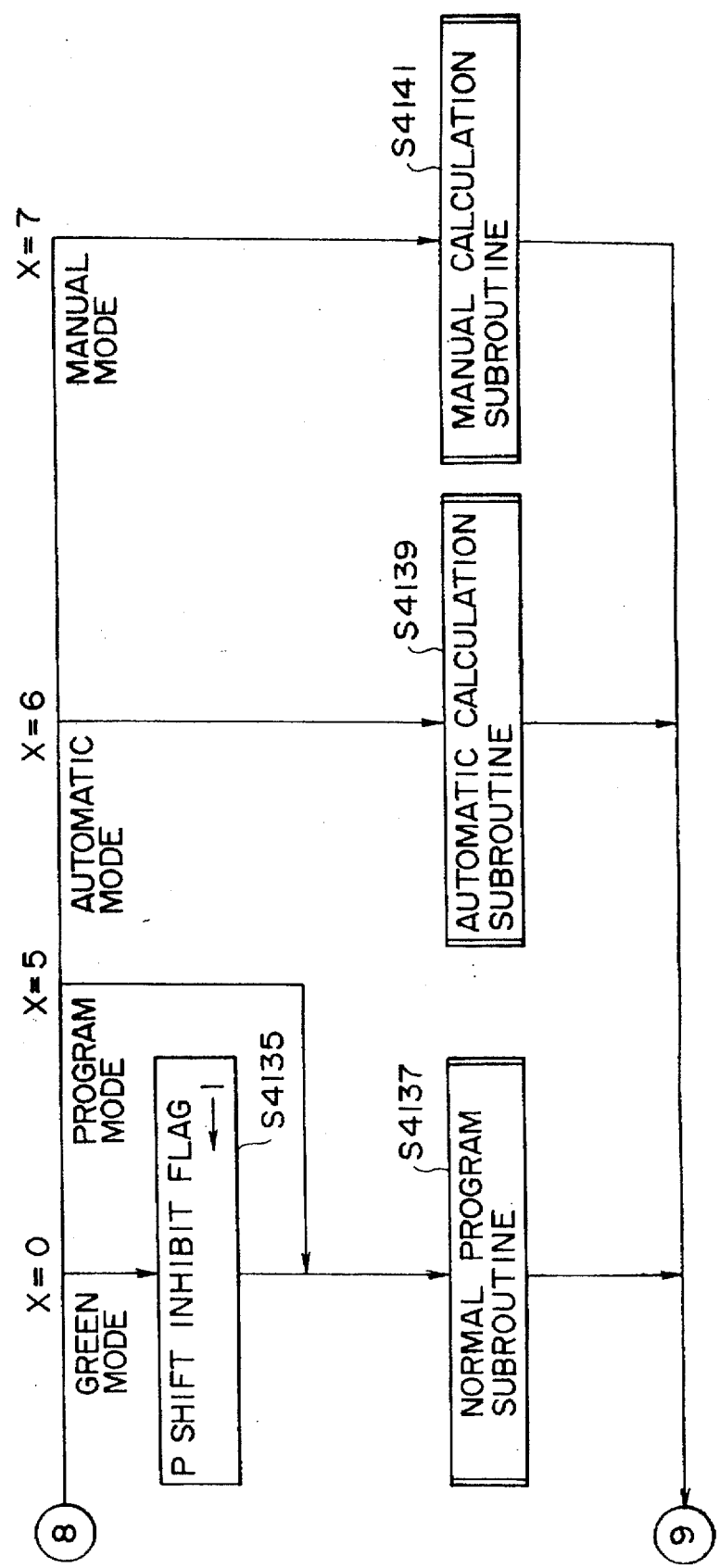

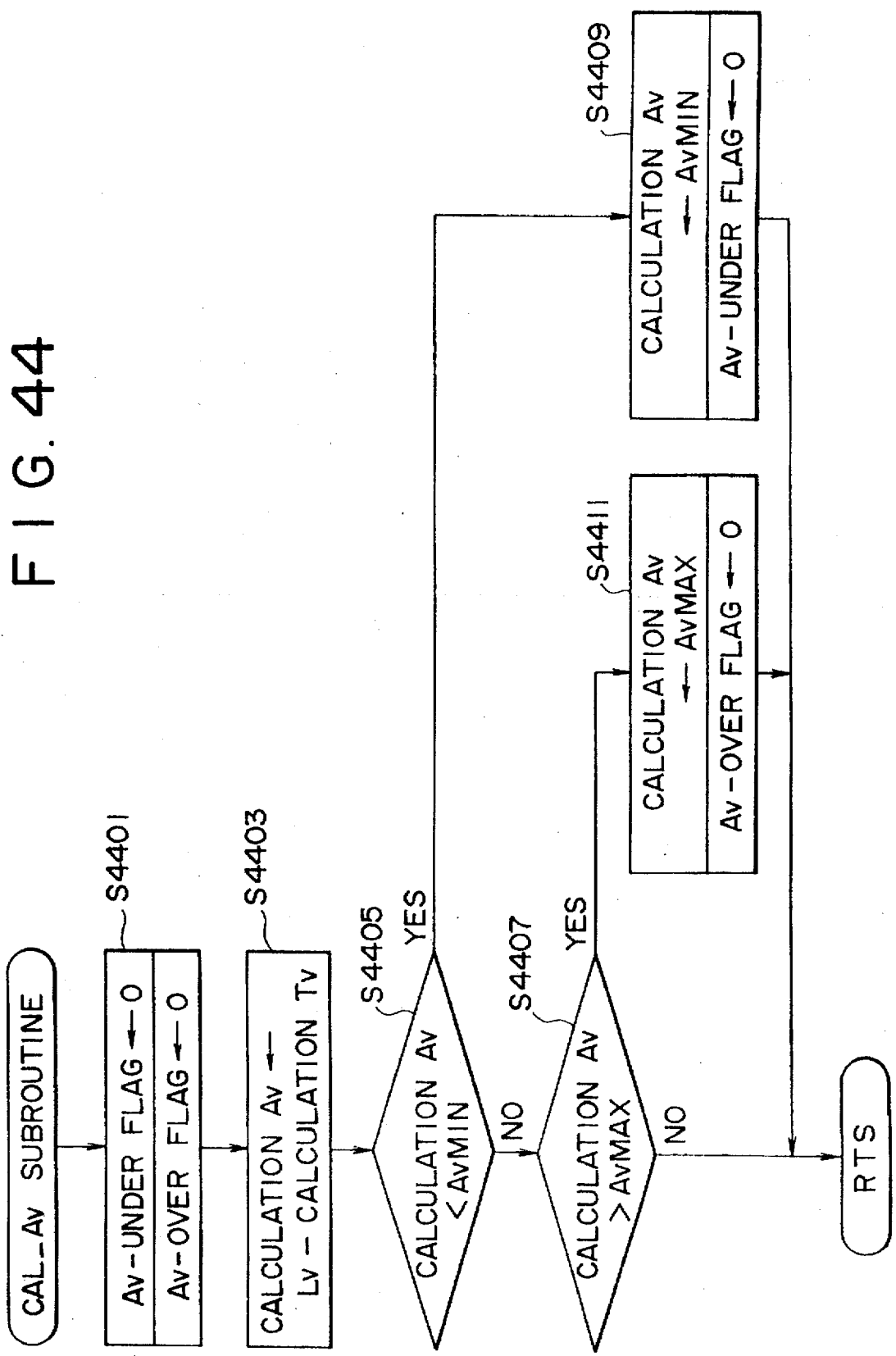
F I G. 44

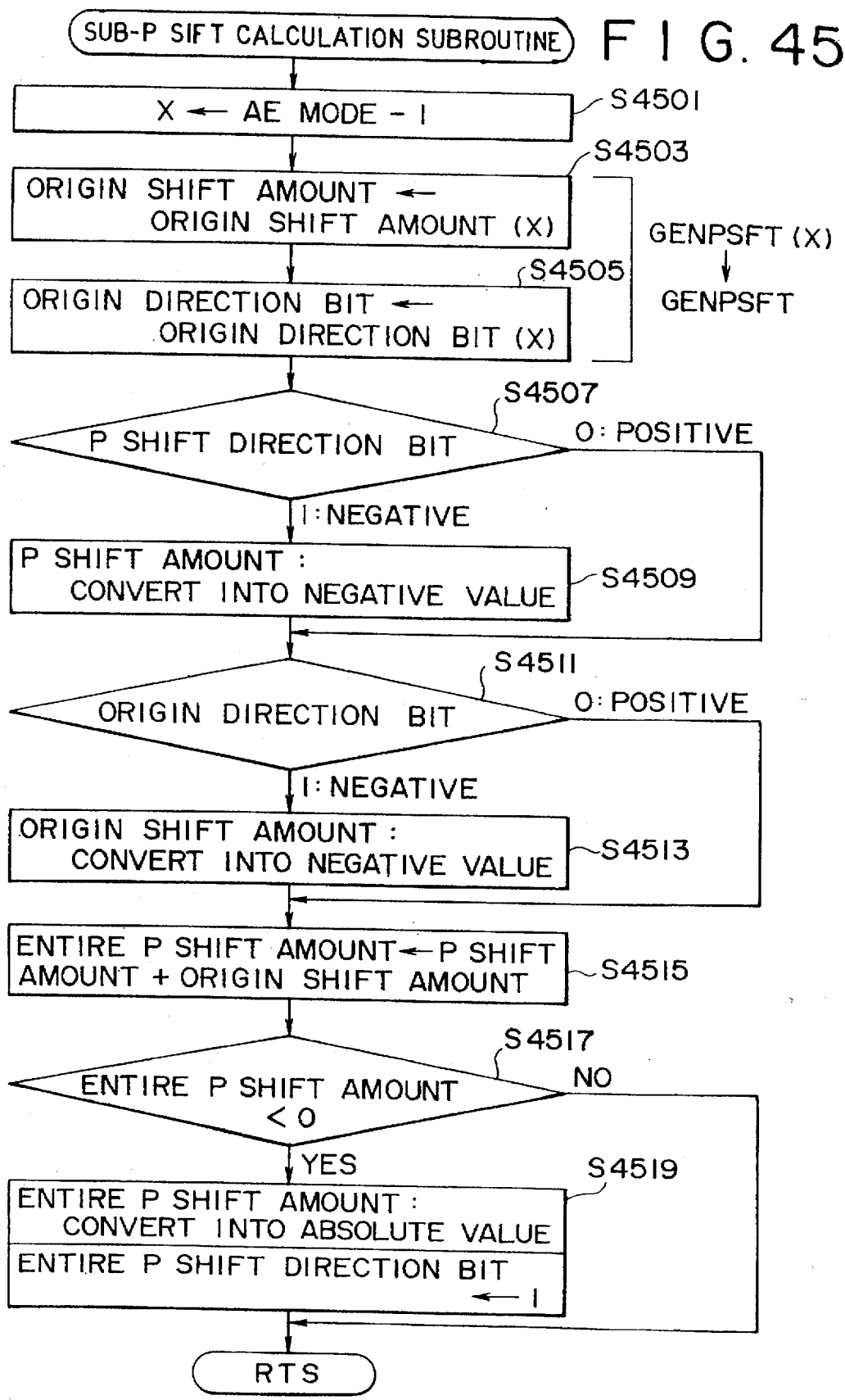

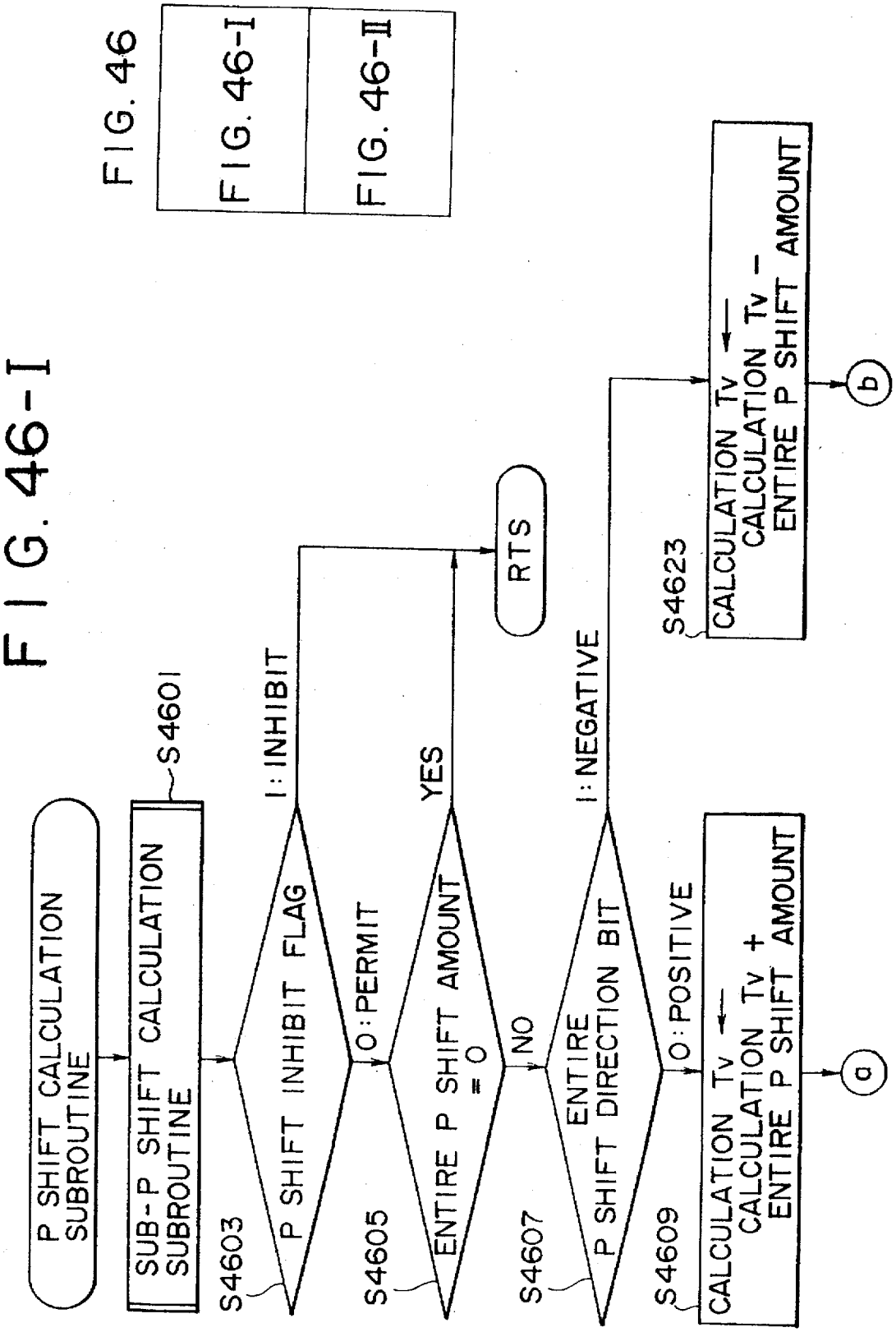

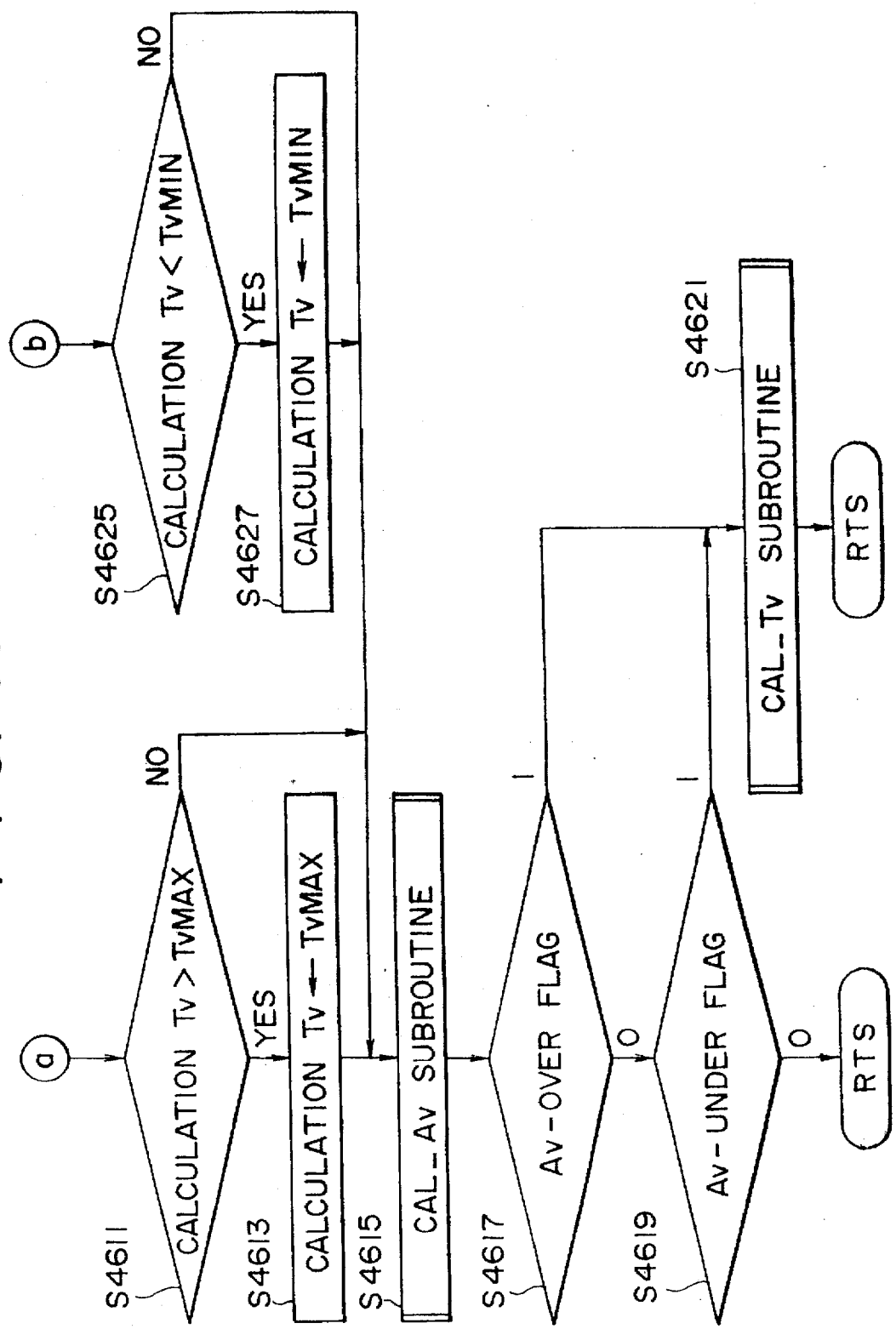

PORTRAIT MODE AE MODE : 1

TvL1 : Tvf
AvL1 : Avf
AvL2 : AvMIN

LANDSCAPE MODE AE MODE : 2

TvL1 : TvMIN
AvL1 : AvMIN + 1
AvL2 : AvMIN

CLOSE-UP MODE AE MODE : 4

TvL1 : Tvf
AvL1 : Av:6(F8)
AvL2 : AvMIN+1

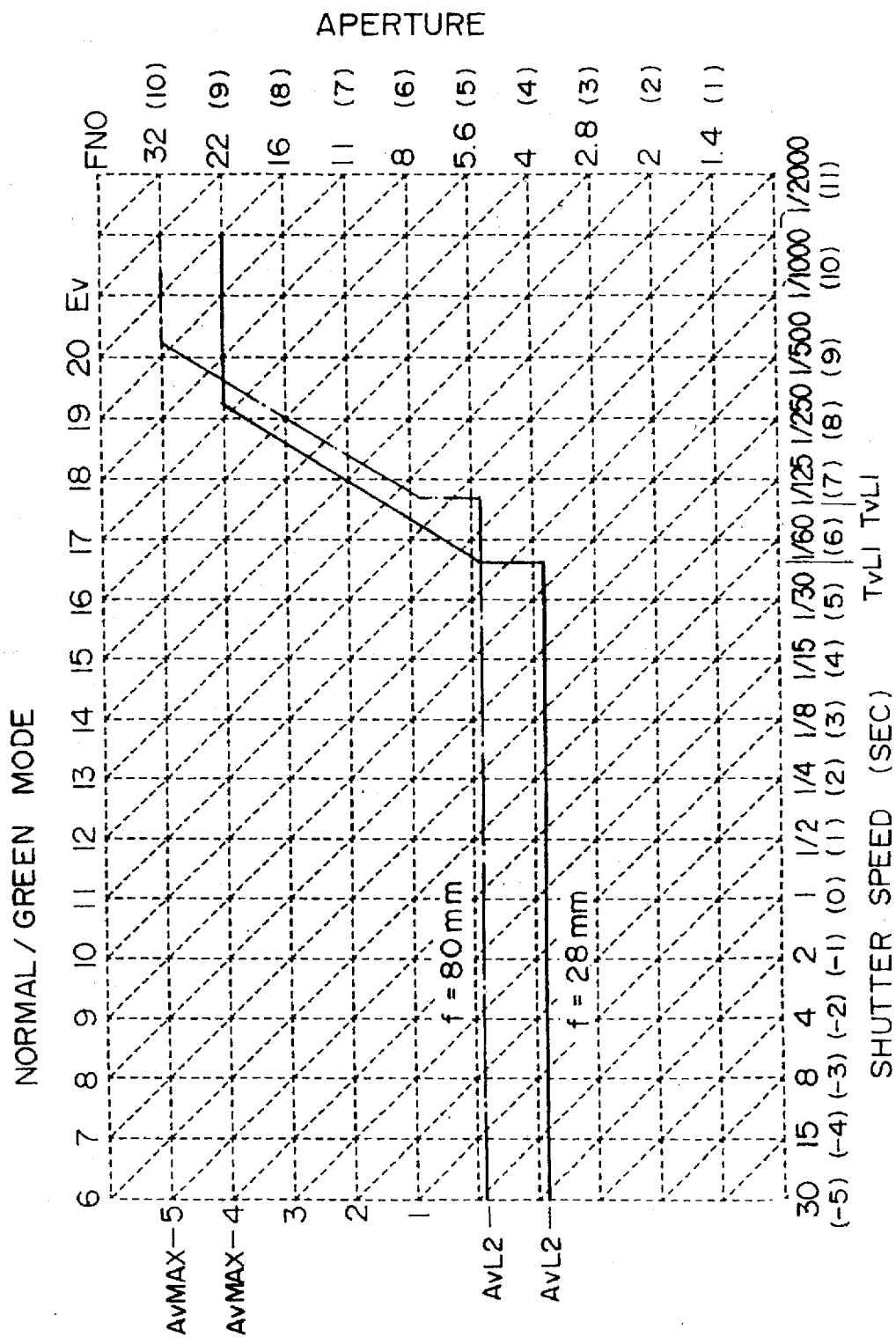

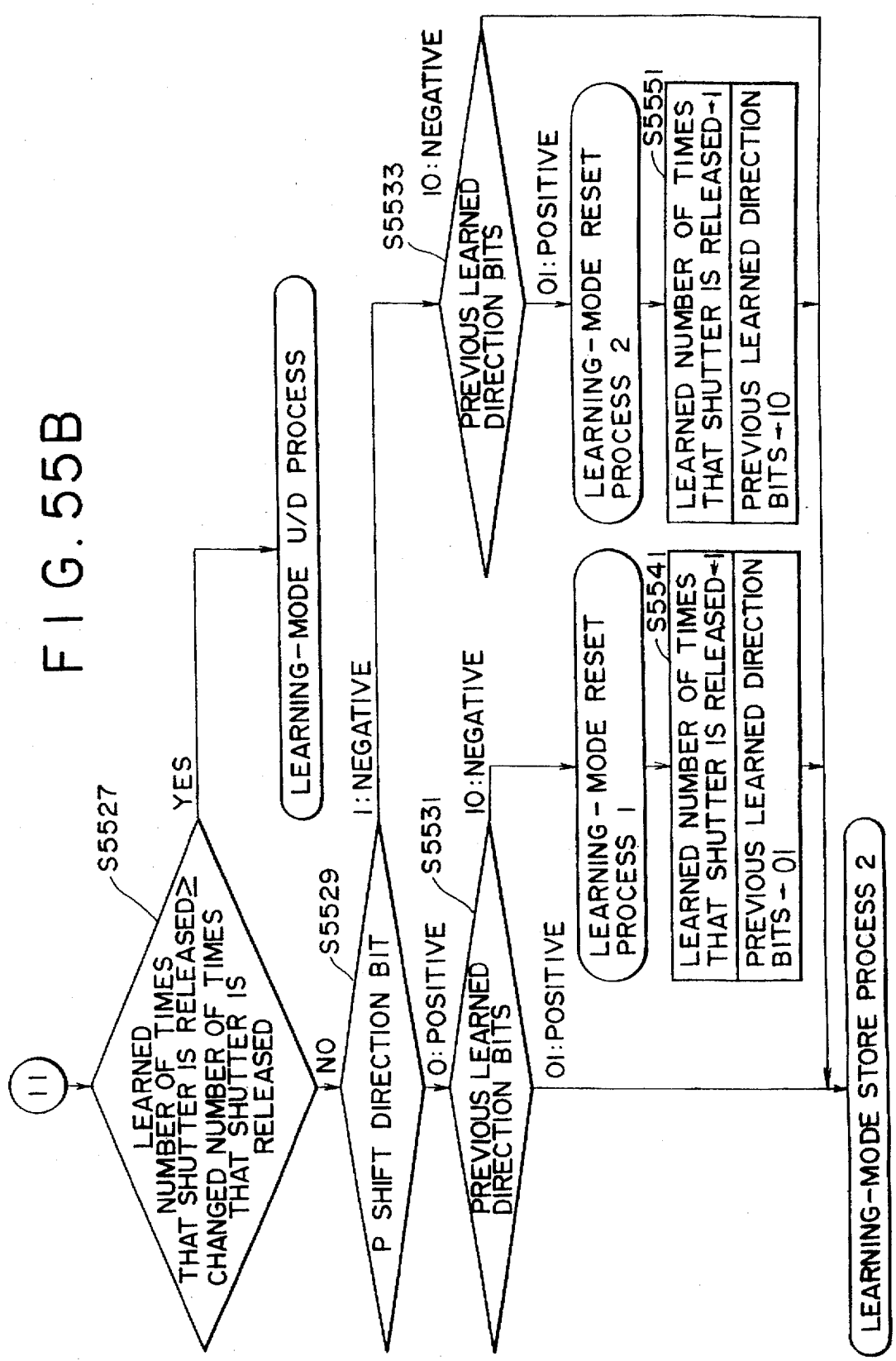

FIG. 59

FORMAT OF ROM AREAS

| RAM AREA NAME | BIT | | | | | | | |
|---|---|---|---|---|---|---|---|---|
| | 7 | 6 | 5 | 4 | 3 | 2 | 1 | 0 |
| ALLPSFT | A | ENTIRE P SHIFT AMOUNT | | | | | | |
| | | 8 | 4 | 2 | 1 | 1/2 | 1/4 | 1/8 |
| SETPSFT | B | P SHIFT AMOUNT | | | | | | |
| | | 8 | 4 | 2 | 1 | 1/2 | 1/4 | 1/8 |
| GENPSFT | C | ORIGIN SHIFT AMOUNT | | | | | | |
| | | 8 | 4 | 2 | 1 | 1/2 | 1/4 | 1/8 |
| STDYCNT | D | LEARNED NUMBER OF TIMES THAT SHUTTER IS RELEASED | | | | | | |
| | | E | 32 | 16 | 8 | 4 | 2 | 1 |

| A | ENTIRE P SHIFT DIRECTION BIT |
|---|---|
| 0 | ENTIRE P SHIFT AMOUNT : POSITIVE |
| 1 | ENTIRE P SHIFT AMOUNT: NEGATIVE |

| B | P SHIFT DIRECTION BIT |
|---|---|
| 0 | P SHIFT AMOUNT : POSITIVE |
| 1 | P SHIFT AMOUNT : NEGATIVE |

| C | ORIGIN DIRECTION BIT |
|---|---|
| 0 | ORIGIN SHIFT AMOUNT : POSITIVE |
| 1 | ORIGIN SHIFT AMOUNT: NEGATIVE |

| DE | PREVIOUS LEARNED DIRECTION BITS |
|---|---|
| 00 | AFTER MOVING ORIGIN OR CLEARING |
| 01 | PREVIOUS LEARNED DIRECTION : POSITIVE |
| 10 | PREVIOUS LEARNED DIRECTION : NEGATIVE |
| 11 | NG |

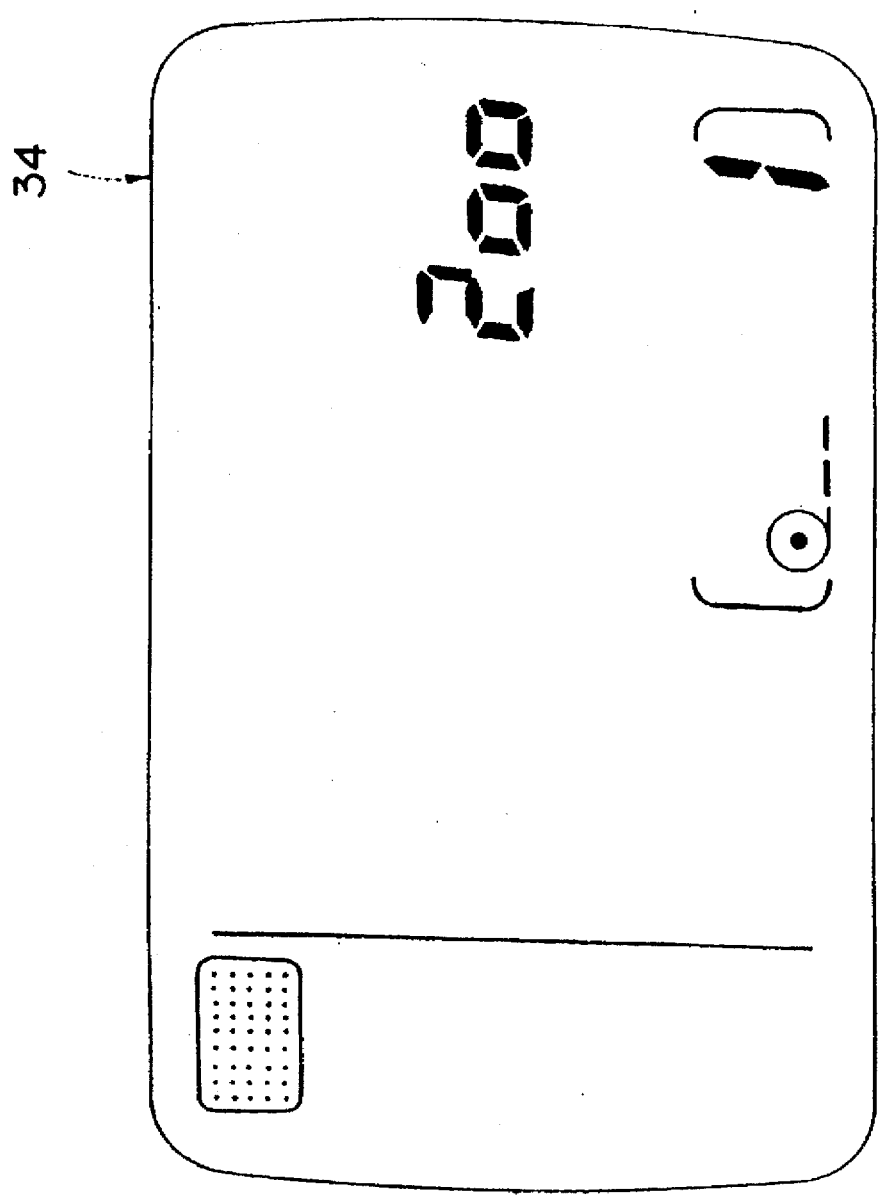

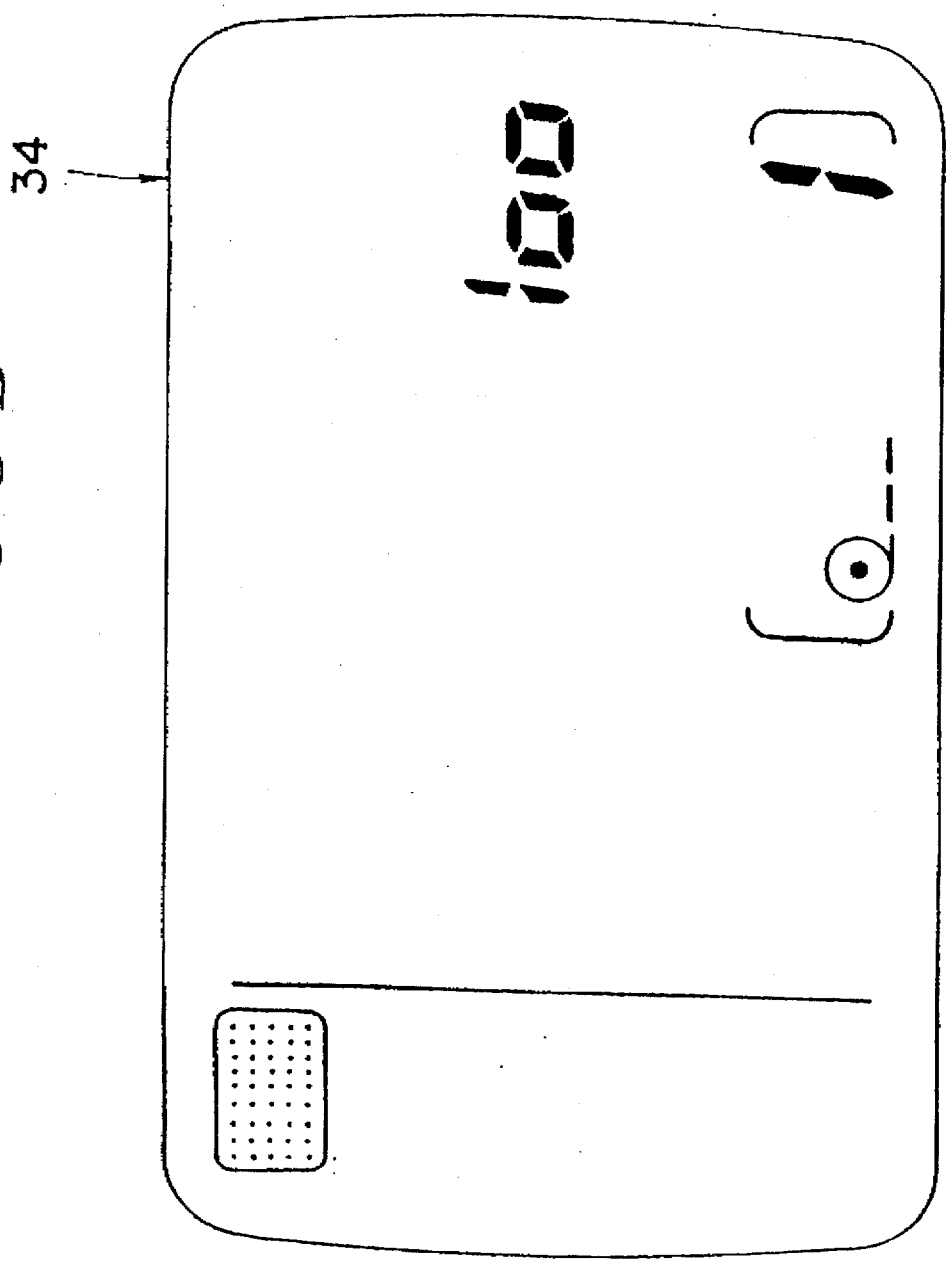

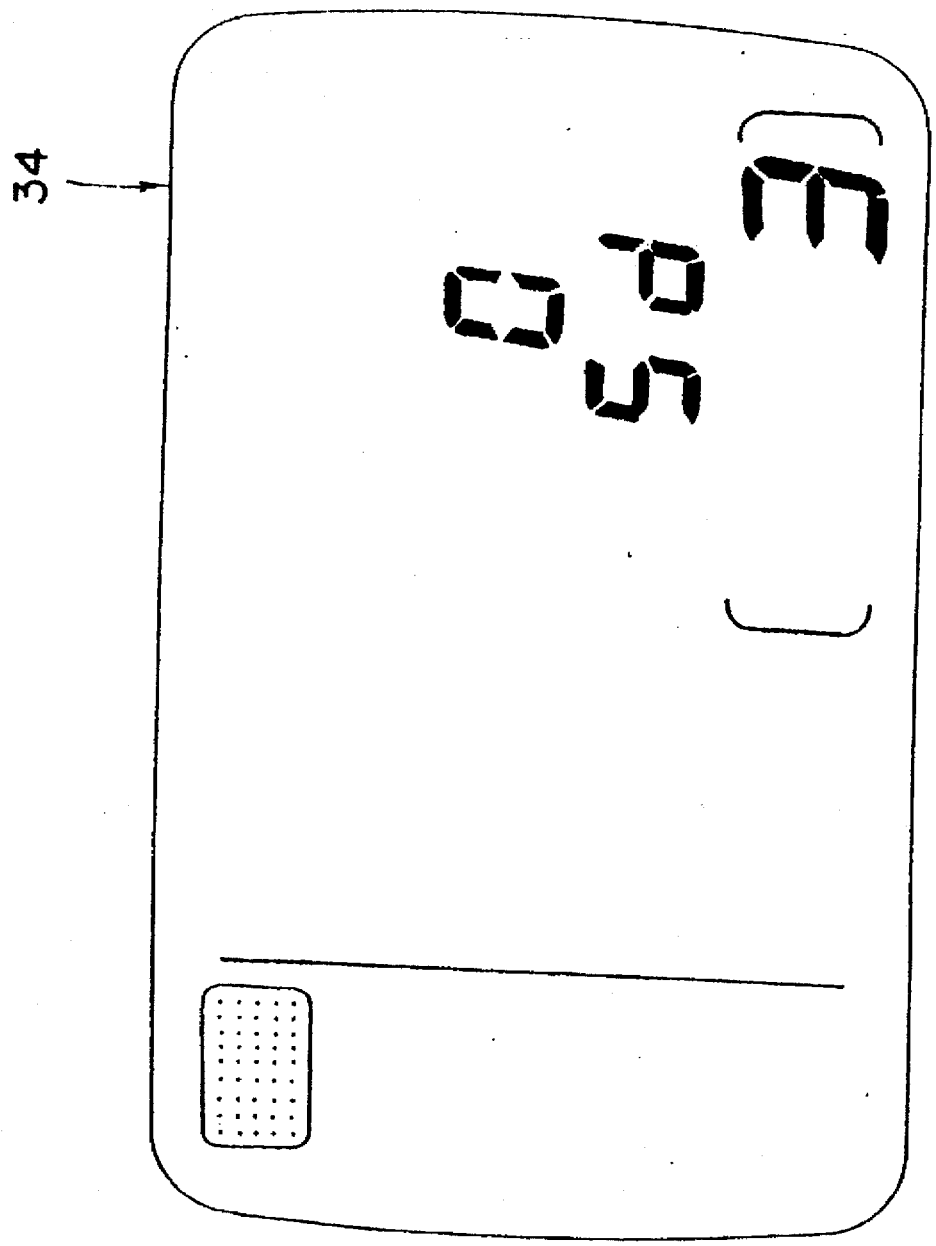

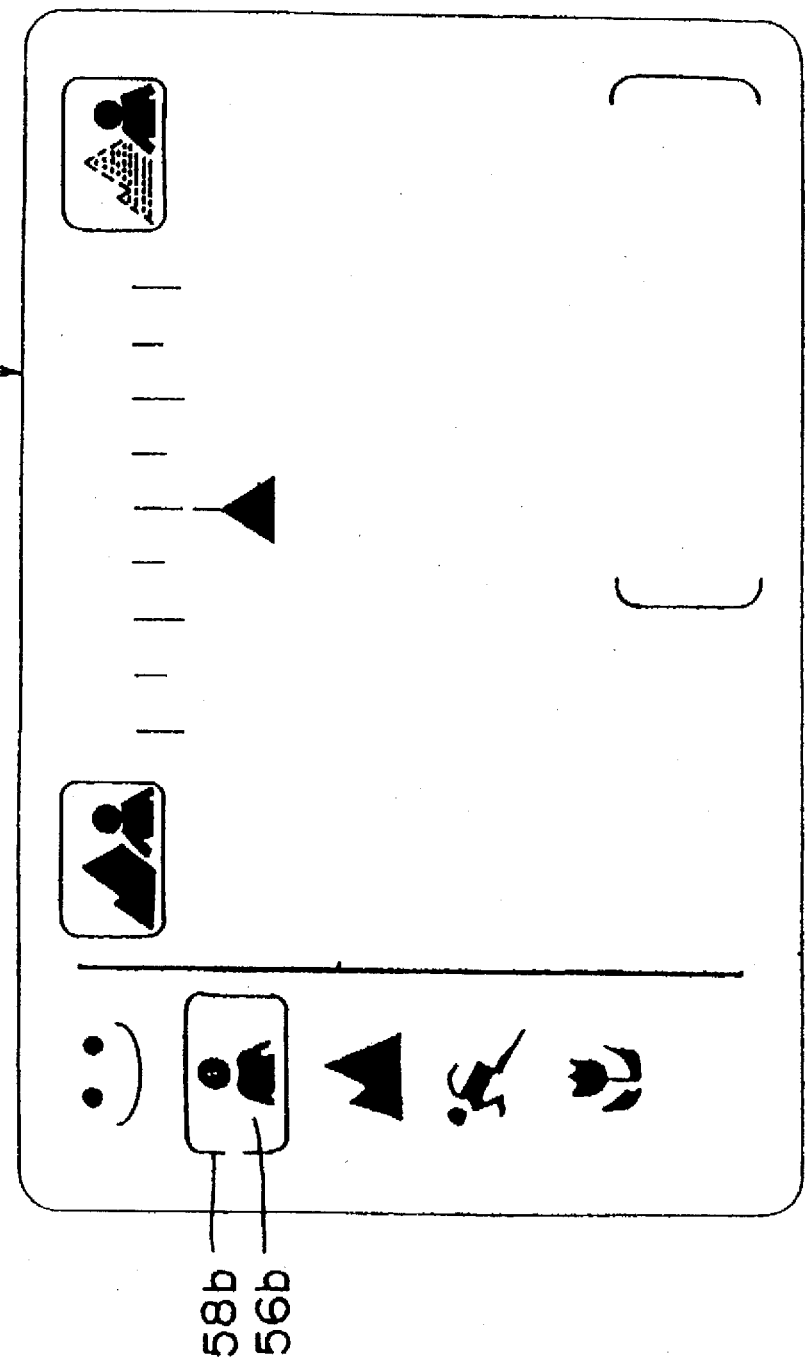

CAMERA WITH LEARNING FUNCTION

This application is a continuation of application Ser. No. 08/114,441, filed Aug. 31, 1993, now abandoned.

BACKGROUND OF THE INVENTION

The present invention relates to a camera which has a program exposure mode with a program shifting function for shifting one or more reference program characteristics of exposure modes.

The present invention also relates to such a camera having a display device for displaying information regarding the exposure modes.

The present invention also relates to a camera having an exposure mode control, and more particularly to the reference program characteristics of exposure modes.

The present invention also relates to a camera which is operable in a normal photographic mode and a function setting mode for setting data in each of a plurality of camera function setting items.

The present invention also relates to a camera capable of switching between various exposure modes.

Some known single lens reflex cameras have a program exposure mode with a program shifting function to enable a particular desired photographing condition to be achieved or to enable a particular combination of shutter speed and aperture to be achieved, depending on the preference of the camera user. When the program shifting function is put into effect, a reference program characteristic or so called program line is shifted along an exposure value EV line and the shutter speed and aperture are obtained on the basis of the shifted program line according to a subject brightness.

With the known camera, the program line is temporarily shifted during the program shifting function and is cleared when a main switch of the camera is turned off, or upon elapse of a predetermined time after the main switch is turned off. Thus, each time the user uses the camera to take a picture or the main switch is turned on, the user must enable the program shifting function so that the program line can be shifted again. Therefore, known single lens reflex cameras having a program exposure mode with a program shifting function have been cumbersome.

This problem is magnified where the camera has a plurality of selectable program exposure modes, and a user may shift a program line in one program exposure mode independent of shifting a program line in another program exposure mode. In addition, when a program shift has been made, it is necessary to turn the main switch off to clear the program shift. This is inconvenient.

The altered shutter speed and aperture that arise when the program line is shifted are mostly displayed as numerals on a display section, such as an external display LCD panel. Thus, the camera user has to read the displayed numerals to recognize the program shift which makes it difficult for the user to discern that a different photographic effect will arise consequent to changes in the shutter speed or in aperture. It is also difficult for the user of the camera to visually and accurately discern that a shift program has taken place.

Known cameras have a plurality of exposure modes which a user can choose from by operating a switch or the like. In the exposure modes that can be selected, an aperture and a shutter speed are varied in a certain relationship along a plurality of reference program characteristics to obtain a desired photographic effect.

In a portrait mode for taking a portrait picture, the particular program characteristic sets the aperture to be fixed to adapt the camera only to portrait exposures. Therefore, the portrait mode may not be suitable for taking general pictures of people.

In a close up mode for taking a close up picture, the particular program characteristic fixes the aperture at about F4 for control with a zoom lens in a macro range. However, it is difficult to apply the close up mode to a macro lens using such a setting. Therefore, there has been a demand for a camera with a close up mode that is adaptable not only to a zoom lens macro range but also to a macro lens used in the close up mode.

In a landscape mode for taking a landscape picture, the particular program characteristic fixes the aperture at F5.6, thus ignoring precautions against hand induced vibration.

Many known cameras are equipped with various special functions including, for example, a function for changing ISO sensitivity and a function for producing an electric buzzer sound when the camera is in focus.

Heretofore, cameras have had dedicated operating buttons or the like which are operable as required to change and set the respective functions. With this arrangement of dedicated operating buttons, as the number of functions increases, the number of operating buttons also increases. The number of operating buttons should be limited because an increased number of buttons increases the cost of the camera and makes the camera less manageable, thus leading to errors in operation thereof.

Some cameras have a mode switch for switching the operation mode of the camera from a normal photographic mode to a function setting mode. In the function setting mode, a plurality of functions can be set by choosing and setting items and data in each of the items. However, this arrangement is not desirable from the design viewpoint nor is it desirable from the viewpoint of the camera operator because independent operating members are provided for setting the functions. In addition, the system for changing data after switching between the modes makes the process of returning modified data to initial values very complex.

Known cameras with a program shifting function have an exposure value which is changed or corrected by an up/down button while an exposure correcting button is pressed. However, to clear the exposure correction value, it has been necessary to operate the up/down button in reverse to return the exposure value to the value prior to exposure correction or to provide a dedicated button for clearing the exposure correction.

Known cameras capable of switching between various exposure modes can set an exposure mode that matches photographing conditions in order to take pictures. For example, the user of the camera may want to take pictures in a manual exposure mode in which the user can set a shutter speed or an aperture freely, or in an automatic exposure mode in which the user can select a shutter speed preference condition or an aperture preference condition. The user may also want to take pictures in a program exposure mode in which a shutter speed and an aperture are set by the camera for optimum exposure.

The amount and direction of a program shift in the program exposure mode are displayed by a dedicated display unit. The amount and direction of an exposure correction made in the automatic exposure mode are displayed by another dedicated display unit.

The display panel of conventional automatic exposure control cameras displays a variety of information. However, if the program shift conditions such as the amount and direction thereof, and the exposure correction conditions such as the amount and direction thereof are separately displayed, then the display units are necessarily large in size, presenting an obstacle to efforts to reduce the camera size. There is, therefore, a demand to overcome these problems.

SUMMARY OF THE INVENTION

It is an object of the present invention to provide a camera which learns the tendency of a camera user to take a picture after changing a program characteristic.

It is a further object of the present invention to provide a camera which independently changes a program characteristic in each of a number of program controlled exposure modes and which learns the tendency of the user to take a picture after changing a program characteristic in a program controlled exposure mode.

It is a further object of the present invention to provide a camera which learns the tendency of the user to take a picture after changing a program characteristic and wherein the learned tendency can be simply cleared.

It is a further object of the present invention to provide a camera which learns the tendency of the user to take a picture after changing a program characteristic on the condition that a film is loaded in the camera.

It is a further object of the present invention to provide a camera having a program exposure mode control wherein the reference program characteristic is adapted according to the exposure mode.

It is a further object of the present invention to provide a camera capable of setting and changing functions in a function setting mode and capable of returning all data to initial values through a simple operation.

It is a further object of the present invention to provide camera which can clear an exposure correction value through a simple operation.

It is a further object of the present invention to provide a camera having an exposure mode display device which allows the user of the camera to easily discern a different photographic effect arising from a change in shutter speed or aperture.

It is a further object of the present invention to provide a camera having display means which allow the user of the camera to easily discern the direction in and the amount by which a program has been shifted.

It is a further object of the present invention to provide a camera capable of reliably displaying program shift conditions and exposure correction conditions without increasing the size of a display unit.

According to one aspect of the present invention a camera is provided with a program controlled exposure mode in which exposure parameters are fixed for each exposure value according to a reference program characteristic. Setting means temporarily change the exposure parameters to a constant exposure value with respect to the values predetermined by the reference program characteristic, and control means modify the reference program characteristic based upon the temporary changing of exposure parameters and at least one exposure operation executed according to the changing.

It will be apparent that the term "modify" is to be construed in a broad manner. Thus, it clearly encompasses embodiments wherein the reference program characteristic after modification results from the control means changing the actual values of the reference program characteristic, or applying change values to those values of the reference program characteristic, or substituting another reference program characteristic. Furthermore, the term "reference" encompasses a current reference program characteristic as well as a preset program characteristic.

As is apparent from the above, when the user of the camera of the present invention releases the shutter a plurality of times while the exposure parameters fixed by a reference program characteristic are being temporarily changed in a selected program exposure mode, the camera modifies the reference program characteristic so that thereafter a shutter speed and an aperture are fixed based on the modified reference program characteristic. Therefore, simply by modifying the reference program characteristic according to the user's preference and repeating exposures in the selected program exposure mode, a combination of a shutter speed and an aperture which the user prefers, i.e., a learned program line, can be obtained in each program controlled exposure mode.

In one preferred embodiment, the control means modifies the reference program characteristic based on a magnitude of the temporary change.

In another preferred embodiment, the control means modifies the reference program characteristic based on a direction of the temporary change.

Preferably, said control means modifies the reference program characteristic based on a predetermined number of exposure operations executed according to the changing.

In a particular case, the predetermined number is variable according to a magnitude of the temporary change.

Preferably, the predetermined number is different according to whether the magnitude of said temporary change is equal to or greater than a predetermined value or whether the magnitude of the temporary change is smaller than the predetermined value.

Conveniently, the control means comprises counting means for counting exposure operations executed according to the changing. The counting means is reset for counting when a direction of the temporary change changes before the count is greater than or equal to the predetermined number.

In one preferred embodiment, the control means modifies a the reference program characteristic based upon the temporary changing of exposure parameters and at least one exposure operation executed according to the changing by means of substituting another predetermined program characteristic.

Conveniently, the control means comprise memory means for storing the modified reference program characteristic.

In another preferred embodiment, the control means modifies a reference program characteristic based upon the temporary changing of exposure parameters and at least one exposure operation executed according to the changing by shifting that reference program characteristic by a predetermined amount.

In this case, the camera may further comprise memory means for storing a direction and magnitude of the shifting.

The camera preferably has two or more program controlled exposure modes, wherein each mode has a respective reference program characteristic and the control means modifies a respective reference program characteristic of a respective mode.

Since the camera of the present invention allows independent modified reference program characteristics for each of the program controlled exposure modes, when switching between program controlled exposure modes is effected, the camera is not affected by a temporary change in exposure parameters prior to the switching. Therefore, such changes contrary to the intention of the user are eliminated.

Conveniently, the temporary changing is evaluated on the basis of shutter speed.

In another preferred embodiment, the camera further comprises means for reverting the modified reference program characteristic to a preset initial reference program characteristic.

Thus, the modified reference program characteristic can be effectively erased in a simple manner by the reverting means so that a preset initial reference program characteristic is available for fixing the exposure parameters.

Preferably, the camera further comprises count clearing means for clearing the count of the counting means.

In one case, the count clearing means simultaneously clears the count of the counting means with the clearing of the stored transition.

In another preferred embodiment, the camera further comprises film detecting means for detecting whether a film is loaded or not in the camera. The control means is operable on the condition that the film detecting means detects a film loaded in the camera.

As no modification of a reference program characteristic takes place when a film is not loaded, any modification contrary to the intention of the user does not take place at the time the shutter is released with no film loaded.

Conveniently, the film detecting means comprises DX code reading means for reading a DX code on a film cartridge, and detects whether a film is loaded or not in the camera based on a DX code read by the DX code reading means.

In another preferred embodiment, the camera includes learning display means for displaying a status of operation of said control means.

Since the direction in and the amount by which the reference program characteristic has been shifted are displayed by the learning display means, the camera can be handled with ease.

Conveniently, the learning display means includes a display section for displaying a magnitude of the temporary change.

The display section can display the modified reference program characteristic.

In one case, the display section has graduations spaced at predetermined intervals with energizable display elements disposed in positions corresponding to the graduations.

Preferably, the display elements are energizable in the direction of the temporary change and can alternately be turned on and off to indicate a magnitude of the change.

The display section may also display a direction in and a magnitude by which the modified reference program characteristic has been modified by means of one energized display element.

Conveniently, the display elements are energizable for displaying a magnitude of the modifying of said modified reference program characteristic relative to a preset program characteristic.

In another preferred embodiment, the learning display means has a learning mark element for displaying the activation of the control means.

The learning display means may alternately turn on and off the learning mark element for a predetermined period of time after the shutter is released when the control means is activated.

Preferably, the camera further comprises mode switching means for switching between a learning mode in which the control means is activated and a normal mode in which the control means is inactivated.

It is preferred that the camera further comprises dial means and wherein manual operation of the dial means in a program controlled exposure mode temporarily changes the exposure parameters.

In a preferred embodiment, the camera comprises a switch for connecting the camera to a power supply and wherein the control means includes means for storing the modified reference program characteristic during disconnection of the camera from the power supply.

According to another aspect of the present invention a camera is provided having a zoom lens and program exposure mode control means with one or more reference program characteristics representing preset combinations of shutter speed and aperture corresponding to one or more of a portrait mode, a landscape mode or a close up mode. Each program line has a predetermined aperture in a first range between a low shutter speed to a hand induced vibration limit and a different aperture configuration in a second range beyond the hand induced vibration limit.

In one embodiment, the reference program characteristic with respect to the portrait mode is set to an open aperture for said first range in wide and tele settings of the zoom lens. For the second range the reference program characteristic is set to a fixed shutter speed and an aperture varied to a predetermined value at the hand induced vibration limit.

Thus, the reference program characteristic with respect to the portrait mode is set to an open aperture from a low shutter speed range to a hand induced vibration limit in wide and tele settings of the zoom lens. The characteristic also set to a fixed shutter speed and an aperture varied to a predetermined value at the hand induced vibration limit. Therefore, the program exposure mode control means is adaptable not only to portrait pictures but also to general pictures of people, and has a program characteristic of a portrait mode taking into account the prevention of hand induced vibrations.

In one embodiment, the aperture is varied at the hand induced vibration limit such that the aperture is reduced through three steps in the wide setting and through one step in the tele setting.

Thus, the wide setting may be adapted to exposures of a group of people and a person in scenery such that the aperture is reduced to place both the person and the background in focus. The tele setting may be adapted to portrait and bust exposures such that the aperture is increased to focus on the person.

In another embodiment, for the first range the reference program characteristic with respect to the close up mode is set to an aperture that is fixed to a first value. For the second range the characteristic is set to a second value that is fixed, reduced substantially one step from the first value.

Thus, the camera is adaptable not only to a zoom lens macro range but also to a macro lens used in a close up mode. In close up photography, the depth of field is reduced and the aperture becomes too small, lowering the shutter speed, with the result that the camera tends to vibrate because of hand or subject movement. However, the shutter speed is fixed and the aperture is reduced substantially one step at the hand induced vibration limit (where the camera is most likely to be vibrated by hand or subject movement). In addition the camera is controlled with the reduced aperture beyond the hand induced vibration limit. Accordingly, it is possible for the camera to avoid hand or subject induced vibration.

Preferably, the aperture of the second value is F8.

In another embodiment, for the first range the reference program characteristic with respect to the landscape mode is set to an aperture that is reduced one step from an open aperture at a certain focal length. For the second range the characteristic is set to a shutter speed and aperture such that they vary at a predetermined gradient beyond substantially the hand induced vibration limit.

Thus, the reference program characteristic for a landscape mode reduces the aperture as much as possible while preventing the effects of hand induced vibration so that in focus pictures may be taken of landscapes ranging from close to distant landscapes irrespective of the focal length.

Conveniently, the hand induced vibration limit different for wide setting and a tele setting.

The hand induced vibration limit may vary according to the mode.

According to another aspect of the present invention a camera is provided, with first operating means, second operating means, control means, and initialization means.

The control means are provided for switching the camera from a normal photographic mode to a setting mode for setting data in each of a plurality of operating modes.

The initializing means are actuable to initialize all data in each of the operating modes when the first and second operating means are simultaneously operated for a continuous predetermined period of time after the camera has been switched to the setting mode.

Preferably, the first and second operating means are simultaneously operated for a continuous predetermined period of time for switching the camera from the normal photographic mode to the setting mode.

In one case, the initializing means is actuable to initialize all data, provided the first and second operating means remain simultaneously operated immediately after the camera has been switched to the setting mode.

Conveniently, the first and second operating means are simultaneously operated for a continuous predetermined period of time for switching the camera from the setting mode to the normal photographic mode.

It is preferred that the initializing means, the first operating means and said second operating means all be actuated simultaneously for the first mentioned predetermined period of time to initialize the data.

The initializing means may comprise a button for selecting a shutter or aperture preference mode in a normal photographing mode.

In another embodiment, the first operating means comprises a drive mode button and the second operating means comprises a mode button for selecting the operating modes.

The camera may further comprise display means for displaying the passage of the predetermined time.

According to yet another aspect of the present invention there is provided a camera having one or more program exposure modes. The camera comprises means for allocating, for an exposure in a program exposure mode, data values which are displaced from a reference program characteristic. Display means are provided for displaying the displacement by means of a visually observable display element, and push button means are provided which are actuable to clear the data values, which are displaced from the reference program characteristic, and the display thereof on the display means.

The camera's pushbutton means clear the data values which are displayed by the display graph when the pushbutton means are turned on. Thus, the exposure corrective value can be cleared through a highly simple operation.

Preferably, the camera further comprises an exposure correcting button actuable to display an exposure correcting value on the display means. An exposure correcting value and the display thereof on the display means are each cleared when the push button means is actuated while the exposure correcting button is actuated.

The pushbutton means may double as the exposure correcting button. Thus it is not necessary to provide a separate button dedicated for clearing the exposure correction. Consequently, the number of parts used is not increased, and the camera may be simplified in structure.

Conveniently, the push button means comprises a button for selecting a shutter or aperture preference mode.

It is preferred that the display means comprises a display graph having graduations spaced at predetermined intervals. Energizably visually observable display elements are disposed in positions corresponding to the graduations. The number and direction of energized display elements respectively indicate the amount and direction of the displacement.

According to yet another aspect of the present invention a camera is provided which has one or more program exposure modes. Means are provided for allocating, for an exposure in a program exposure mode, data values which are displaced from a reference program characteristic for an exposure. Display means are provided to display the displacement by means of a visually observable display element, and pictures are provided at opposite ends of the display means to serve as visual representations of the displacement. Display control means are provided to switch between types of pictures at the opposite ends of the display graph according to the current mode.

As described above, the camera of the present invention has a display section having a display graph for displaying the amount and direction of a program shift through movement of a visual display unit. Pictures, displayable at opposite ends of the display graph, serve as indications of the direction of the program shift. Picture switching are provided for switching between the types of the pictures at the opposite ends of the display graph depending on the exposure modes. Therefore, the exposure mode display device allows the user of the camera to easily recognize a photographic effect difference caused by a change in the shutter speed or the aperture upon a program shift.

Preferably, the display means comprises a display graph having graduations spaced at predetermined intervals with energizable and visually observable display elements disposed in positions corresponding to the graduations. The number and direction of energized display elements respectively indicate the amount and direction of the displacement.

In one case, the program exposure modes include a landscape mode in which the display pictures for indicate a photographic effect relating to aperture to convey whether a distant object is to be focused or defocused.

In another case, the program exposure modes include a moving object mode in which the display pictures indicate a photographic effect relating to shutter speed to convey whether a moving object is to be photographed as fuzzy or still.

It is preferred that the display section displays a mark "Tv" to indicate a shutter speed and/or a mark "Av" to indicate an aperture.

According to yet another aspect of the present invention, a camera is provided having one or more program exposure modes. Each program exposure mode may have allocated data values which are displaced from a reference program characteristic. Display means are provided with a display graph for displaying the change in shutter speed or an aperture by means of a visually observable display element. Marks "+" and "−" are positioned at opposite ends of the display graph for indicating a magnitude and direction of the shutter speed or the aperture.

Preferably, the display section displays a mark "Tv" indicative of a shutter speed and/or a mark "Av" indicative of an aperture.

Conveniently, the display graph has graduations spaced at predetermined intervals with energizable display elements disposed in positions corresponding to the graduations, wherein an energized display element indicates the amount and direction by which the shutter speed or aperture is changed.

According to yet another aspect of the present invention a camera is provided having one or more program exposure modes, the camera comprises means for allocating, for an exposure in a program exposure mode, data values which are displaced from a reference program characteristic. Exposure correction mode setting means are provided for setting an exposure correction. Display means are provided and include a display graph with graduations spaced at predetermined intervals, energizable display elements disposed in positions corresponding to the graduations, and a minus mark, and a plus mark. Display control means are provided to control energizing of the graduations and a number of the display elements to indicate said displacement. In addition, when the program exposure mode is set an element at the end of the number is controlled to be alternately energized and de-energized and when the exposure correction mode is set, the graduations and one of the display elements can be energized in combination with energization of a minus or plus mark to indicate an exposure correction. The minus or plus mark from the exposure correction mode remains energized on returning to the program exposure mode for indicating an exposure correction when the exposure correction mode is inactivated.

Preferably, the exposure correction mode setting means comprises a pressable exposure correction button, wherein the exposure correction mode is activated from the program exposure mode as long as the exposure correction button is pressed and is inactivated when the exposure correction button is released.

Conveniently, when the exposure correction mode is set, the graduations and one of the display elements are energized in combination with energization of a minus or plus mark to indicate an exposure correction. The display graph is not displayed when a shutter speed preference mode or an aperture preference mode of an automatic exposure mode is selected and set except when an exposure correction is to be indicated.

In another embodiment, when a manual exposure mode is set, the graduations and a number of the display elements can be energized in combination with energization of a minus or plus mark to indicate an amount and direction of an exposure change.

DESCRIPTION OF THE ACCOMPANYING DRAWINGS

FIG. 4 is a view of an external display LCD panel of the camera body shown in FIG. 1 with all display elements fully turned on;

FIG. 7 is a view of a view finder display LCD panel in an eyepiece viewfinder of the camera body shown in FIG. 1 with all display elements being fully turned on;

FIG. 14 is a flowchart of a control sequence when a SHUTTER RELEASE PROCESS is called;

Figure 17:
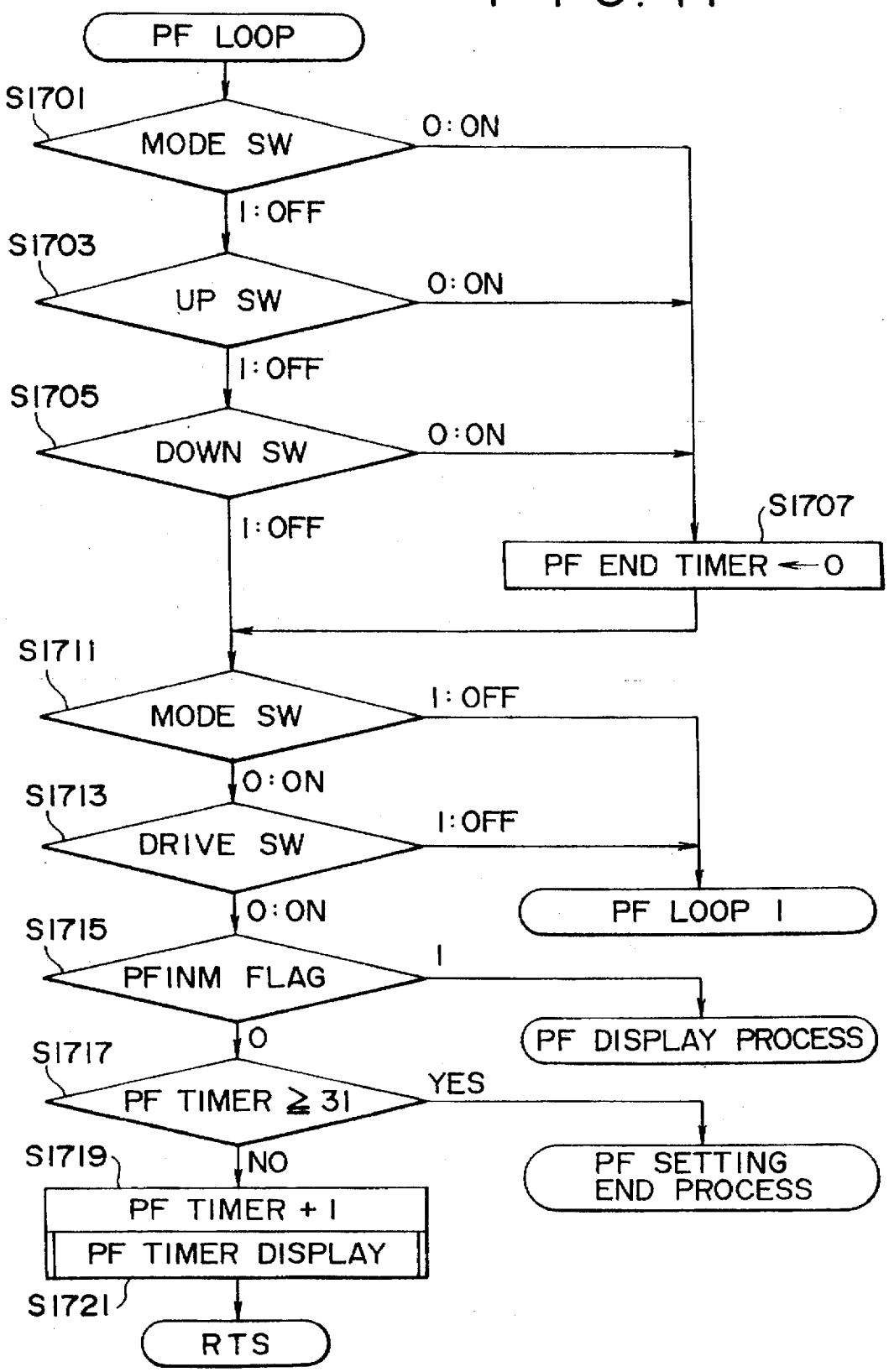
Figure 18:
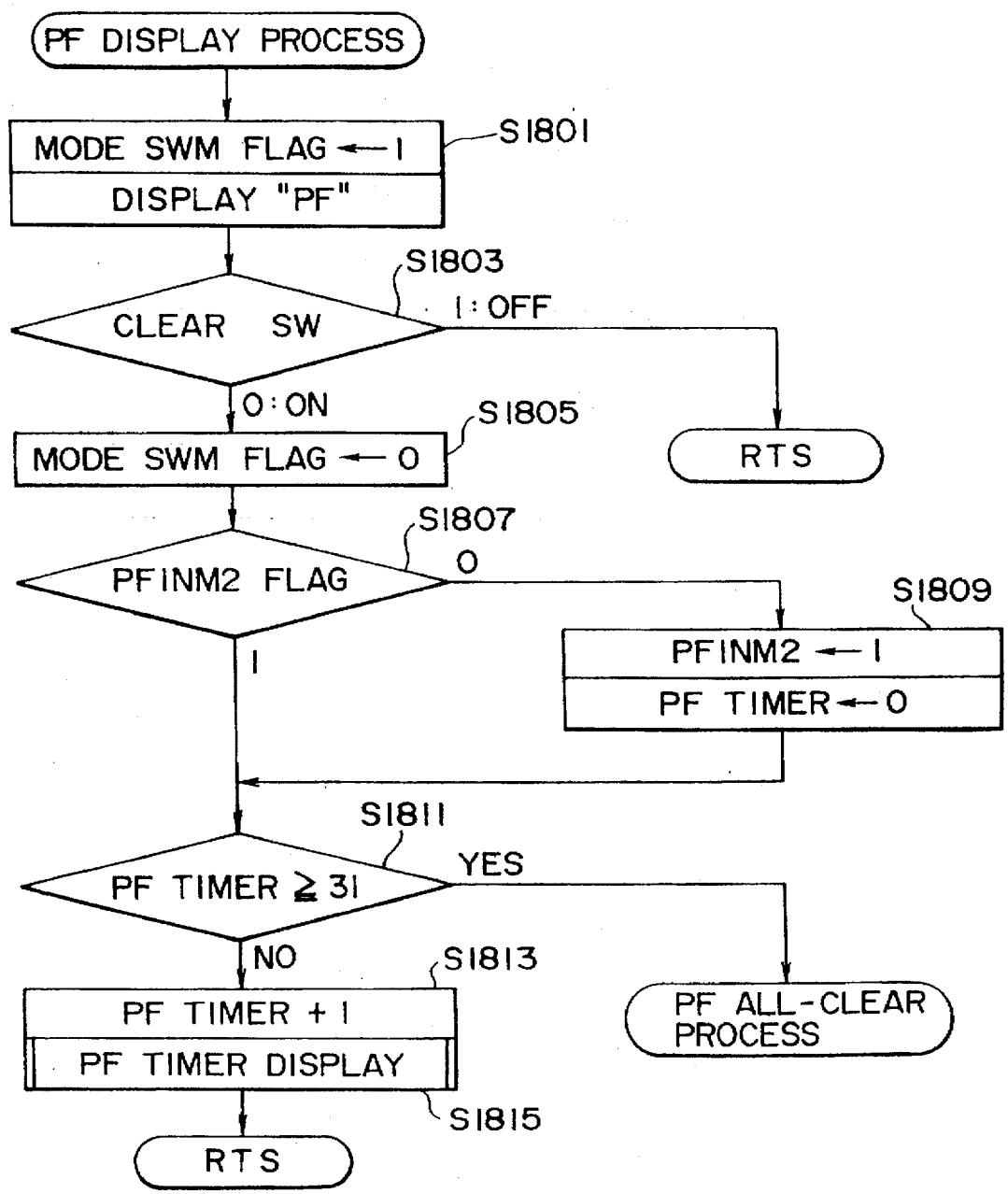
Figure 19A:
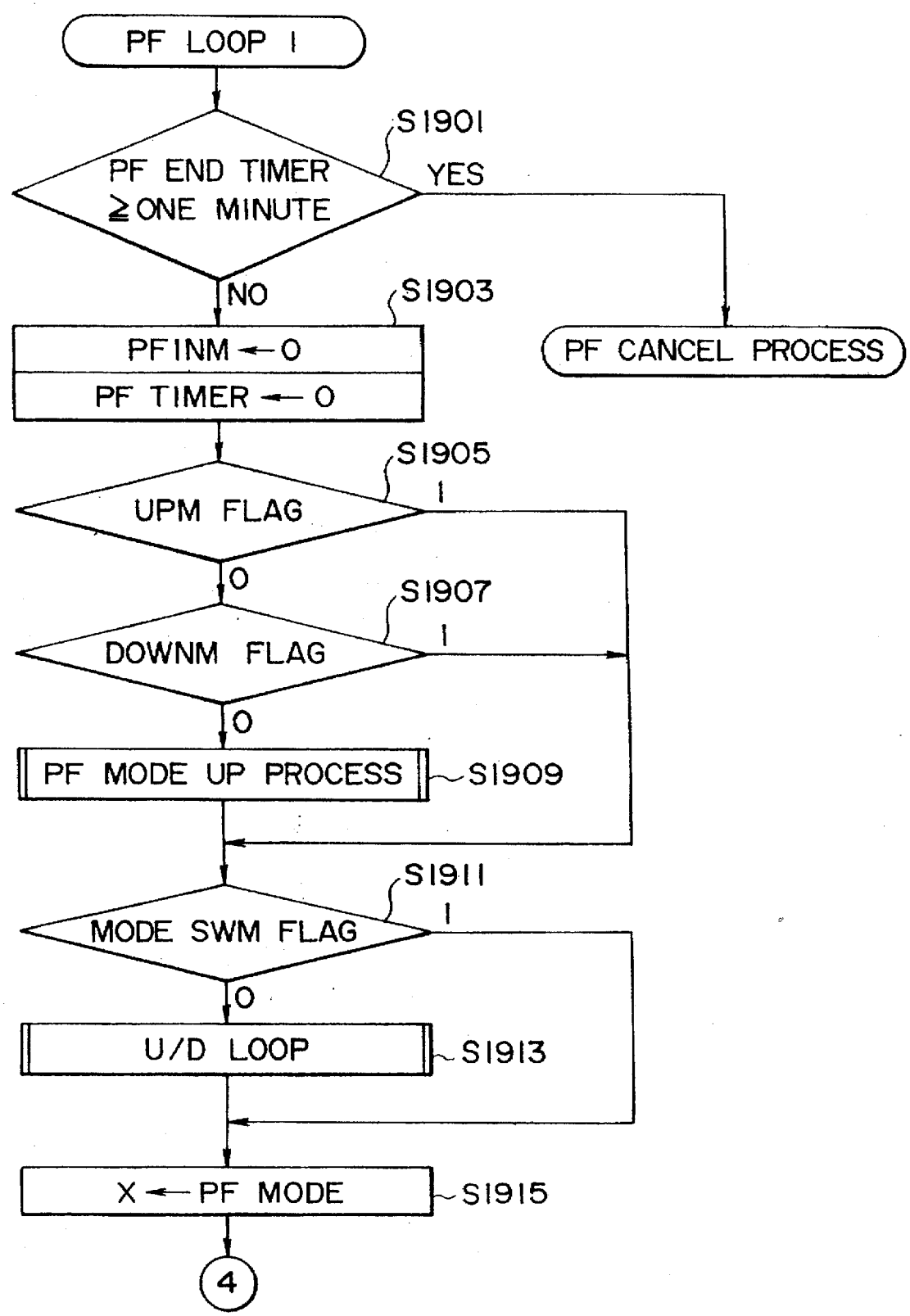
Figure 19C:
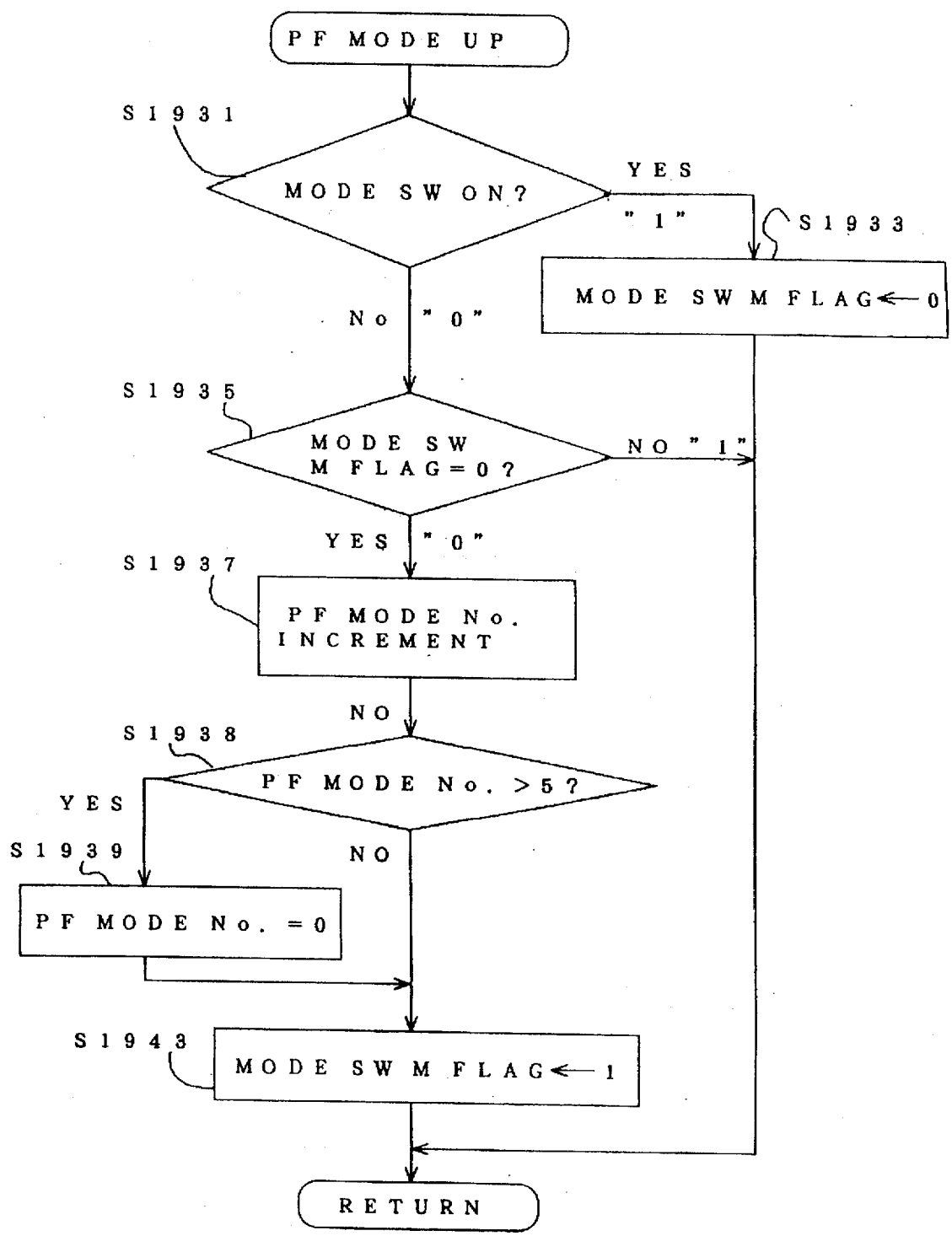
Figure 20:
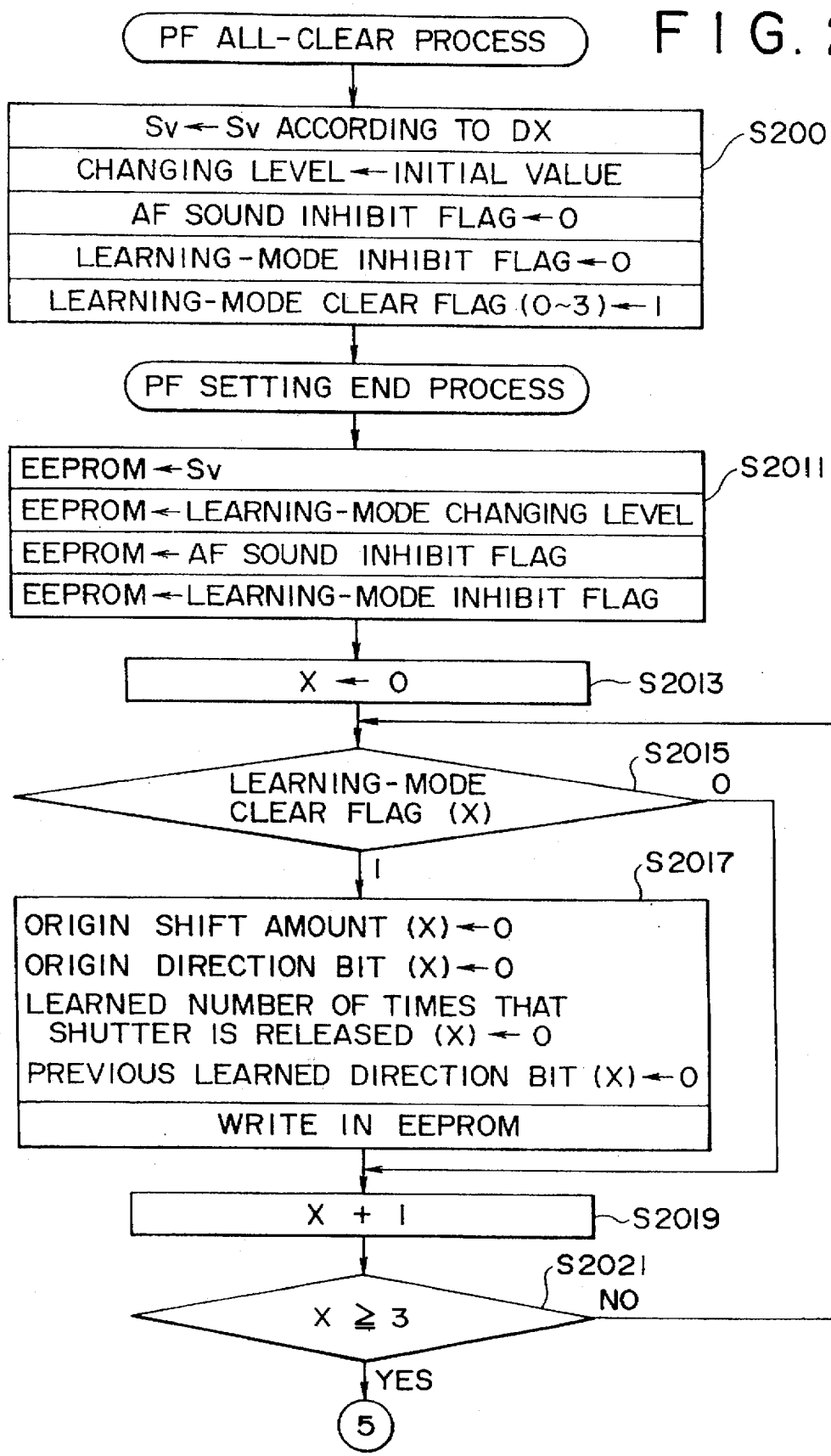
Figure 21:
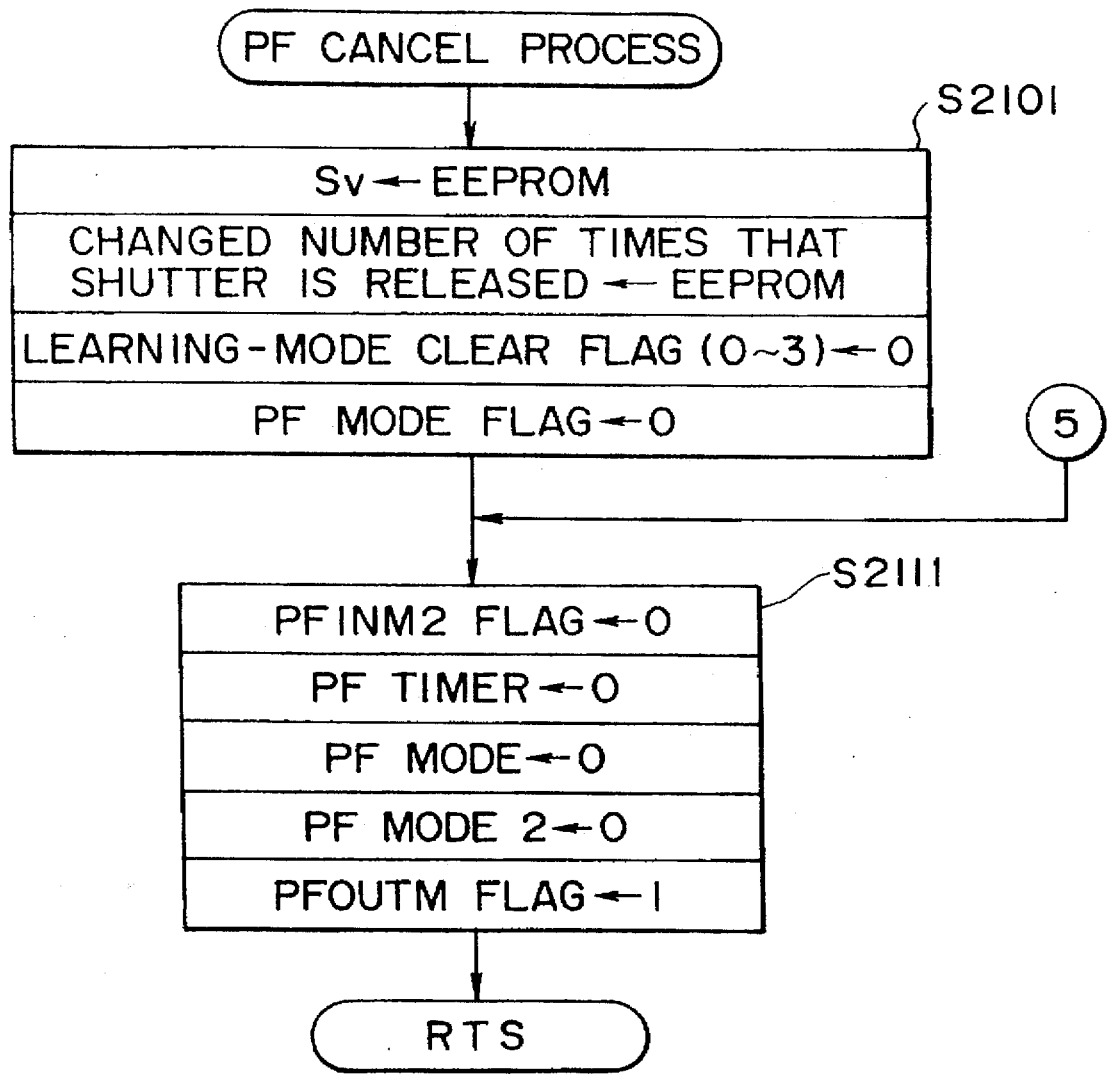
Figure 22:
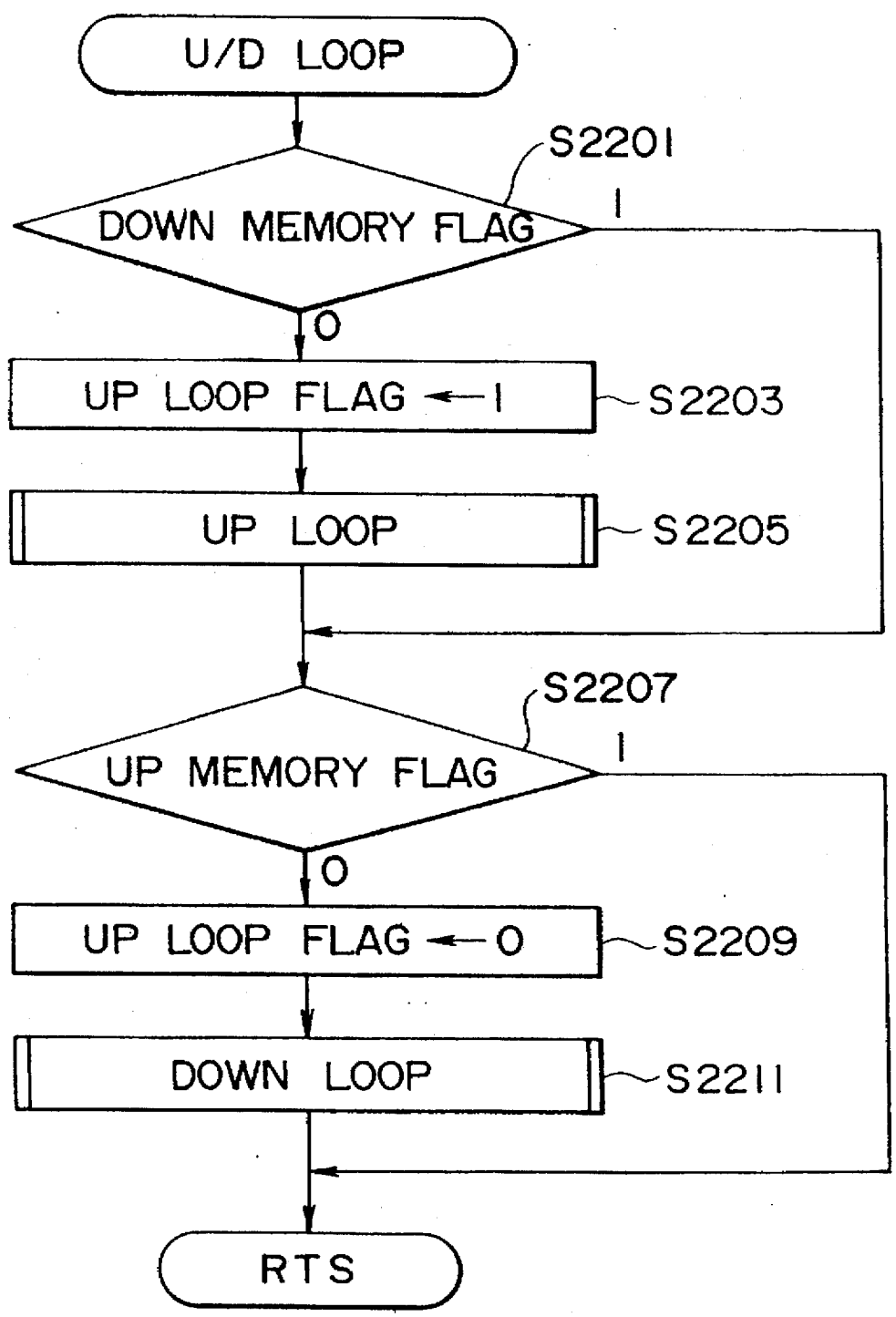
Figure 23:
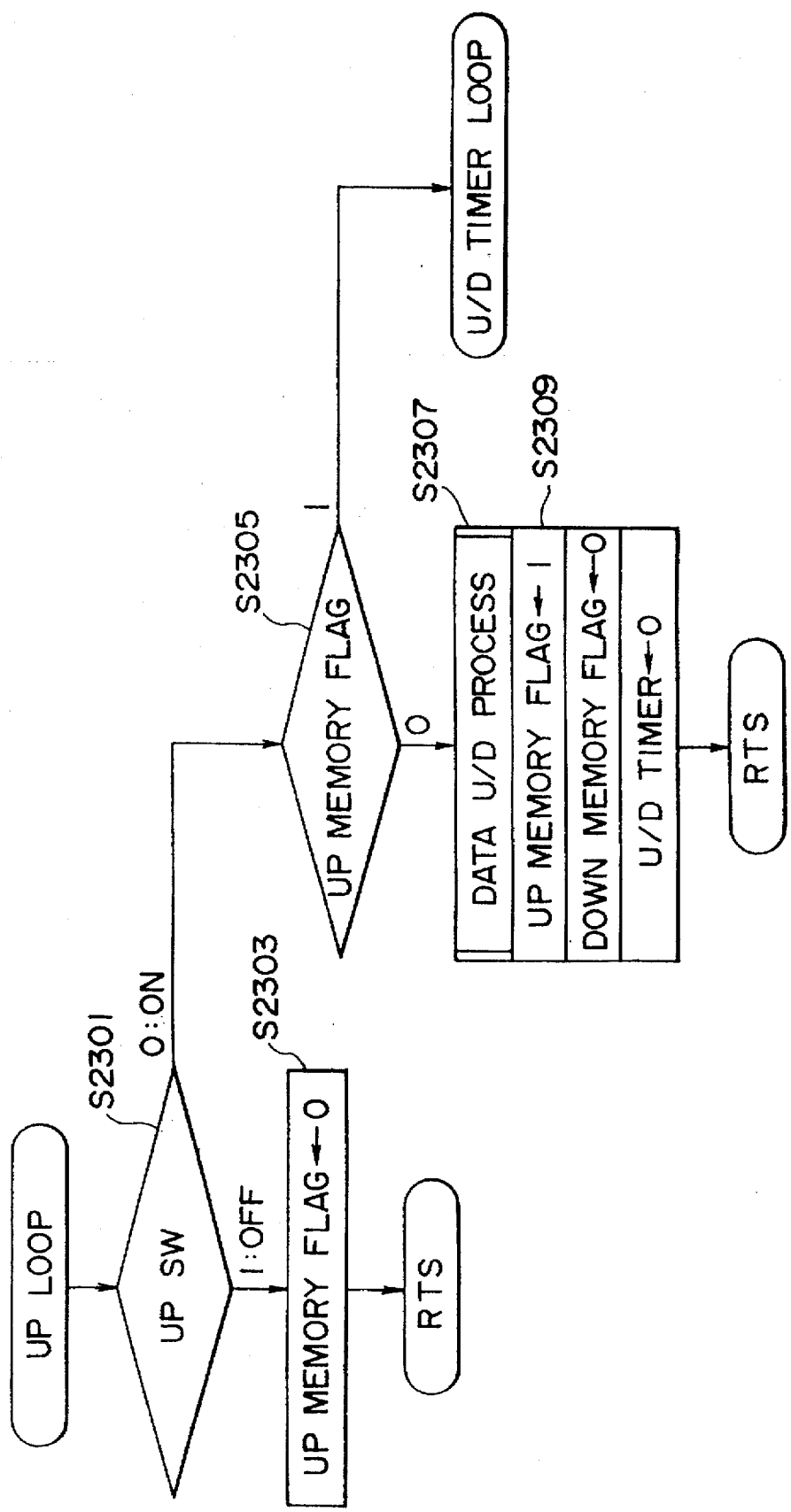
Figure 24:
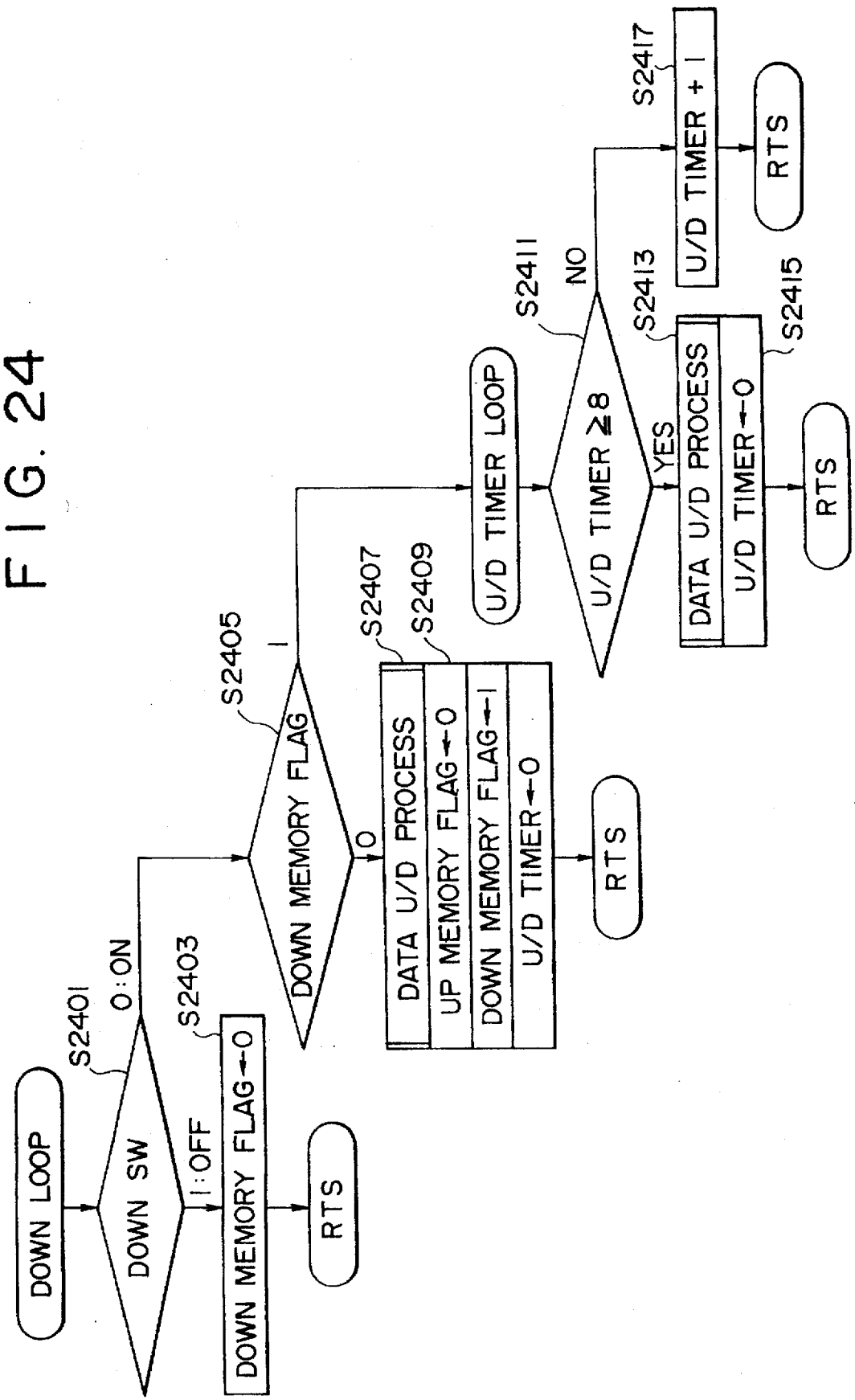
Figure 28:
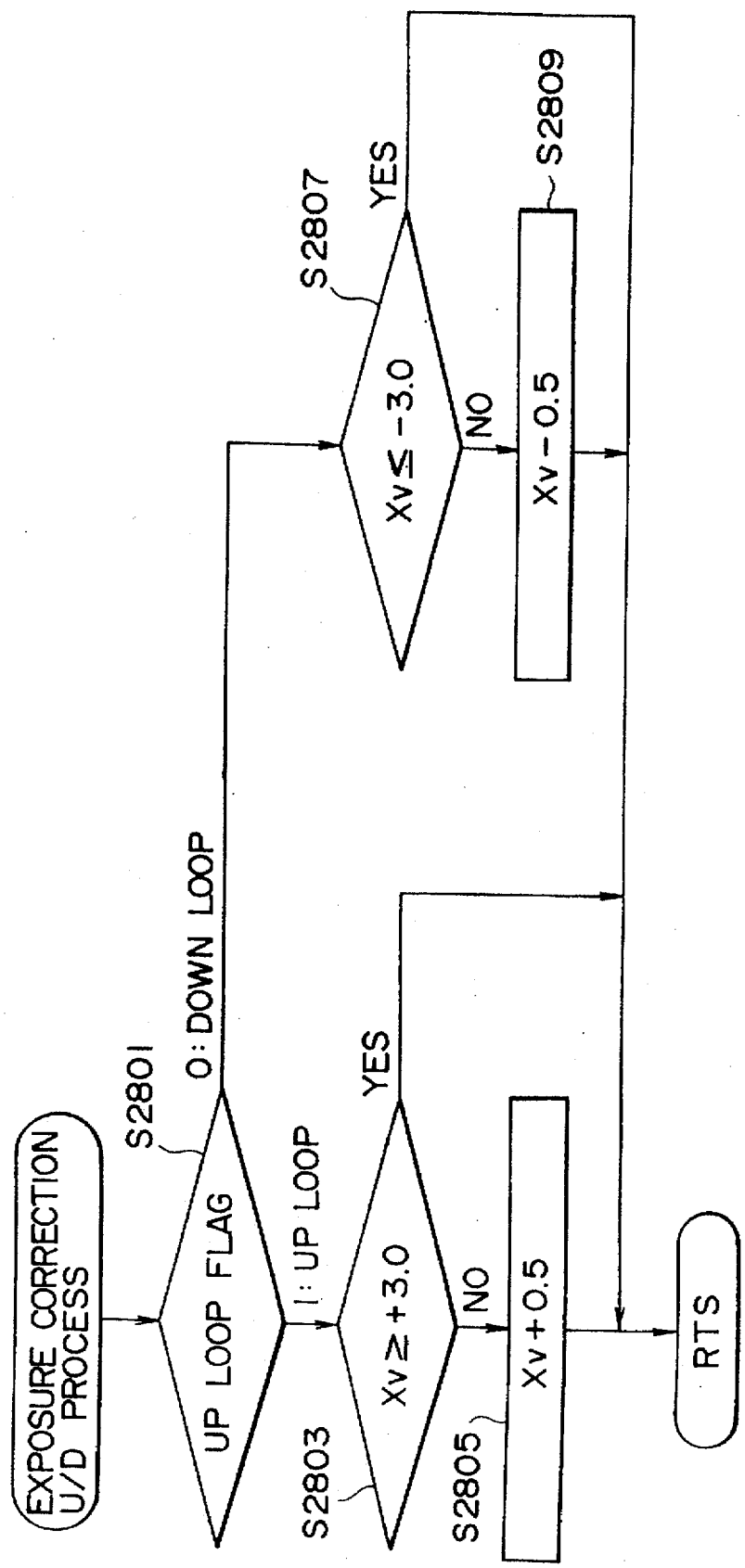
Figure 29:
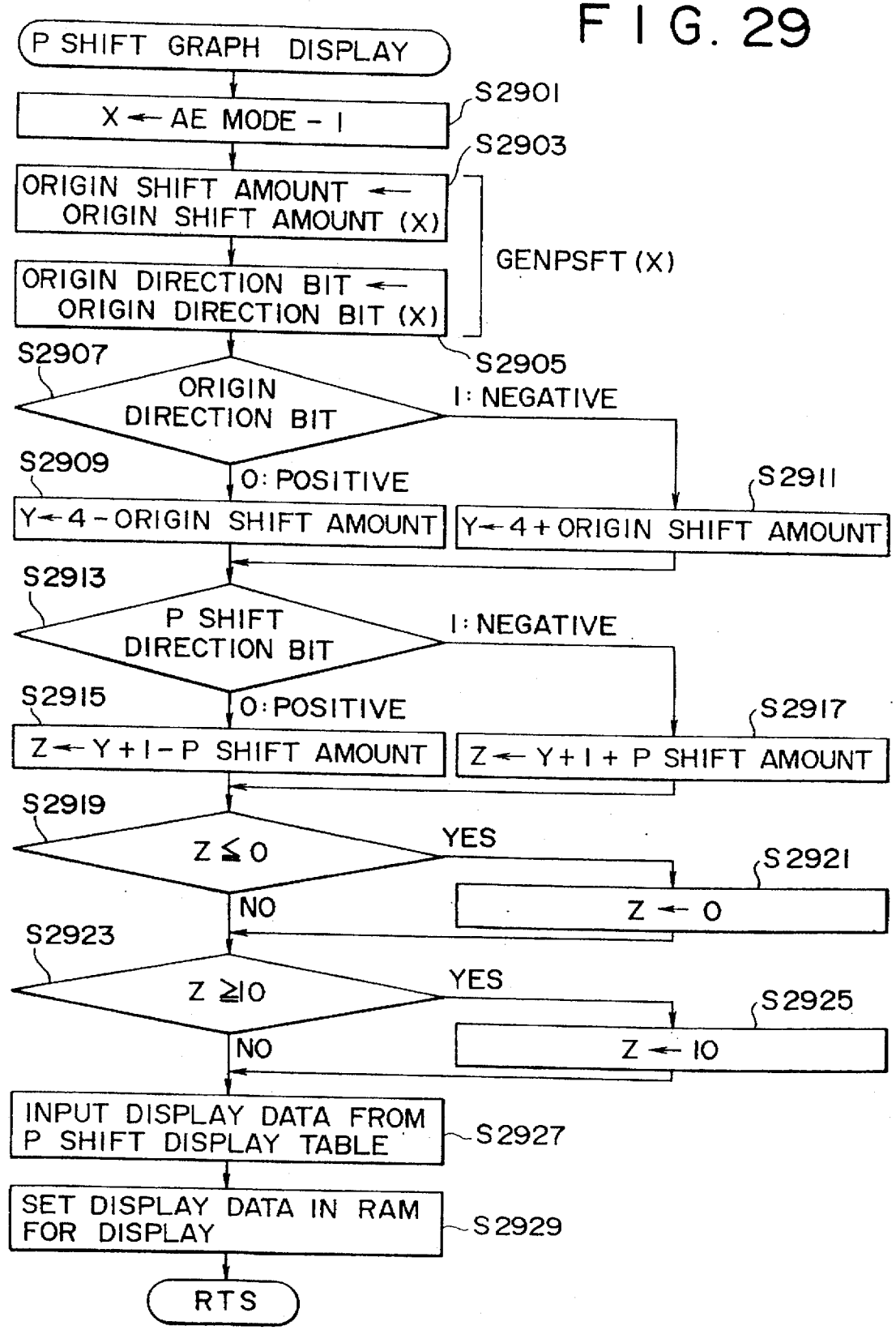
Figure 32:
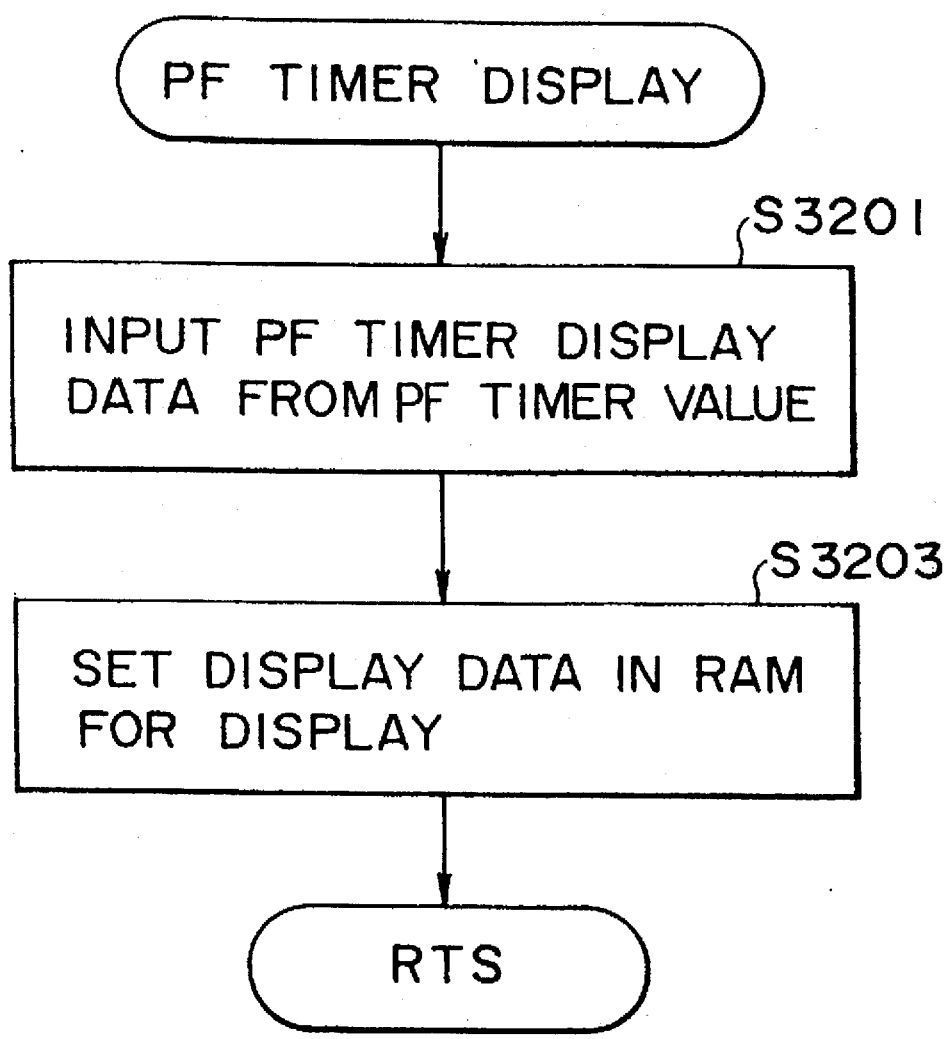
Figure 33:
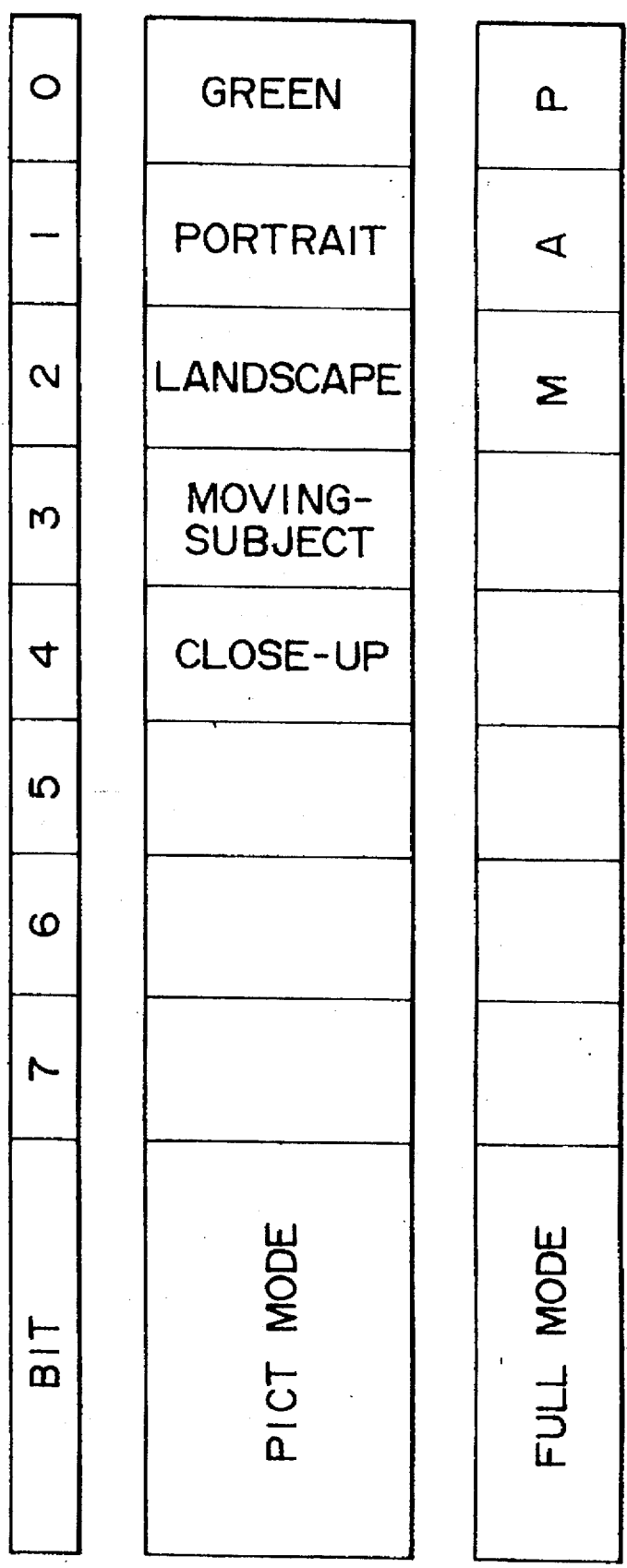
Figure 34:
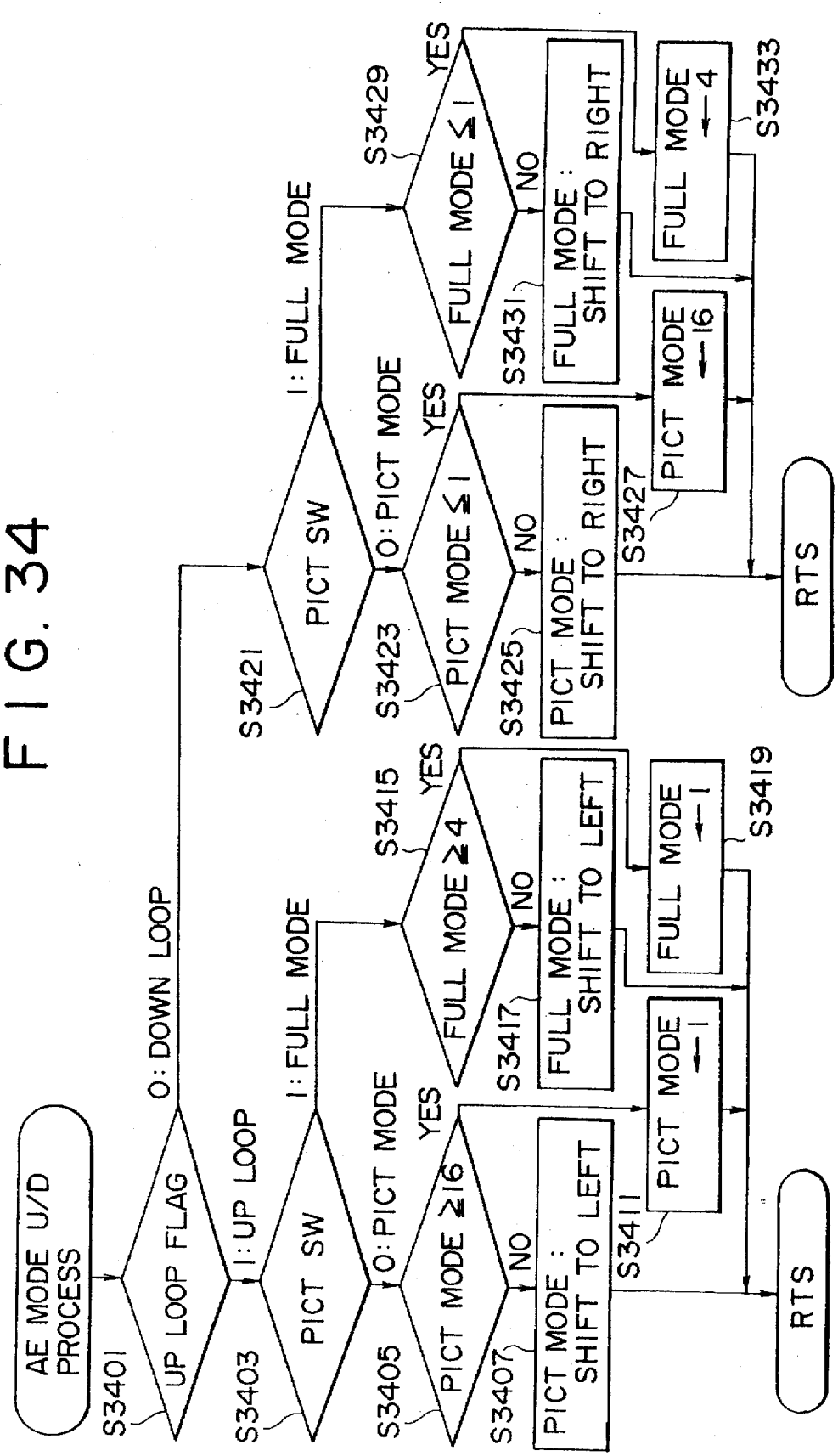
Figure 35:
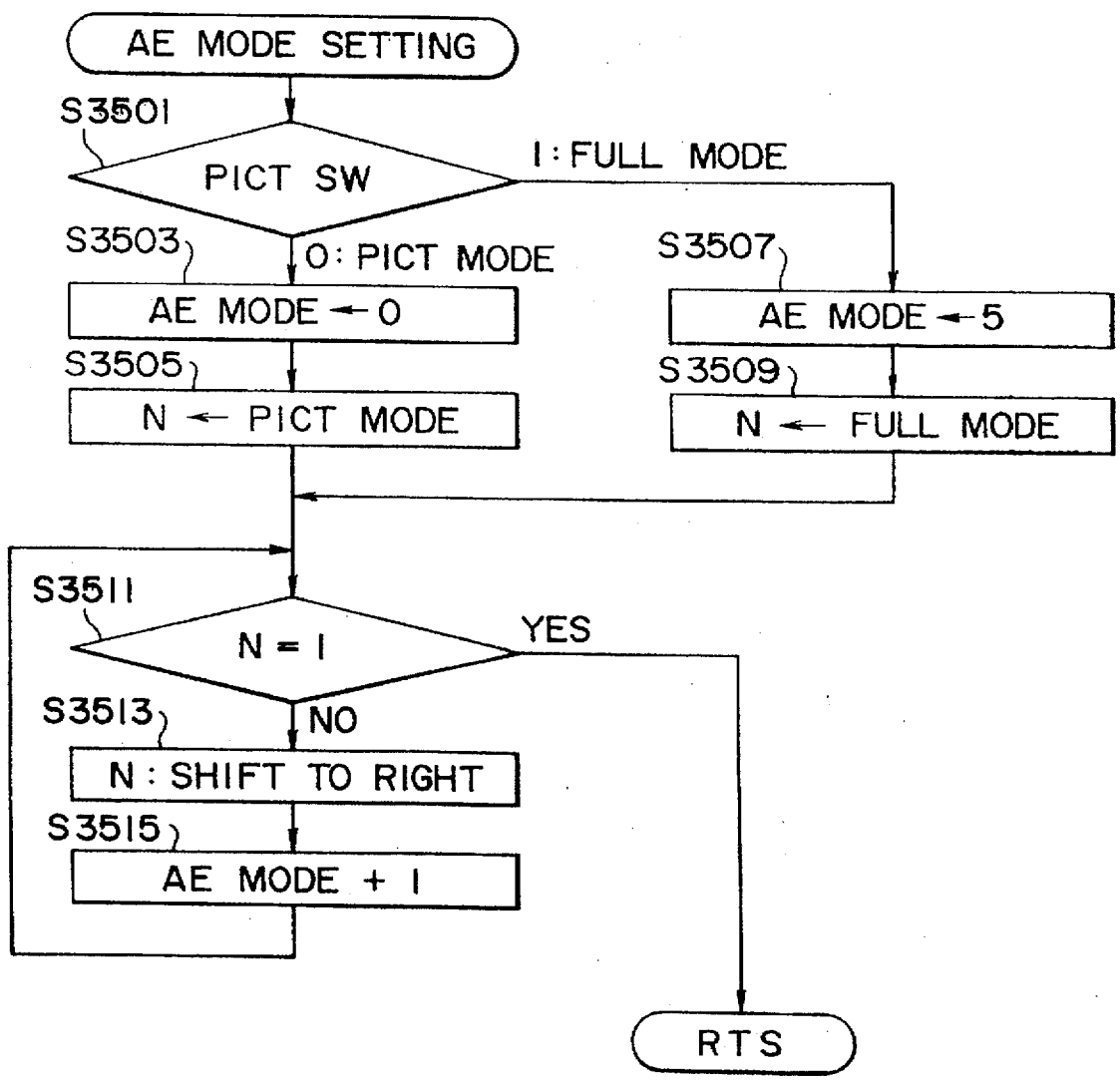
Figure 38:
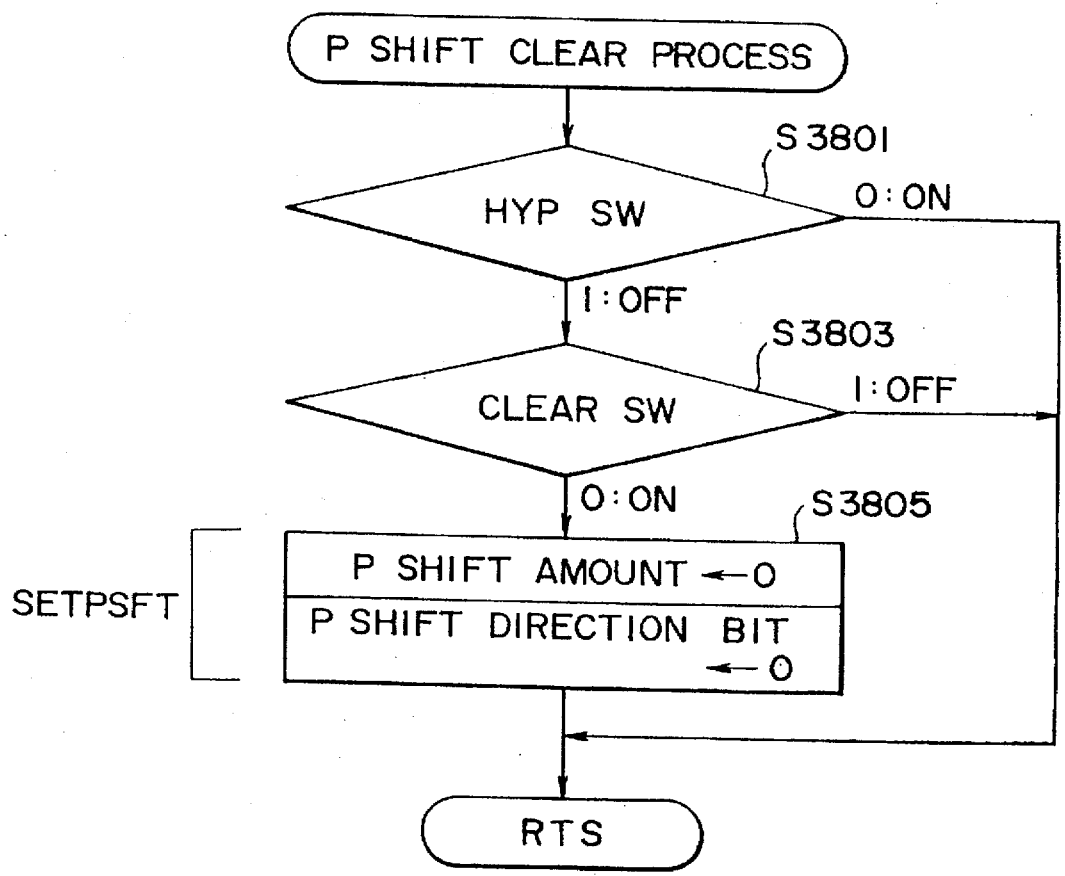
Figure 39:
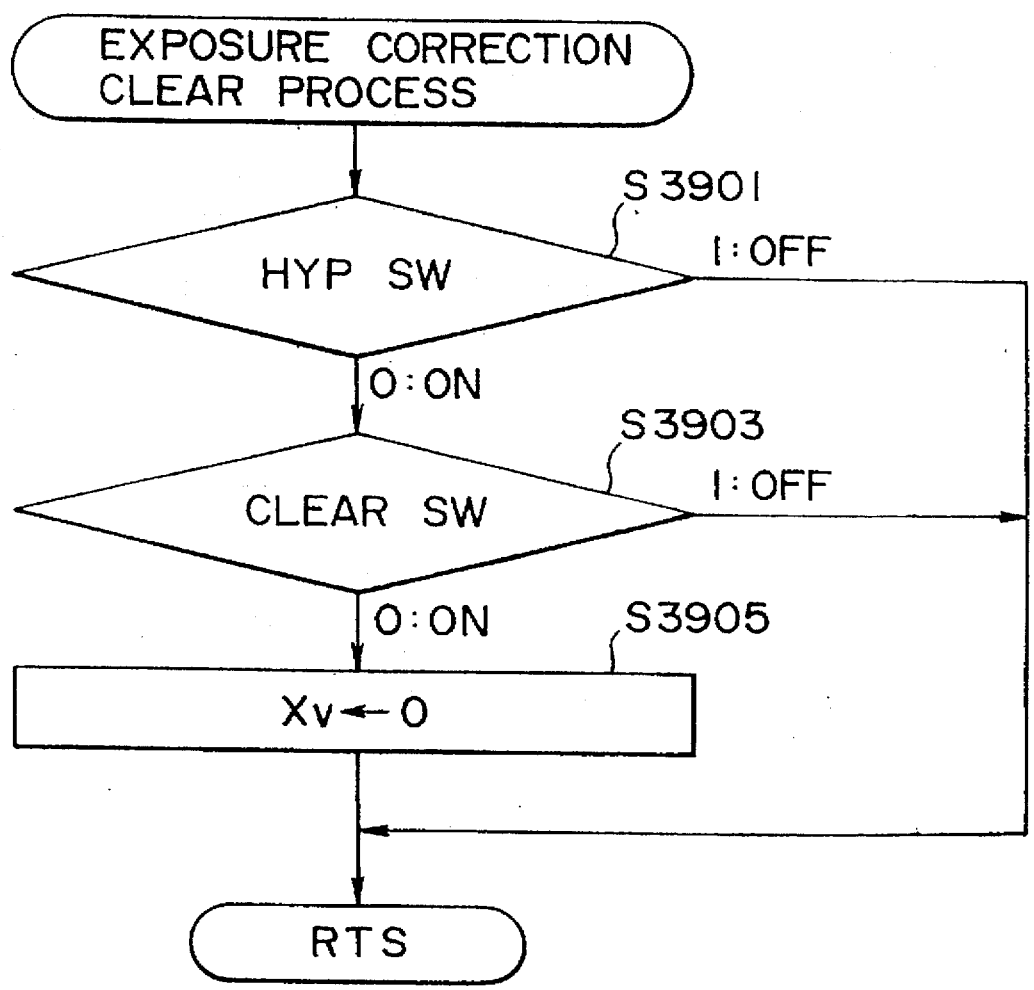
Figure 42A:
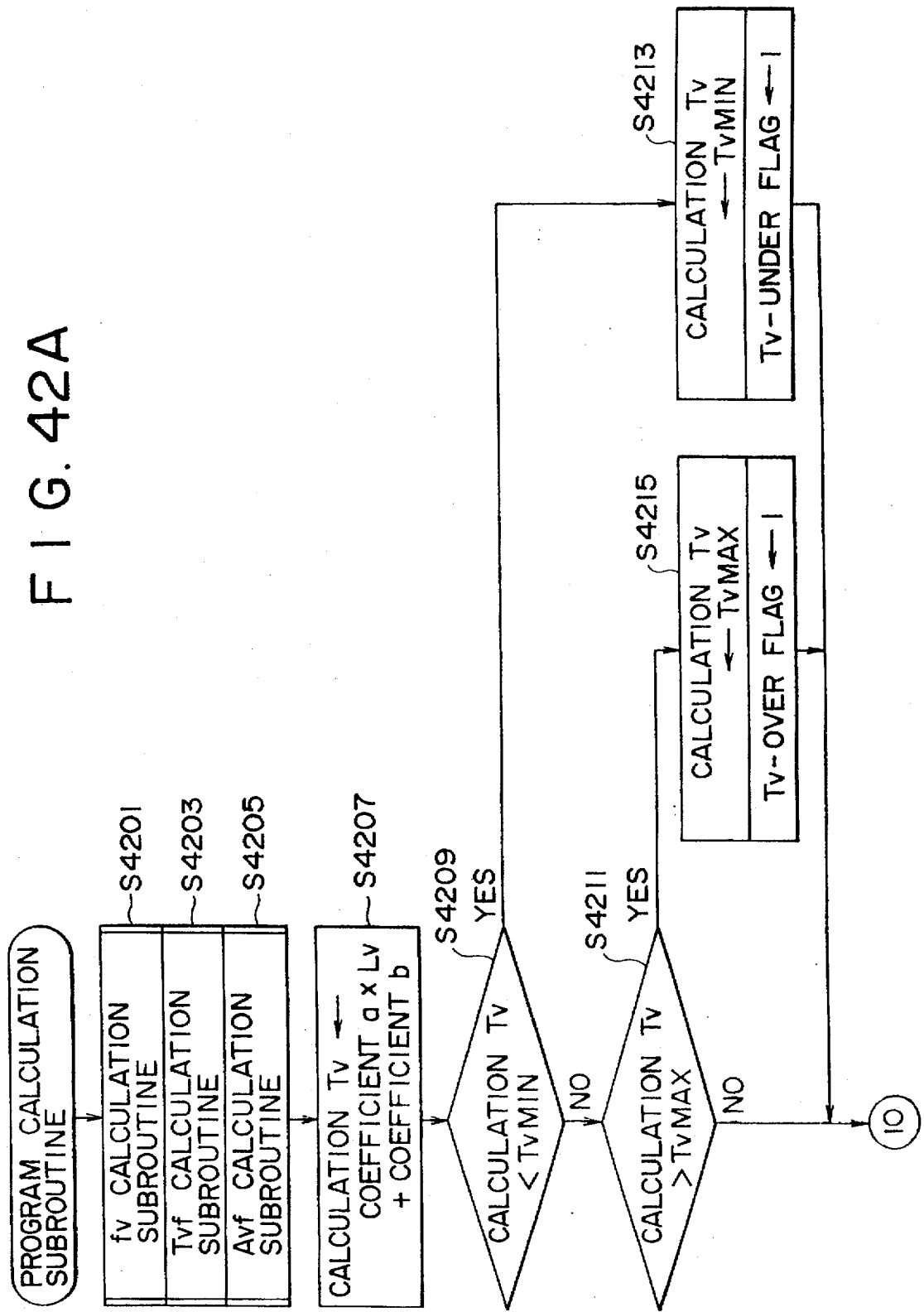
Figure 42B:
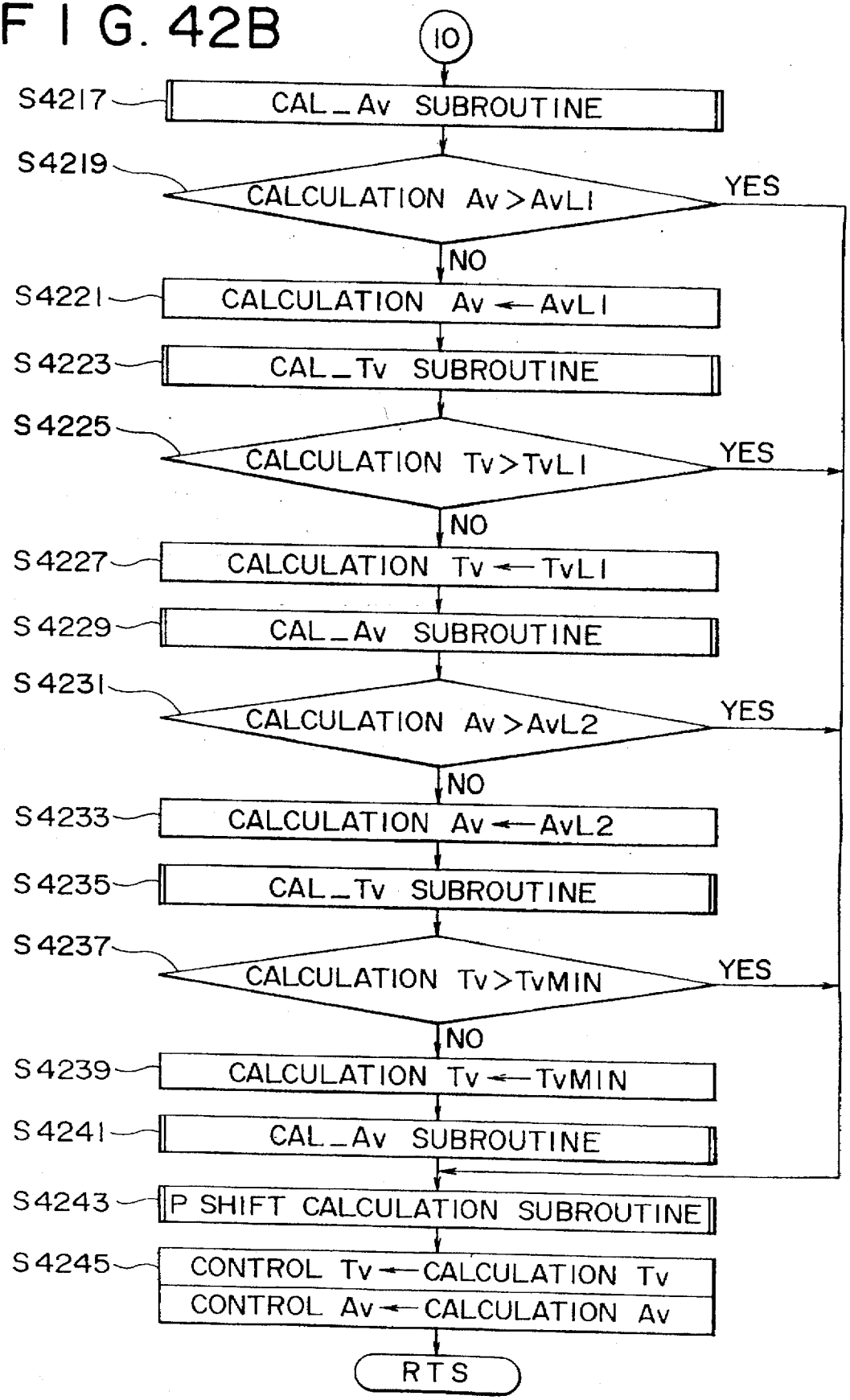
Figure 43:
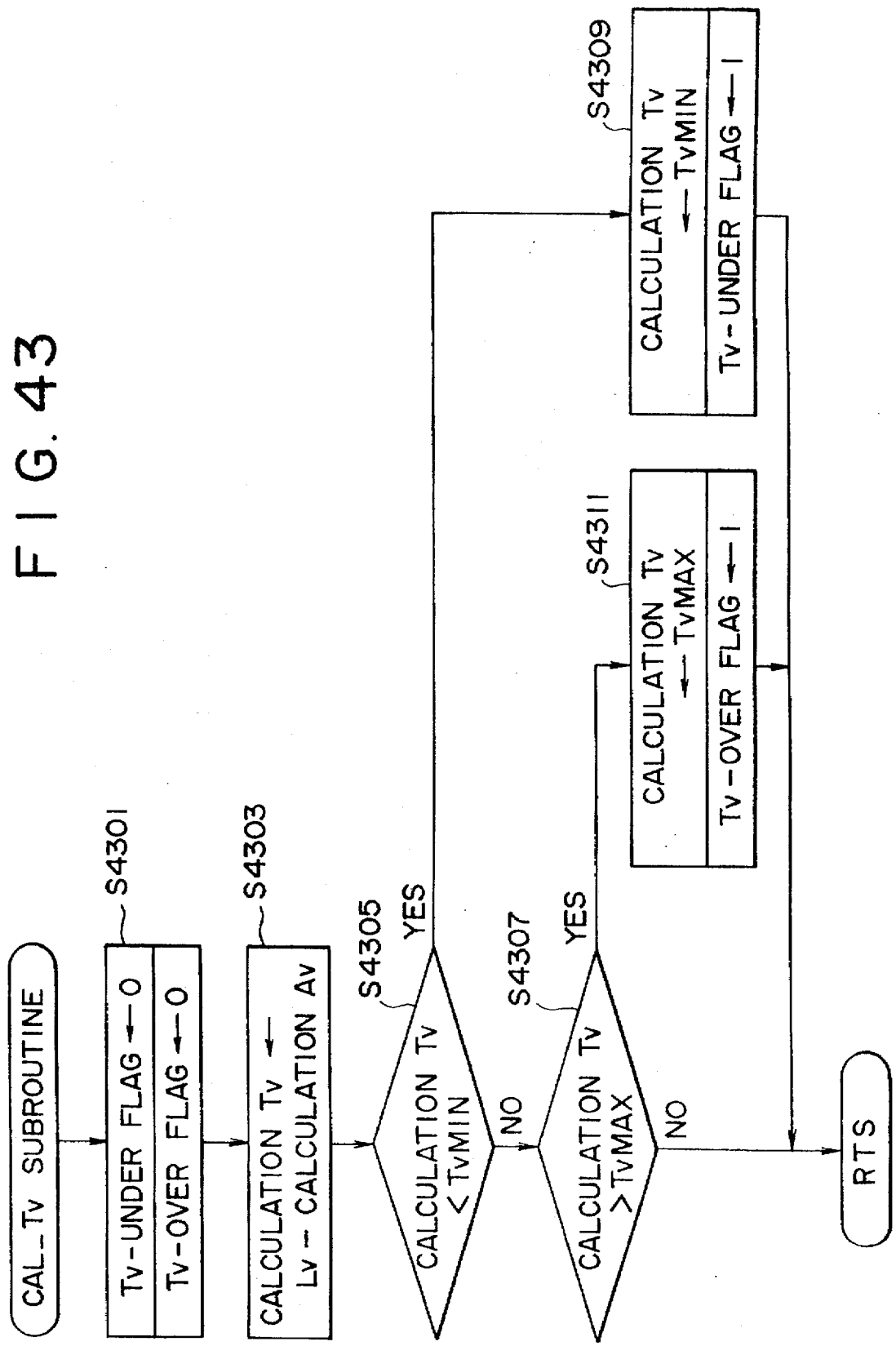
Figure 47:
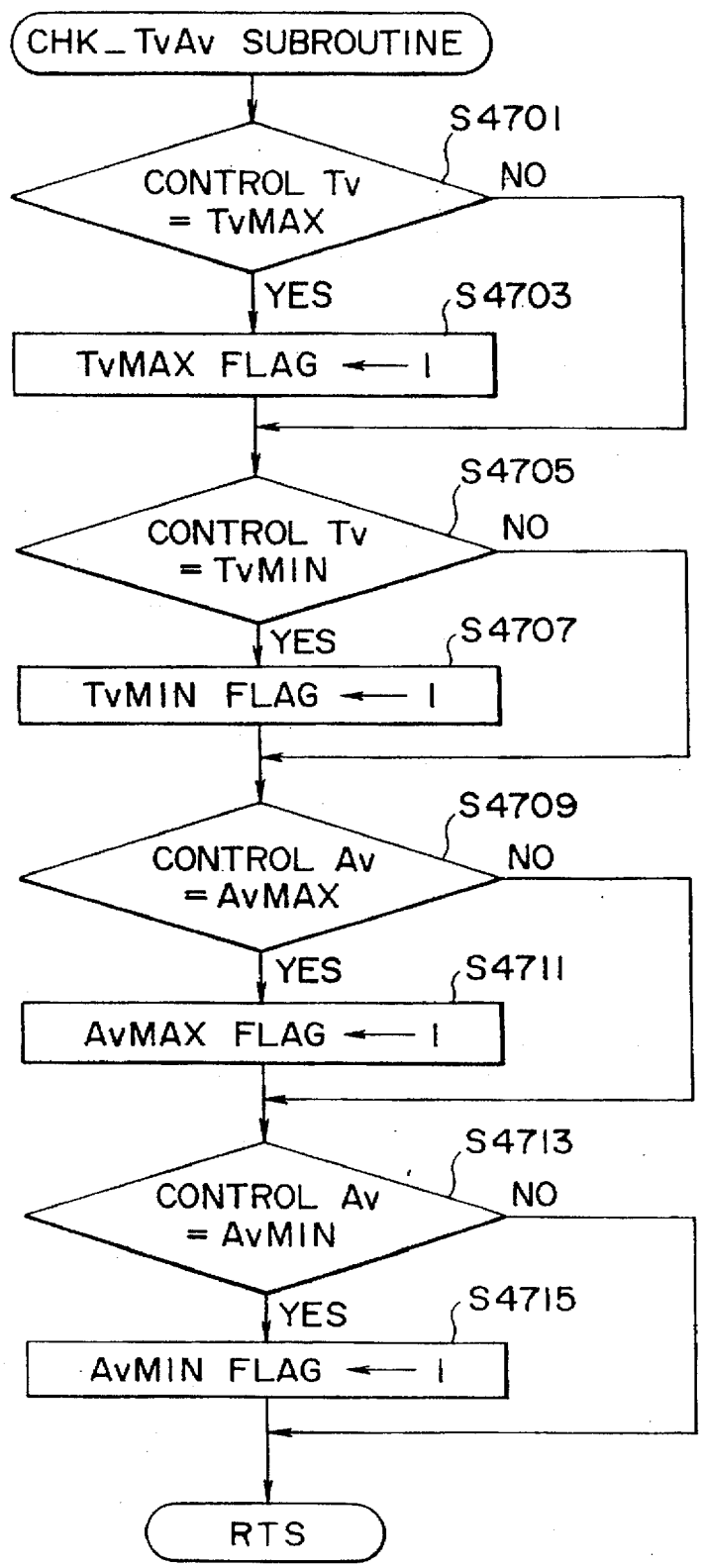
Figure 48A:
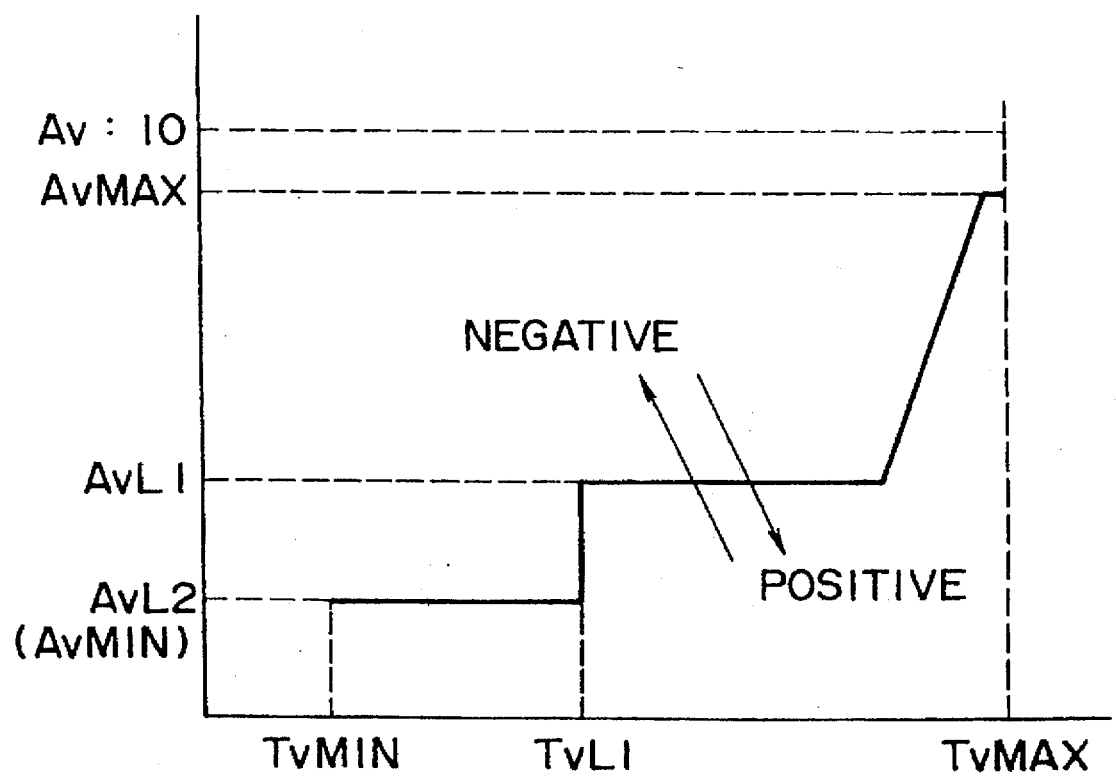
Figure 48B:
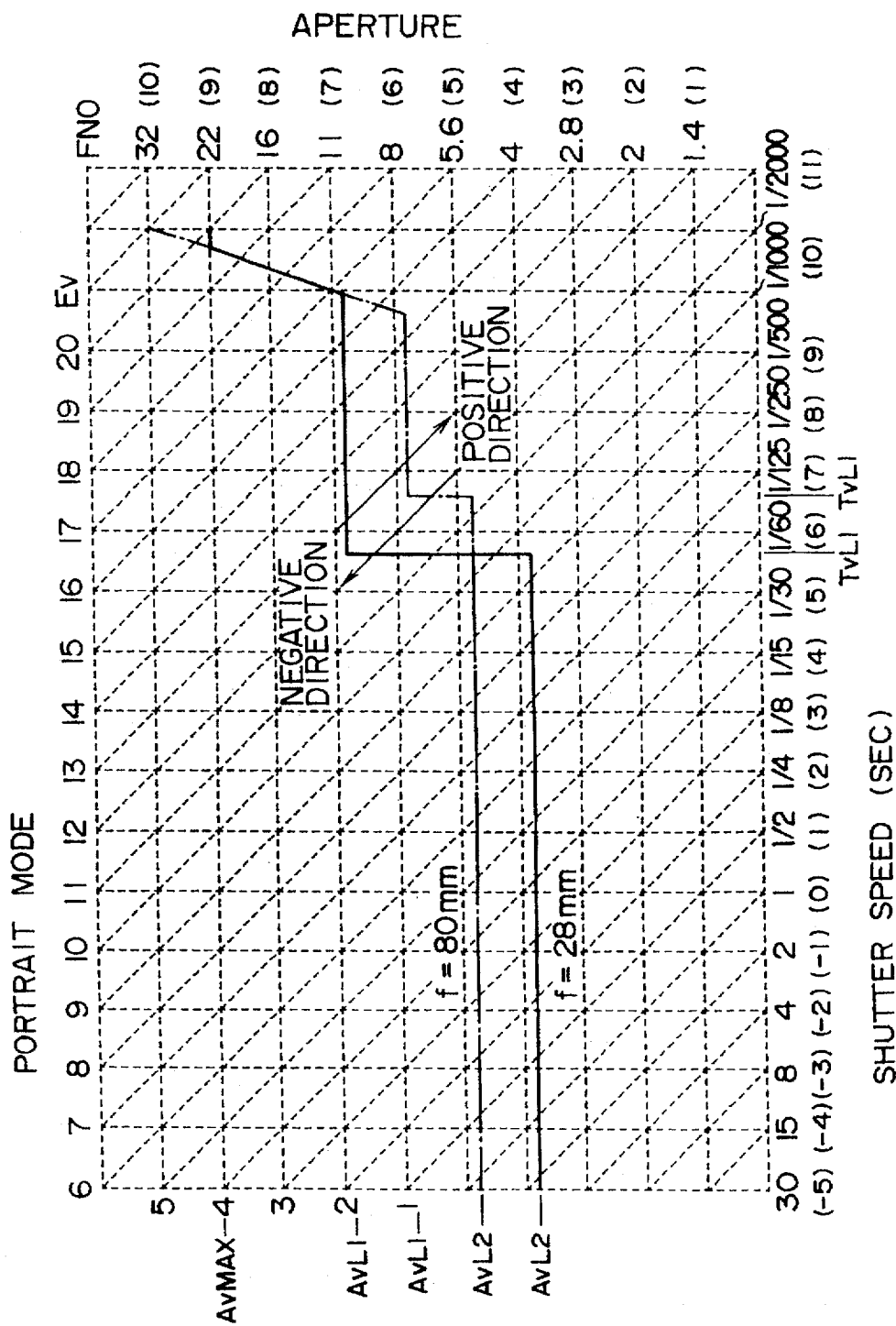
Figure 49A:
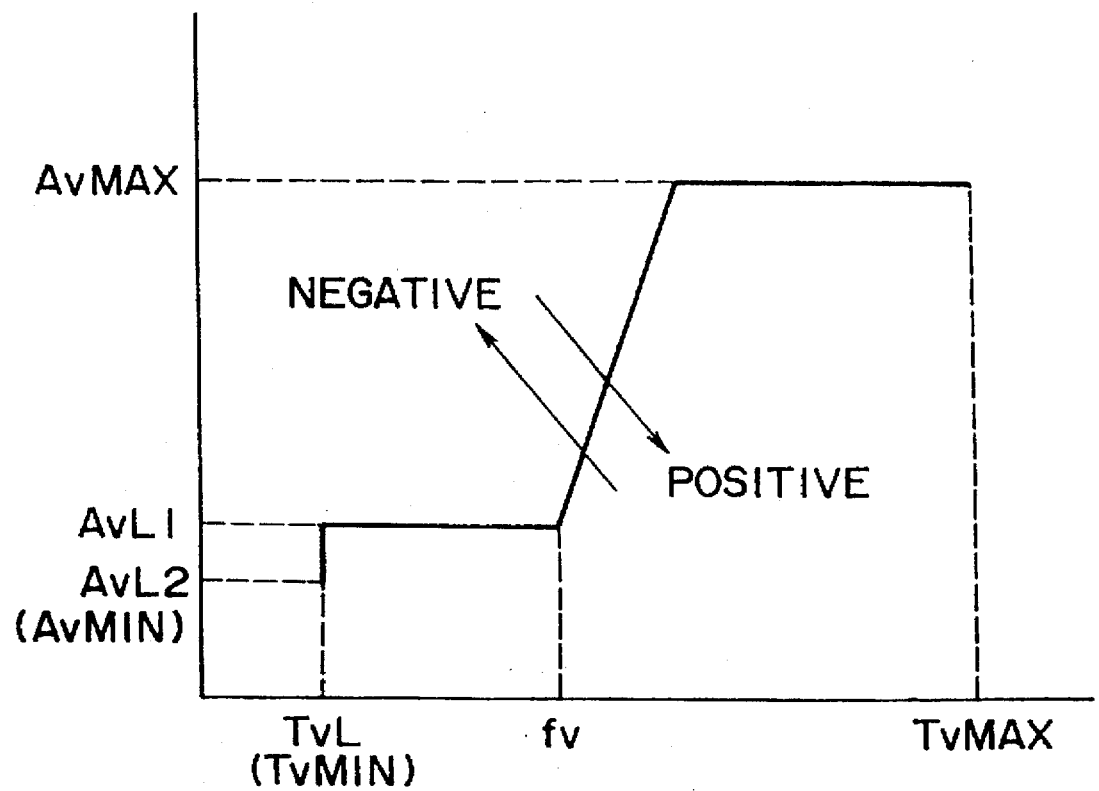
Figure 49B:
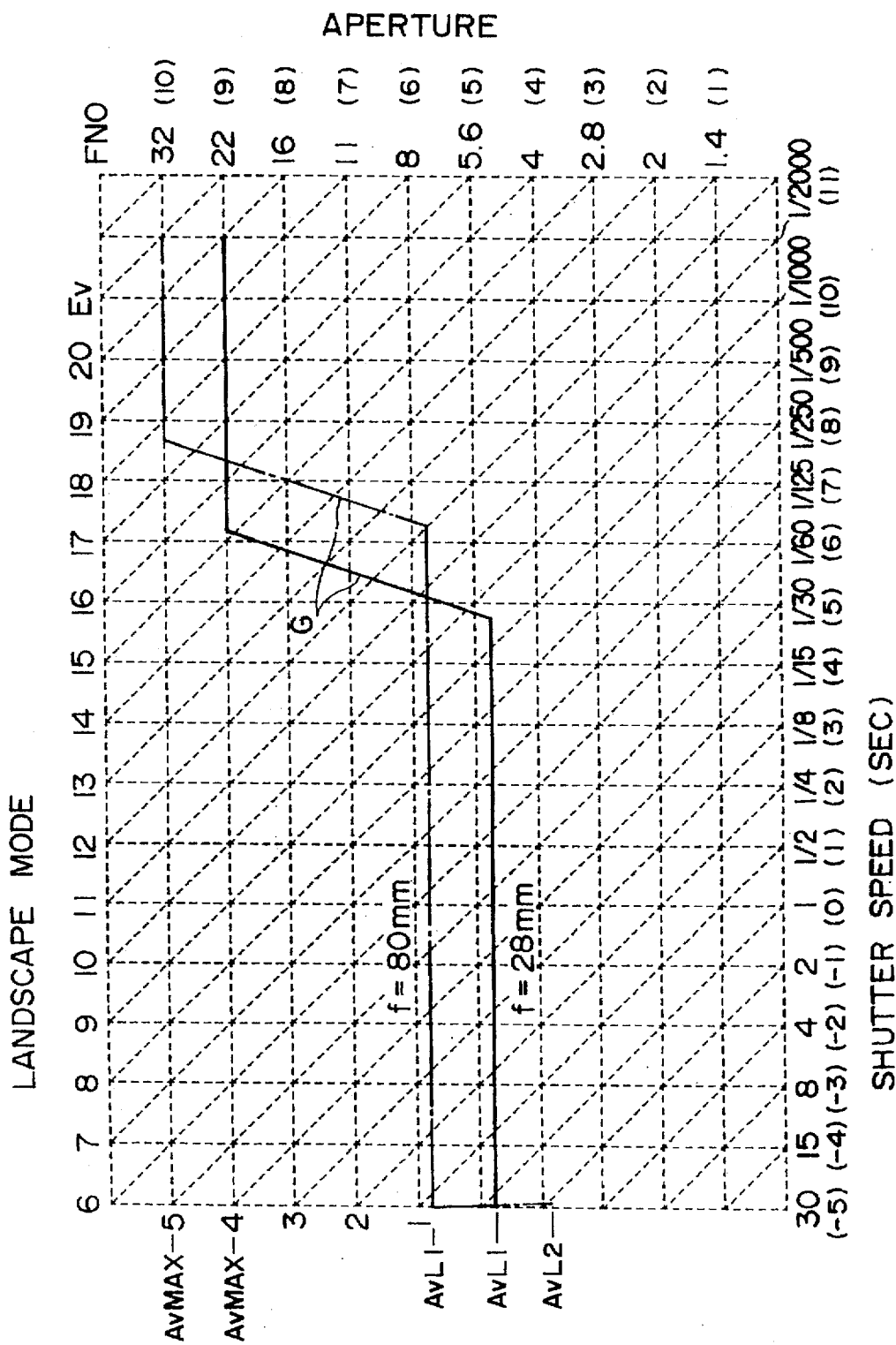
Figure 50A:
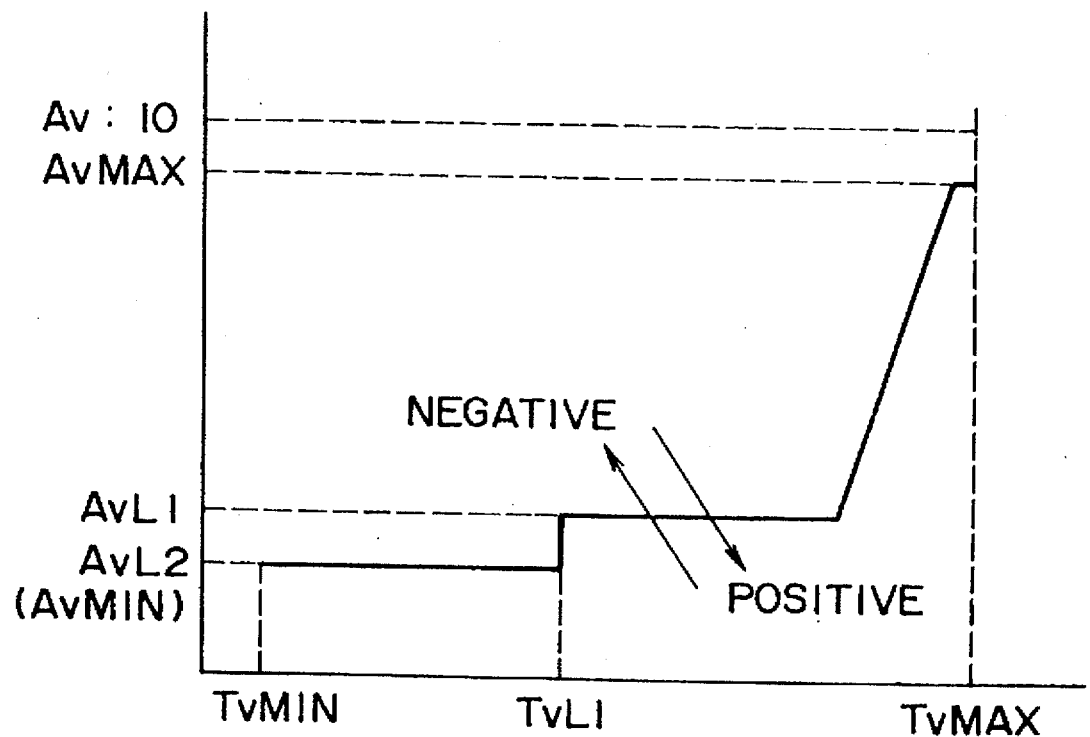
Figure 50B:
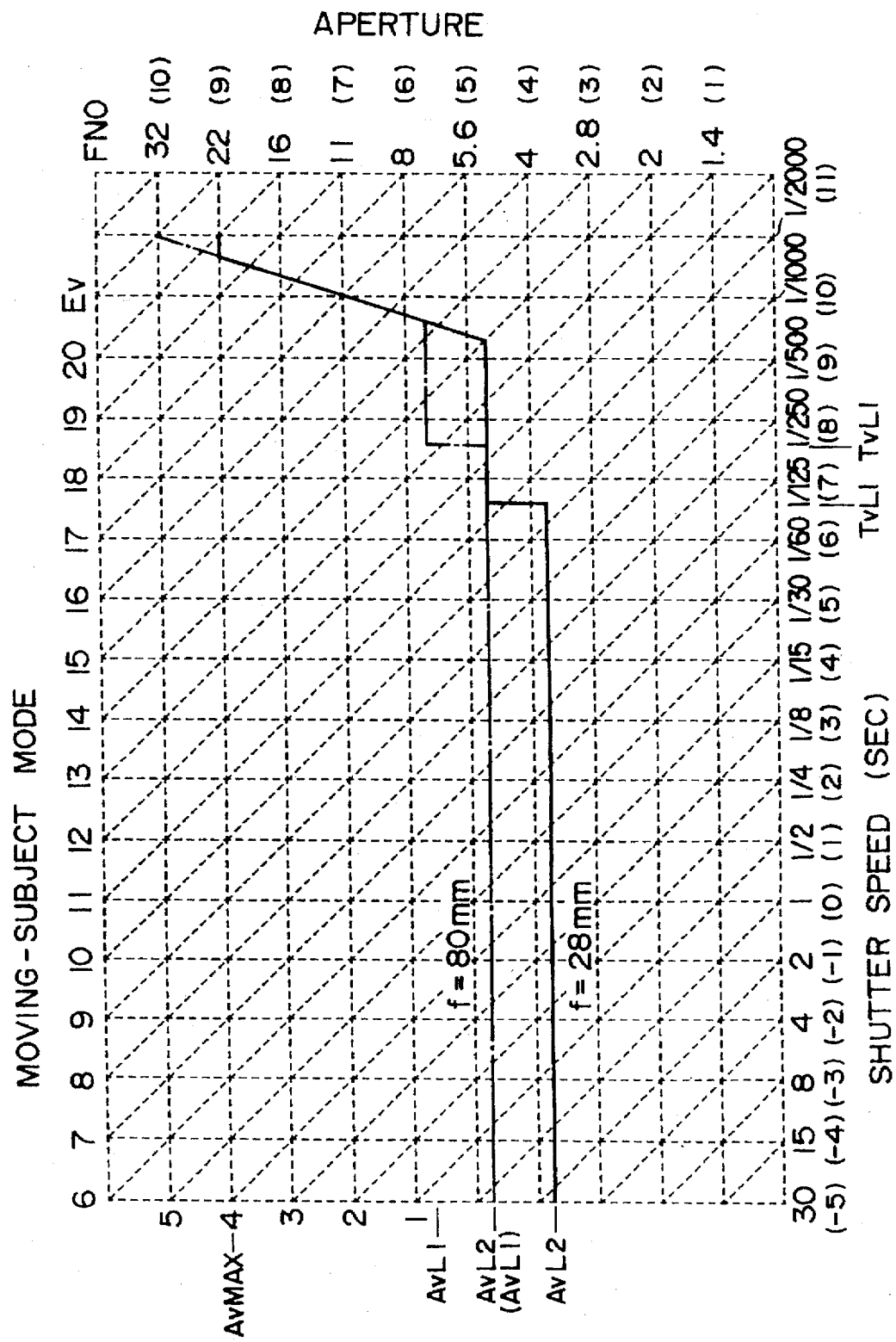
Figure 51A:
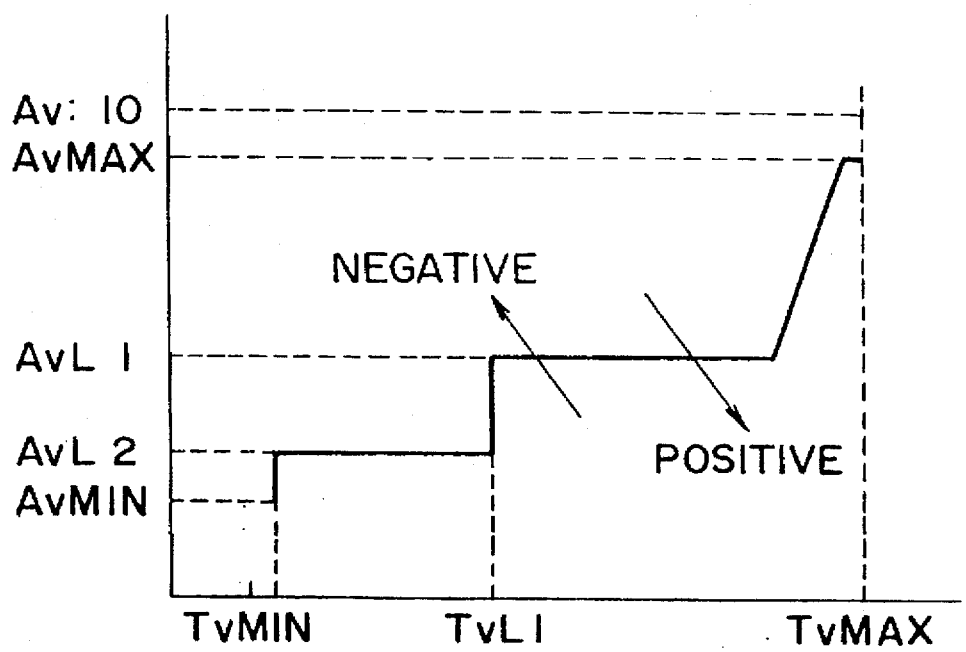
Figure 51B:
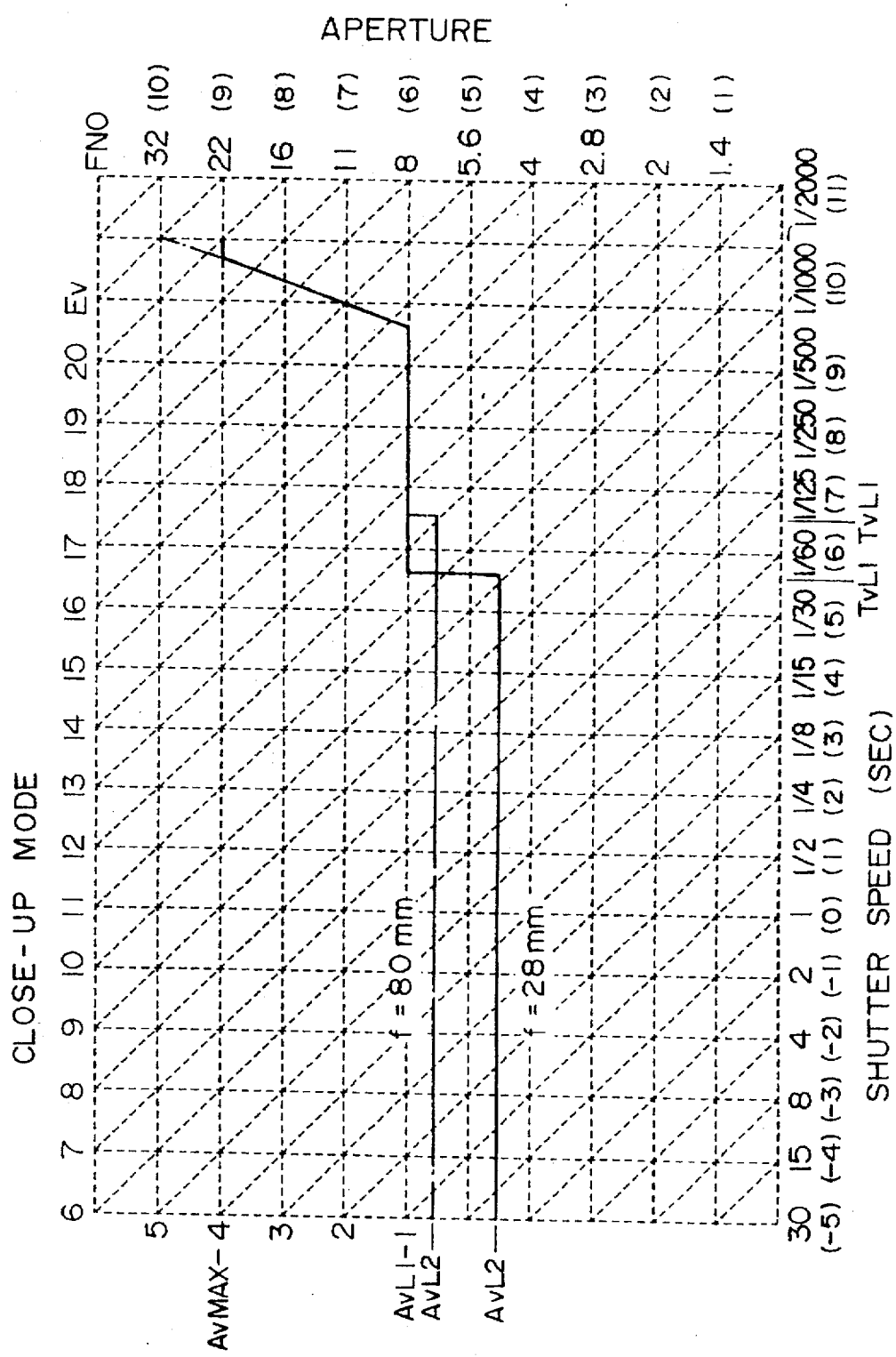
Figure 52A:
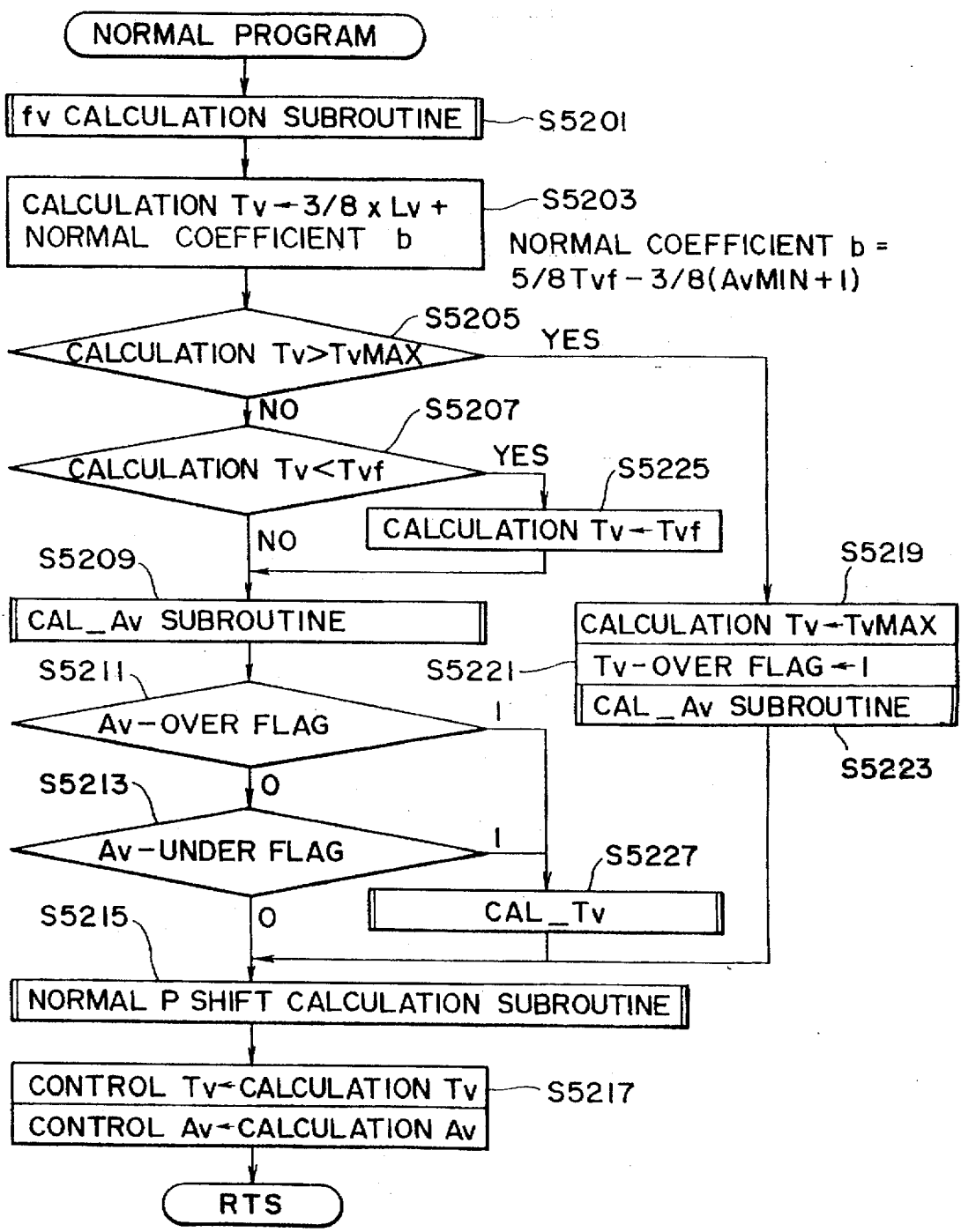
Figure 53:
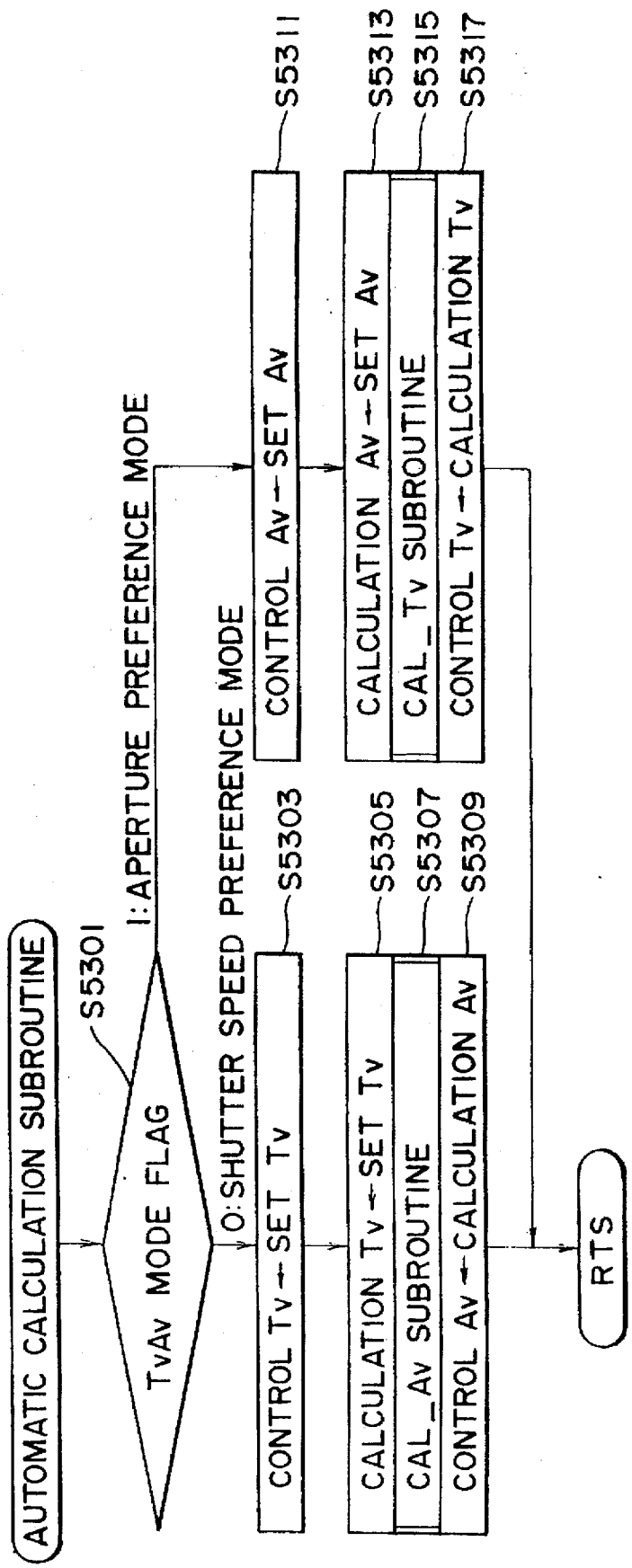
Figure 54:
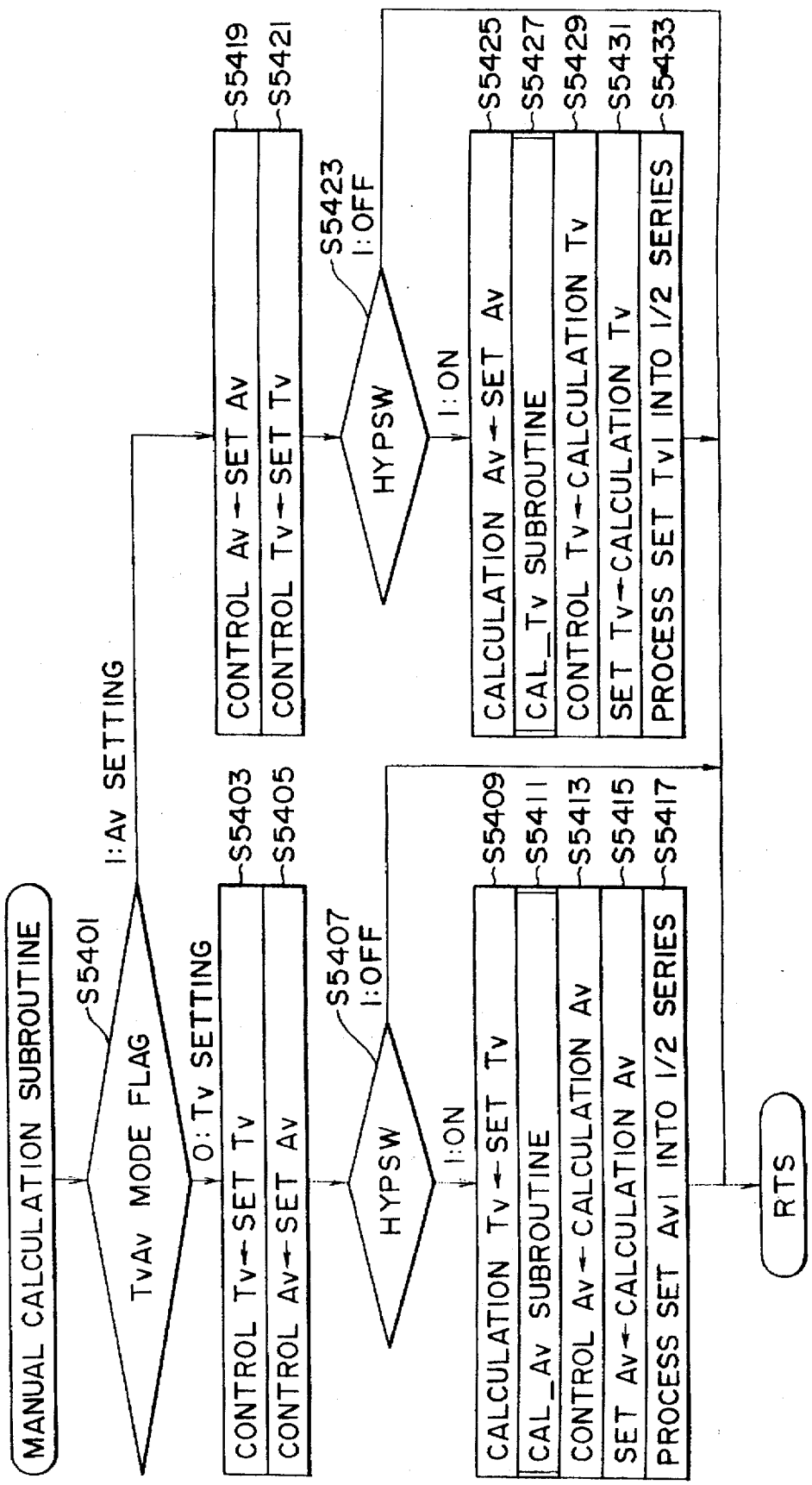
Figure 55A:
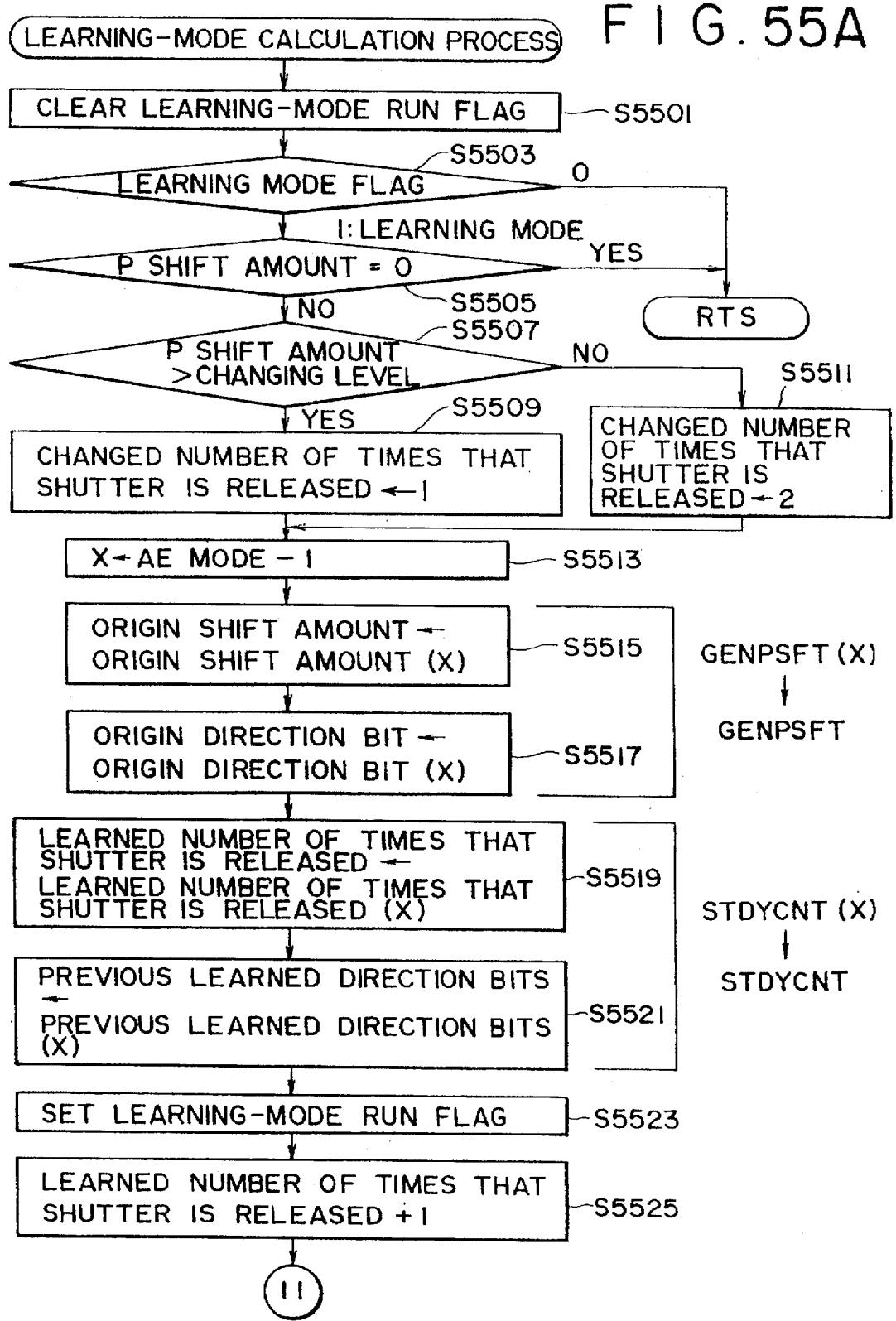
Figure 55C:
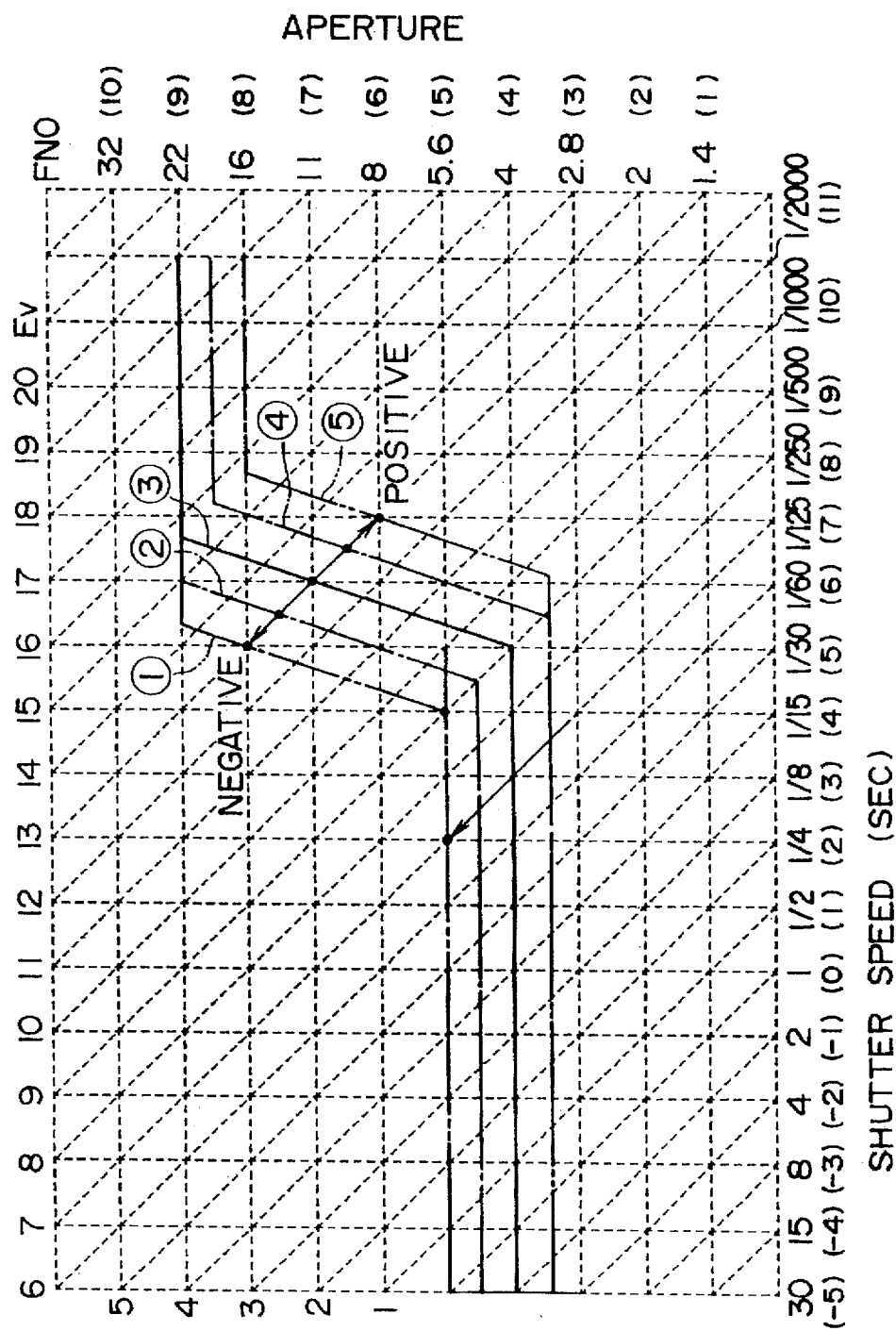
Figure 56:
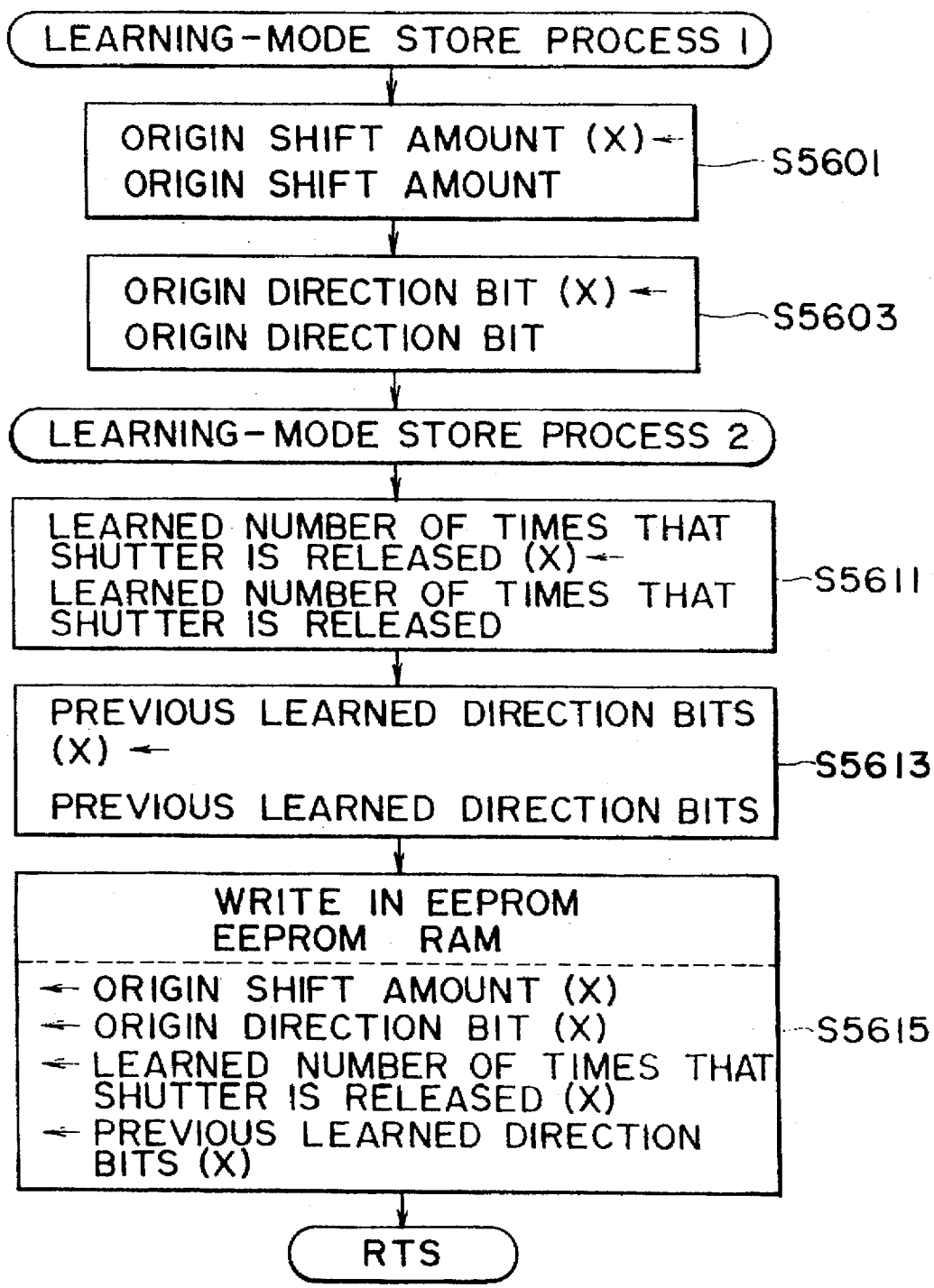
Figure 57A:
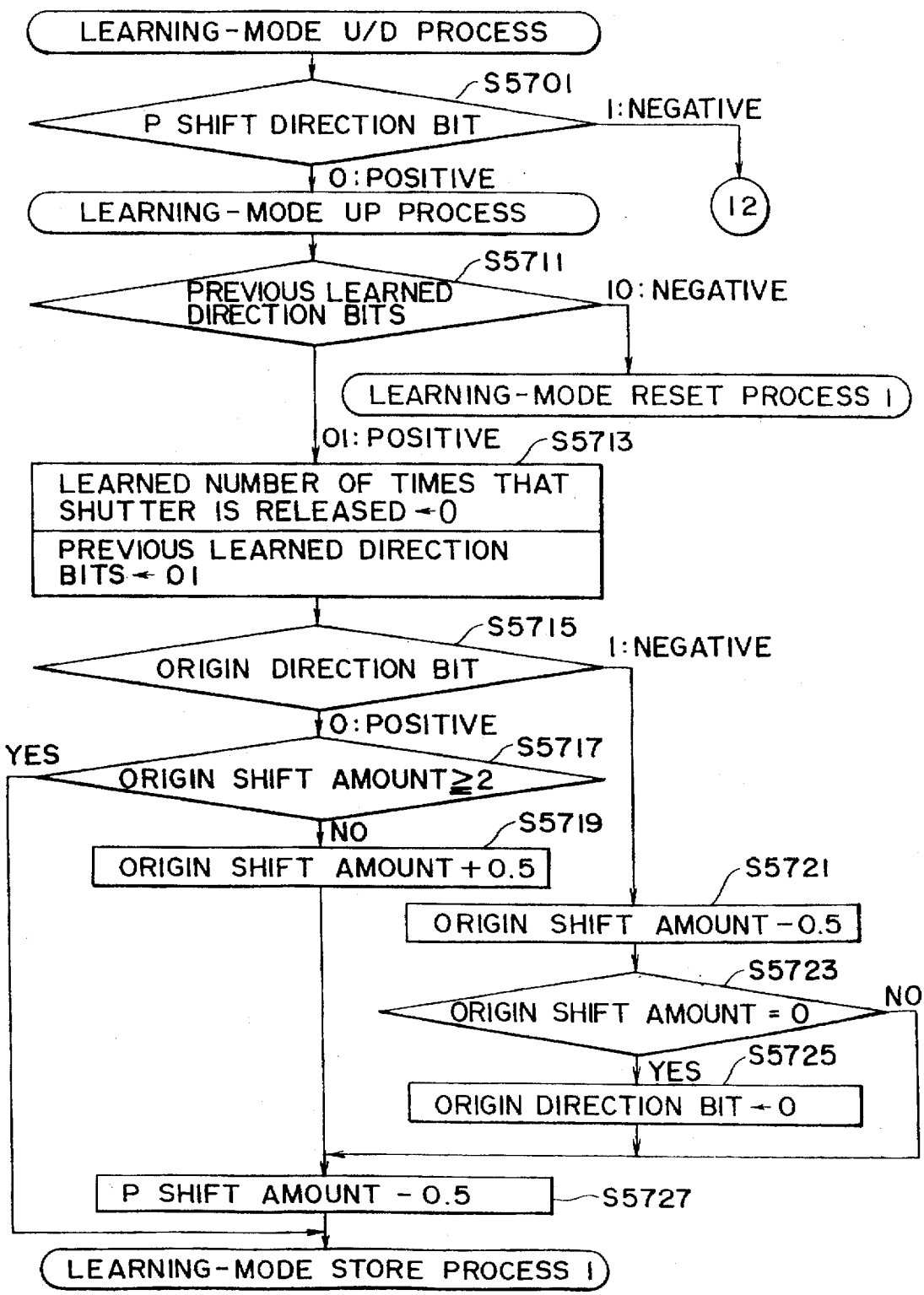
Figure 57B:
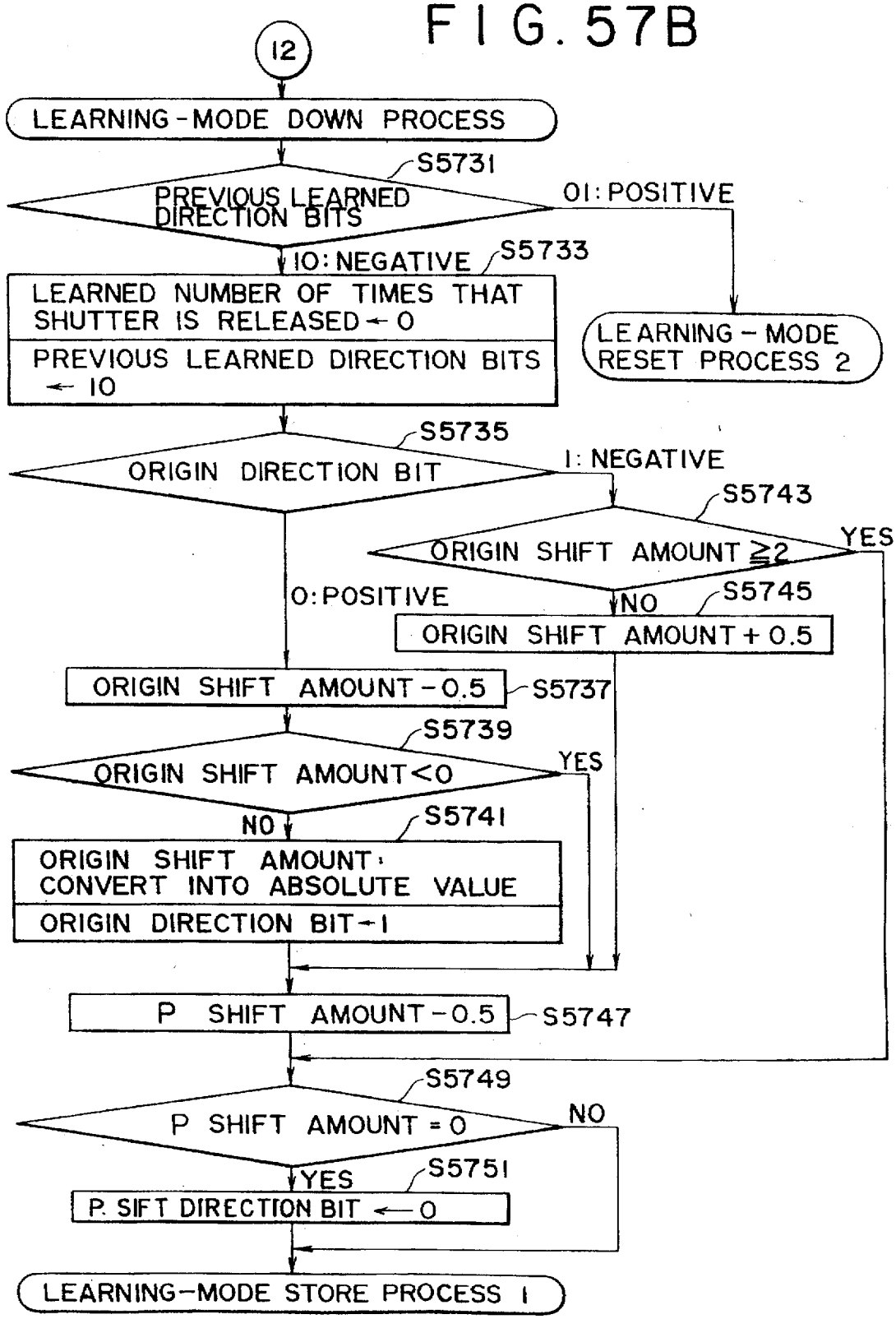
Figure 58:
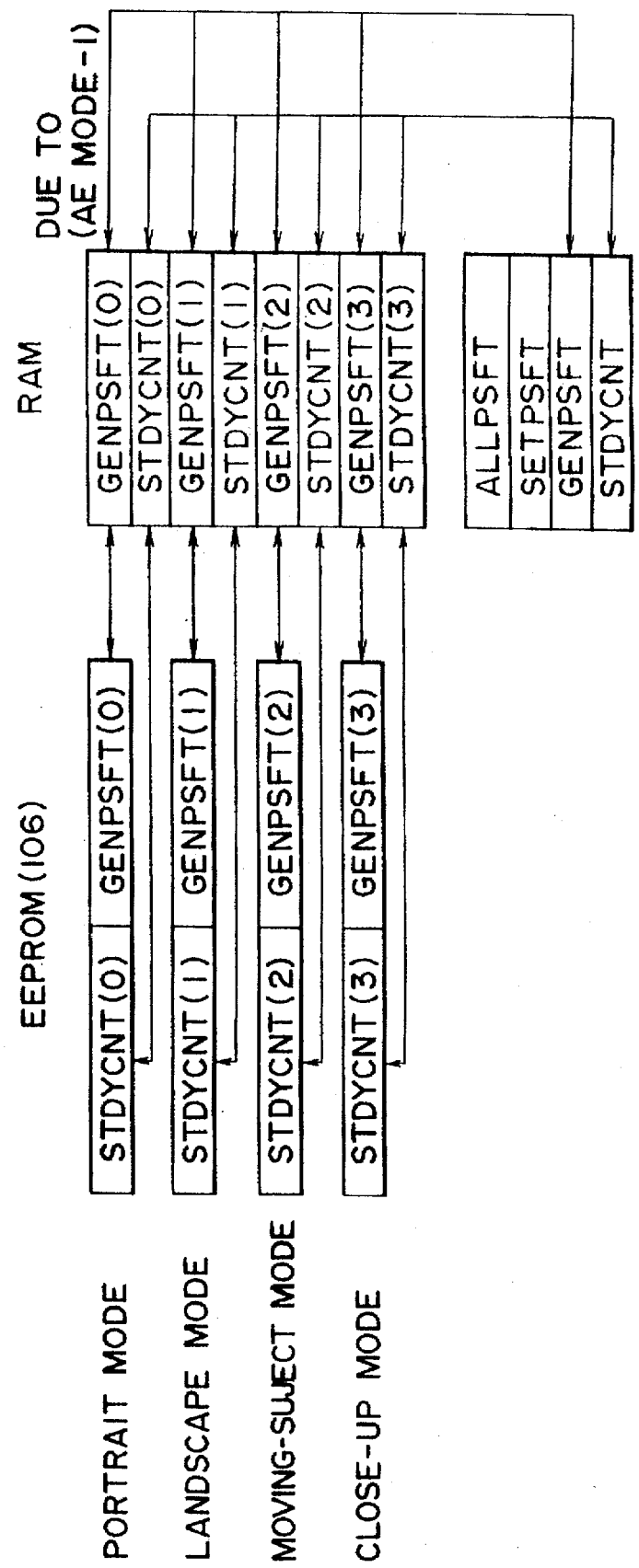
Figure 60A:
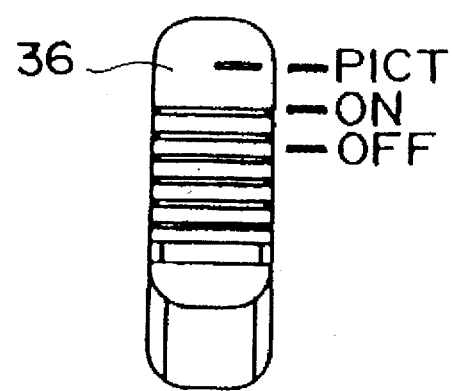
Figure 60B:
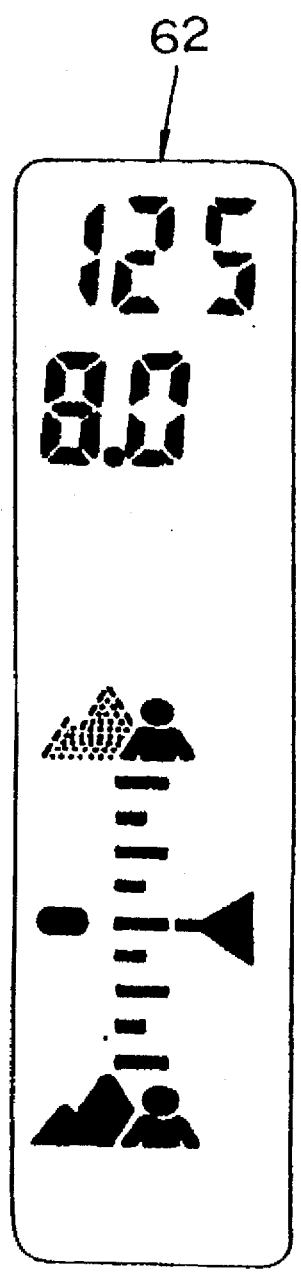
Figure 60C:
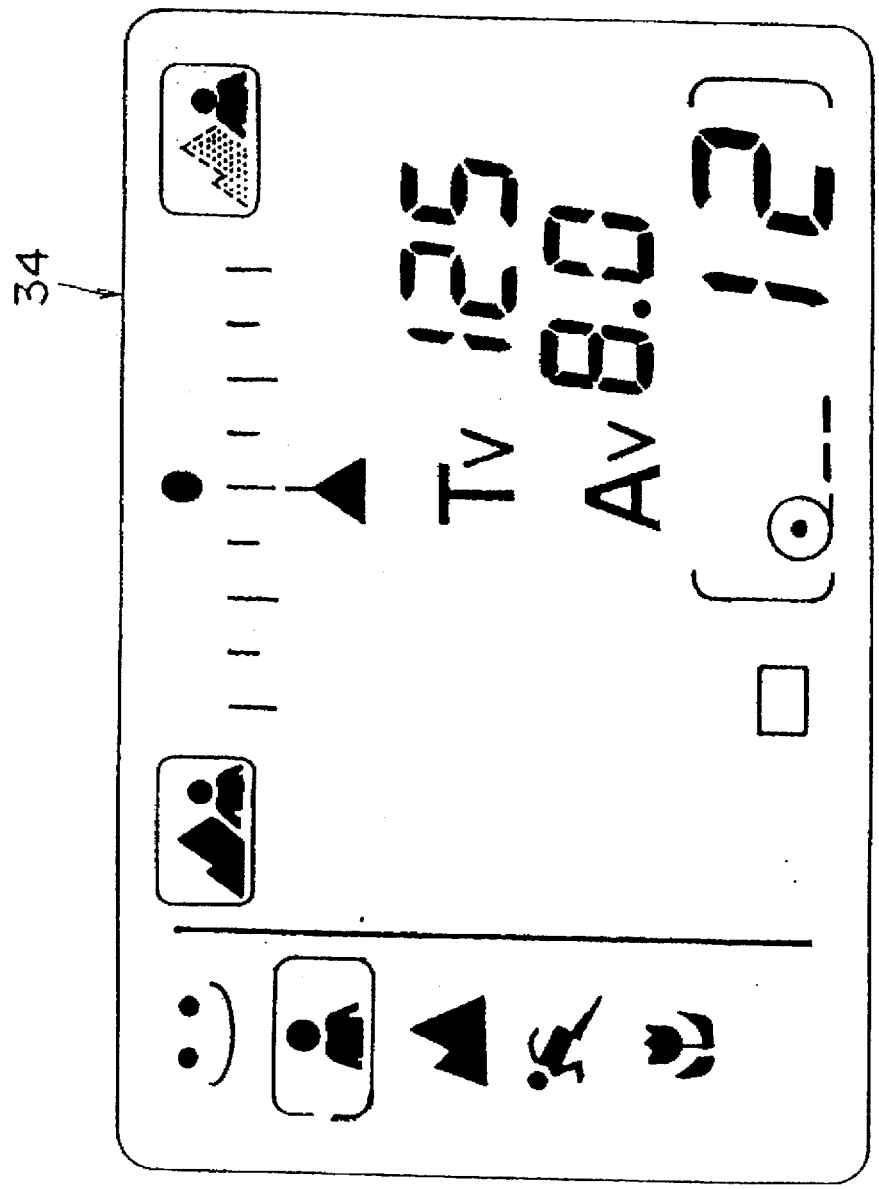
Figure 61A:
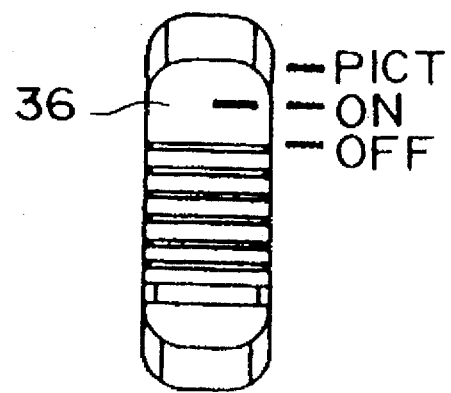
Figure 61B:
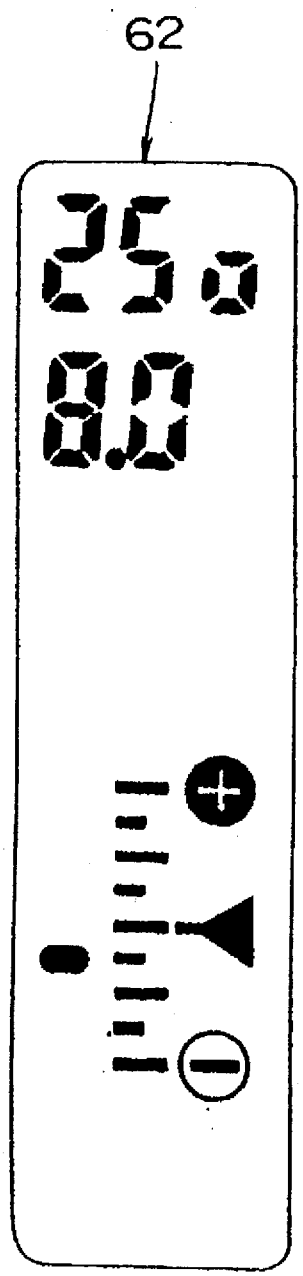
Figure 61C:
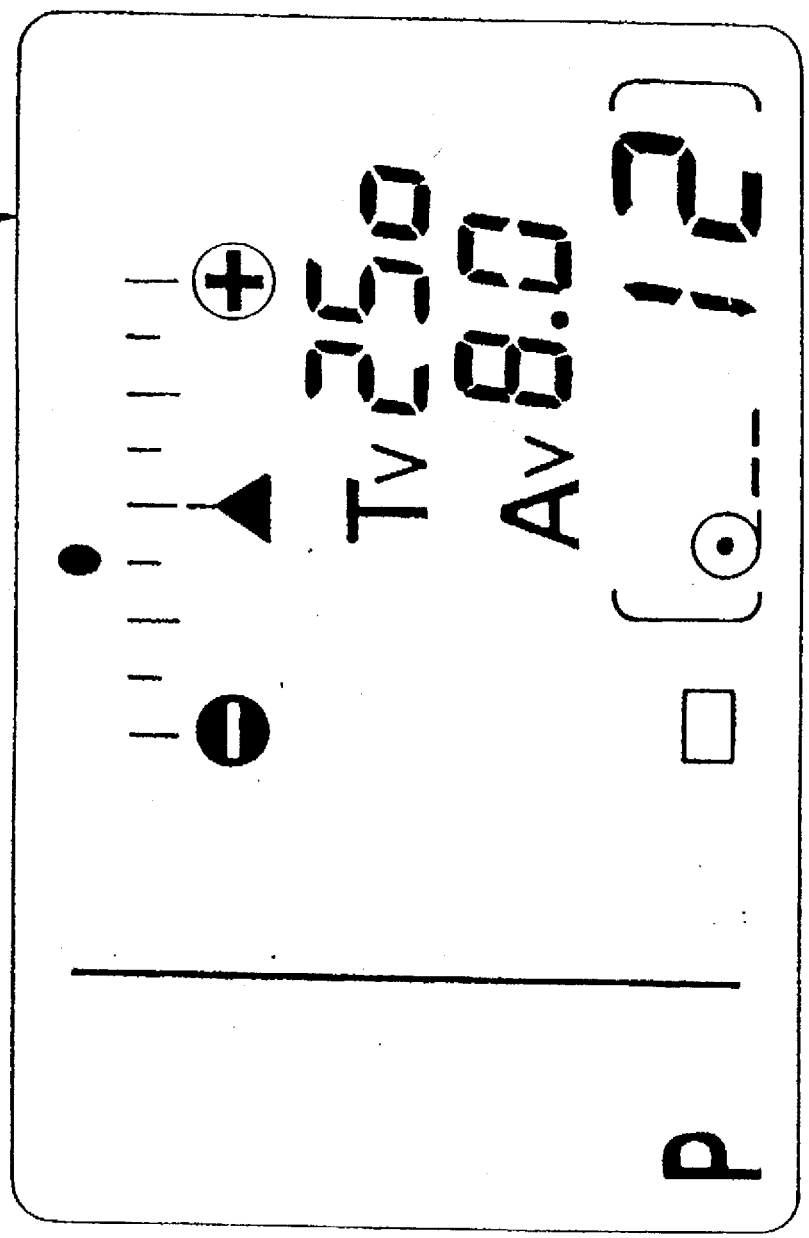
Figure 62:
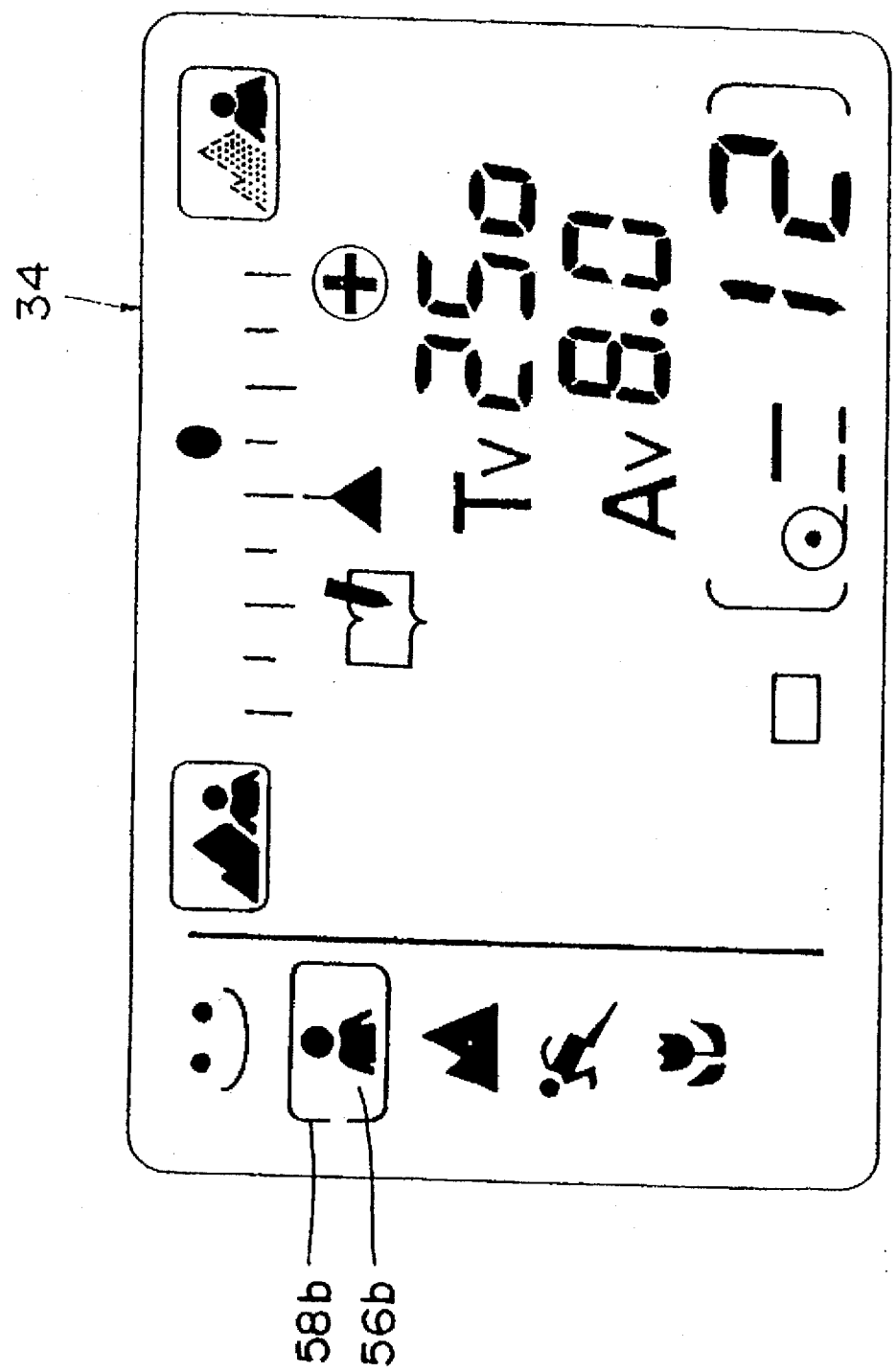
Figure 64A:
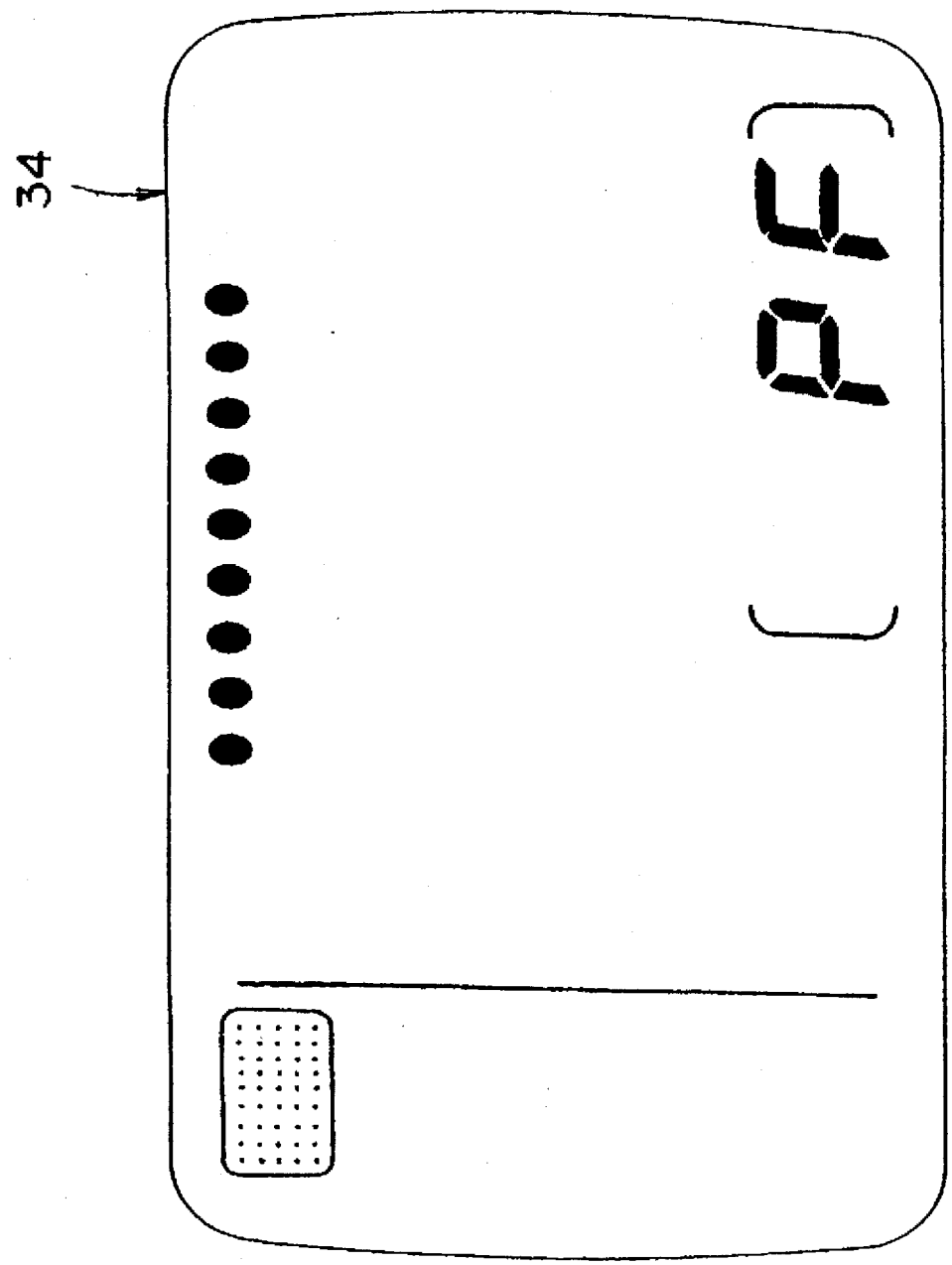
Figure 64B:
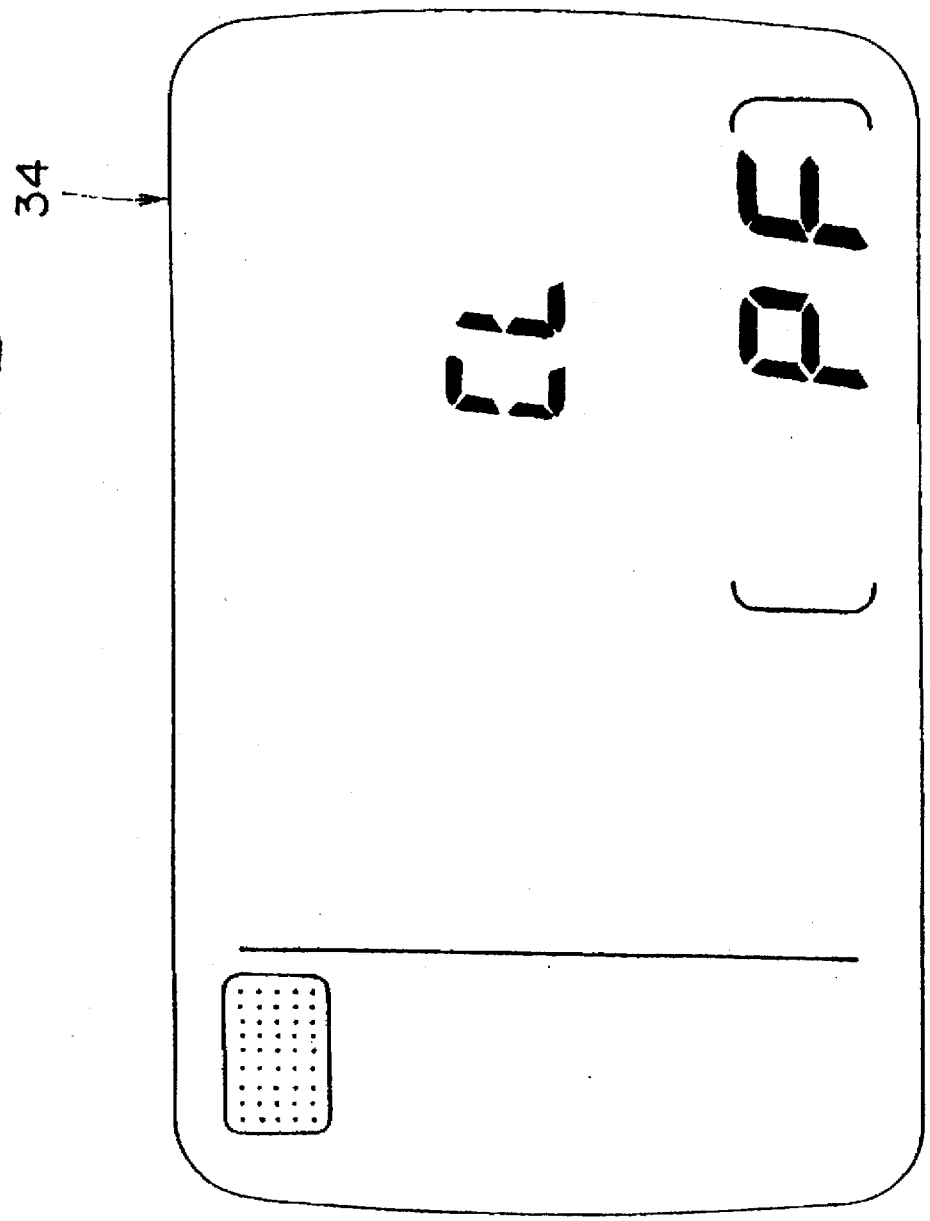
Figure 66A:
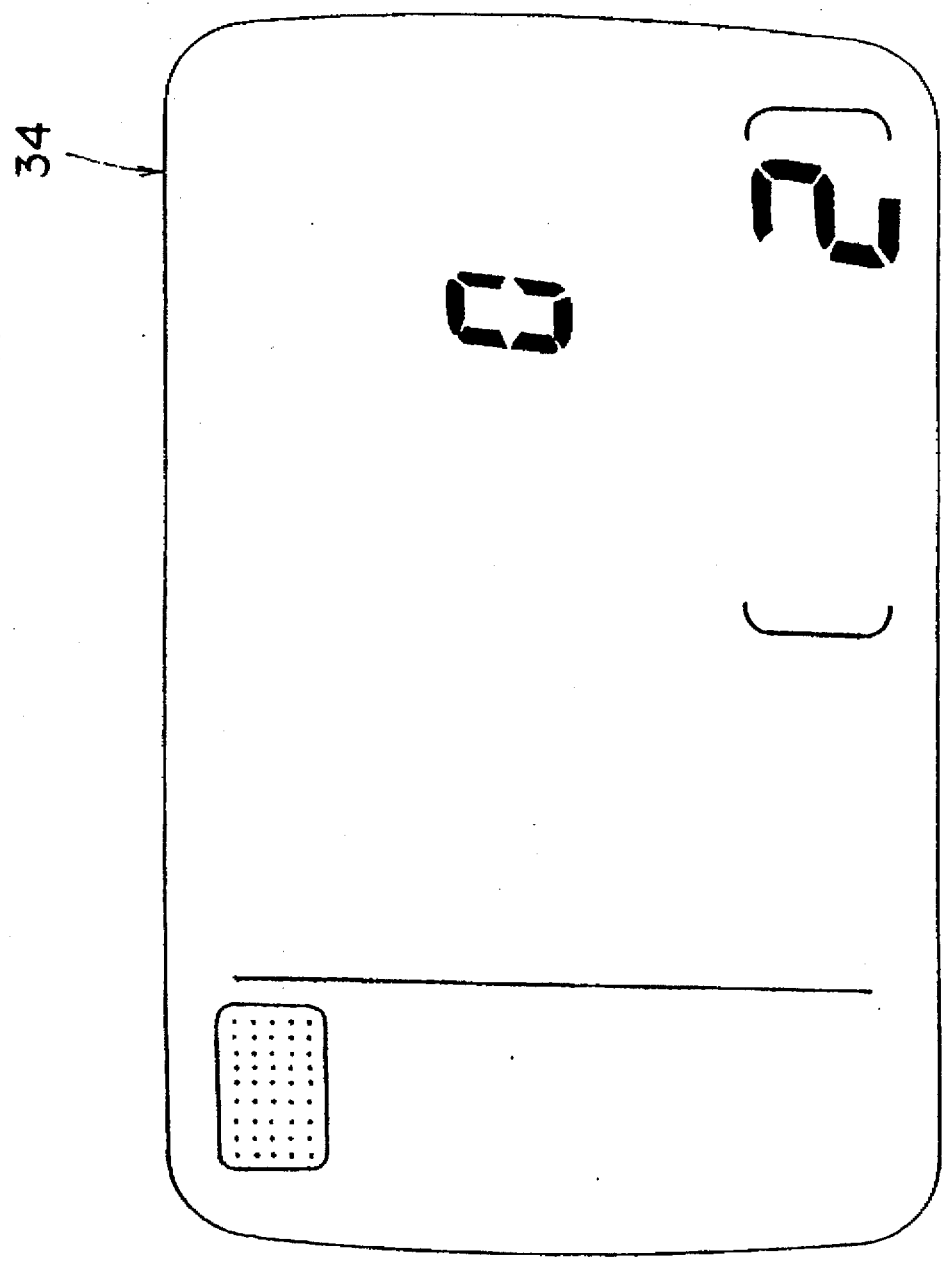
Figure 66B:
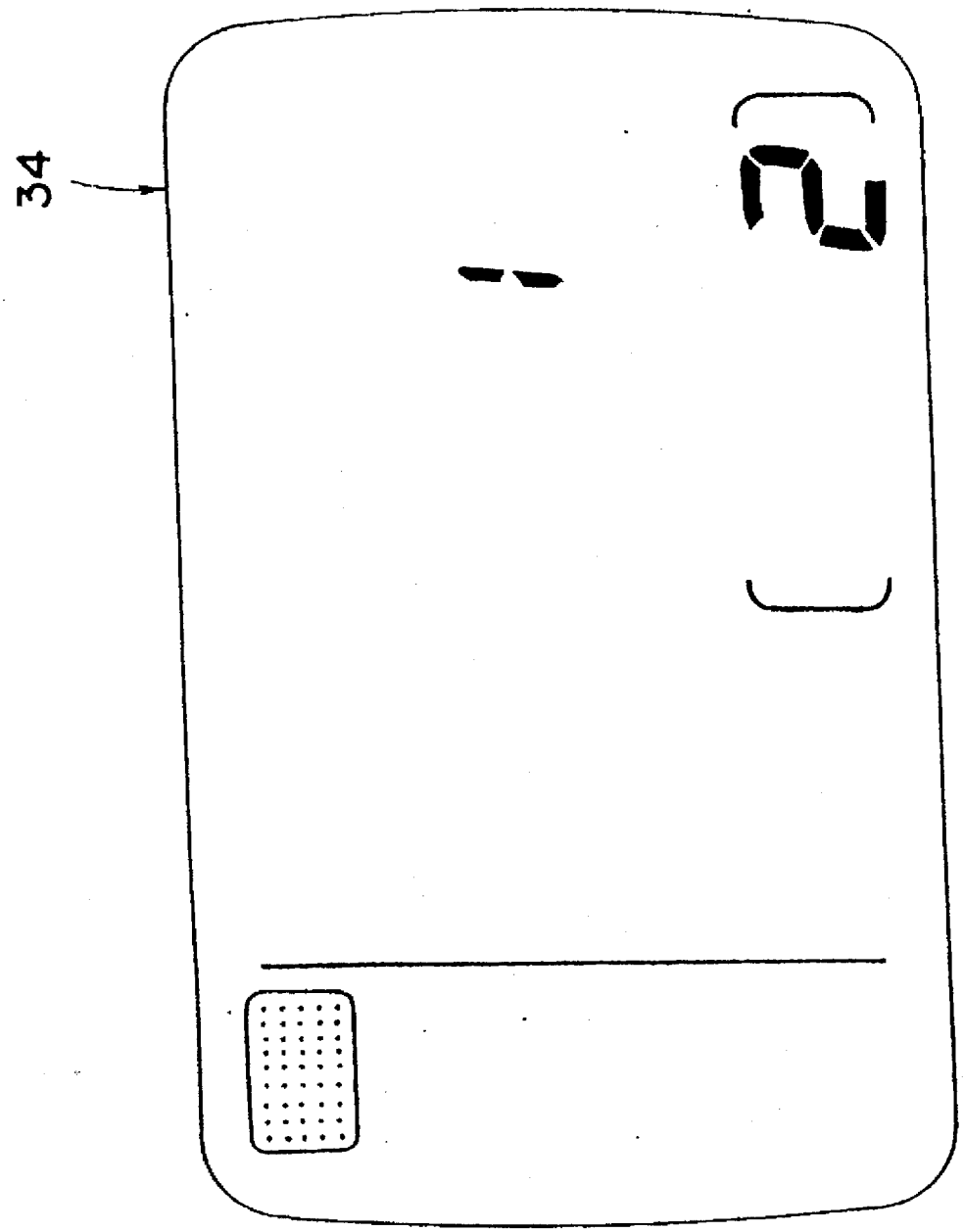
Figure 67B:
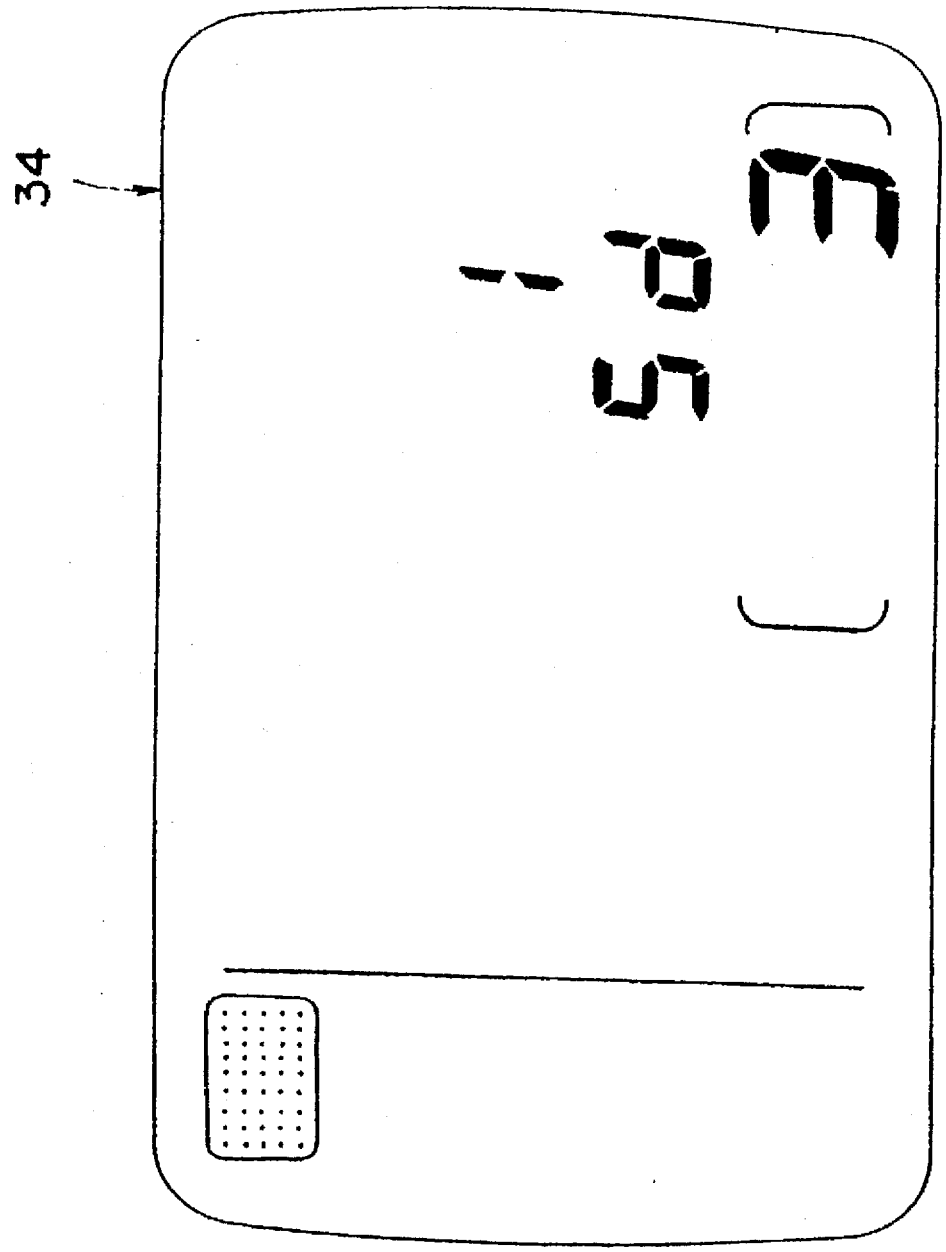
Figure 68A:
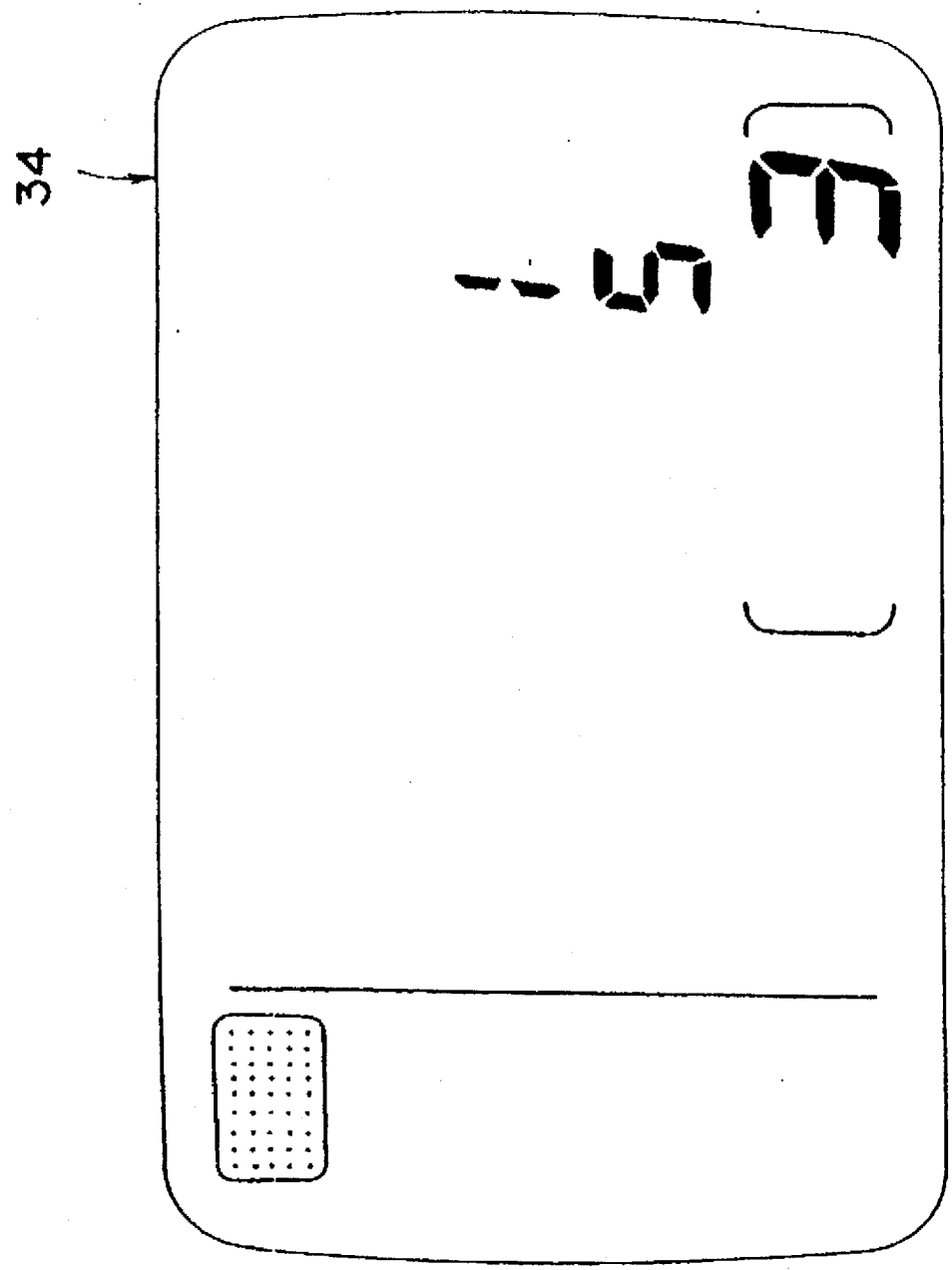
Figure 68B:
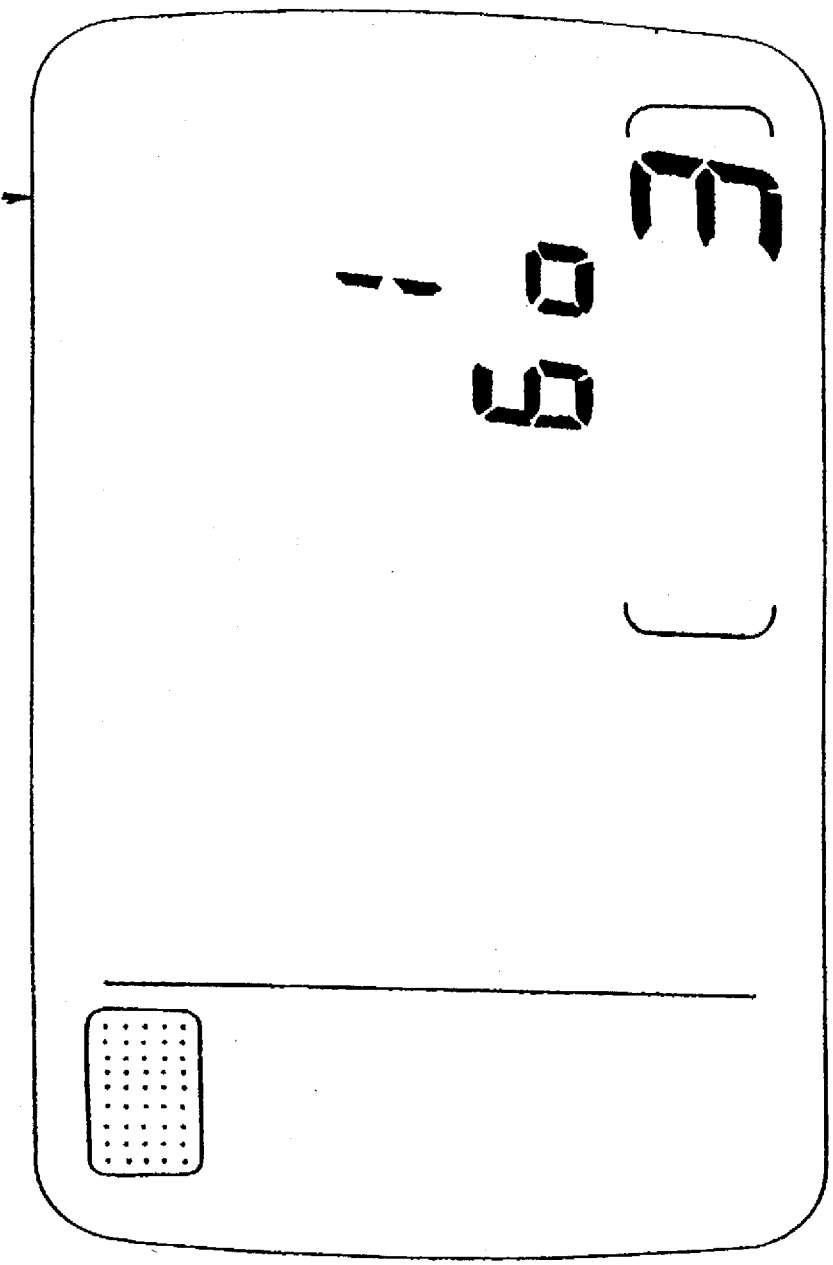
Figure 68C:
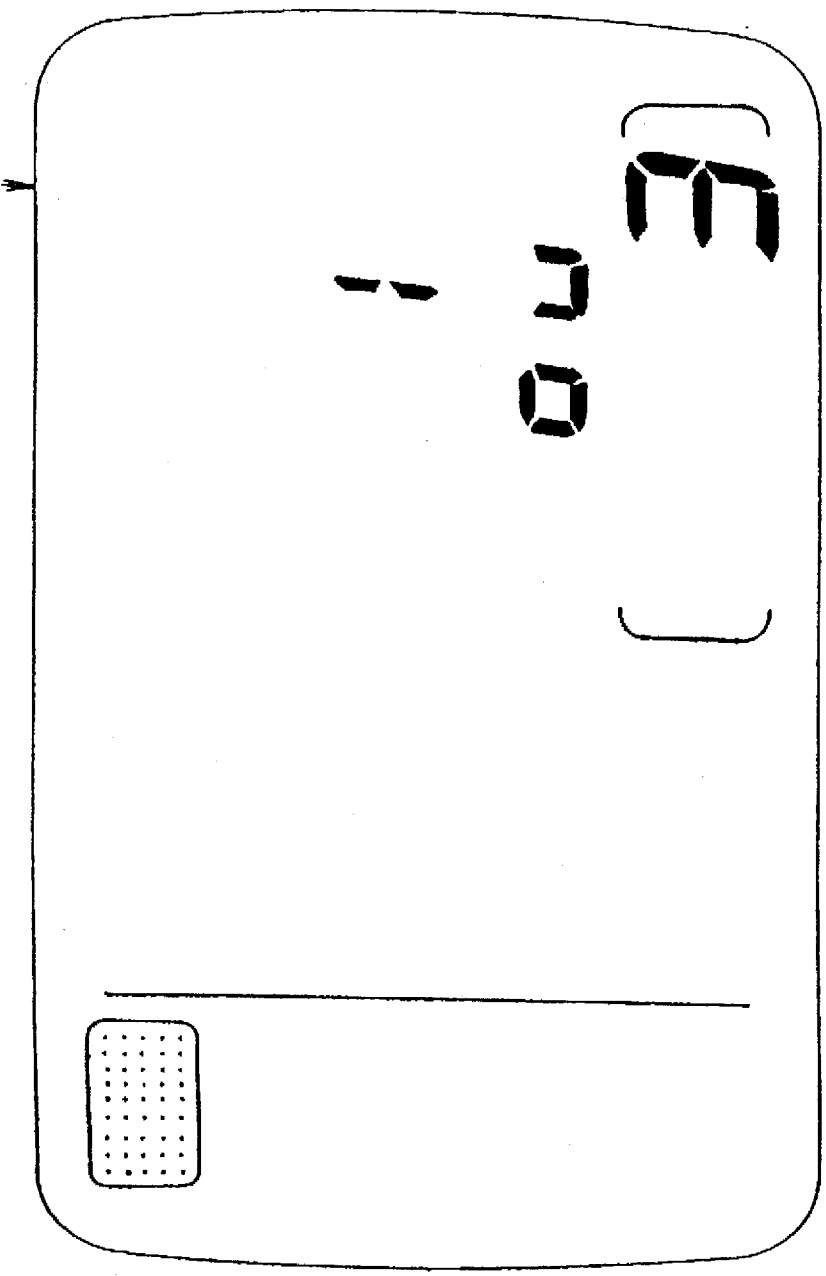
Figure 68D:
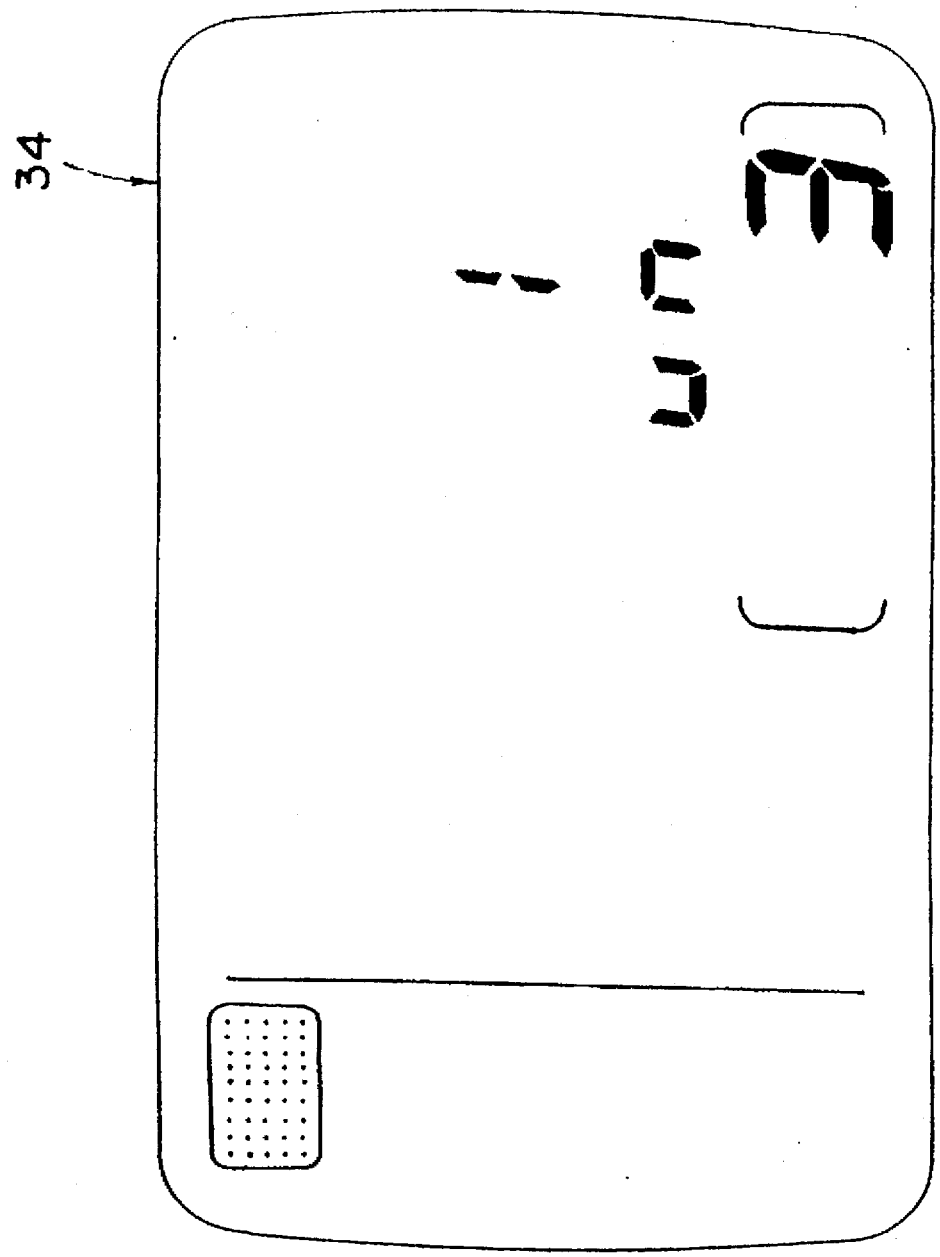
Figure 68E:
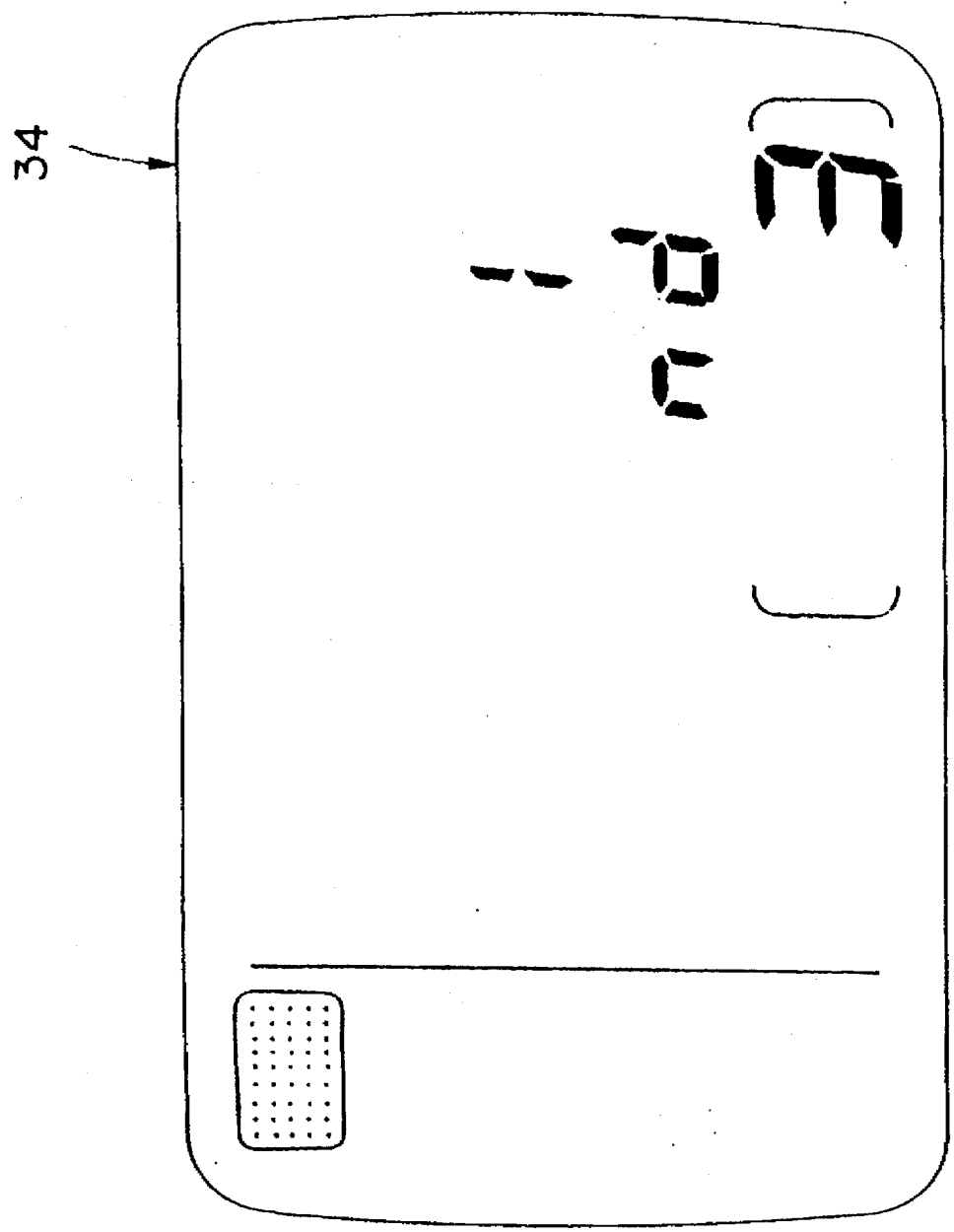
Figure 68F:
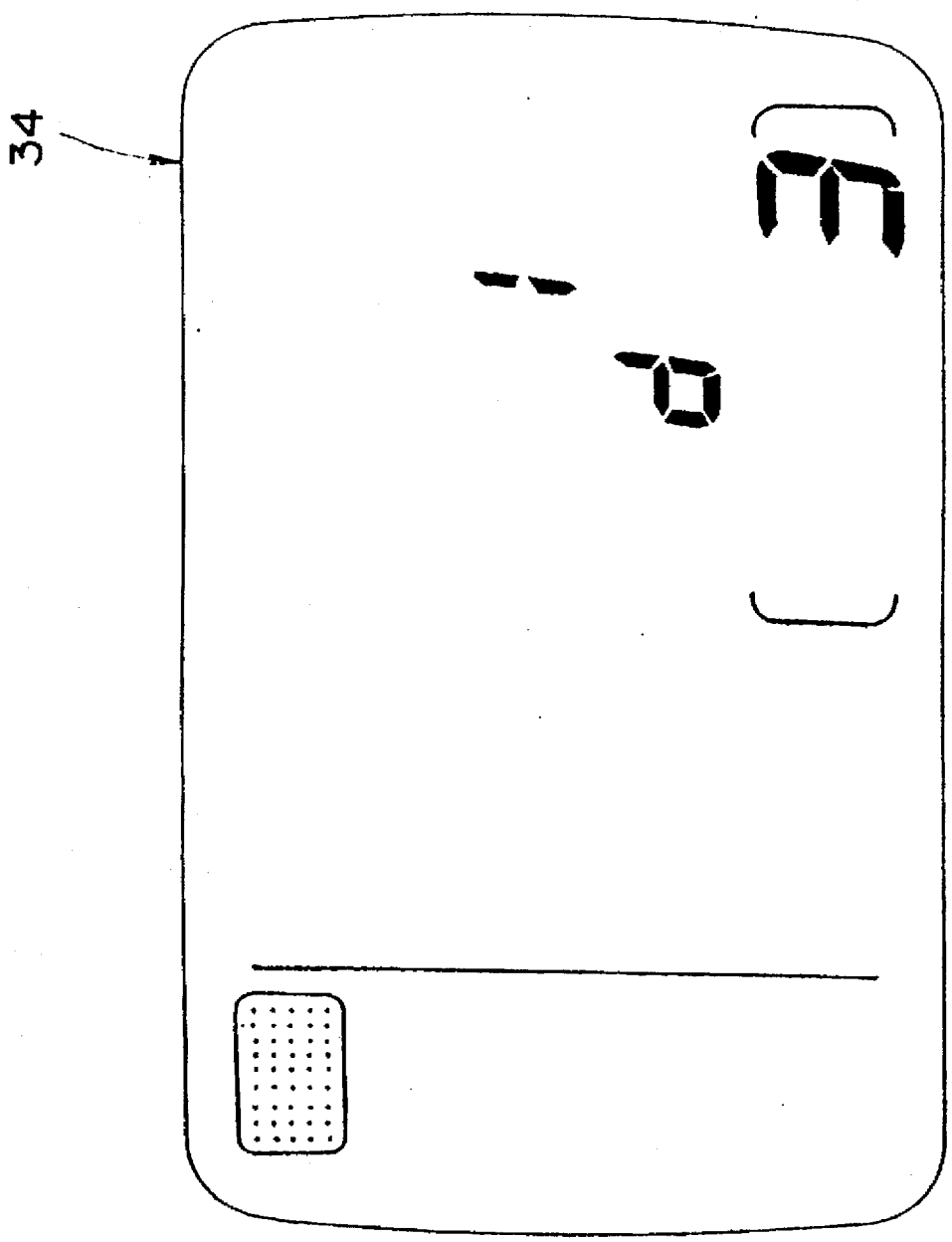
Figure 69A:
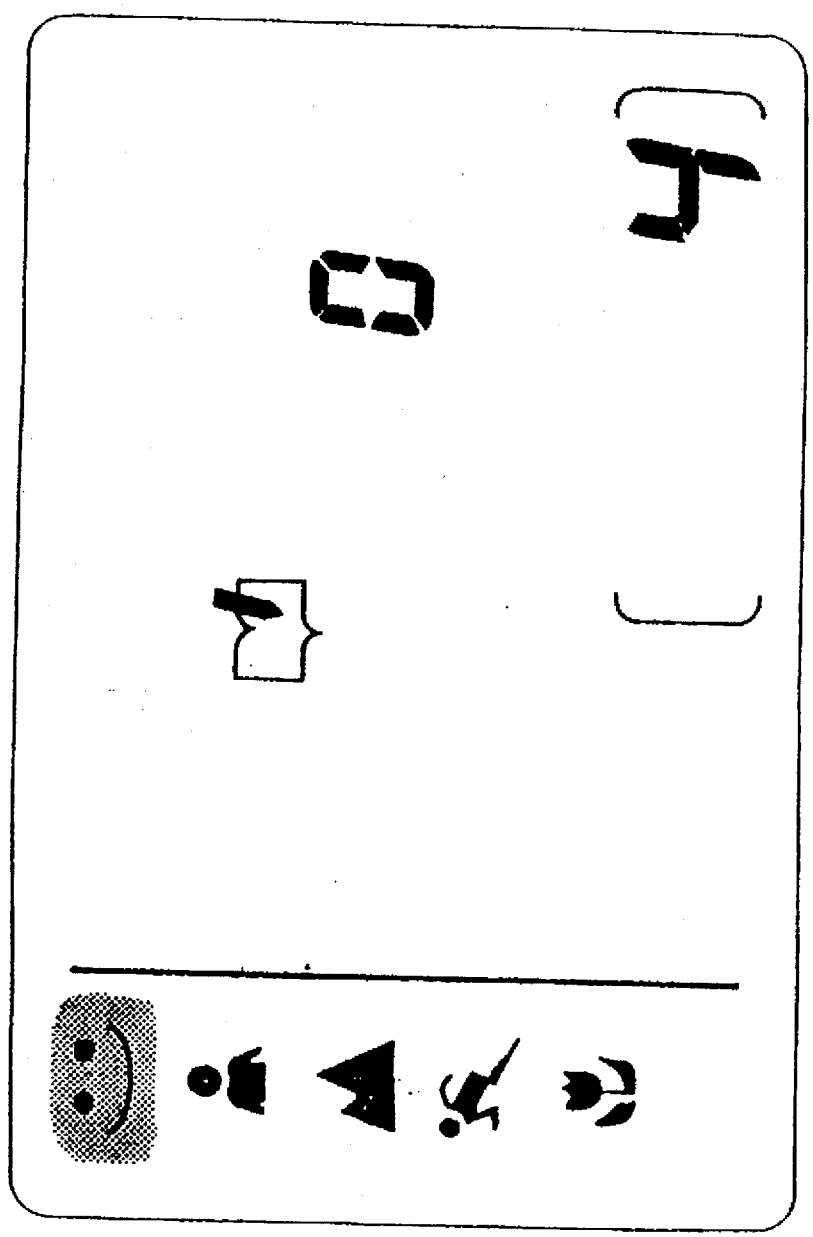
Figure 69B:
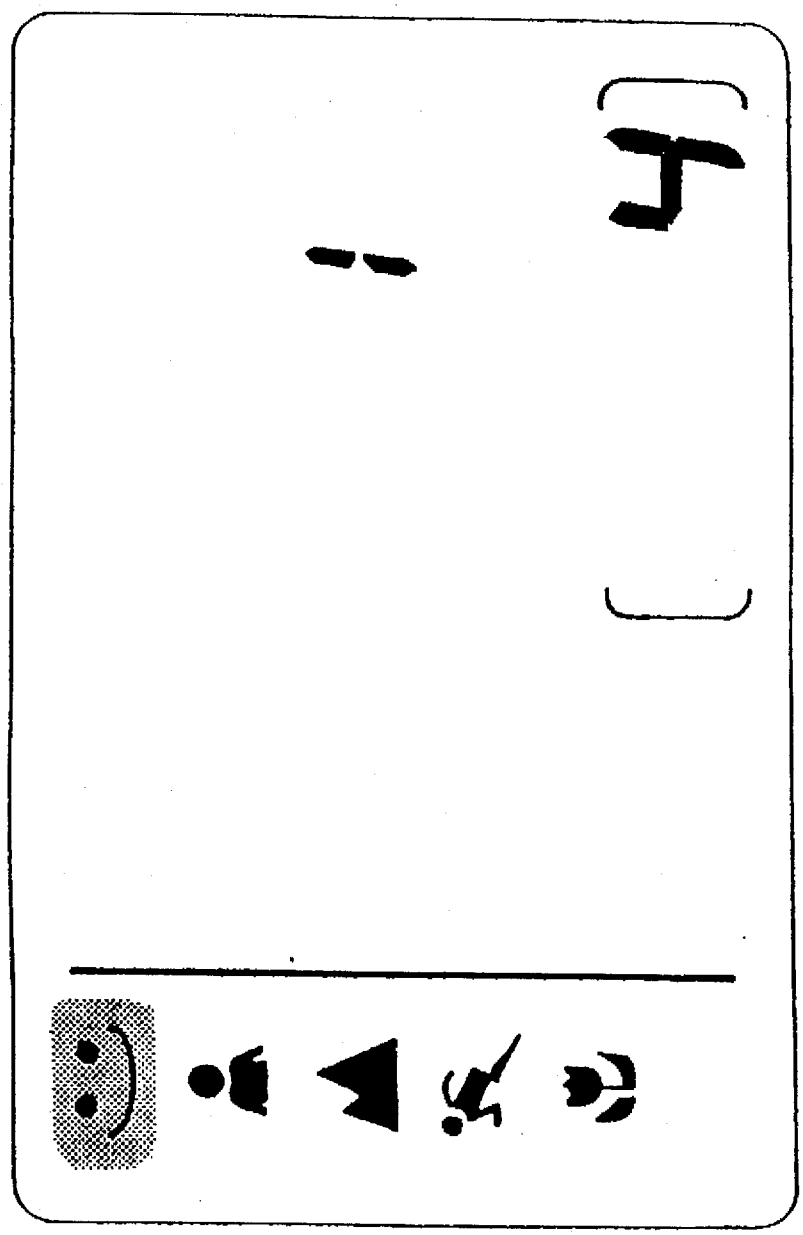
Figure 70A:
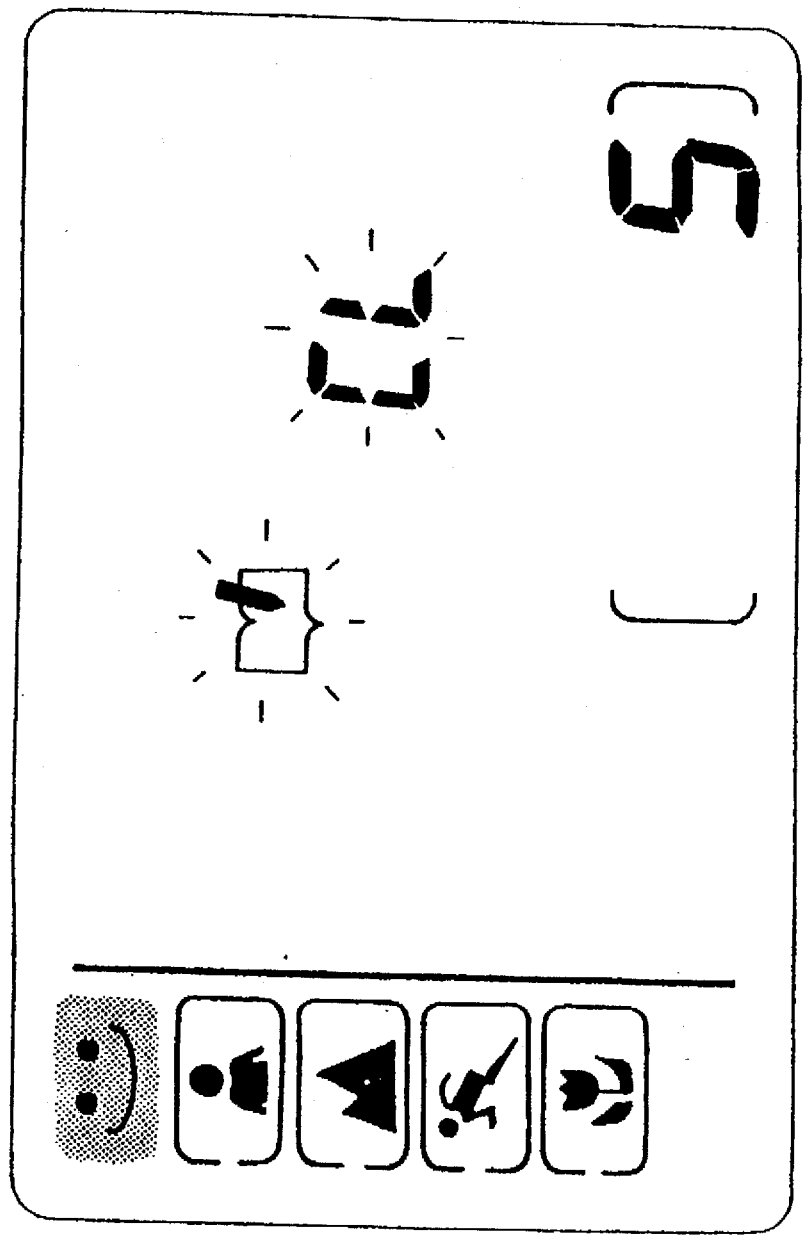
Figure 70B:
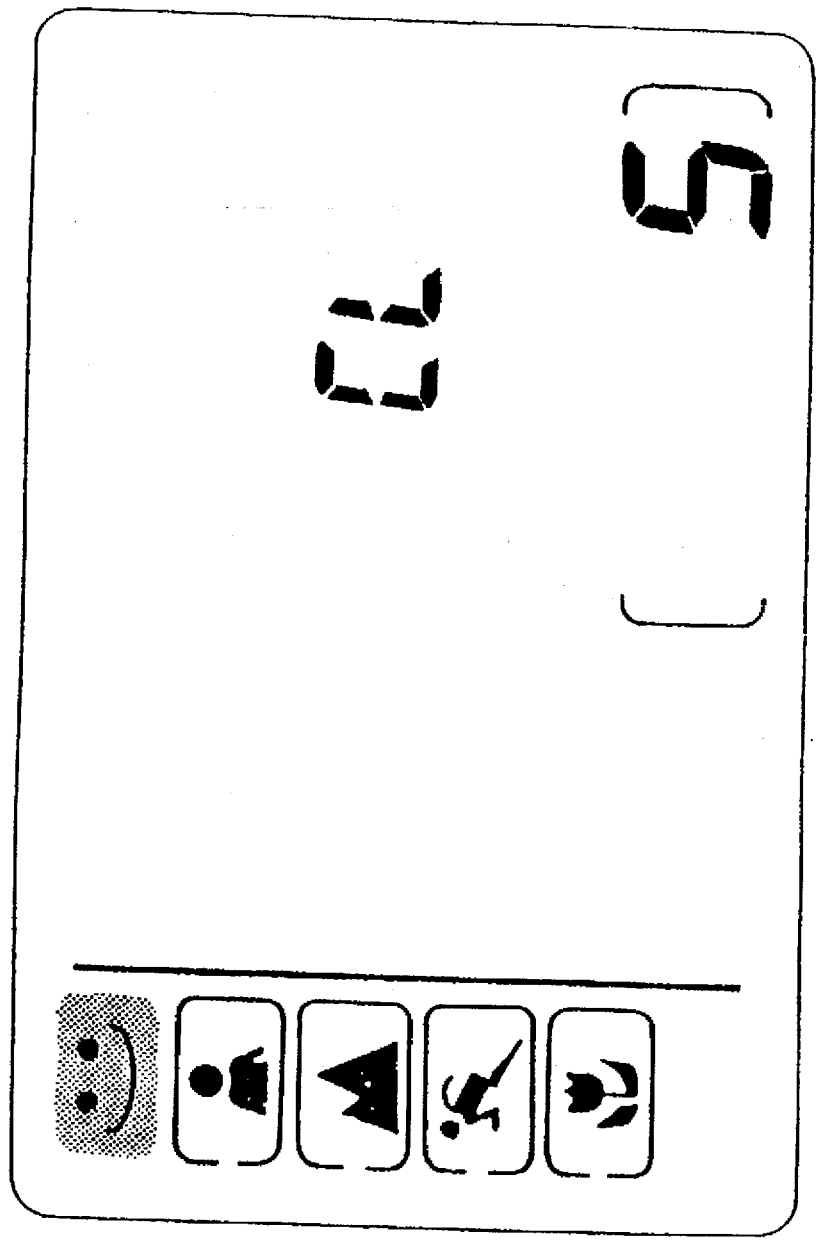
Figure 71A:
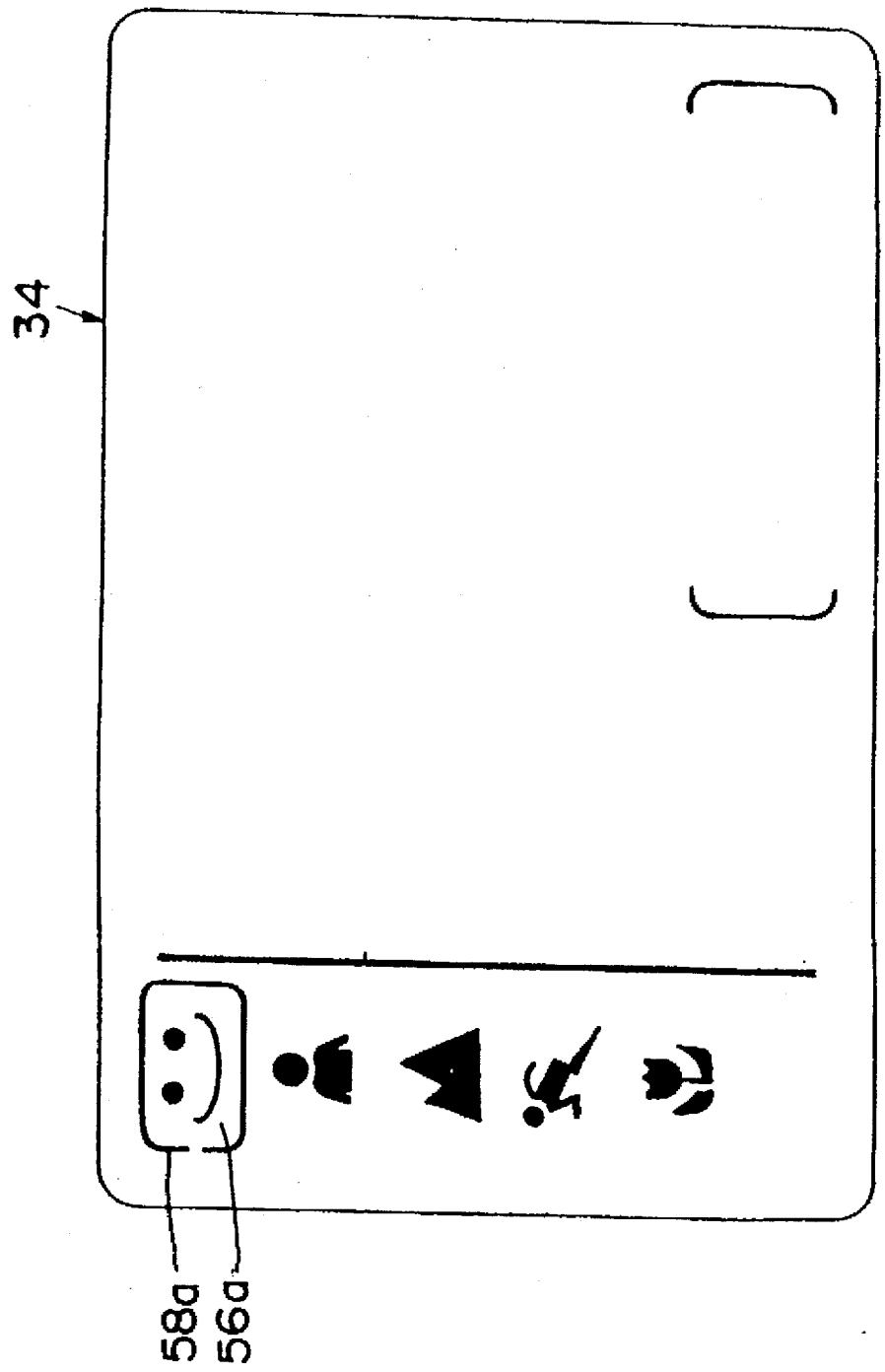
Figure 71C:
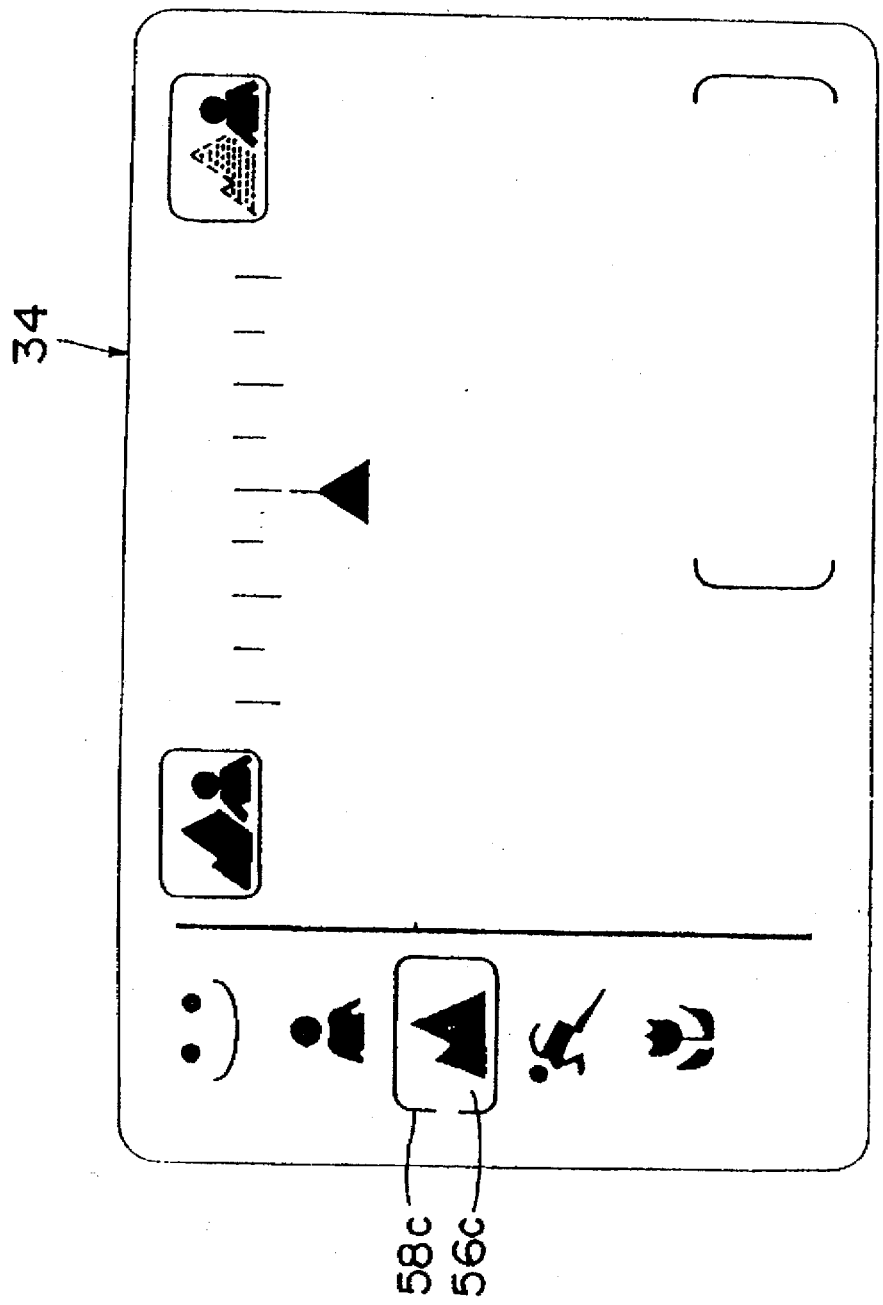
Figure 71D:
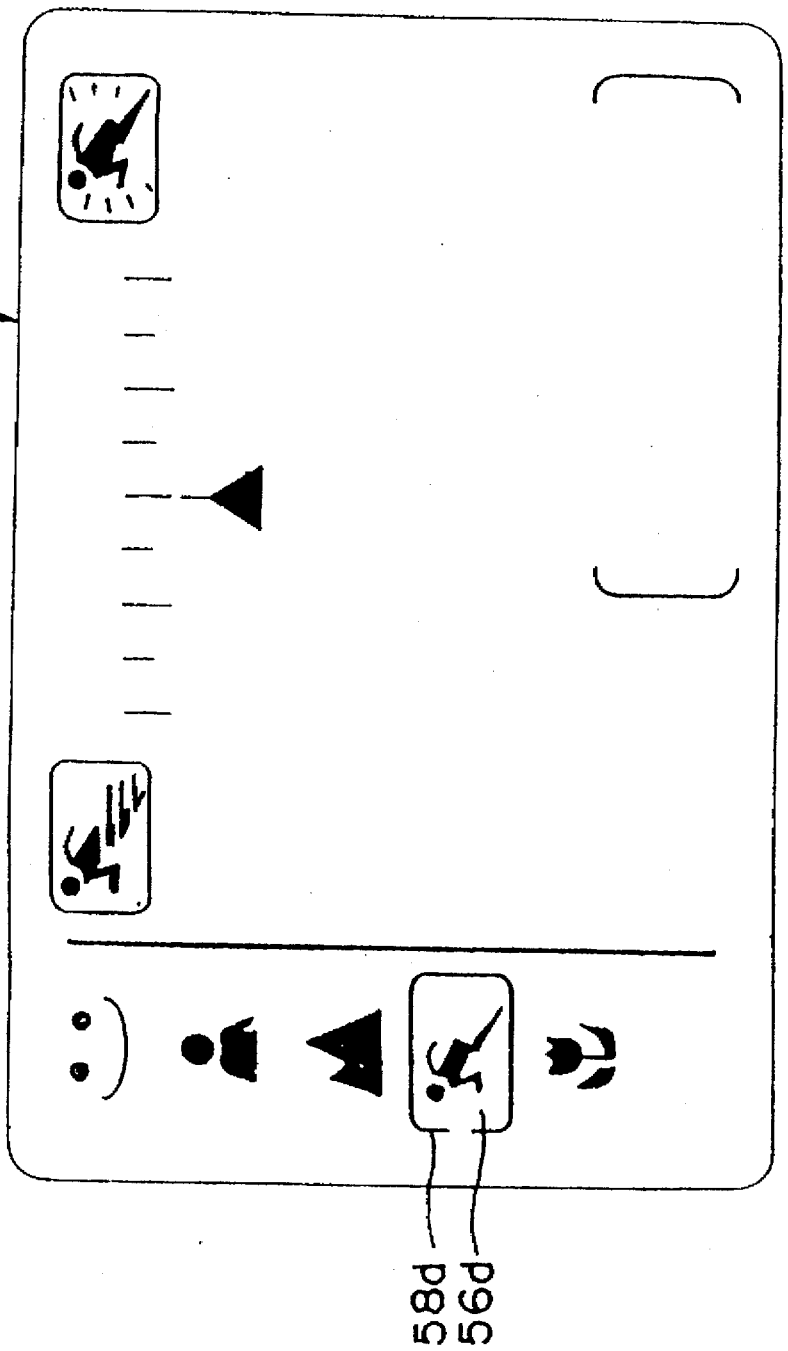
Figure 71E:
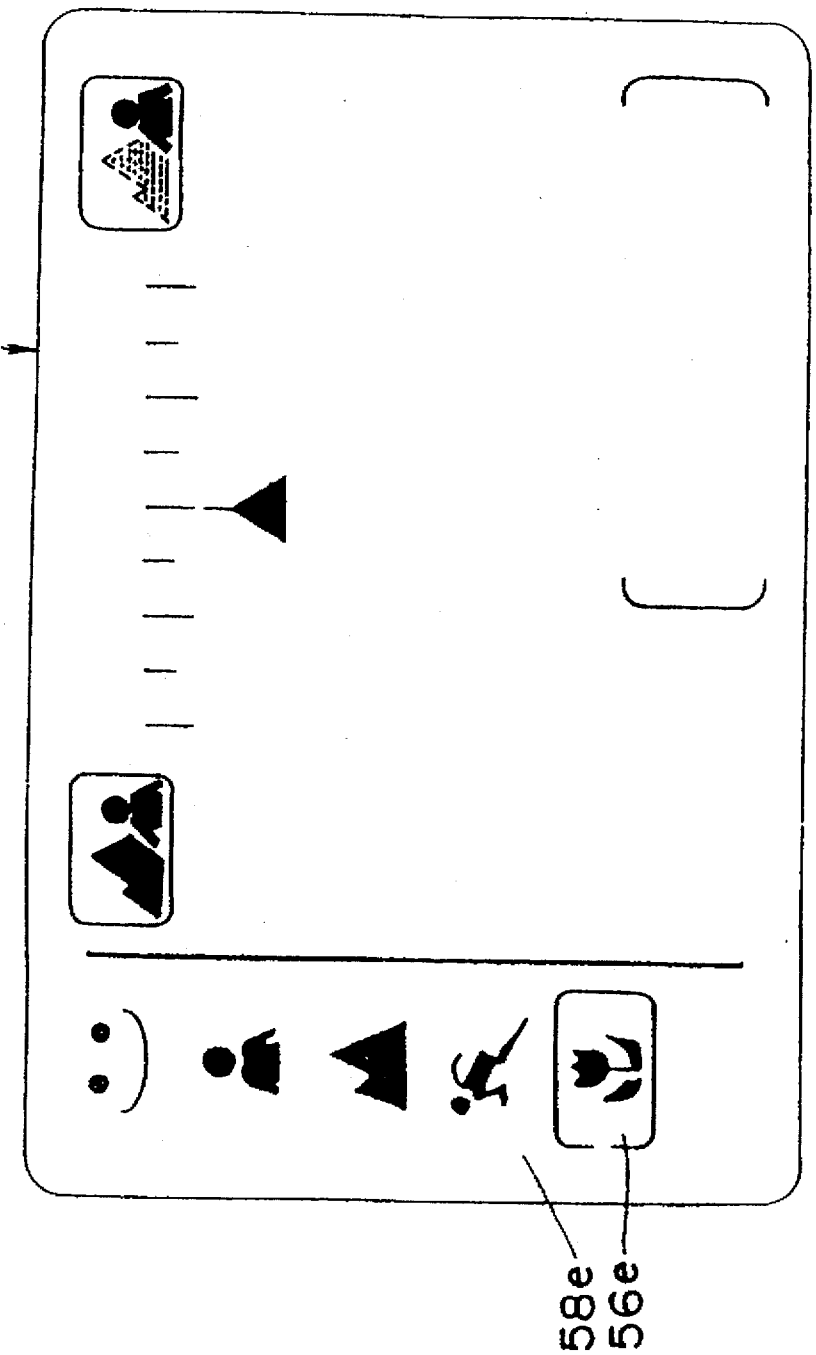
Figure 71F:
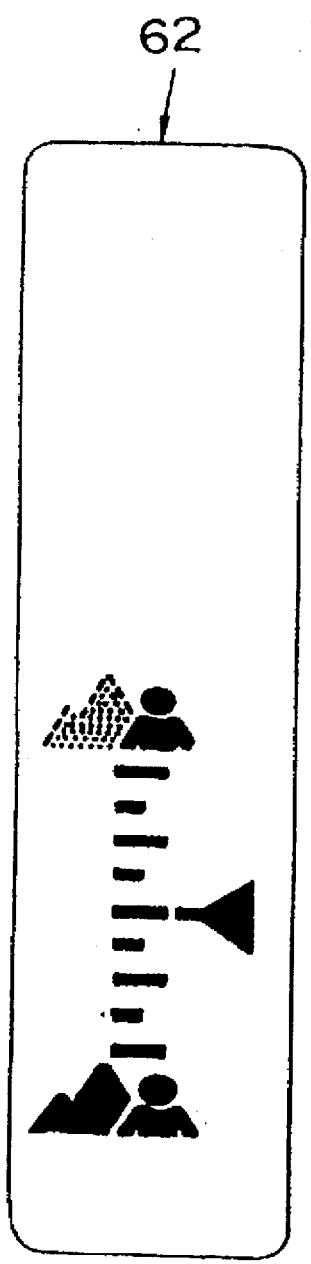
Figure 71G:
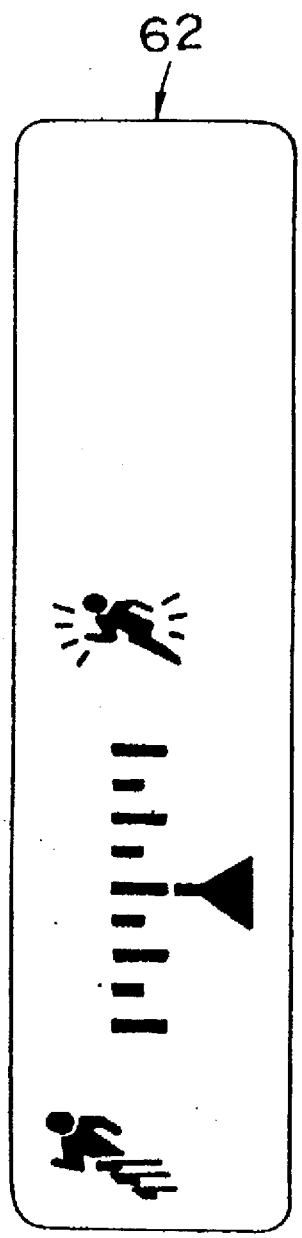
Figure 72A:
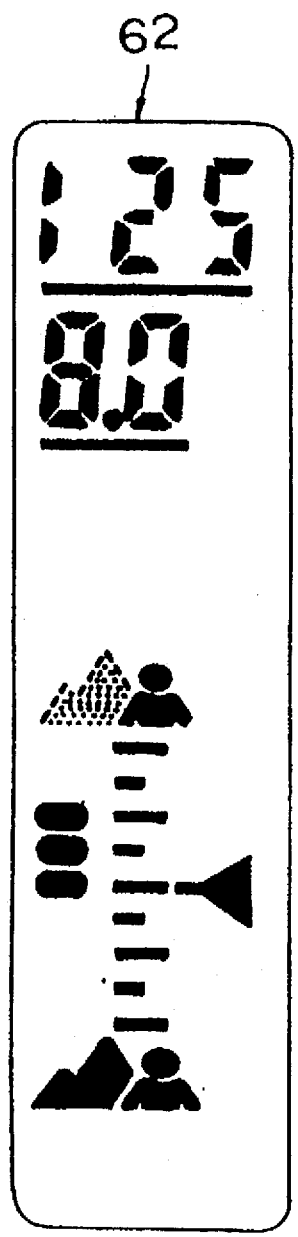
Figure 72B:
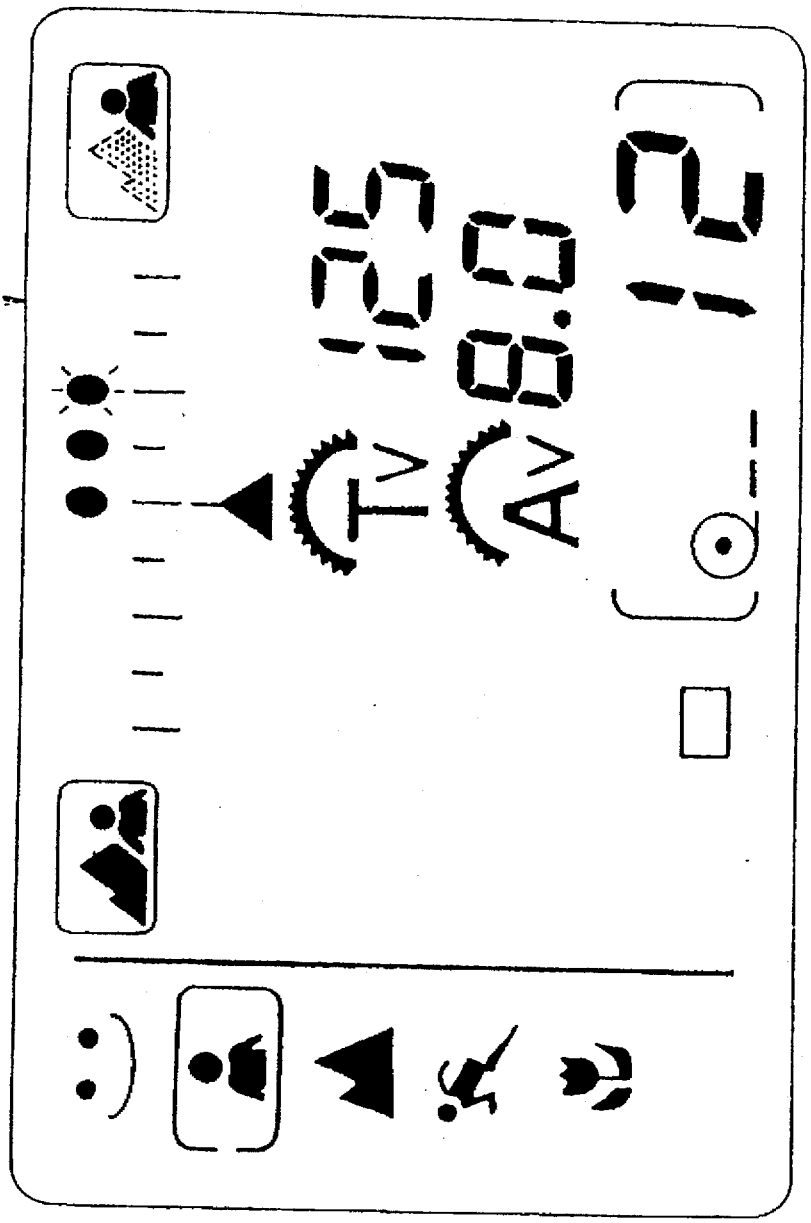
Figure 73A:
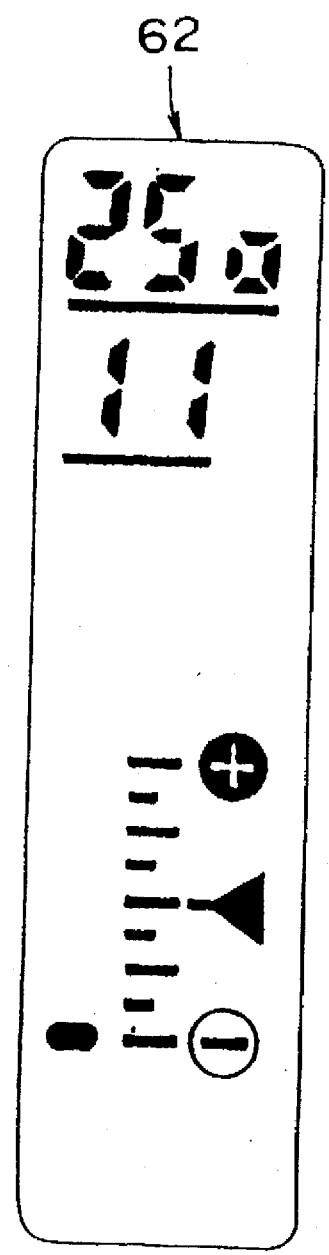
Figure 73B:
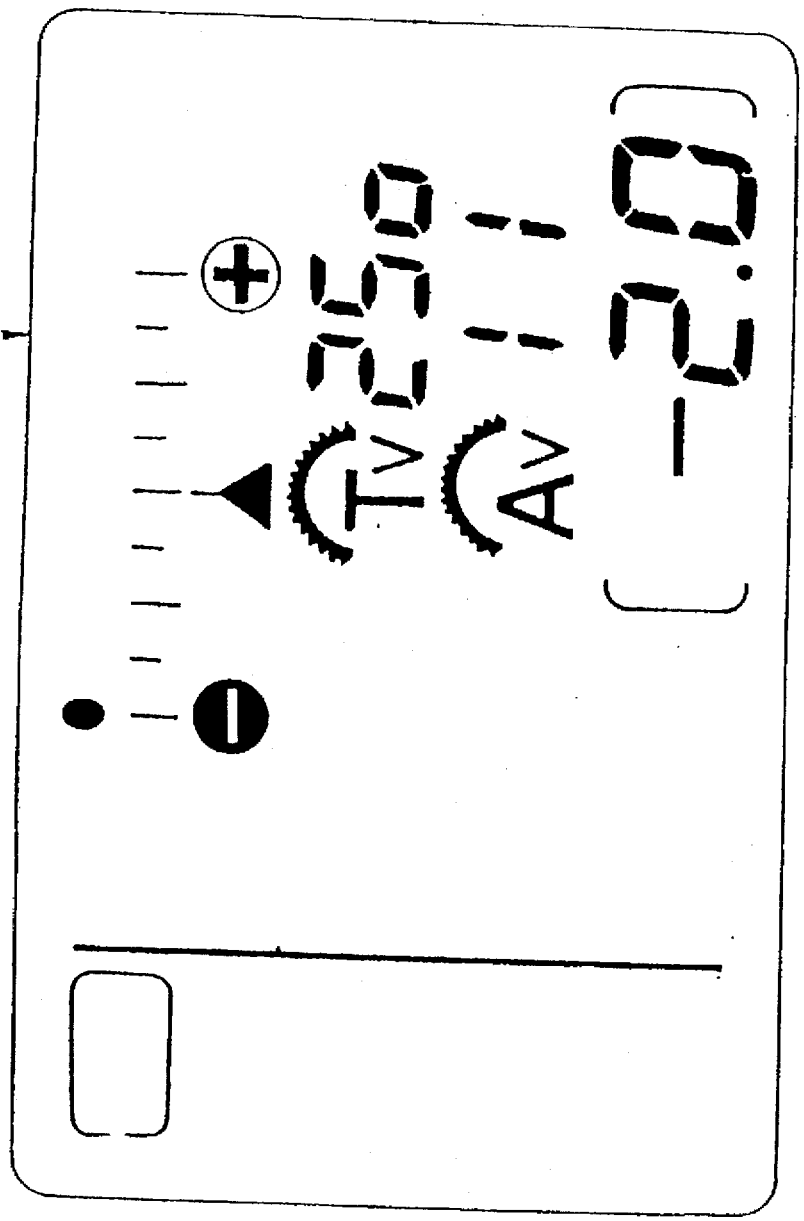
Figure 74A:
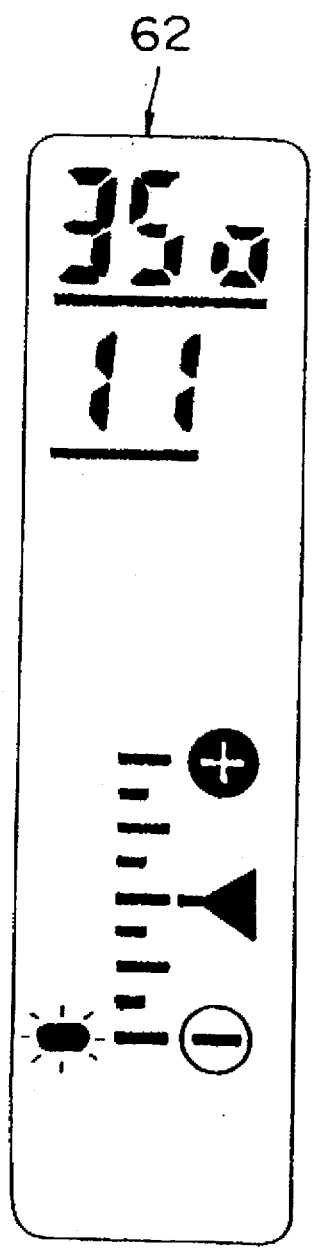
Figure 74B:
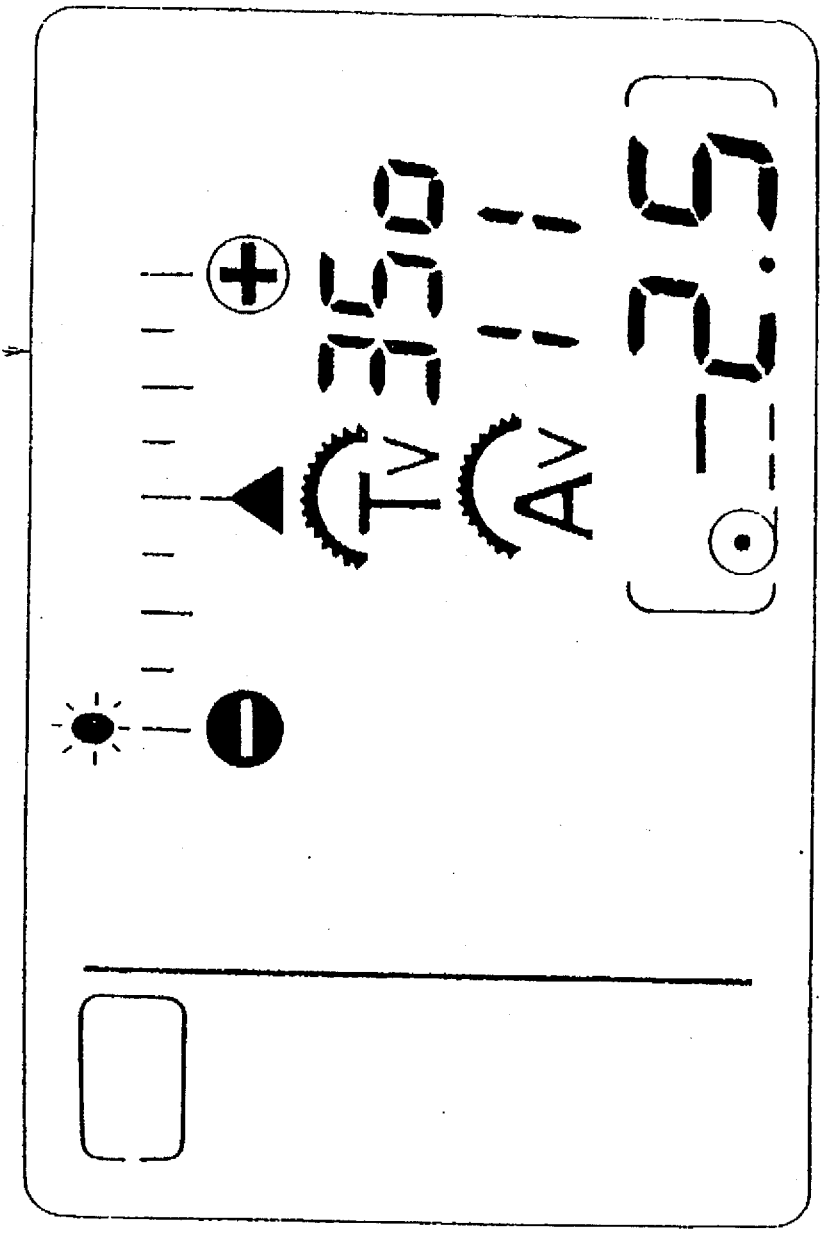
Figure 75A:
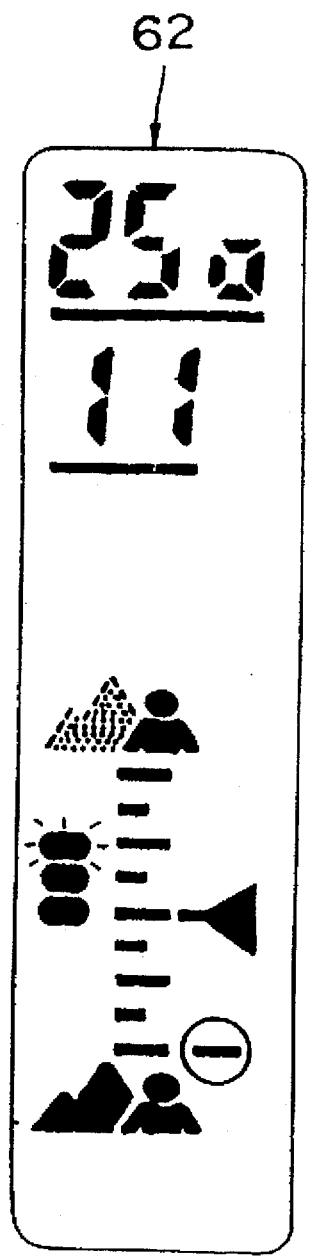
Figure 75B:
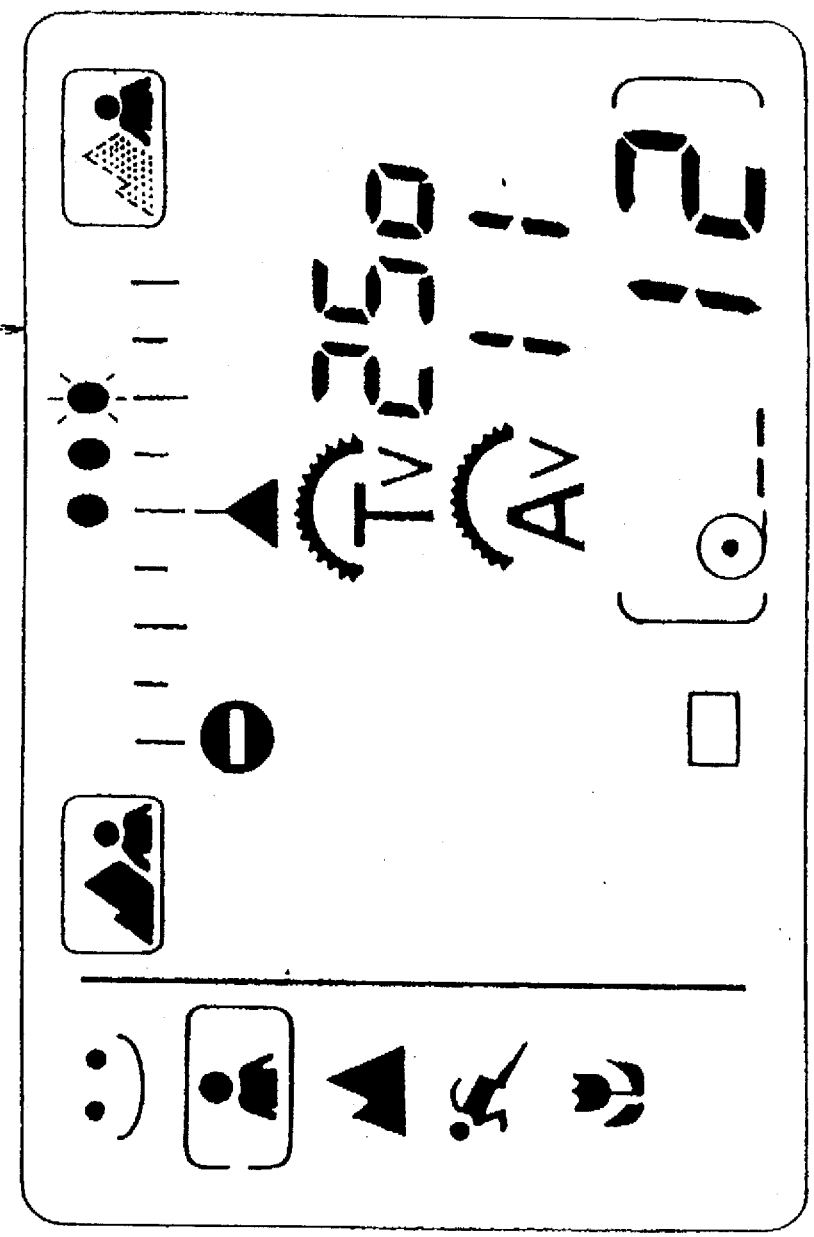
Figure 76A:
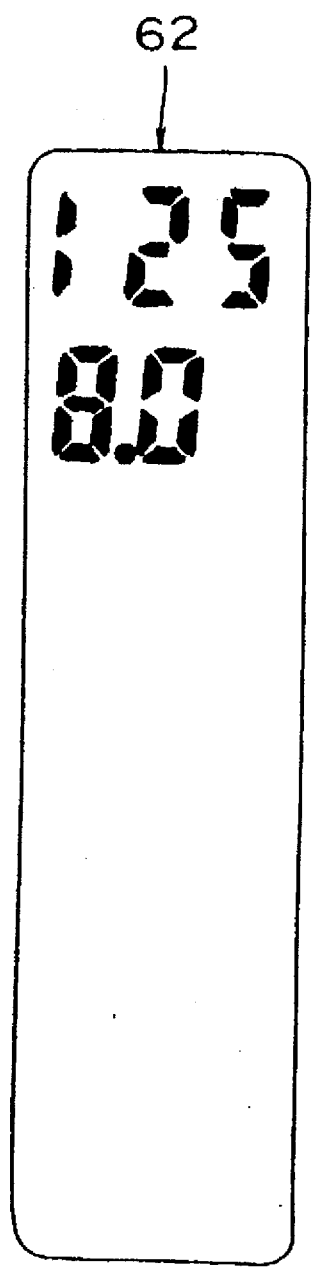
Figure 76B:
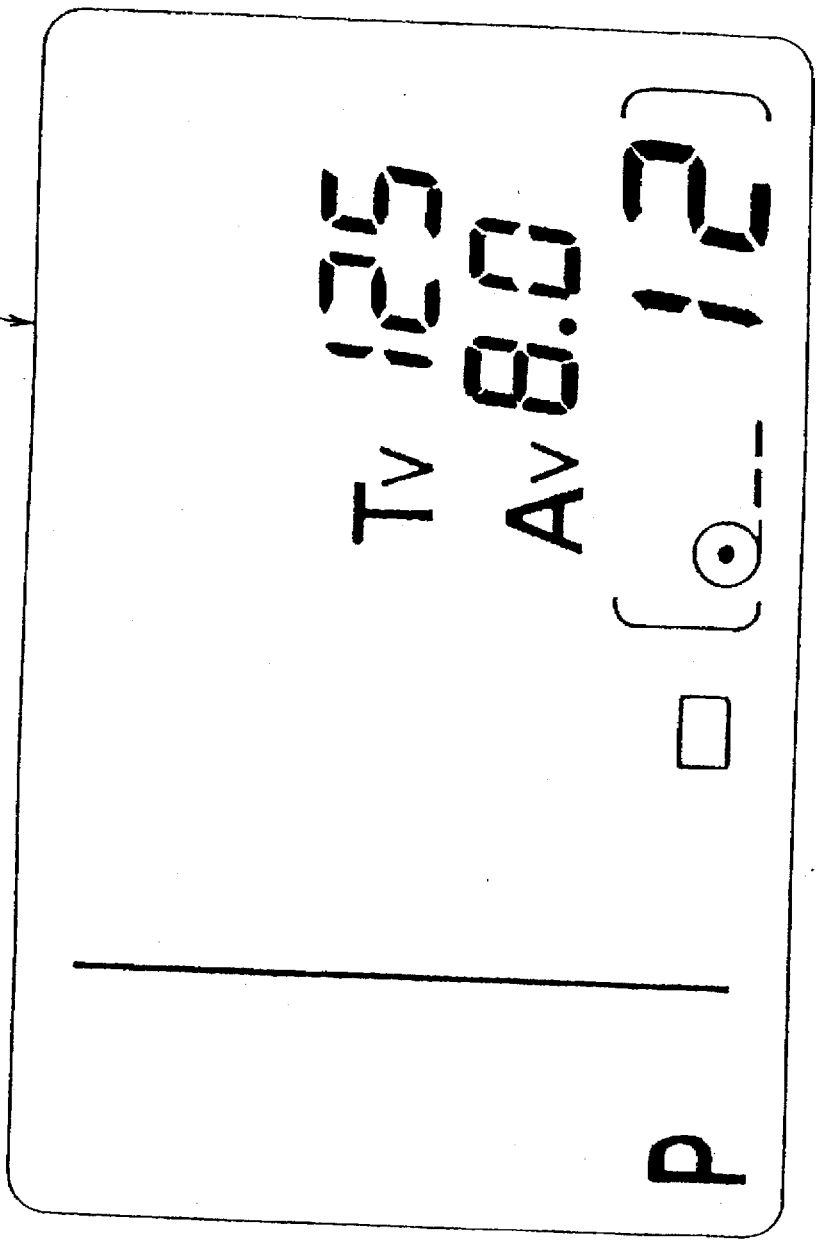
Figure 77A:
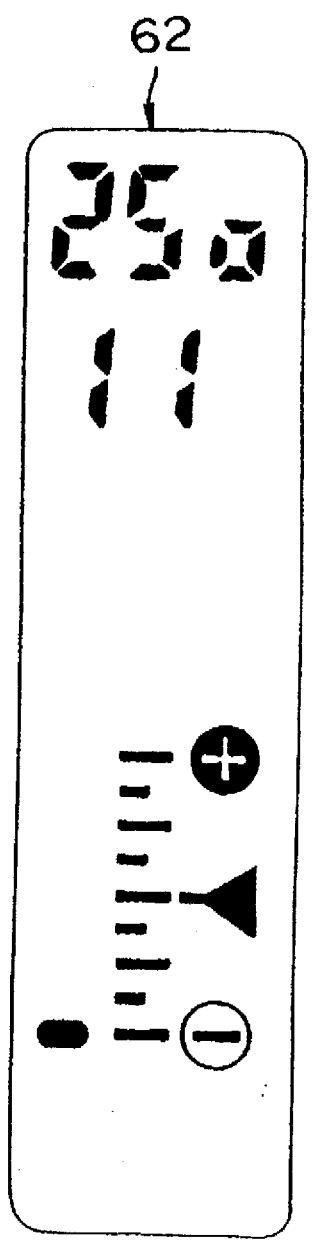
Figure 77B:
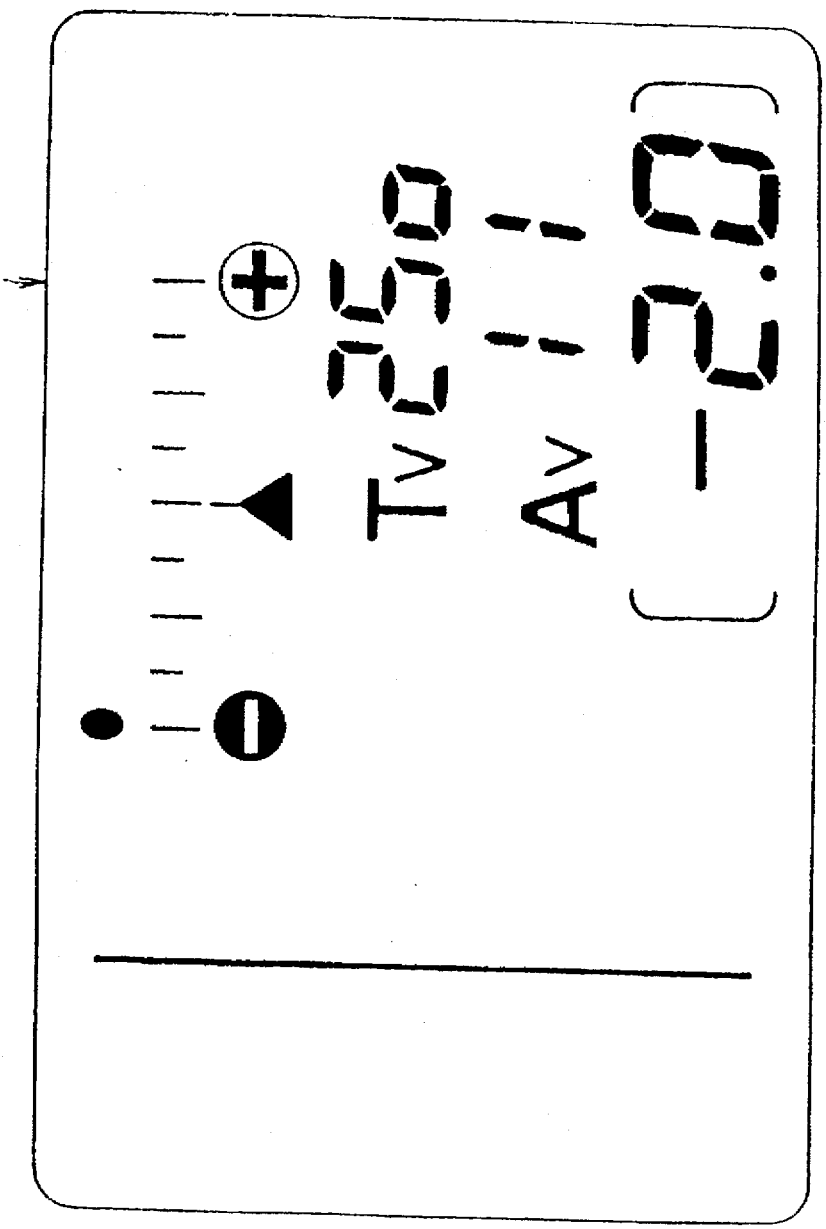
Figure 78A:
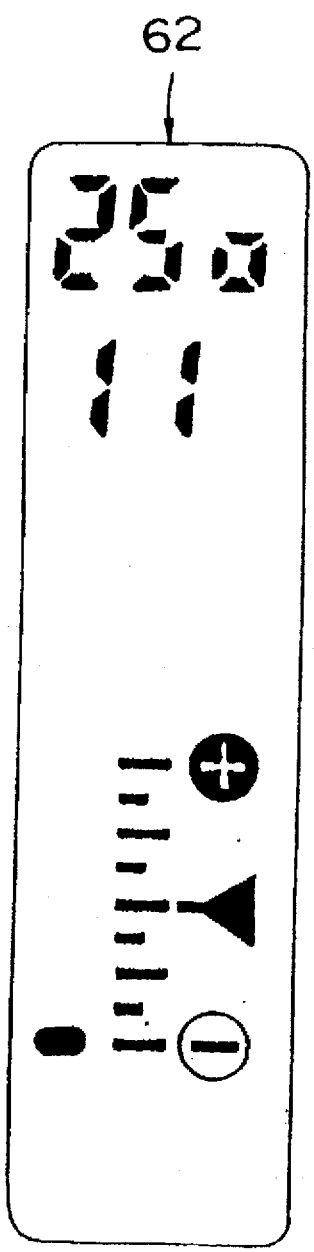
Figure 78B:
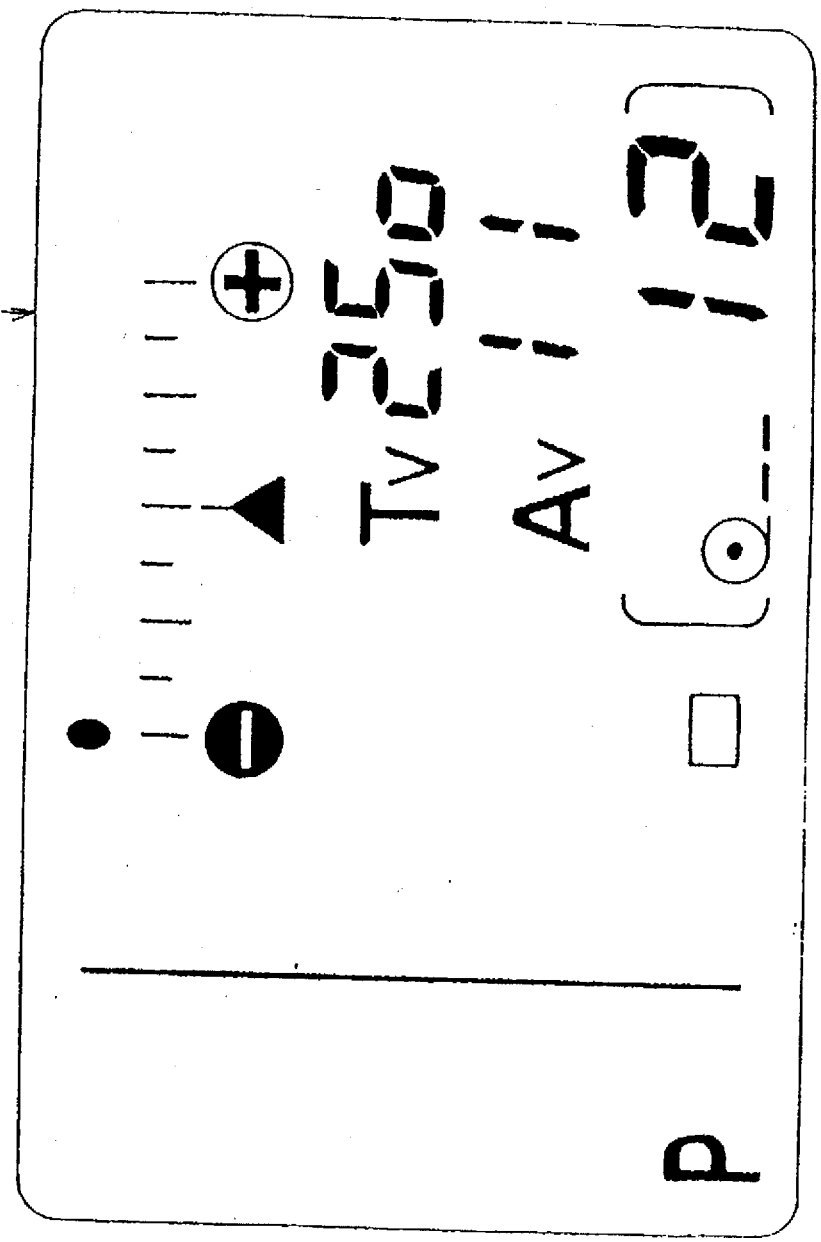
Figure 79A:
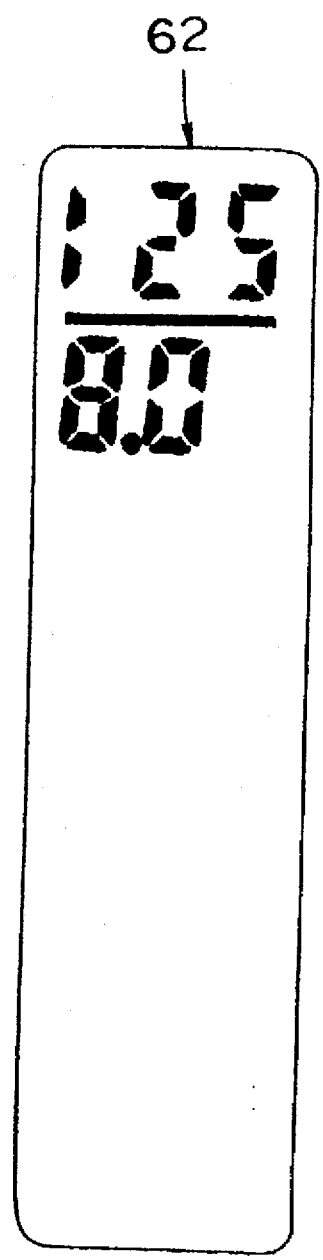
Figure 79B:
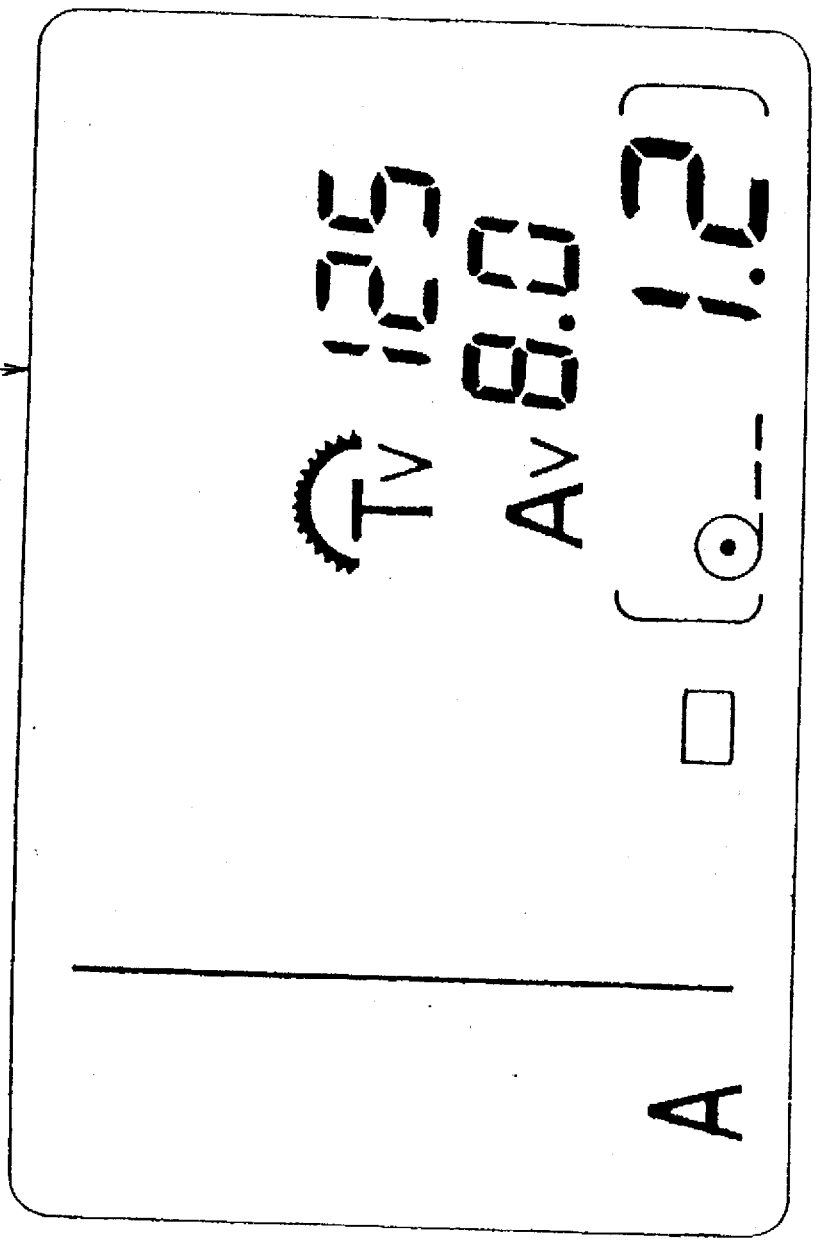
Figure 80A:
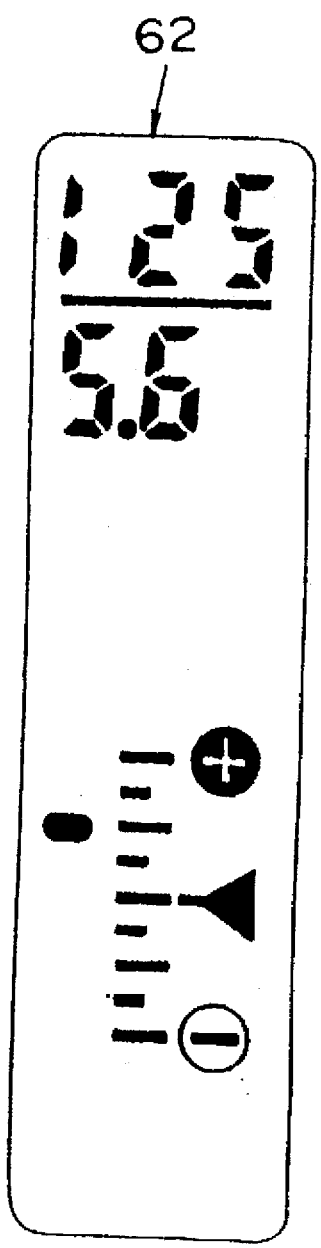
Figure 80B:
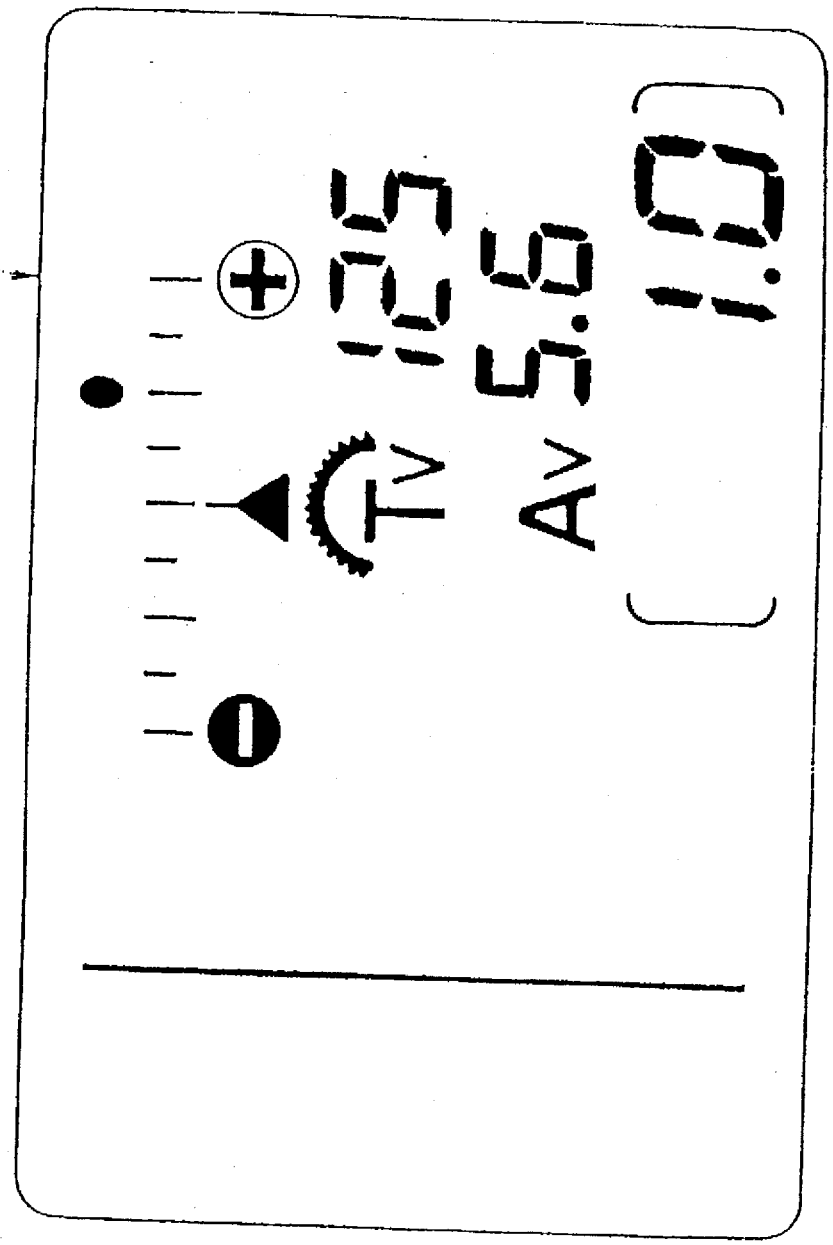
Figure 81A:
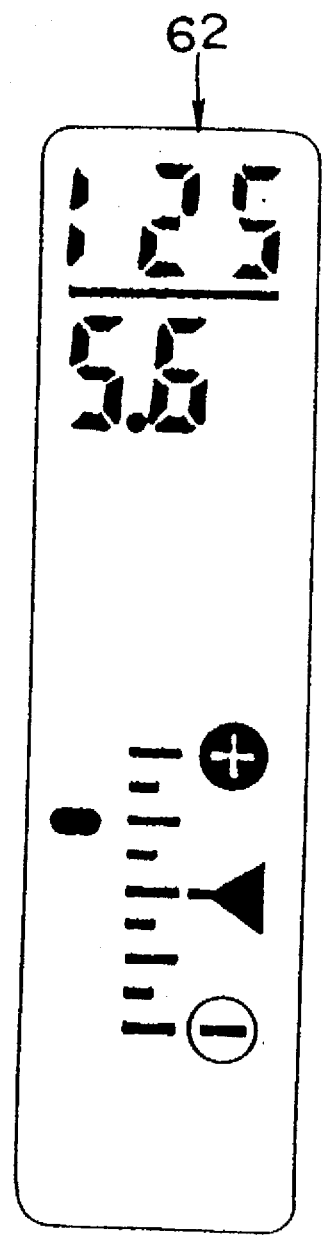
Figure 81B:
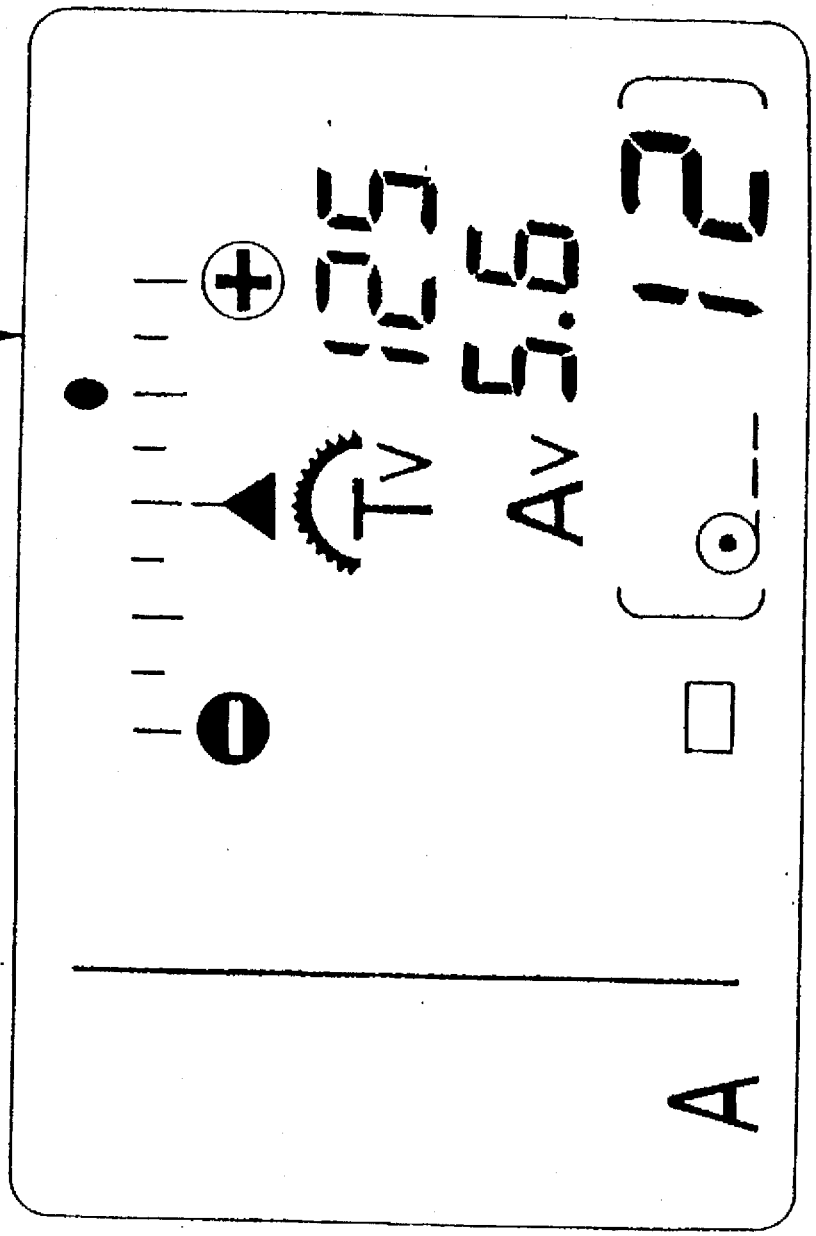
Figure 82A:
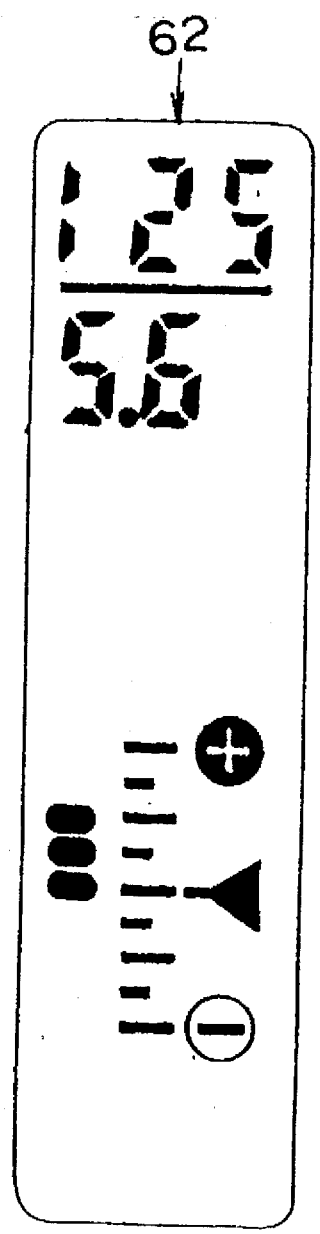
Figure 82B:
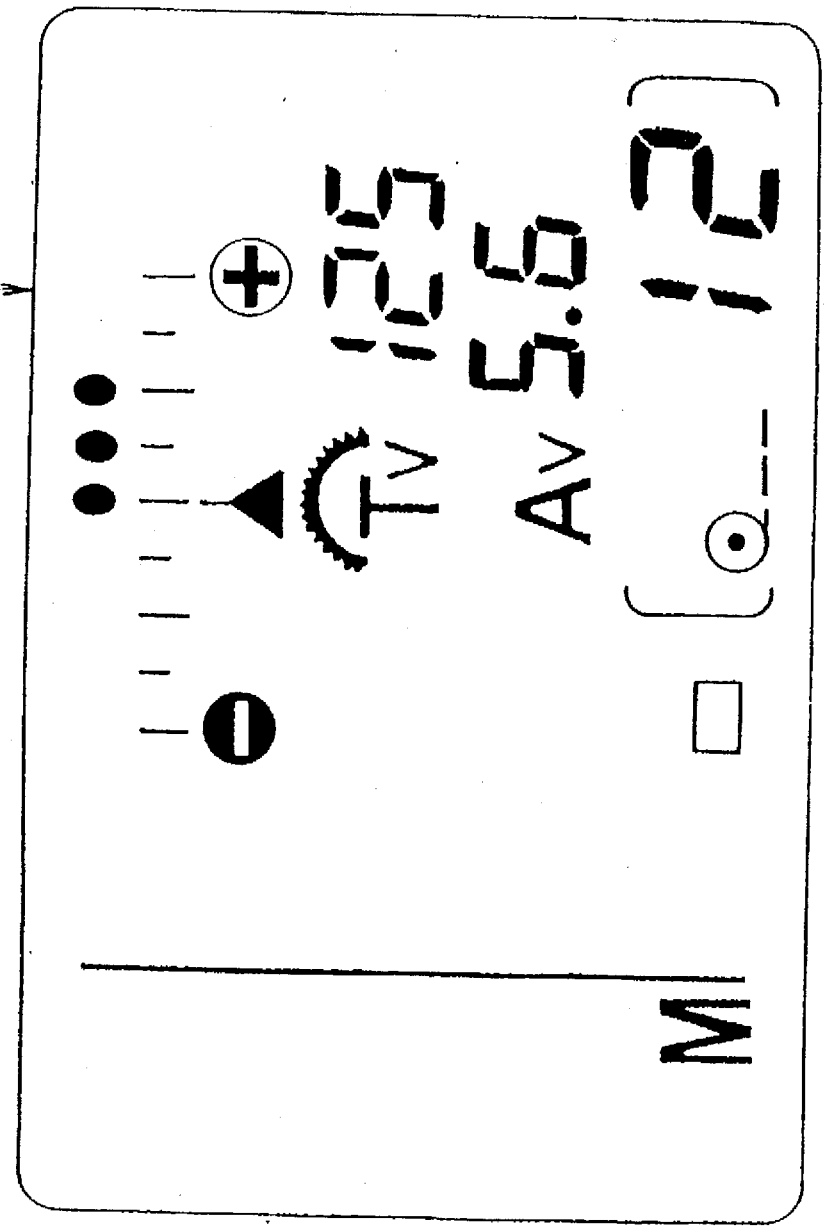
Figure 83A:
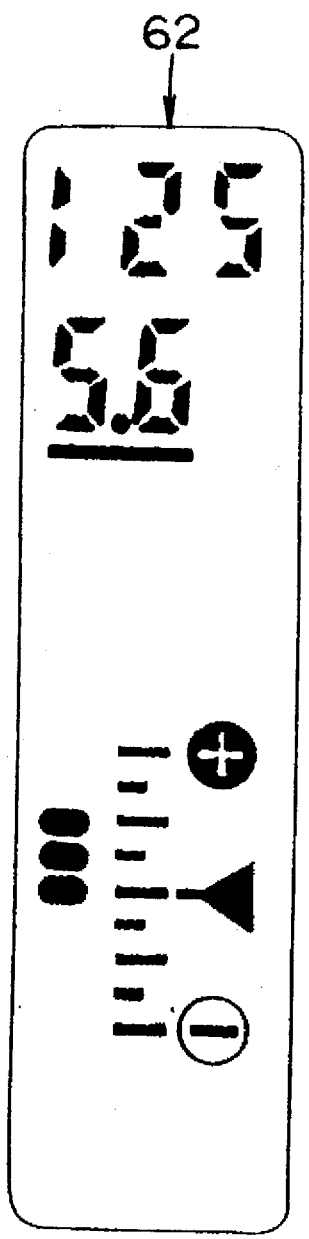
Figure 83B:
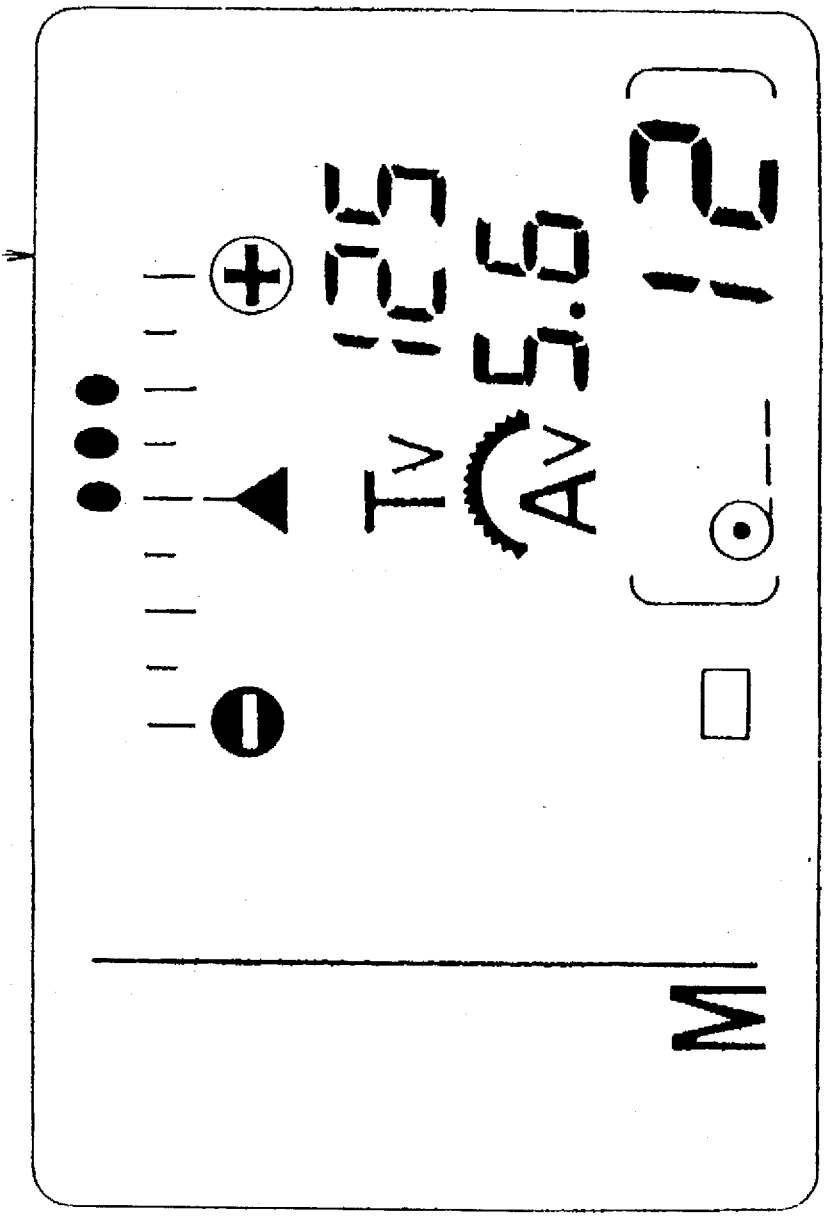
Figure 83C:
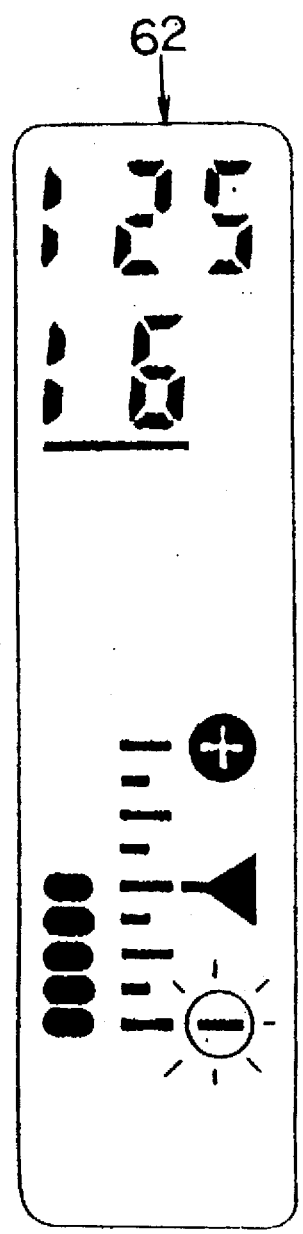
Figure 83D:
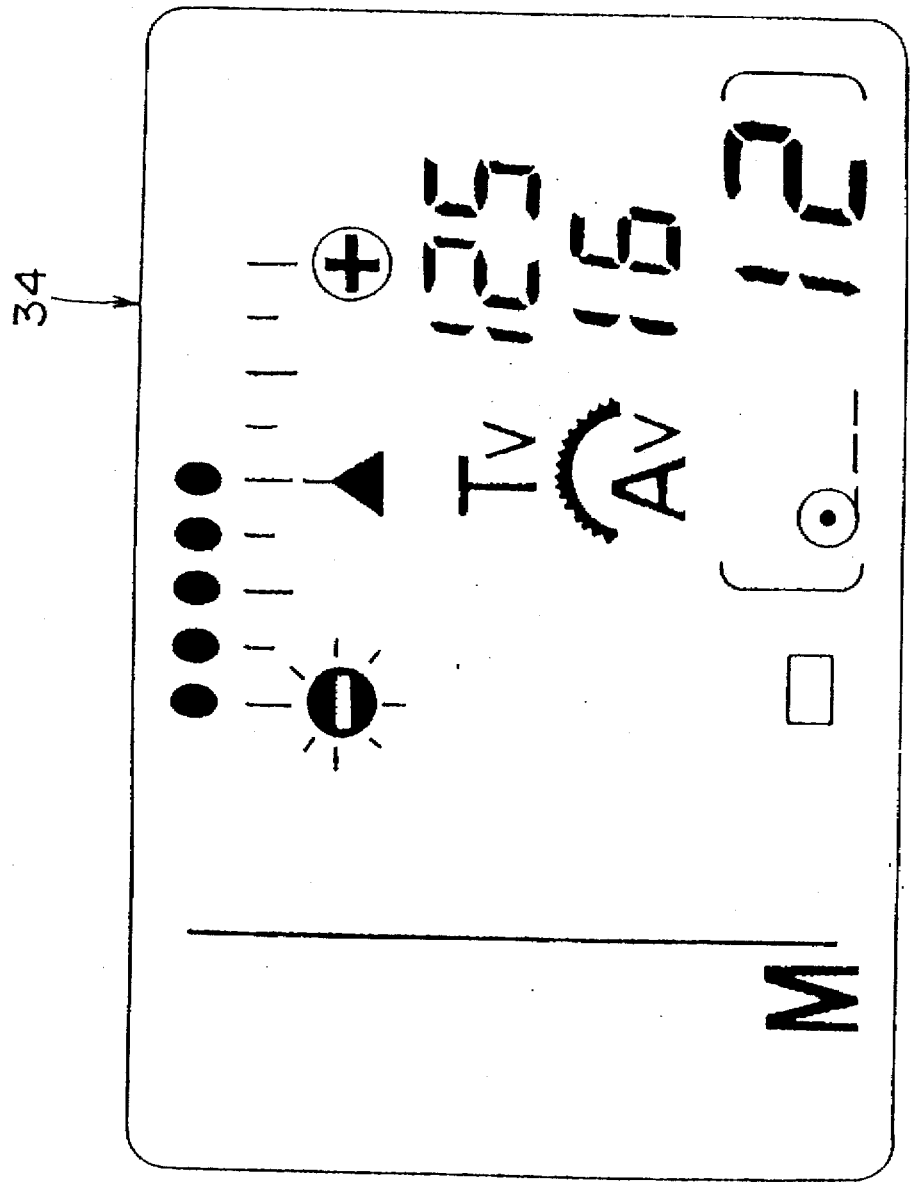
Figure 84A:
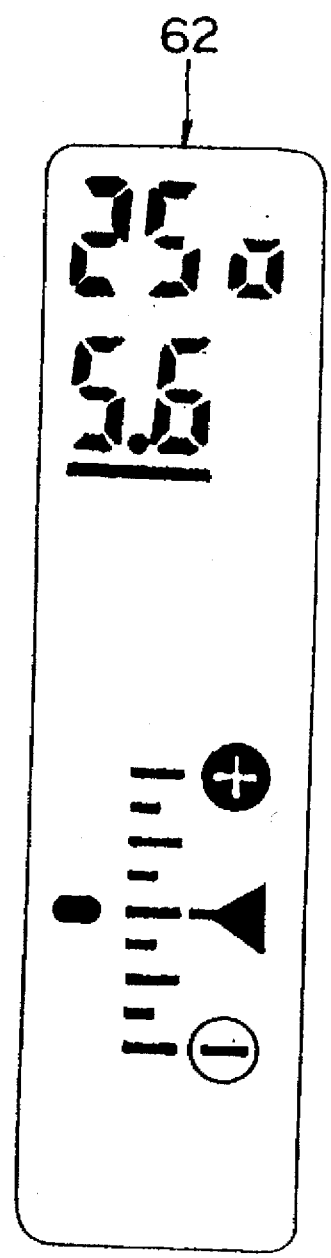
Figure 84B:
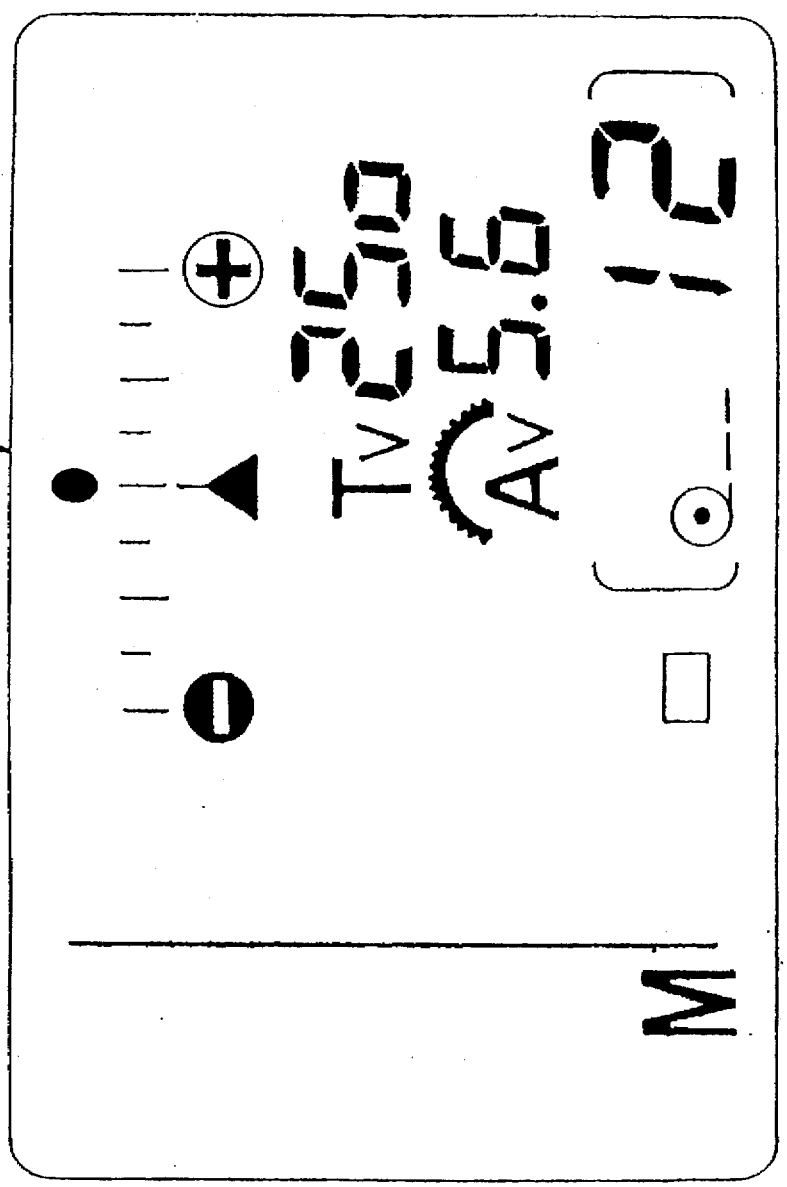
Figure 85:
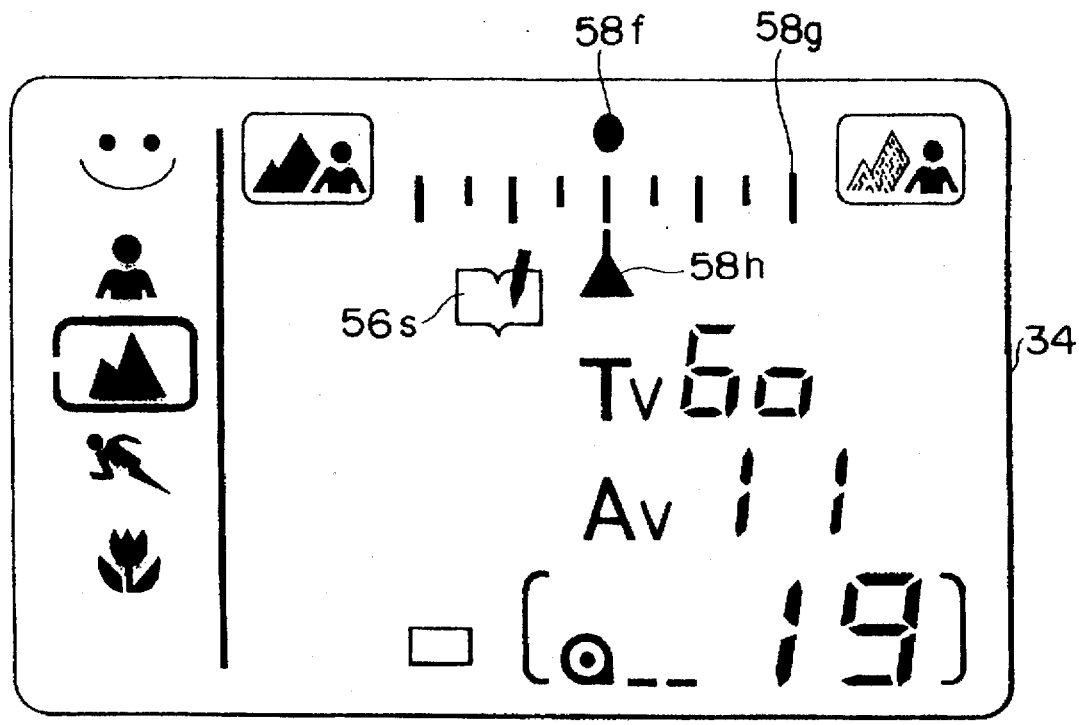
Figure 86:
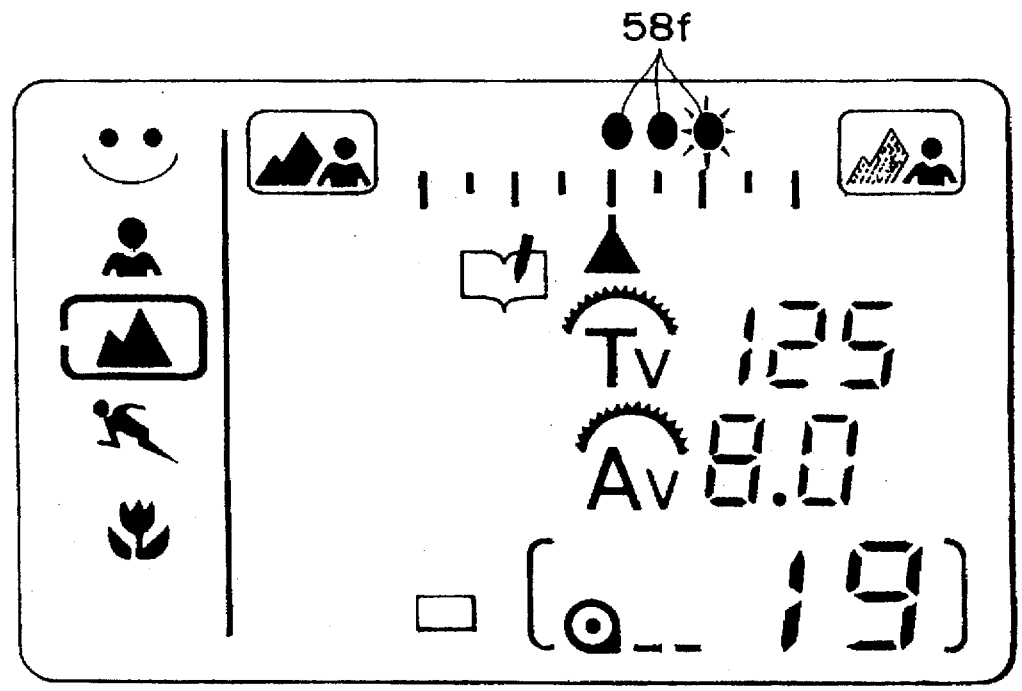
Figure 87:
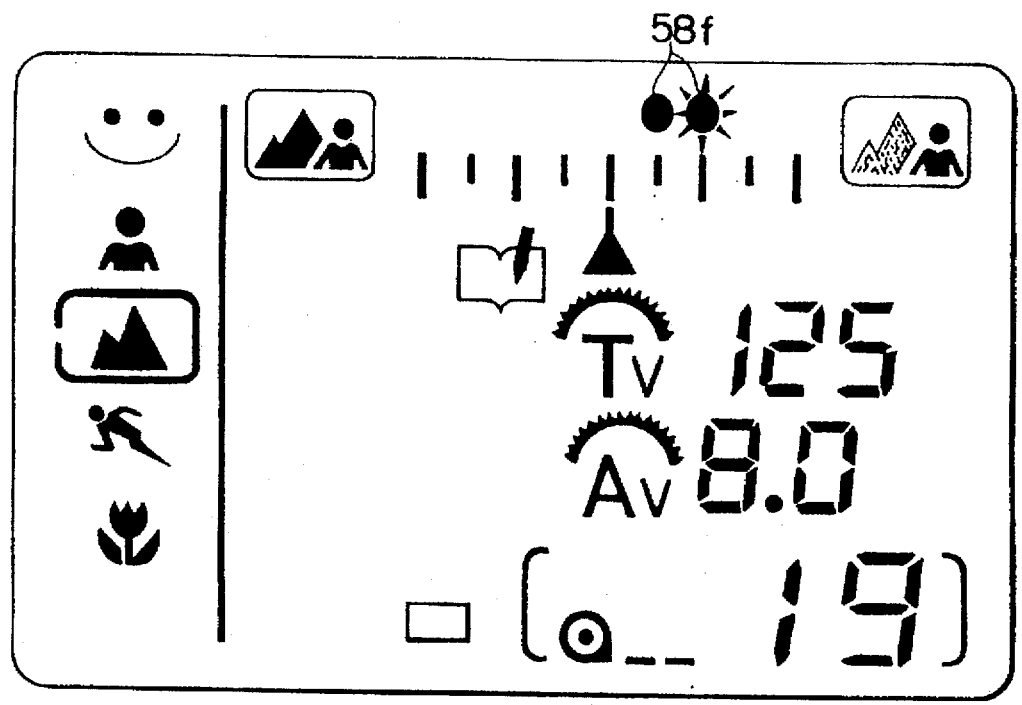
Figure 88:
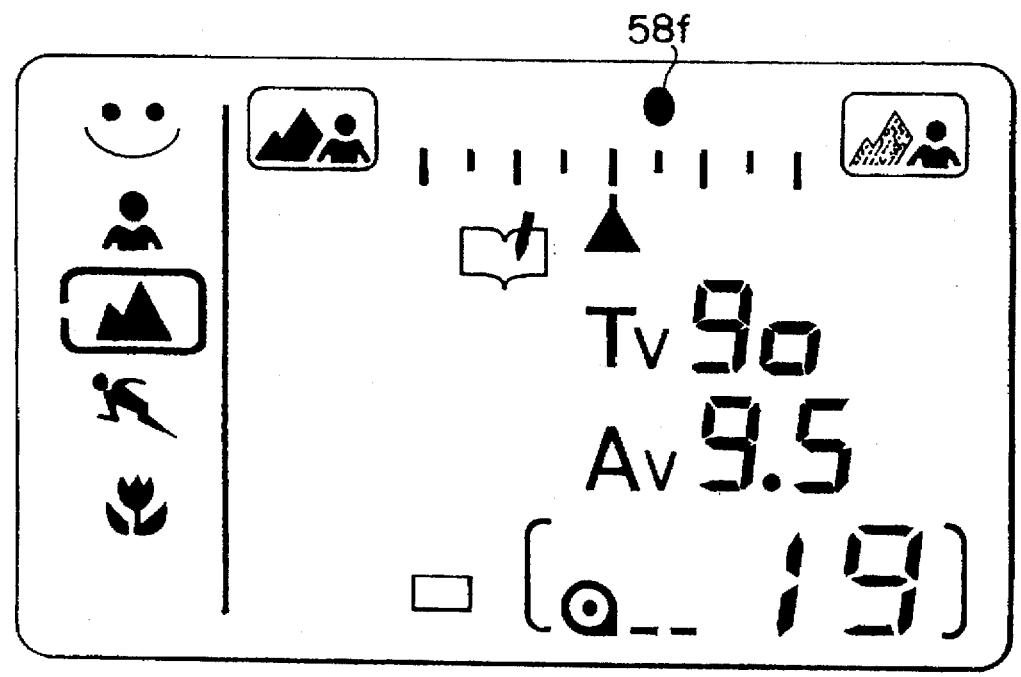
Figure 89:
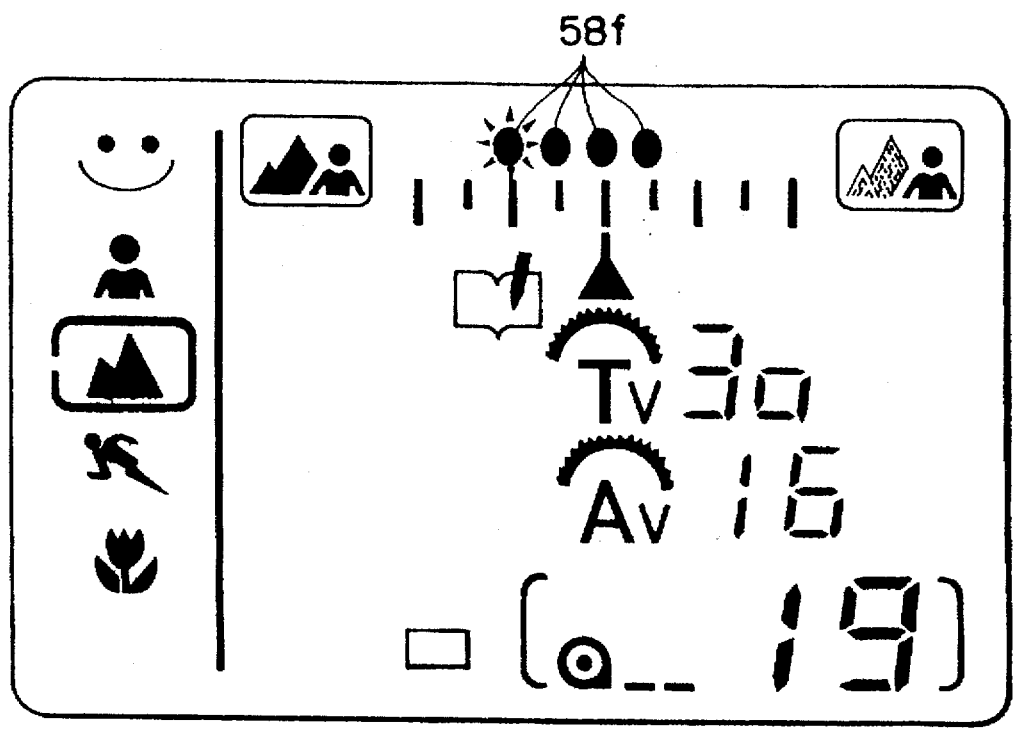
Figure 90:
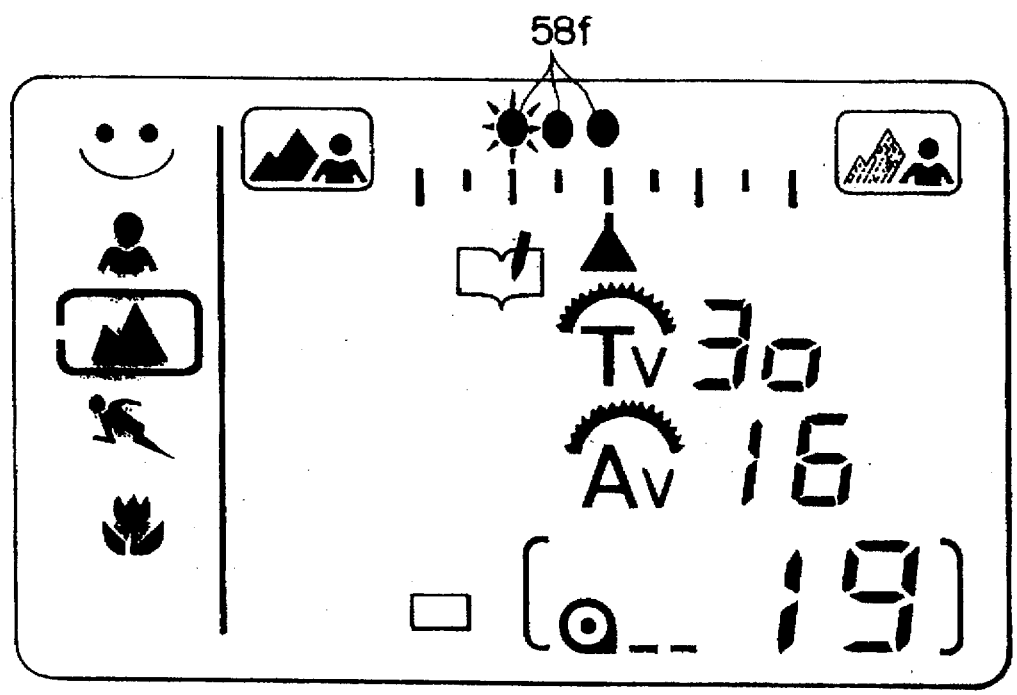

FIG. 16A, 16B-I, 16B-II, 16C illustrate a flowchart of a control sequence when an SW OPERATION DISPLAY PROCESS 1 is called;

FIG. 17 is a flowchart of a control sequence when a PF LOOP PROCESS is called;

FIG. 18 is a flowchart of a control sequence when a PF DISPLAY PROCESS is called;

FIG. 19A, 19B-I, and 19B-II illustrate a flowchart of a control sequence when a PF LOOP 1 PROCESS is called;

FIG. 19C is a flowchart of a control sequence when a PF MODE UP process is called;

FIG. 20 is a flowchart of a control sequence when a PF ALL-CLEAR PROCESS is called;

FIG. 21 is a flowchart of a control sequence when a PF CANCEL PROCESS is called;

FIG. 22 is a flowchart of a control sequence when an U/D LOOP PROCESS is called;

FIG. 23 is a flowchart of a control sequence when an UP LOOP PROCESS is called;

FIG. 24 is a flowchart of a control sequence when a DOWN LOOP PROCESS is called, which includes an U/D TIMER LOOP PROCESS;

FIG. 25-I and 25-II is a flowchart of a control sequence when a DATA U/D PROCESS is called;

FIG. 26-I and 26-II is a flowchart of a control sequence when a PF DATA U/D PROCESS is called;

FIG. 27-I and 27-II is a flowchart of a control sequence when a P SHIFT U/D PROCESS is called;

FIG. 28 is a flowchart of a control sequence when an EXPOSURE CORRECTION U/D PROCESS is called;

FIG. 29 is a flowchart of a control sequence when a P SHIFT GRAPH DISPLAY PROCESS is called;

FIGS. 30-I and 30-II illustrate a flowchart of a control sequence when an EXPOSURE CORRECTION DISPLAY PROCESS is called;

Figure 31:
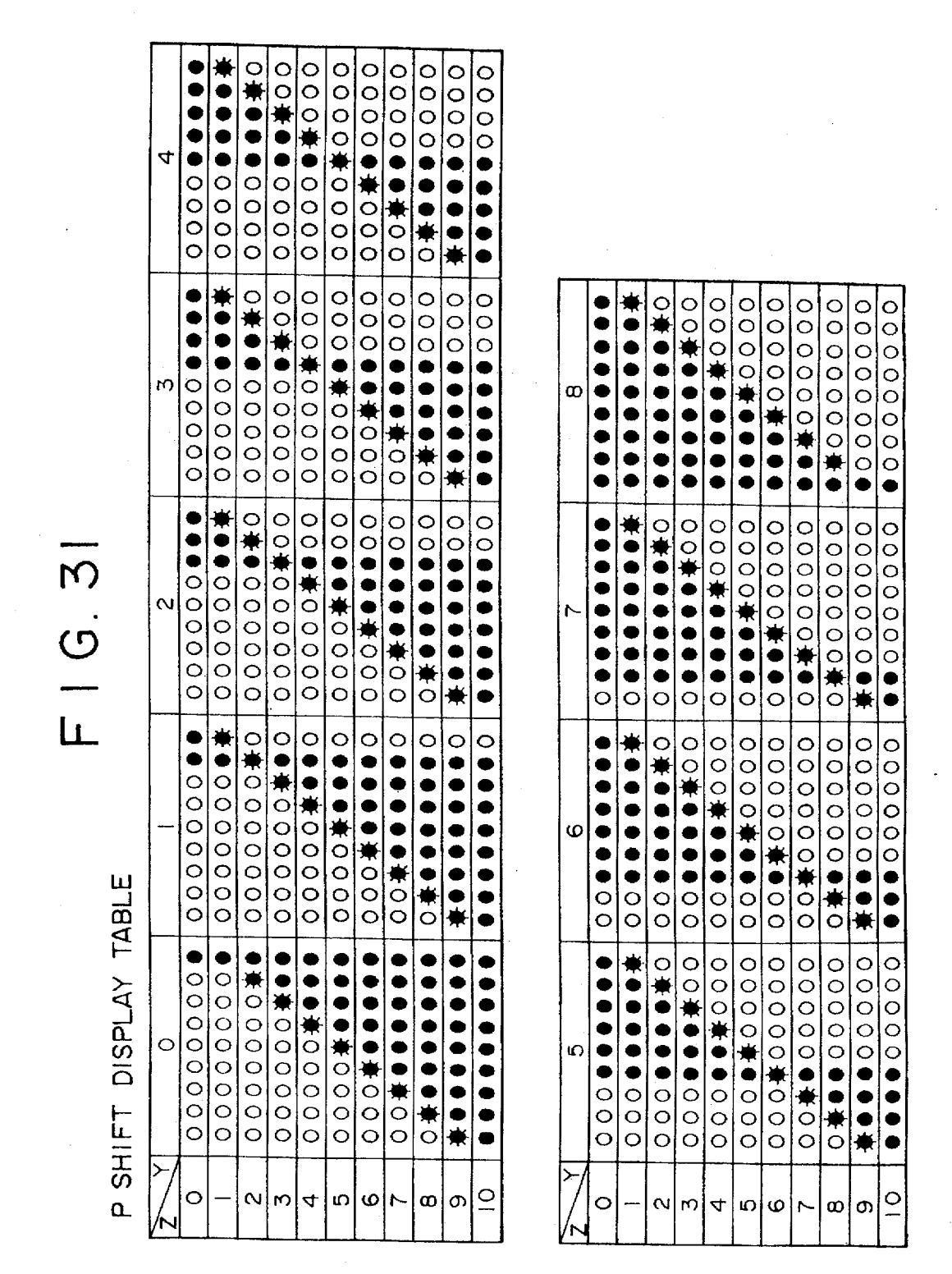

FIG. 31 is a diagram showing a P shift display table;

FIG. 32 is a flowchart of a control sequence when a PF TIMER DISPLAY PROCESS is called;

FIG. 33 is a diagram showing a data format in a PICT mode and a FULL mode;

FIG. 34 is a flowchart of a control sequence when an AE MODE U/D PROCESS is called;

FIG. 35 is a flowchart of a control sequence when an AE MODE SETTING PROCESS is called;

FIG. 36 is a diagram showing the relationship between an AE mode and an exposure mode;

FIG. 37 is a diagram showing the manner in which a displayed graph changes in the counting operation of a PF timer;

FIG. 38 is a flowchart of a control sequence when a P SHIFT CLEAR PROCESS is called;

FIG. 39 is a flowchart of a control sequence when an EXPOSURE CORRECTION CLEAR PROCESS is called;

FIG. 40 is a diagram showing an exposure correction graph display table;

FIGS. 41A, 41B, 41C, and 41D illustrate a flowchart of a control sequence when an AE CALCULATIONS PROCESS is called;

FIGS. 42A and 42B illustrate a flowchart of a control sequence when a PROGRAM CALCULATION SUBROUTINE is called;

FIG. 43 is a flowchart of a control sequence when a CAL_Tv SUBROUTINE is called;

FIG. 44 is a flowchart of a control sequence when a CAL_Av SUBROUTINE is called;

FIG. 45 is a flowchart of a control sequence when a SUB-P SHIFT SUBROUTINE is called;

FIGS. 46-I and 46-II illustrate a flowchart of a control sequence when a P SHIFT CALCULATION SUBROUTINE is called;

FIG. 47 is a flowchart of a control sequence when a CHK_TvAv SUBROUTINE is called;

FIG. 48A is a program diagram showing the general relationship between shutter speed and aperture when a portrait mode is selected;

FIG. 48B is a program diagram showing the specific detail of the relationship between shutter speed and aperture at focal lengths of 28 mm and 80 mm when the portrait mode is selected;

FIG. 49A is a program diagram showing the general relationship between shutter speed and aperture when a landscape mode is selected;

FIG. 49B is a program diagram showing the specific detail of the relationship between shutter speed and aperture at focal lengths of 28 mm and 80 mm when the landscape mode is selected;

FIG. 50A is a program diagram showing the general relationship between shutter speed and aperture when a moving subject mode is selected;

FIG. 50B is a program diagram showing the specific detail of the relationship between shutter speed and aperture at focal lengths of 28 mm and 80 mm when the moving subject mode is selected;

FIG. 51A is a program diagram showing the general relationship between shutter speed and aperture when a close up mode is selected;

FIG. 51B is a program diagram showing the specific detail of the relationship between shutter speed and aperture at focal lengths of 28 mm and 80 mm when the close up mode is selected:

FIG. 52A is a flowchart of a control sequence when a NORMAL PROGRAM PROCESS is called;

FIG. 52B is a program diagram showing the specific detail of the relationship between shutter speed and aperture at focal lengths of 28 mm and 80 mm when the normal program is selected;

FIG. 53 is a flowchart of a control sequence when an AUTOMATIC CALCULATION SUBROUTINE is called;

FIG. 54 is a flowchart of a control sequence when a MANUAL CALCULATION SUBROUTINE is called;

FIG. 55A and 55B are a flowchart of a control sequence when a LEARNING MODE CALCULATION PROCESS is called;

FIG. 55C is a program diagram illustrating a program shift;

FIG. 56 is a flowchart of a control sequence when a LEARNING MODE STORE PROCESS 1 is called;

FIG. 57A and 57B are a flowchart of a control sequence when a LEARNING-MODE U/D PROCESS is called;

FIG. 58 is a diagram showing a data format of an EEPROM-RAM;

FIG. 59 is a diagram showing formats of RAM areas;

FIG. 60A is a view showing a main button shifted to a PICT position;

FIG. 60B is a view of the viewfinder display LCD panel showing data displayed when the main button is in the PICT position;

FIG. 60C is a view of the external display LCD panel showing data displayed when the main button is in the PICT position;

FIG. 61A is a view showing the main button shifted to an ON position;

FIG. 61B is a view of the viewfinder display LCD panel showing data displayed when the main button is in the ON position;

FIG. 61C is a view of the external display LCD panel showing data displayed when the main button is in the ON position;

FIG. 62 is a view of the external display LCD panel showing data displayed when the portrait mode is set while the learning mode calculation process is selected;

FIG. 63A, 63B, 63C, 63D, 63E, 63F, and 63G are views showing displayed data on the external display LCD panel as they vary when a special function (PF) setting mode is set;

FIG. 64A and 64B are views showing displayed data on the external display LCD panel as they vary when the special function (PF) setting mode is cleared;

FIG. 65A and 65B are views showing displayed data on the external display LCD panel as they vary when an ISO film sensitivity is altered in the special function (PF) setting mode;

FIG. 66A and 66B are views showing displayed data on the external display LCD panel as they vary when the number of times that a learning mode is to take place is set in the special function (PF) setting mode;

FIG. 67A and 67B are views showing displayed data on the external display LCD panel as they vary when setting whether a sound is to be produced when the lens system is focused in the special function (PF) setting mode;

FIG. 68A, 68B, 68C, 68D, 68E, and 68F are views showing the display of the letters "Sound" on the external display LCD panel, as they vary when setting whether a sound is to be produced when the lens system is focused in the special function (PF) setting mode;

FIG. 69A and 69B are views showing displayed data on the external display LCD panel as they vary when a setting is made about whether a learning mode is to take place in the special function (PF) setting mode;

FIG. 70A and 70B are views showing displayed data on the external display LCD panel as they vary when a setting is made about whether the learning mode is to be cleared in the special function (PF) setting mode;

FIG. 71A, 71B, 71C, 71D, and 71E are views of the external display LCD panel showing data displayed when a green mode, portrait mode, landscape mode, moving subject mode and close up mode, respectively, are set in a picture mode;

FIG. 71F is a view of the viewfinder display LCD panel showing data displayed when the portrait, landscape, or close up mode is set in the picture mode;

FIG. 71G is a view of the viewfinder display LCD panel showing data displayed when the moving subject mode is set in the picture mode;

FIG. 72A and 72B are views of the viewfinder display LCD panel and the external display LCD panel, respectively, showing an example of normal data displayed when the portrait mode is selected in the picture mode;

FIG. 73A and 73B are views of the viewfinder display LCD panel and the external display LCD panel, respectively, showing data displayed when an exposure correction is made to the data displayed in FIGS. 72A and 72B;

FIG. 74A and 74B are views of the viewfinder display LCD panel and the external display LCD panel, respectively, showing data displayed when an exposure correction is made beyond a bar graph range with the data displayed in FIGS. 72A and 72B;

FIG. 75A and 75B are views of the viewfinder display LCD panel and the external display LCD panel, respectively, showing data displayed when a normal photographing condition is resumed after an exposure correction is made to the data displayed in FIGS. 72A and 72B;

FIG. 76A and 76B are views of the viewfinder display LCD panel and the external display LCD panel, respectively, showing data normally displayed when a program mode is selected;

FIG. 77A and 77B are views of the viewfinder display LCD panel and the external display LCD panel, respectively, showing data displayed when an exposure correction is being made to the data displayed in FIGS. 76A and 76B;

FIG. 78A and 78B are views of the viewfinder display LCD panel and the external display LCD panel, respectively, showing data displayed when the normal photographing condition is resumed after the exposure correction is made to the data displayed in FIGS. 76A and 76B;

FIG. 79A and 79B are views of the viewfinder display LCD panel and the external display LCD panel, respectively, showing data normally displayed when an automatic mode is selected;

FIG. 80A and 80B are views of the viewfinder display LCD panel and the external display LCD panel, respectively, showing data displayed when an exposure correction is being made to the data displayed in FIGS. 79A and 79B;

FIG. 81A and 81B are views of the viewfinder display LCD panel and the external display LCD panel, respectively, showing data displayed when the normal photographing condition is resumed after an exposure correction has been made in the data displayed in FIGS. 79A and 79B;

FIG. 82A and 82B are views of the viewfinder display LCD panel and the external display LCD panel, respectively, showing data normally displayed when a variable shutter speed condition is set while a manual mode is being selected;

FIG. 83A and 83B are views of the viewfinder display LCD panel and the external display LCD panel, respectively, showing data normally displayed when a variable aperture condition is set while the manual mode is being selected;

FIG. 83C and 83D are views of the viewfinder display LCD panel and the external display LCD panel, respectively, showing data normally displayed when the difference between a calculated appropriate exposure value and a manually set exposure value exceeds a range that can be displayed at the time a variable aperture condition is set while the manual mode is being selected;

FIG. 84A and 84B are views of the viewfinder display LCD panel and the external display LCD panel, respectively, showing data normally displayed when a calculated appropriate exposure value and a manually set exposure value agree with each other at the time a variable aperture condition is set while the manual mode is being selected;

FIG. 85 is a view of the external display LCD panel showing data displayed before learned data are stored or when a learned program line agrees with a default program line and a program shift is 0;

FIG. 86 is a view of the external display LCD panel showing data displayed before learned data are stored or when a learned program line agrees with a default program line and a program shift is +1.0 Tv;

FIG. 87 is a view of the external display LCD panel showing data displayed when a learned program line is shifted +0.5 Tv from a default program line and a program shift is +0.5 Tv;

FIG. 88 is a view of the external display LCD panel showing data displayed when a learned program line is shifted +0.5 Tv from a default program line and a program shift is 0;

FIG. 89 is a view of the external display LCD panel showing data displayed when a learned program line is shifted +0.5 Tv from a default program line and a program shift is −0.5 Tv; and FIG. 90 is a view of the external display LCD panel showing data displayed before learned data are stored or when a learned program line agrees with a default program line and a program shift is −1.5 Tv.

DESCRIPTION OF THE EMBODIMENTS

Figure 1:
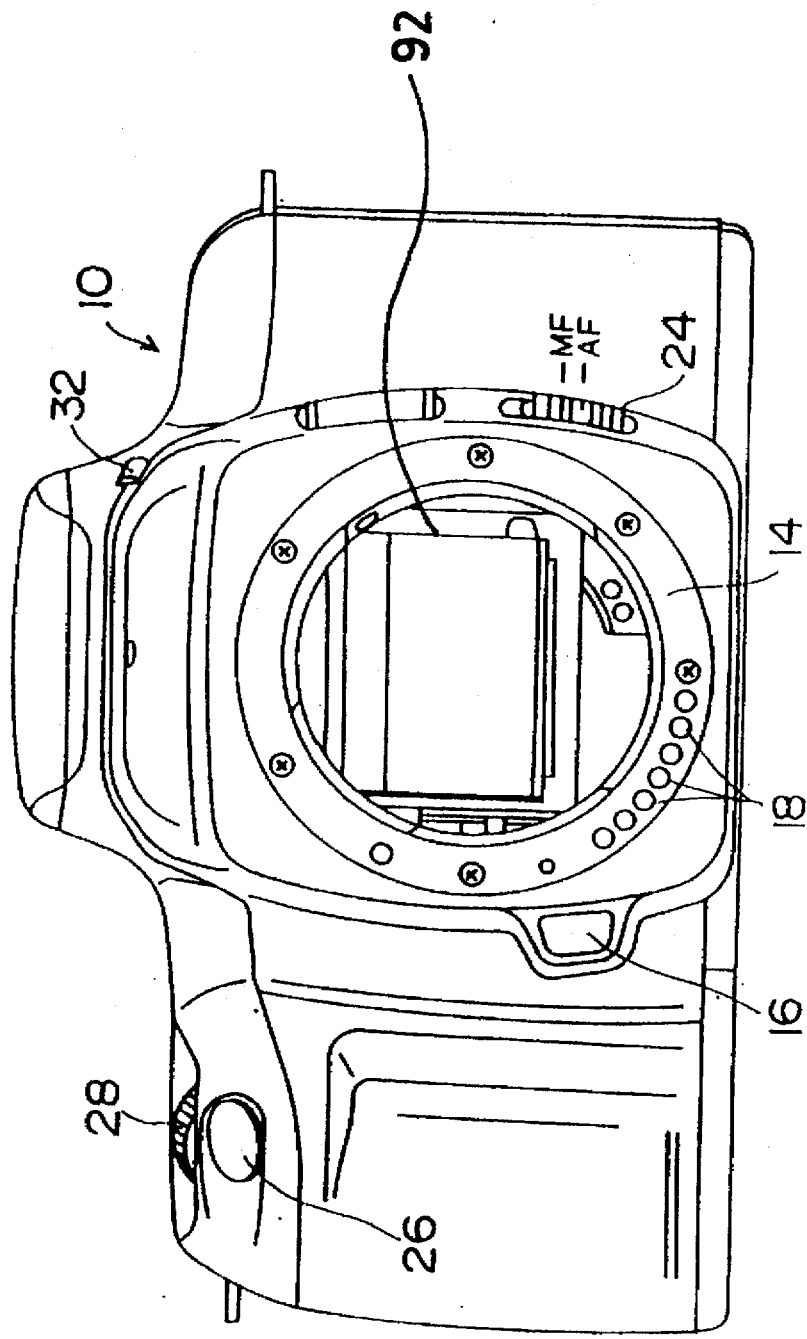
FIG. 1 is a front elevational view of a camera body of a single lens reflex camera embodying the present invention.
Figure 2:
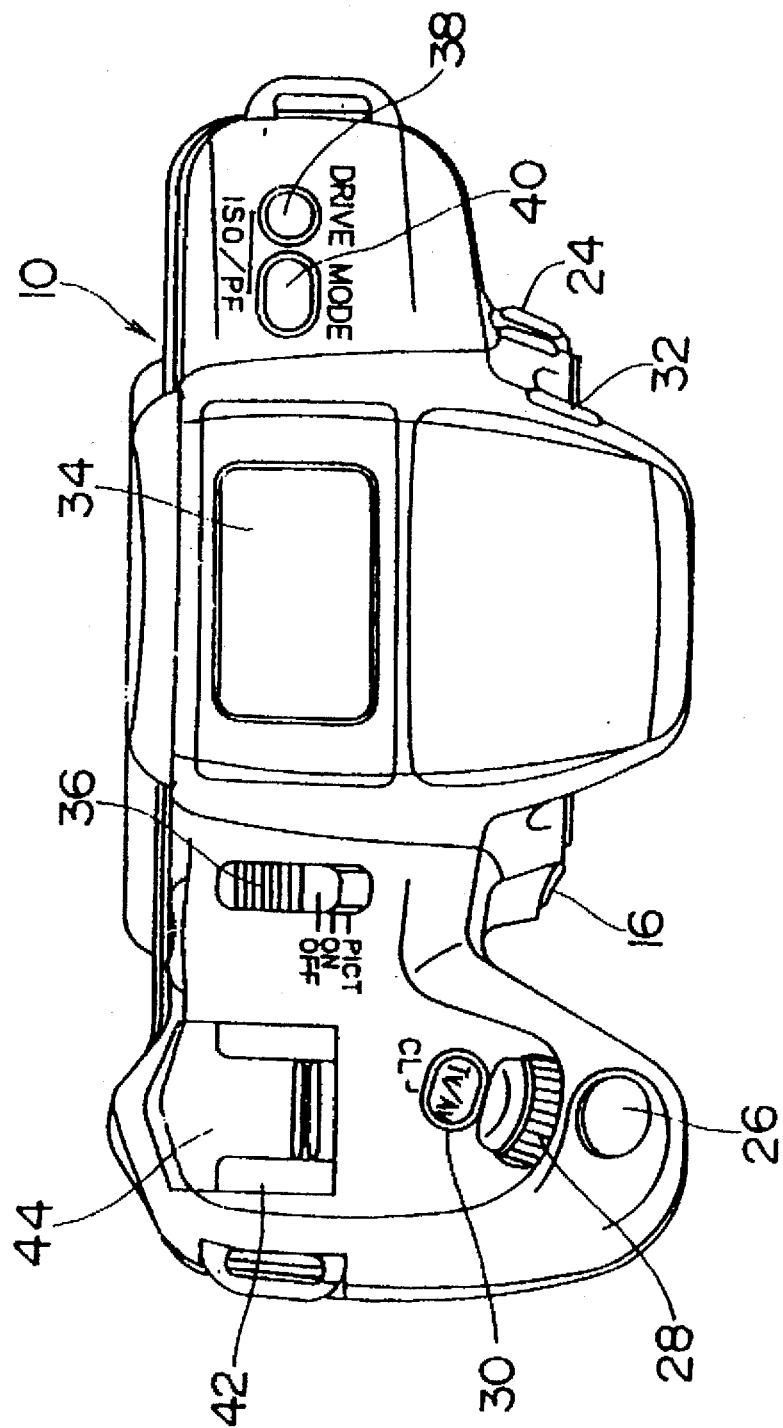
FIG. 2 is an upper plan view of the camera body shown in FIG. 1.
Figure 3:
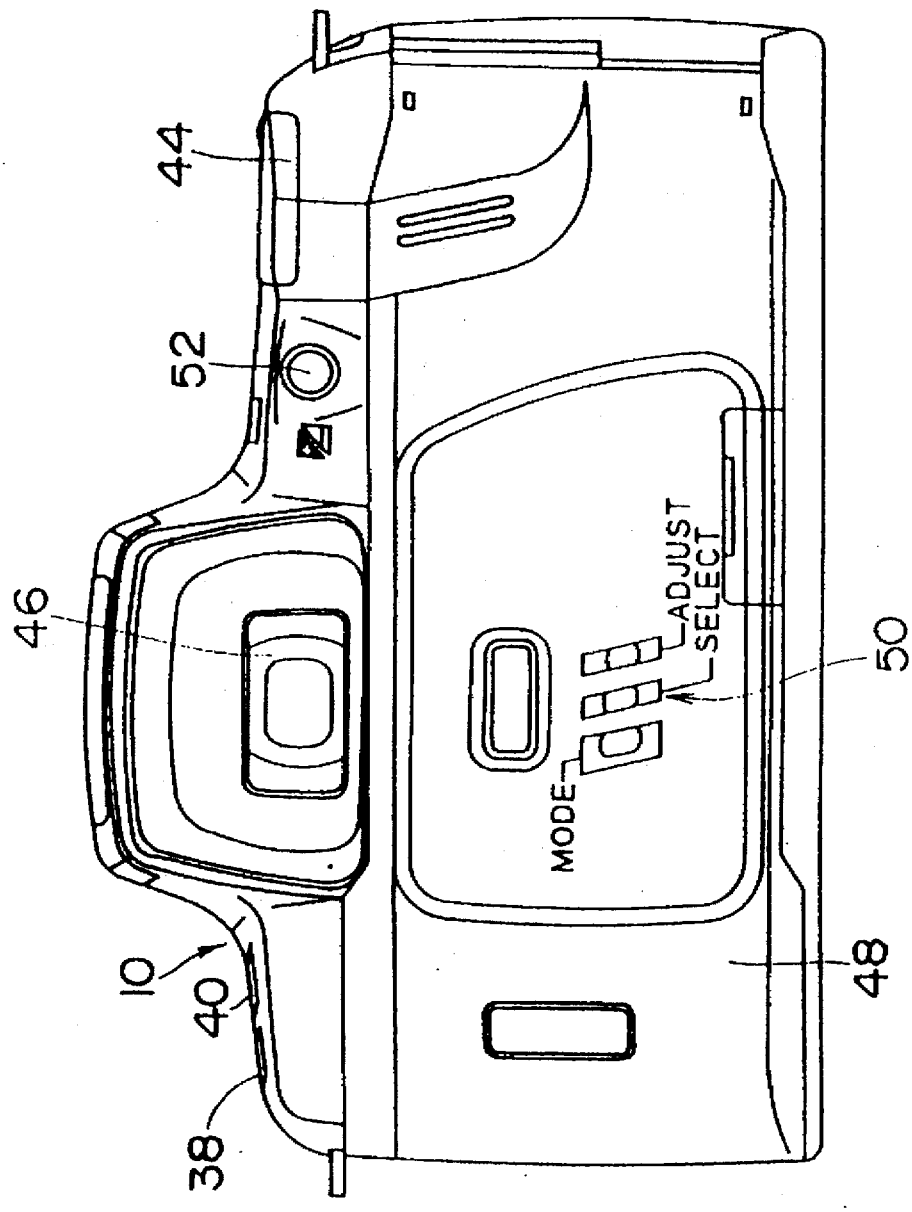
FIG. 3 is a rear elevational view of the camera body shown in FIG. 1.

FIGS. 1 through 3 are front elevational, plan, and rear elevational views, respectively, of a camera body 10 of an automatic-focusing (AF) single-lens reflex camera which embodies the present invention. The camera has a lens mount 14 on a front panel of the camera body 10. The camera also includes a lens system 12 (schematically shown in FIG. 11) that can be detachably mounted on the lens mount 14 and can of course be exchangeable. In this embodiment, the lens system 12 comprises a power zoom lens system having a focal length which is variable between 28 mm and 80 mm by means of a built-in zoom motor (not shown).

LENS SYSTEM

Figure 11:
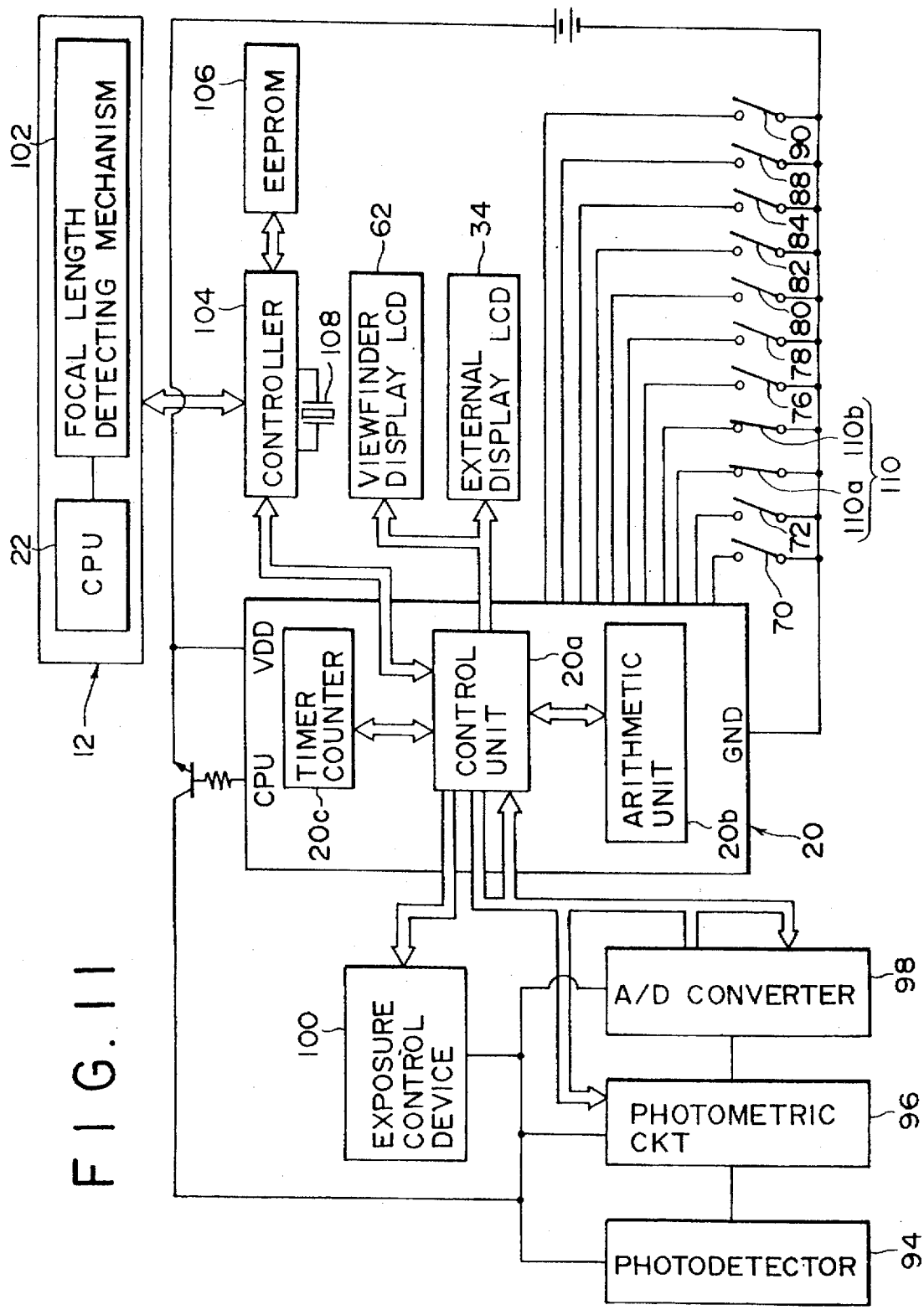
FIG. 11 is a block diagram of a control system of the single lens reflex camera embodying the present invention.

The lens system 12 is locked to the lens mount 14 as it is mounted to the camera body 10. When a lens lock button 18 that is positioned on the left hand side of the lens mount 14, as shown in FIGS. 1 and 2, is pressed, the lens system 12 is unlocked and it can be detached from the lens mount 14. With the lens system 12 mounted on the camera body 10, a group of connection terminals 18 on the surface (front surface) of the lens mount 14 are held in contact with a group of connection terminals (not shown) on the rear surface of the lens system 12 allowing a body-side CPU 20 in the camera body 10 and a lens-side CPU 22 in the lens system 12 to communicate with each other, as shown in FIG. 11.

FOCUSING MODE SELECTOR BUTTON

A focusing mode selector button 24 is positioned on the right hand side of the lens mount 14, as shown in FIGS. 1 and 2, and is substantially vertically slidable to select a manual focusing (MF) mode for manually focusing the lens system 12 or an automatic focusing (AF) mode for automatically focusing the lens system 12. The AF mode is selected when a mark "–" impressed on the focusing mode selector button 24 is aligned with a mark "AF" impressed on the camera body 10, and the MF mode is selected when the mark "–" is aligned with a mark "MF" impressed on the camera body 10.

SHUTTER BUTTON, UP/DOWN LEVER, Tv/Av BUTTON

As shown in FIGS. 1 and 2, a pressable shutter release button 26 is disposed on an upper left hand portion of the camera body 10 at a most forward position. An UP/DOWN lever or dial 28 is provided to increase or decrease designated variable data, and is positioned immediately to the rear of the shutter release button 26. The UP/DOWN lever 28 is angularly movable about an axis substantially parallel to the optical axis of the lens system 12, i.e., about an axis extending substantially in a forward to rearward direction of the camera body 10. Immediately behind the UP/DOWN lever 28, a pressable Tv/Av button 30 is disposed that additionally functions as a clear button. Each time the Tv/Av button 30 is pressed in an automatic exposure mode (A) or a manual exposure mode (M) in a full-spec mode that is installed when a main button 38 (described below) is shifted to an ON position, the Tv/Av button 30 selects a shutter speed preference mode or an aperture preference mode.

In this embodiment, the UP/DOWN lever 28, which is movable laterally whilst the camera body 10 is held in a photographing posture, is interposed between the shutter release button 26 and the Tv/Av button 30. The shutter release button 26, the UP/DOWN lever 28, and the Tv/Av button 30 are positioned such that they can be operated by the index finger of the right hand of a user when they grip a right hand portion (left hand portion in FIGS. 1 and 2) of the camera body 10. Since both the shutter release button 26 and the Tv/Av button 30 can be pressed by the index finger of the right hand of the user, they may be operated by mistake. However, because the UP/DOWN lever 28 that is movable laterally, i.e., is not pressable, is located between the shutter release button 26 and the Tv/Av button 30, the user can 20 reliably recognize the shutter release button 26 in front of the UP/DOWN lever 28 and the Tv/Av button 30 behind the UP/DOWN lever 28 while touching the UP/DOWN lever 28 in a pressing manner with the index finger. Consequently, unintended pressed operation of the shutter release button 26 and the Tv/Av button 30 can be prevented.

MAIN BUTTON

A built-in flash bulb (not shown) is housed in a front portion of the camera body 10 near an upper central surface thereof. The flash bulb pops up when a pop-up button 32 is pressed. As shown in FIG. 2, an external display LCD panel 34, for displaying various items of information which will be necessary when taking pictures, is mounted for visual observation at the rear, upper central surface of the camera body 10. The main button 36 is disposed on the left hand side (as viewed in FIG. 2) of the external display LCD panel 34. The main button 36 is slidable in a forward or rearward direction between an OFF position, an ON position, and a PICT position. When the main button 36 is in the OFF position, a main switch 110 (described later on) is turned off, and when the main switch 36 is in the ON or PICT position, the main switch 110 is turned on.

When the main button 36 is in the ON position, it sets a normal exposure mode (full-spec mode: FULL) in which a normal program mode (P), an automatic exposure mode (A), or a manual exposure mode (M) can be selected as desired. When the main button 36 is in the PICT position, it sets exposure mode (picture mode) which can be selected as desired. These modes comprise a green mode suitable for a novice to take pictures, a portrait mode suitable for photographing human beings, a landscape mode suitable for photographing natural scenery, a moving subject mode suitable for photographing moving subjects, and a close up mode suitable for taking close ups. These exposure modes will be described later on. In this embodiment, the modes that can be selected in the picture mode may be installed when the user selects symbols represented by pictures.

When the manual exposure mode (M) is set, as the values of shutter speed and aperture have been set by the Tv/Av button 30, they can be varied by turning the UP/DOWN lever 28.

DRIVE BUTTON, MODE BUTTON

A pressable drive button 38 and a pressable mode button 40, which is positioned on the left hand side of the drive button 38, are disposed in juxtaposed relationship on an upper right hand surface (as viewed in FIG. 2) of the camera body 10. The drive button 38 and the mode button 40 can be pressed independently or simultaneously by the index finger of the left hand of a user gripping a left hand side (shown as a right hand side in FIGS. 1 and 2) of the camera body 10.

When the UP/DOWN lever 28 is turned with the drive button 38 pressed by the user, a drive setting mode switches between a single-frame photographing mode, a multi-frame photographing mode, and a self-timer photographing mode irrespective of whether the main button 36 is in the ON or PICT position. When the UP/DOWN lever 28 is turned with the mode button 40 pressed by the user, the exposure mode switches successively between the normal program mode (P), the automatic exposure mode (A), and the manual exposure mode (M) in the full-spec mode when the main button 36 is in the ON position, or the exposure mode switches successively between the green mode, the portrait mode, the landscape mode, the moving subject mode, and the close up mode in the picture mode when as the main button 36 is in the PICT position.

When the user simultaneously presses the drive button 38 and the mode button 40 for a predetermined period of time, the camera enters a special function (PF) setting mode. While the PF setting mode has been selected, each time the mode button 40 is pressed, the contents of a set special function are successively changed. While the PF setting mode has been selected and letters "PF" are being displayed, and when the Tv/Av button 30 is continuously pressed for a predetermined period of time, the Tv/Av button 30 functions as a clear button for clearing all various data that have been set in the special function setting mode, as described later in detail. In such a clearing process, if a film is loaded in the camera body 10, then the ISO film sensitivity is set to an ISO exposure index indicated by a DX code on the loaded film. If no film is loaded in the camera body 10, then the ISO film sensitivity is set to a default ISO exposure index, e.g., 100.

When the Tv/Av button 30 is pressed while program shifting (described later on) is being executed, the Tv/Av button 30 functions as a program shifting clear button for clearing the amount of program shifting. When the Tv/Av button 30 is pressed while exposure correction is being executed, the Tv/Av button 30 functions as an exposure correction clear button for clearing the amount of exposure correction.

An accessory shoe 42 for mounting an external flash bulb (not shown) to the camera body is disposed on the upper surface of the camera body 10 on its left hand side as shown in FIG. 2. The accessory shoe 42 is normally covered with a cover 44.

As shown in FIG. 3, a viewfinder eyepiece 46 is positioned on an upper portion of a rear panel of the camera body 10. The rear panel has a lower portion that is covered substantially entirely with an openable rear lid 48, which when opened, allows a film to be loaded into and unloaded from the camera body 10. The rear lid 48 is equipped with a date data recording mechanism 50 for recording on a loaded film, data of including the year, month, and data on which the film is exposed.

HYPER BUTTON

As shown in FIG. 3, a pressable hyper button 52 is disposed on the rear panel of the camera body 10 on its right hand shoulder. The hyper button 52 basically functions as an exposure correcting button. Whilst in the normal program mode (P) or the automatic exposure mode (A) when in the normal exposure mode, if the UP/DOWN lever 28 is turned with the hyper button 52 pressed, optimum exposure conditions calculated by the camera can be adjusted in a positive or negative direction, i.e., can be increased or reduced, as desired by the user. The user can also adjust the exposure conditions by turning the UP/DOWN lever 28 while pressing the hyper button 52 pressed any of the modes other than the green mode are installed in the picture mode.

While the manual exposure mode (M) has been set in the normal exposure mode, when the hyper button 52, a photometric process for exposure is carried out, and an optimum combination of shutter speed and aperture are determined based on the results of the photometric process. That is, when the hyper button 52 is pressed in the manual exposure mode (M), the function of the automatic exposure mode (A) can effectively be obtained.

The exposure conditions that have been adjusted by turning the UP/DOWN lever 28 with the hyper button 52 pressed can be cleared when the Tv/Av button 30 serves as a clear button.

DISPLAYED CONTENTS OF EXTERNAL DISPLAY LCD PANEL

Figure 5:
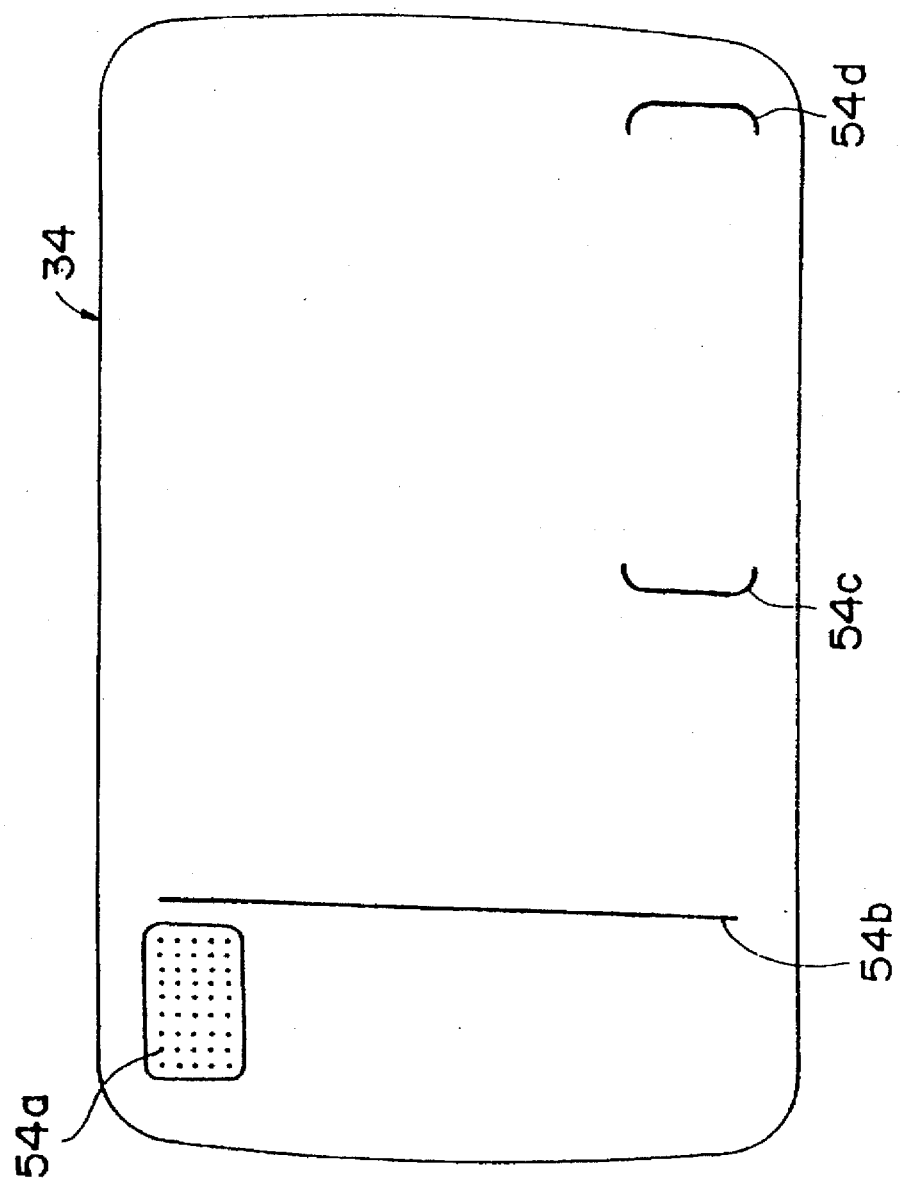
FIG. 5 is a view of fixed display data on the LCD panel shown in FIG. 4.
Figure 6:
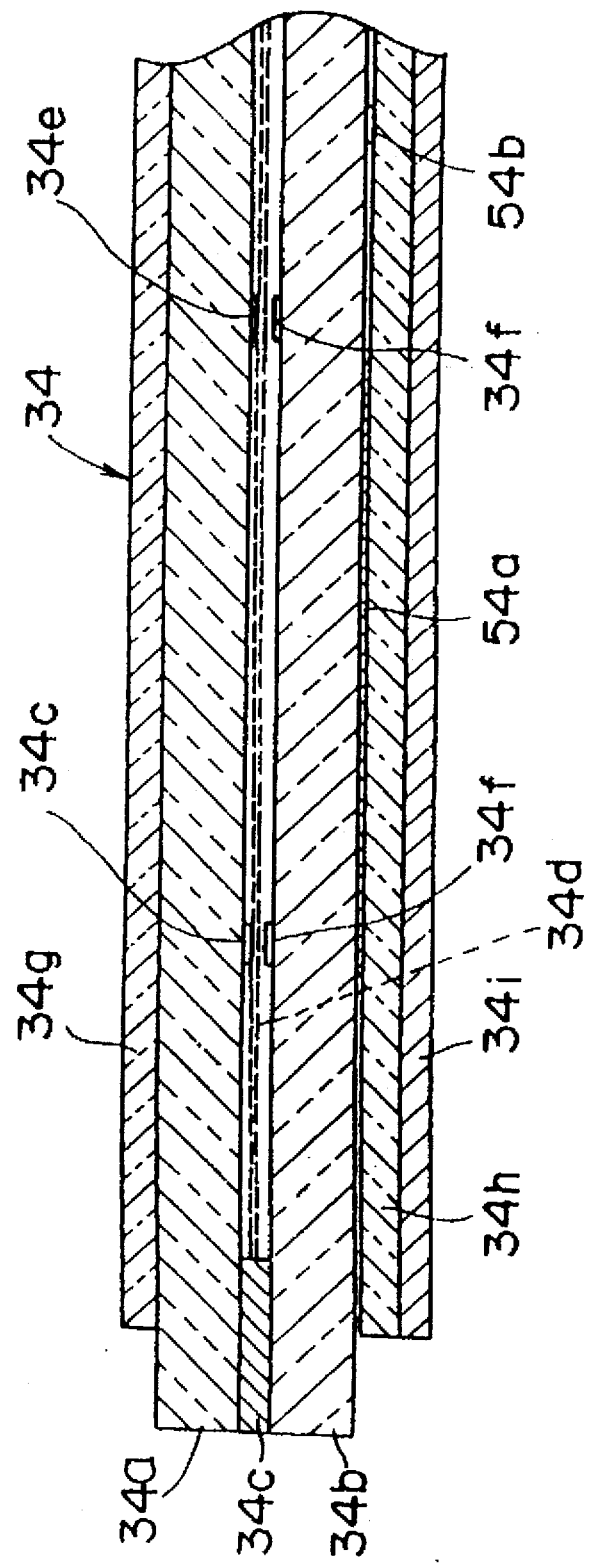
FIG. 6 is a vertical cross-sectional view showing the structure of the LCD panel shown in FIG. 4.

The arrangement of the external display LCD panel 34 now be described with reference to FIGS. 4 through 6.

Figure 4:
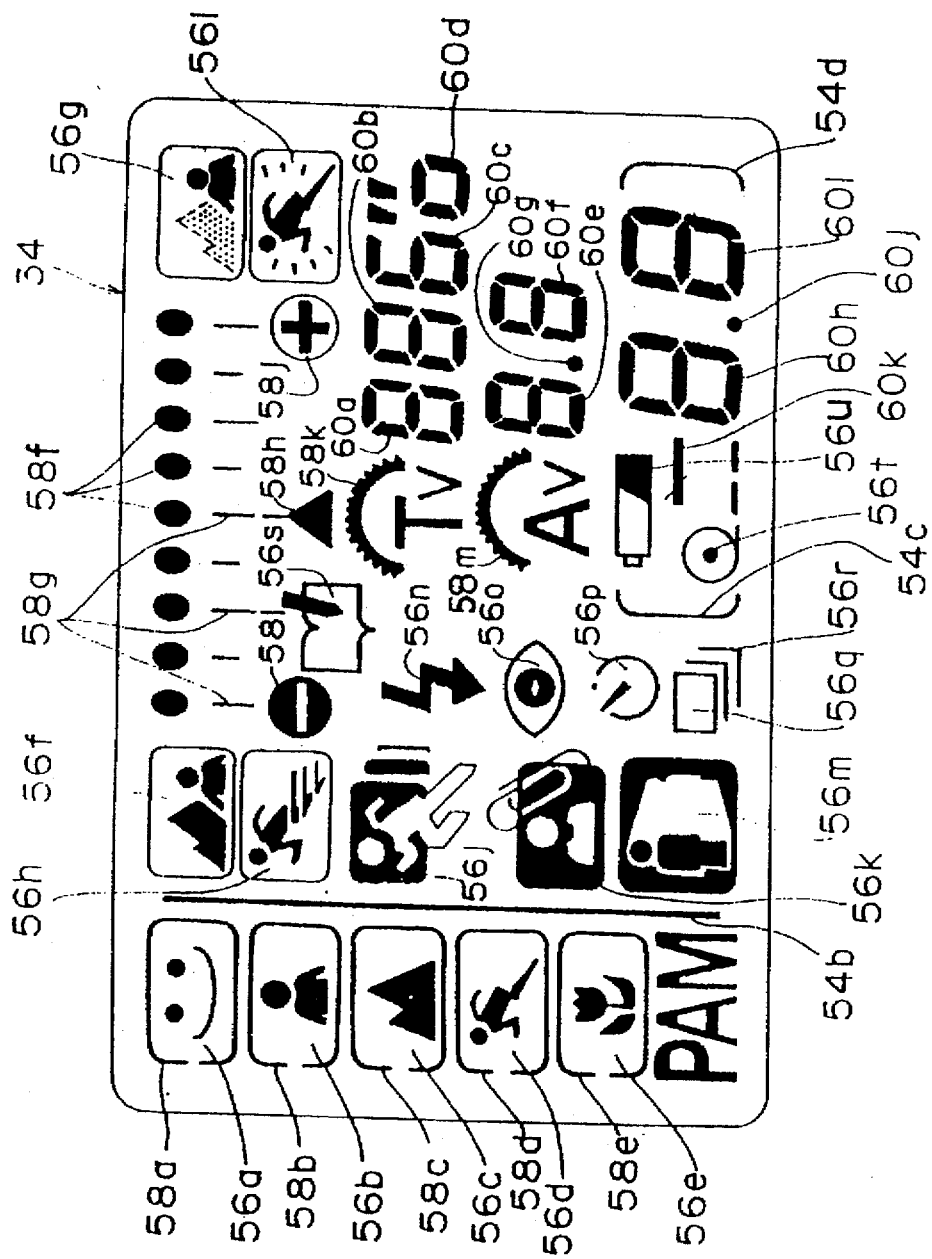

The display patterns or elements of the external display LCD panel 34 are shown in FIG. 4 as if they were all fully turned on. As shown in FIG. 5, the external display LCD panel 84 has four fixed display elements 54a–54d that are displayed or turned on at all times irrespective of which position the main button 36 is shifted to. The display element 54a comprises a halftone display element for displaying a picture indicating the green mode in an actual hue of green. The display element 54b comprises a division line for dividing the display area of the external display LCD panel 34 into left and right areas on the left hand and right hand sides, respectively, thereof. The left area includes pictures indicating five exposure modes, that can be selected in the picture mode, and alphabetic letters indicating the three exposure modes in the normal exposure mode. The right area includes various items of information that are required for taking pictures, for example exposure conditions, shutter speed, aperture, the number of frames exposed, etc. The display elements 54c, 54d represent parentheses for displaying in an area therebetween a battery condition, film information, and special function setting information, etc. The display elements which are shown as being fully turned on in FIG. 4, except the fixed display elements 54a–54d shown in FIG. 5, are energizable liquid crystal elements. These liquid crystal elements can be energised when the main button 36 is shifted to a position other than the OFF position.

In the area on the left hand side of the division line 54b, there are arranged a picture (graphically representing a smiling face) 56a indicating the green mode, a picture (graphically representing a person) 56b indicating the portrait mode, a picture (graphically representing a mountain) 56c indicating the landscape mode, a picture (graphically representing a runner) 56d indicating the moving subject mode, and a picture (graphically representing a flower) 56e indicating the close up mode. The pictures 56a, 56b, 56c, 56d, 56e are positioned successively downwardly from the uppermost position. In the lowermost position of the left area, the display includes a letter P indicating the normal program mode selectable in the normal exposure mode, a letter A indicating the automatic exposure mode selectable in the normal exposure mode, and a letter M indicating the manual exposure mode selectable in the normal exposure mode. The letters A, P, M are positioned horizontally and side-by-side. The pictures 56a–56e are surrounded by respective liquid crystal element frames 58a–58e that are energizable to indicate that the corresponding pictures 56a–56e are selected.

More specifically, when the normal exposure mode is set by the main button 36 having been shifted to the ON position, only the selected one of the letters P, A, or M which indicate the normal program mode, the automatic exposure mode, or the manual exposure mode, respectively, is energized on the left hand side of the division line 54b. When the picture mode is set by the main button 36 having been shifted to the PICT position, all the pictures 56a–56e are energized, but only one of the frames 58a–58e which corresponds to the selected mode in the picture mode is energized.

In the area on the right hand side of the division line 54b, there is arranged an energizable graph 58f which is composed of nine black dots positioned at equal intervals along an upper central edge of the external display LCD panel 34 in horizontal side-by-side relationship, and an array of nine graduations 58g positioned directly underneath the black dots in vertical alignment therewith. A centrally located graduation 58g is located above a triangular mark 58h that is energizable to indicate the central graduation 58g. A left end graduation 58g is located above an energizable minus mark 58i, and a right end graduation 58g is located above an energizable plus mark 58j. The minus mark 58i indicates a negative direction for reducing the aperture or lowering the shutter speed, and the plus mark 58j indicates a positive direction for widening the aperture or increasing the shutter speed.

When one of the four exposure modes other than the green mode is selected in the picture mode, the black dots of the graph 58f are alternately turned on and off or continuously turned on is varied by turning the UP/DOWN lever 28, thereby indicating a direction in which, and an amount by which, a program shift is effected. However, the "+" (plus) mark and the "−" (minus) mark can be alternately turned on and off or continuously turned on at the opposite ends of the graph 58f to enable the graph 58f to directly display a change in the shutter speed or a change in the aperture. Pictures 56f, 56g (described below) at the opposite ends of the graph 58f may be dispensed with, and only the "+" and "−" marks may be displayed.

Pictures 56f, 56g are energized when one of the portrait mode, the landscape mode, or the close up mode are selected in the picture mode, and are positioned respectively at the left and right ends of the graph 58f. The left picture 56f, which is a graphic representation of a person and a mountain both in focus, indicates a reduced aperture with an increased depth of field thereby widening a range that can be in focus. The right picture 56g, which is a graphic representation of a person in focus and a mountain out of focus, indicates an increased aperture with a reduced depth of field thereby reducing a range that can be in focus.

Pictures 56h, 56i are energized when the moving subject mode is selected in the picture mode and are positioned respectively to the left of the minus mark 58i underneath the picture 56f, and to the right of the plus mark 58j underneath the picture 56g. The left picture 58h, which is a graphic representation of a blurred runner, indicates a slower shutter speed tending to photograph the subject as a blurred image. The right picture 56i, which is a graphic representation of an unblurred runner, indicates a faster shutter speed tending to photograph the subject as a stationary image.

Three pictures 56j, 56k, 56m, are arranged in a vertical array selectively energizable and are disposed below the picture 56h. These pictures 56j, 56k, 56m indicate different automatic power zoom control modes to be set when the lens system 12 mounted on the camera body 10 is a power zoom lens. The uppermost picture 56j is energized when a constant image magnification photographing mode is selected, the lowermost picture 56m is energized when an in-exposure zoom photographing mode is selected, and the picture 56k therebetween is energized when a clip photographing mode is selected. These automatic power zoom control modes will not be described in detail as they have no bearing on the present invention.

A vertical array of five pictures 56n, 56o, 56p, 56q, 56r, located to the right of the array of pictures 56j, 56k, 56m, are selectively energizable and are below the minus mark 58i. The uppermost picture 56n, graphically representing lightening, is alternately turned on and off when flash photography is needed. At this time, when the pop-up button 32 is pressed, the built-in flash bulb is popped up, and will be turned on when conditions are ready for flash photography.

The second picture 56o, graphically representing an eye, is turned on when a red-eye prevention mode is set for flash photography. When the red-eye prevention mode is set, the built-in flash bulb is pre-energized prior to taking a picture in flash photography, making the iris of the subject person close.

The third picture 56p, graphically representing a clock, is energized when a self-timer photographing mode is selected by turning the UP/DOWN lever 28 with the drive button 38 pressed to set the drive setting mode.

The fourth picture 56q, graphically representing a rectangle, is energized when a single-frame photographing mode or the multi-frame photographing mode is selected by turning the UP/DOWN lever 28 with the drive button 38 pressed to set the drive setting mode.

The fifth and lowermost picture 56r, graphically representing overlapping squares in connection with picture 56q, is energized when the multi-frame photographing mode is selected by turning the UP/DOWN lever 28 with the drive button 38 pressed to set the drive setting mode.

More specifically, when the single-frame photographing mode is set, only the rectangular picture 56q is energized, and when the multi-frame photographing mode is set, the picture 56r is energized in addition to the rectangular picture 56q.

An energizable picture 56s, graphically representing a learning mode, is disposed between the triangular mark 58h and the minus mark 58i. The picture 56s, composed of a notebook and a pencil, is energized when a learning mode is set in the special function (PF) setting mode. The learning mode will be described in detail later on.

Energizable letters "Tv" for displaying a shutter speed are disposed to the right of the lightning picture 56n and below the triangular mark 58h. An energizable arcuate bar mark 58k is disposed directly above the letters "Tv". The bar mark 58k is energized when the shutter speed preference mode is selected by pressing the Tv/Av button 30.

Energizable letters "Av" for displaying an aperture are disposed below the letters "Tv". An energizable arcuate bar mark 58m is disposed directly above the letters "Av". The bar mark 58m is energized when the aperture preference mode is selected by pressing the Tv/Av button 30.

The external display LCD panel 34 may be arranged to energize the "Tv" and "Av" marks simultaneously, or to energize the "Tv" and "Av" marks one at a time in response to a switch action.

Four-digit energizable display elements 60a–60d for displaying a shutter speed or an ISO film sensitivity are disposed to the right of the letters "Tv". Each of the two-digit display elements 60a, 60b on the left is composed of seven segments capable of selectively displaying numerals ranging from "0" to "9" and letters. The display element 60c, which is the second element from the right, is composed of six segments capable of selectively displaying the numerals "5" and "0". The display element 60d on the right end is capable of selectively displaying a numeral "0" and a symbol '"'. The symbol '"' is energized if the shutter speed displayed by the left two-digit display elements 60a, 60b is in seconds, and is de-energized if the shutter speed displayed in the maximum number of three digits (60a, 60b, 60c) is in the reciprocal of seconds.

Two-digit energizable display elements 60e, 60f for displaying an aperture or the like are disposed to the right of the letters "Av" described above. Each of these two-digit display elements 60e, 60f comprises seven segments for displaying numerals ranging from "0" to "9" and letters. A dot display element 60g for displaying a decimal point is interposed between the display elements 60e, 60f.

An energizable picture 56u, graphically representing a dry cell, is for displaying the electric power condition of a power supply (battery) and is disposed in an upper left portion of the area between the parentheses represented by the display elements 54c, 54d. The picture 56u is fully energized in its inside area when the battery stores sufficient electric power, half energized when the remaining electric power stored in the battery is small, and de-energized when the remaining electric power stored in the battery is substantially eliminated.

An energizable picture 56t, graphically representing a film cartridge, for displaying the loaded condition of a film is disposed below the dry cell picture 56u. The film cartridge picture 56t is de-energized when no film is loaded, and energized when a film is loaded.

Two-digit energizable display elements 60h, 60i for displaying an exposure correction letters "PF" or the like are disposed in a right portion of the area between the parentheses represented by the display elements 54c, 54d. Each of these two-digit display elements 60h, 60i comprises seven segments for displaying numerals ranging from "0" to "9" and letters. A dot display element 60j for displaying a decimal point is interposed between the display elements 60h, 60i. An energizable display element 60k, graphically representing a negative sign, for displaying that the exposure correction value is negative is disposed to the left of the left display element 60h.

STRUCTURE OF EXTERNAL DISPLAY LCD PANEL

The structure of the external display LCD panel 34 will be described below with reference to FIG. 6.

The external display LCD panel 34 has a pair of upper and lower transparent glass plates 34a, 34b that are spaced a predetermined gap from each other by a spacer 34c. A liquid crystal 34d is located in the gap that is determined by the spacer 34c. A pair of upper and lower transparent electrodes 34e, 34f are disposed respectively on lower and upper surfaces of the upper and lower transparent glass plates 34a, 34b as independent electrodes corresponding to the pictures 56a–56u, the display elements 58a–58m representing the frames, the marks, etc., and the display elements 60a–60k including the seven-segment elements, etc. When the smiling-face picture 56a is to be energized, for example, the upper and lower transparent electrodes 34e, 34f corresponding to the picture 56a are energized to turn on the smiling-face picture 56a independently of the other pictures.

A first polarizer is mounted on the upper surface of the upper transparent glass plate 34a, and a second polarizer 34h is mounted on the lower surface of the lower transparent glass plate 34b. The upper surface of the second polarizer 34h is printed with the green halftone display element 54a according to pad printing. The division line 54b and the display elements 54c, 54d are also printed on the upper surface of the second polarizer 34h. A reflector 34i is attached to the lower surface of the second polarizer 34h.

The external display LCD panel 34 of the above structure is capable of reliably displaying the various items of information, described above, when required.

VIEWFINDER DISPLAY LCD PANEL

Figure 7:
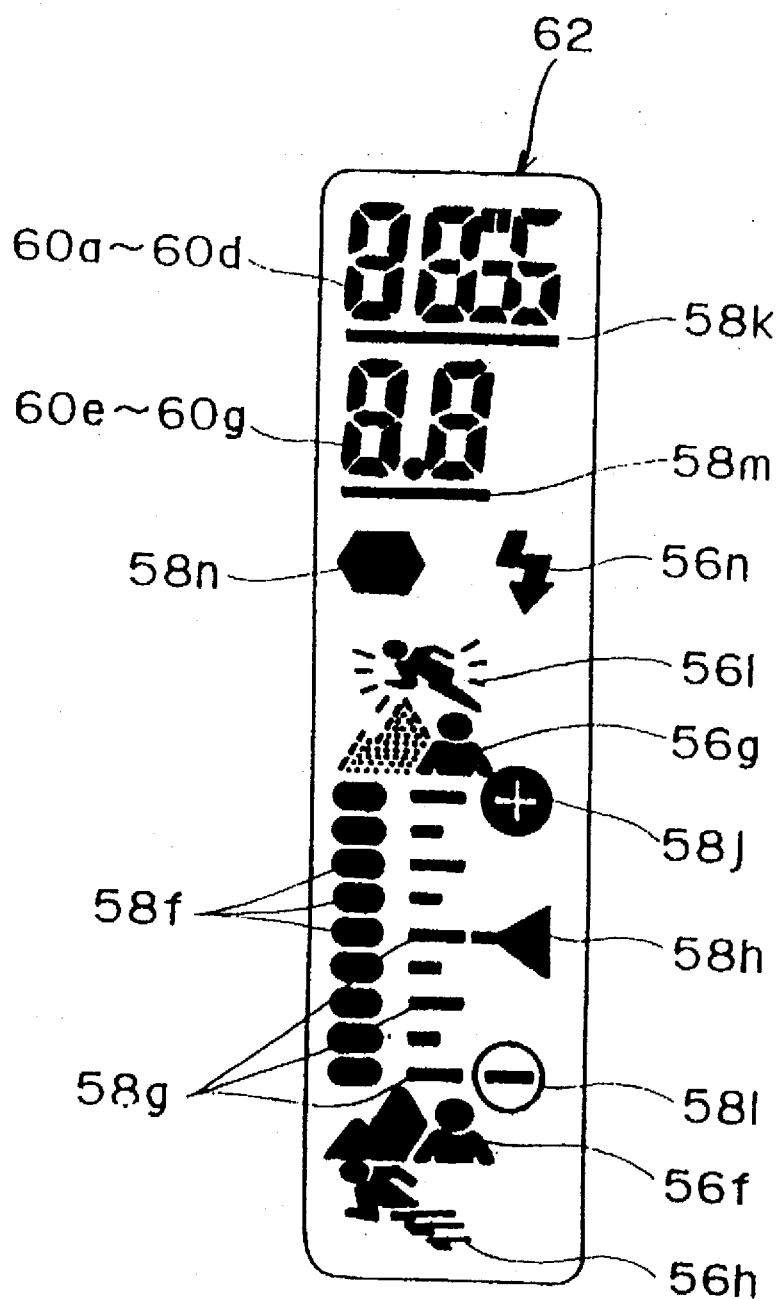

A viewfinder display LCD panel 62 as shown in FIG. 7 is disposed along a right edge of an outer frame which defines a viewfinder as viewed through the viewfinder eyepiece 46. The viewfinder display LCD panel 62 displays various items of information that are simplified versions of the items of information that are displayed by the external display LCD panel 34. Therefore, the items of information that are displayed by the viewfinder display LCD panel 62 are denoted by similar reference characters, and will not be described in detail. The viewfinder display LCD panel 62 includes a display element 58n, graphically representing a focused mark, which is energized when the lens system is focused to inform the user that the lens system is focused. The same display element is not included in the external display LCD panel 34. The focusing mark 58n is energizable when the manual focusing (MF) mode or the automatic focusing (AF) mode is selected with the focusing mode selector button 24.

ATTACHMENT STRUCTURES FOR SHUTTER RELEASE BUTTON, UP/DOWN LEVER, Tv/Av BUTTON, DRIVE BUTTON, AND MODE BUTTON

Figure 8:
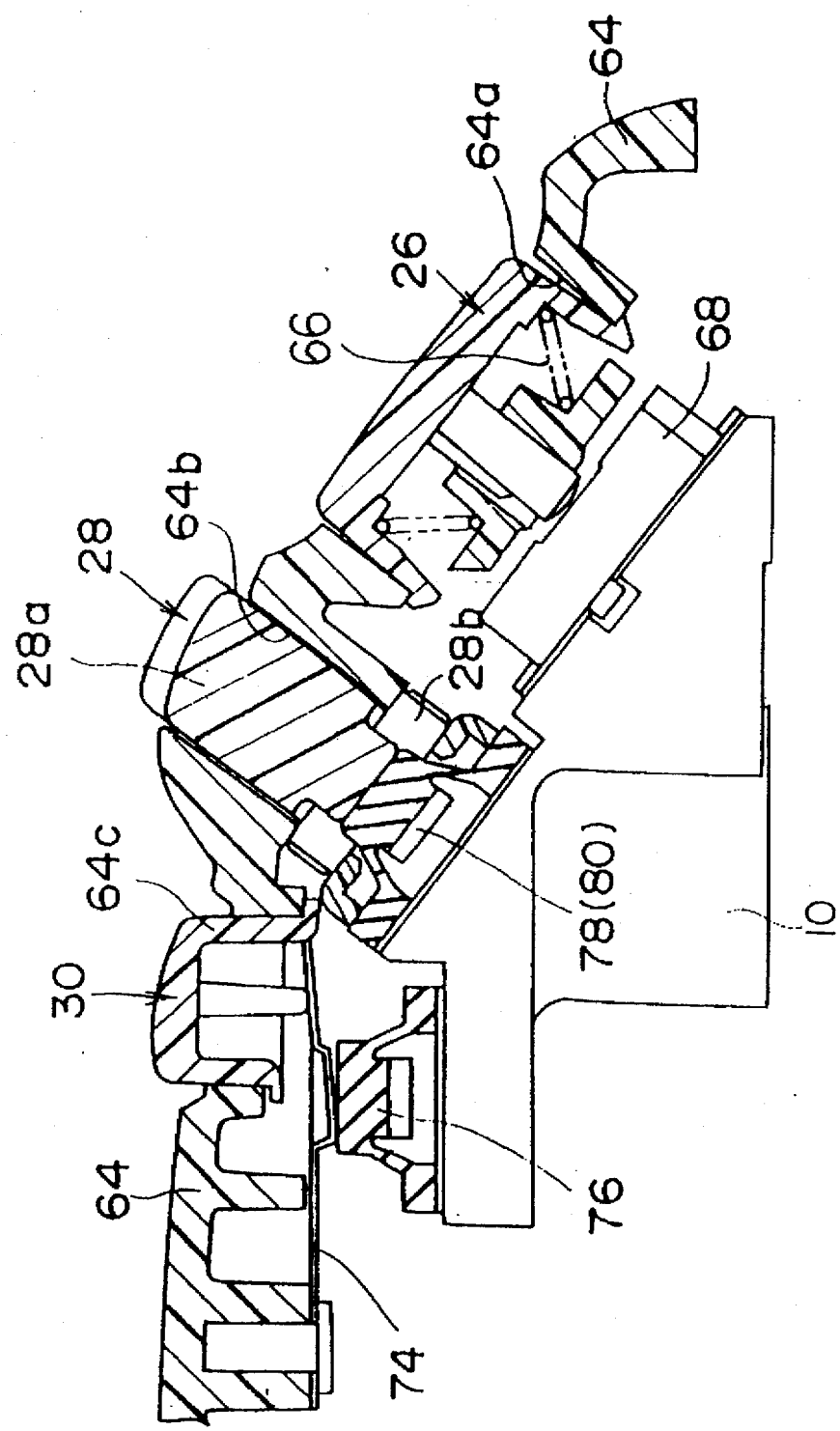
FIG. 8 is a vertical cross-sectional view showing, in side elevation, the attachment of a shutter release button, an UP/DOWN lever, and a Tv/Av button to the camera body shown in FIG. 1.
Figure 9:
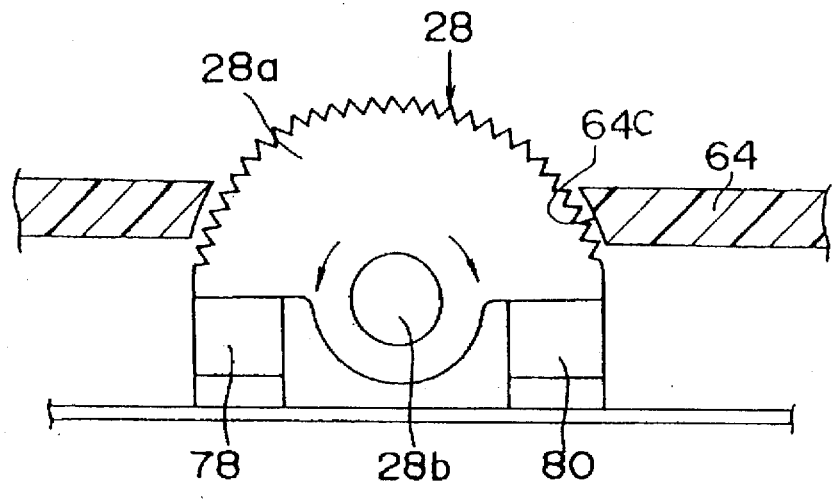
FIG. 9 is a vertical cross-sectional view showing, in front elevation, the attachment of the UP/DOWN lever shown in FIG. 8.

Attachment structures for the five manual control members, i.e., the shutter release button 26, the UP/DOWN lever 28, the Tv/Av button 30, the drive button 38, and the mode button 40, that are disposed on the upper surface of the camera body 10, will be described below with reference to FIGS. 8 through 10.

First, attachment structures for the shutter release button 26, the UP/DOWN lever 28, and the Tv/Av button 30, that are disposed on the upper surface of the camera body 10 on the left hand side (i.e., on the right hand side as viewed from the user) of the external display LCD panel 34, will be described with reference to FIGS. 8 and 9. As shown in FIG. 8, the shutter release button 26 is inwardly and pressably disposed in a first opening 64a, defined in an upper ornamental plate 64 which defines the upper surface of the camera body 10. The shutter release button 26 is normally urged upwardly by a coil spring 66. A switch assembly 88 is disposed below the shutter release button 26. The switch assembly 68 houses a photometric switch 70 (see FIG. 11) that is turned on when the shutter release button 26 is pressed halfway and a release switch 72 (see FIG. 11) that is turned on when the shutter release button 26 is fully pressed. The Tv/Av button 30 is inwardly and pressably disposed in a second opening 64b defined in the upper ornamental plate 64. The Tv/Av button 30 is normally urged upwardly by a leaf spring 74 that is positioned above a clear switch 78. The clear switch 76 is turned on when the Tv/Av button 30 is pressed.

The UP/DOWN lever 28 is angularly movable rather than pressable. More specifically, as shown in FIG. 9, the UP/DOWN lever 28 comprises a lever body 28a, and a support shaft 28b integrally joined to the lever body 28a, and extends substantially parallel to the optical axis of the lens system 12. Therefore, the UP/DOWN lever 28 is rotatably movable about the central axis of the support shaft 28b. The lever body 28a is of a substantially semicircular shape and has an upper edge projecting upwardly through a third opening (slit) 64c defined in the upper ornamental plate 64. The lever body 28a is associated with an UP switch 78 that is turned on when the lever body 28a is turned counterclockwise in FIG. 9 (i.e., clockwise as viewed from the user), and a DOWN switch 80 that is turned on when the lever body 28a is turned clockwise in FIG. 9 (i.e., counterclockwise as viewed from the user). The lever body 28a is normally urged by a return spring (not shown) toward its neutral position in which it does not turn on the UP and DOWN switches 78, 80.

Figure 10:
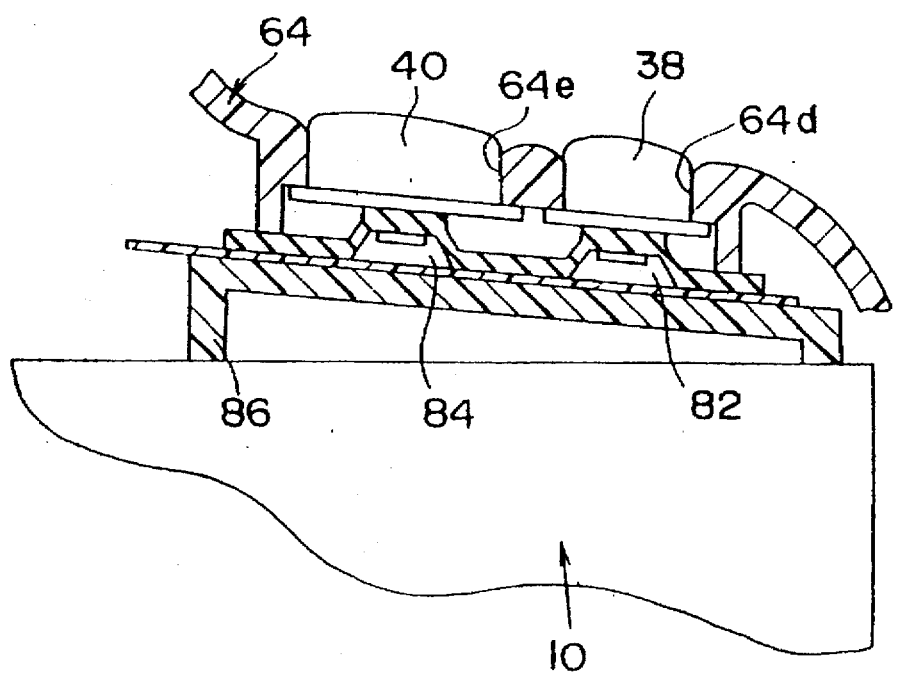
FIG. 10 is a vertical cross-sectional view showing, in front elevation, the attachment of a drive button and a mode button to the camera body shown in FIG. 1.

As shown in FIG. 10, the drive button 38 and the mode button 40 are inwardly pressably disposed in respective fourth and fifth openings 64d, 64e defined in the upper ornamental plate 64. The drive button 38 and the mode button 40 are normally urged upwardly by a spring (not shown). A drive switch 82 and a mode switch 84 are disposed on a switch support plate 88 respectively underneath the drive button 38 and the mode button 40. The drive switch 82 is turned on when the drive button 38 is pressed, and the mode switch 84 is turned on when the mode button 40 is pressed.

A hyper switch 88 (FIGS. 8 and 11), which can be turned on when the hyper button 52 is pressed, is disposed in the camera body 10. The camera body 10 also accommodates therein a film cartridge detecting switch 90 (turned on by a film cartridge that can be loaded when the rear lid 48 is opened) for detecting the loaded condition of the film cartridge. The hyper switch 88 and the film cartridge detecting switch 90 are shown in FIG. 11.

CONTROL SYSTEM OF AF SINGLE LENS REFLEX CAMERA

An AF single lens reflex camera for taking pictures is produced when the lens system 12 is mounted on the camera body 10. A control system of such an AF single lens reflex camera will be described below with reference to FIG. 11.

Light from a subject which has entered the camera body 10 through the zoom optical system of the lens system 12 is mostly reflected by a main mirror 92 (see FIG. 1) toward a pentagonal mirror (not shown) of the optical system of the viewfinder. Part of the reflected light is applied to a photodetector 94 (see FIG. 11) of a photometric IC. Part of the light from the subject that has entered the camera body 10 is applied to and passes through a half-silvered mirror section (not shown) of the main mirror 92, and is then reflected by a rear submirror (not shown) downwardly to a rangefinder CCD sensor unit (not shown).

The photodetector 94 of the photometric IC generates an electric signal depending on the intensity of light applied thereto. The electric signal generated by the photodetector 94 is logarithmically compressed by a photometric circuit 98 and then converted by an A/D converter 98 into a digital signal that is applied as a photometric signal to the body-side CPU 20 in the camera body 10. Based on the digital photometric signal and film sensitivity information, the body-side CPU 20 carries out predetermined calculations to determine an optimum shutter speed and aperture for exposure. Then, the body-side CPU 20 actuates an exposure control device 100 and an aperture mechanism (not shown) for exposing a film frame based on the calculated shutter speed and aperture.

In response to a shutter release, the body-side CPU 20 controls a motor drive circuit (not shown) to energize a mirror motor (not shown) to lift and lower the main mirror 92. After the film frame has been exposed, the body side CPU 20 energizes a film take up motor (not shown) to wind the film.

The body-side CPU 20 communicates with the lens-side CPU 22 for exchanging data and commands through the connection terminals 18 on the lens mount 14 and the connection terminals (not shown) on the lens system 12. The lens system 12 has a focal length detecting mechanism 102 for detecting a focal length that is presently set. The focal length detecting mechanism 102 is electrically connected to the lens-side CPU 22.

The body side CPU 20 comprises a control unit 20a for effecting overall control over the camera, the control unit 20a having a ROM for storing a control program and a RAM for storing certain data. The body side CPU 20 further comprises an arithmetic unit 20b for carrying out AF (automatic focusing) arithmetic operations, PZ (power zoom) arithmetic operations, AE (automatic exposure) arithmetic operations, learning mode arithmetic operations, etc., and further comprises a timer counter 20c. An EEPROM 108, as an external memory, is connected to the control unit 20a through a controller 104. The EEPROM 108 stores various constants inherent to the camera body 10, and various functions and constants which will be required by the AF arithmetic operations, PZ arithmetic operations, AE arithmetic operations, learning mode arithmetic operations, etc. An electronic buzzer 108 for generating a sound when the lens system is focused is connected to the controller 104. The buzzer 108 comprises a PCV (Piezo Ceramic Vibrator).

Also connected to the body side CPU 20 are the photometric switch 70 that is turned on when the shutter release button 26 is half pressed, the release switch 72 that is turned on when the shutter release button 26 is fully pressed, the main switch 110 that is turned on and off in response to sliding movement of the main button 38, the clear switch 76, the UP switch 78, the DOWN switch 80, the drive switch 82, the mode switch 84, the hyper switch 88, and the film cartridge detecting switch 90.

The main switch 110 comprises an ON switch 110a and a PICT switch 110b. The ON switch 110a is turned on when the main button 38 is slid to the ON position, and turned off when the main button 38 is slid to the other positions. The PICT switch 110b is turned on when the main button 36 is slid to the PICT position, and turned off. When the main button 36 is slid to the other positions. The main switch 110 is turned on when either the ON switch 110a or the PICT switch 110b is turned on, and turned off when both the ON switch 110a and the PICT switch 110b are turned off.

A control sequence for controlling the camera in this embodiment will be described below with reference to various flowcharts.

Figure 12:
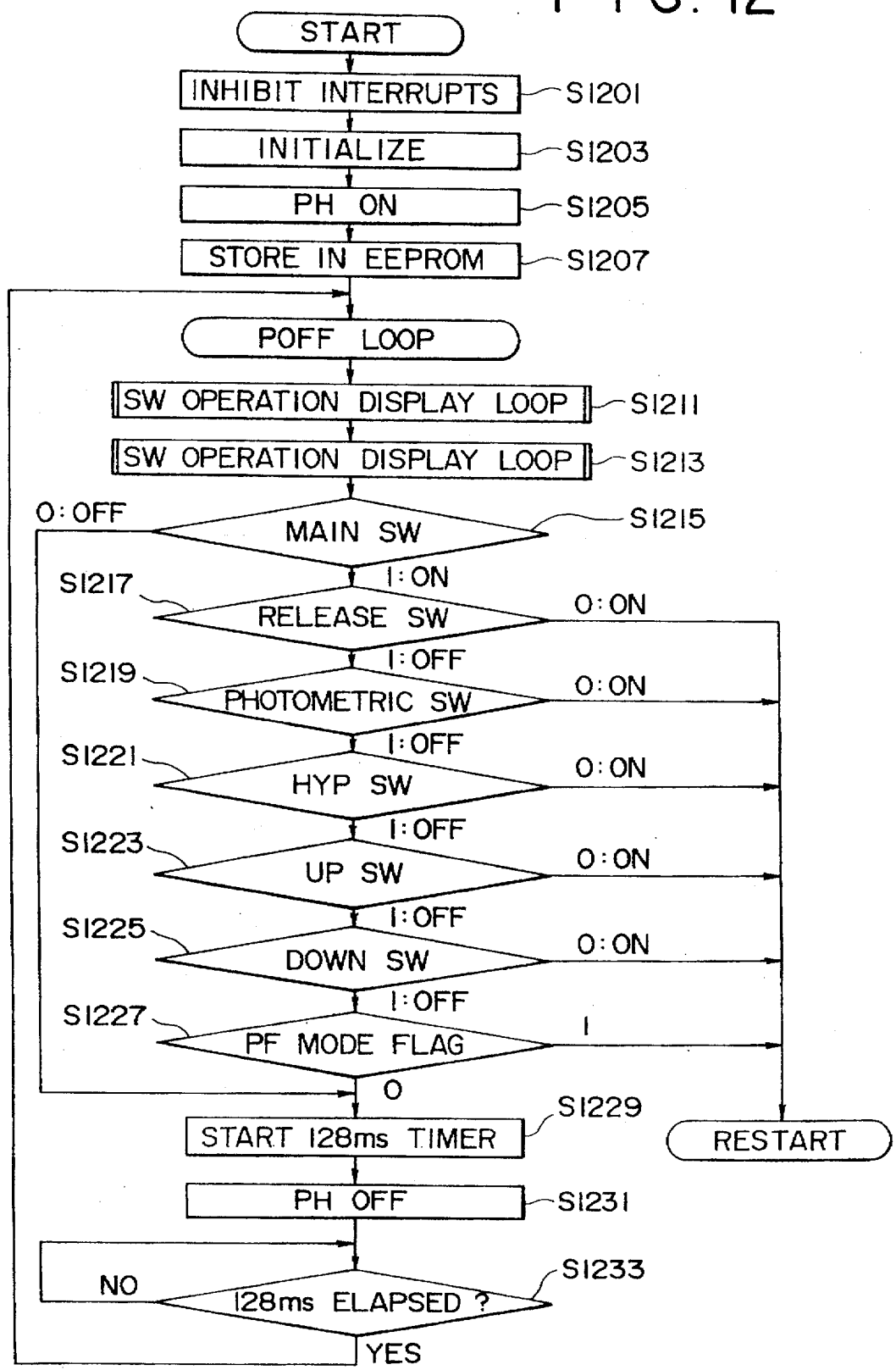
FIG. 12 is a flowchart of a main routine of a control sequence that is executed by the body side CPU shown in FIG. 11.

A main routine shown in FIG. 12 and 13 includes a POFF loop corresponding to a standby condition and a PON loop corresponding to an operating condition. From the PON loop, various control processes are executed for controlling the camera. There are four general control processes: a shutter release process (FIG. 14) for controlling an exposure when the shutter release button 26 is fully pressed; an SW operation display loop process (FIG. 15) for controlling display processes upon operation of the mode button 40, the drive button 38, the Tv/Av button 30, the UG/DOWN lever 28, and the hyper button 82; an AE arithmetic process for controlling various program arithmetic operations; and a learning mode arithmetic process for controlling a learning function to learn an action of the user. The SW operation display loop process can be sub-divided into a process in the exposure mode for exposure correction and program shifting, and a process in the special function setting mode.

MAIN ROUTINE

FIG. 12 is a flowchart showing the main routine for controlling the camera. This flowchart is started when a battery is loaded in the camera. When a battery is loaded in the camera body 10, interrupts are inhibited, and an initializing process is executed to initialize flags, the RAM, and registers, and to effect a sum check in the ROM (S1201, S1203). Then, a power hold mode is turned on to supply electric energy to the overall hardware arrangement of the camera, and data stored in the EEPROM 108 is written in the RAM of the CPU 20 (S1205, S1207). Thereafter, control proceeds to the POFF loop that is repeatedly executed while the main switch 110 of the camera is turned off.

FORMATS DATA IN EEPROM/RAM

FIGS. 58 and 59 are diagrams showing formats of data stored in the EEPROM and data written in the RAM.

The camera of the present embodiment can learn the amount of a program shift in each of the exposure modes including the portrait mode, the landscape mode, the moving subject mode, and the close up made. In these exposure modes, GENPSFT(0)–GENPSFT(3) respectively indicate the amount of a shift from an initial learning mode origin in a program diagram that has been learned and STDYCNT (0)–STDYCNT(3) respectively indicate the number of times that the shutter has been released with the amount of a program shift that the user has set. They are each first written in the RAM, and then written in the EEPROM 106 as required. The data written in the EEPROM 106 are written in the RAM in step S1303 shown in FIG. 13A and in step S1207 shown in FIG. 12. Furthermore, data are transferred from GENPSFT(0)–GENPSFT(3) and STDYCNT(0) –STDYCNT(3) written in the RAM to GENPSFT, STDY-CNT in the RAM according to the exposure mode that is selected.

In addition to the locations GENPSFT, STDYCNT, the RAM has SETPSFT for storing the amount of a program shift, which the user has set, from a learning mode origin, and ALLPSFT for storing the final amount of a program shift.

FIG. 59 shows a data structure of the data ALLPSFT, SETPSFT, GENPSFT, STDYCNT in the RAM.

As shown in FIG. 59, each of the data ALLPSFT, SETPSFT, GENPSFT contains 0th through 8th bits representing the absolute amount of a program shift in units of ⅛, and a 7th bit serving as a direction bit that represents the direction of the program shift. The data STDYCNT contains 0th through 5th bits representing the number of times that the shutter is released, and 6th and 7th bits representing data relative to the status of a learning mode.

POFF LOOP

Figure 15:
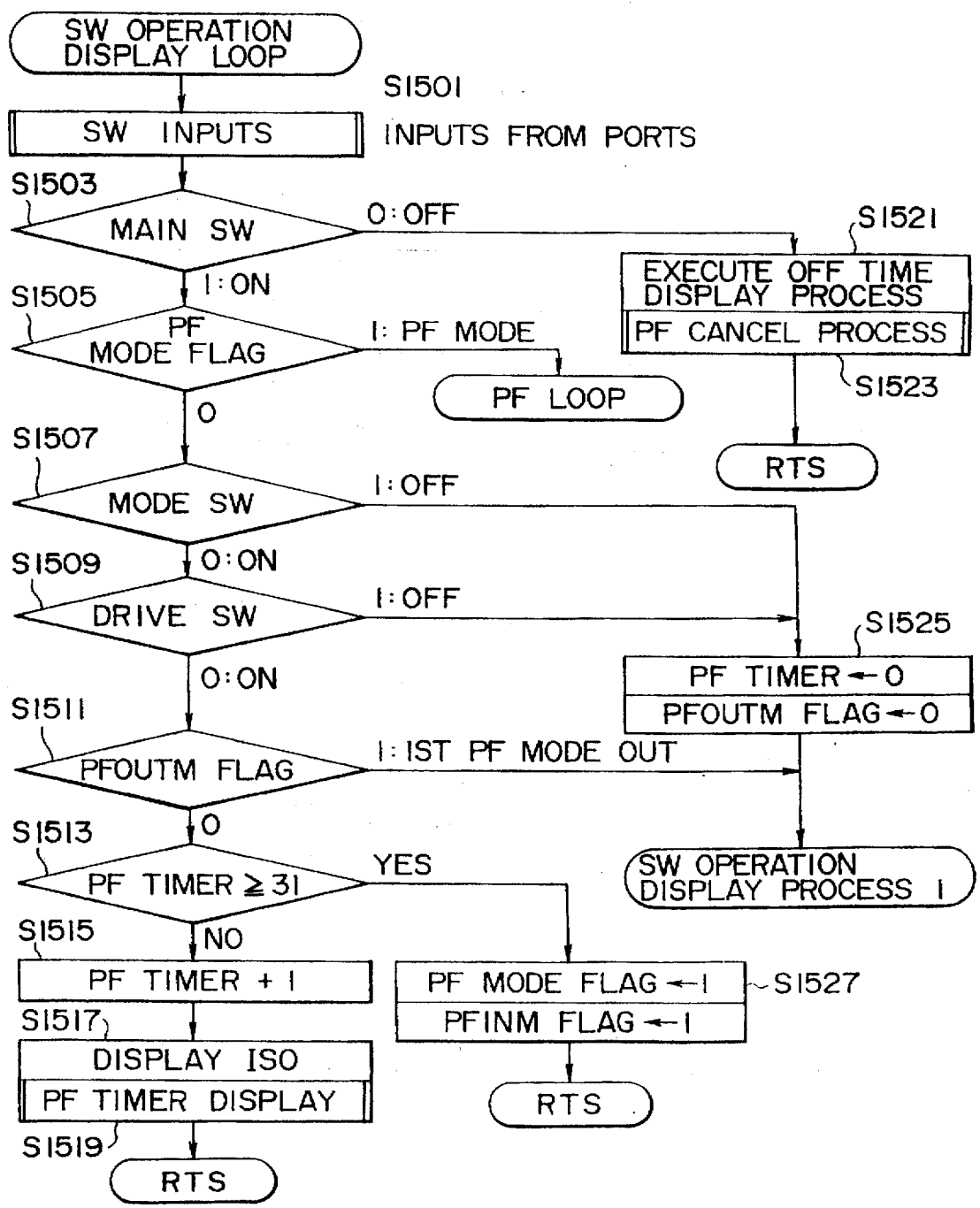
FIG. 15 is a flowchart of a control sequence when an SW OPERATION DISPLAY LOOP PROCESS is called.
Figure 16A:
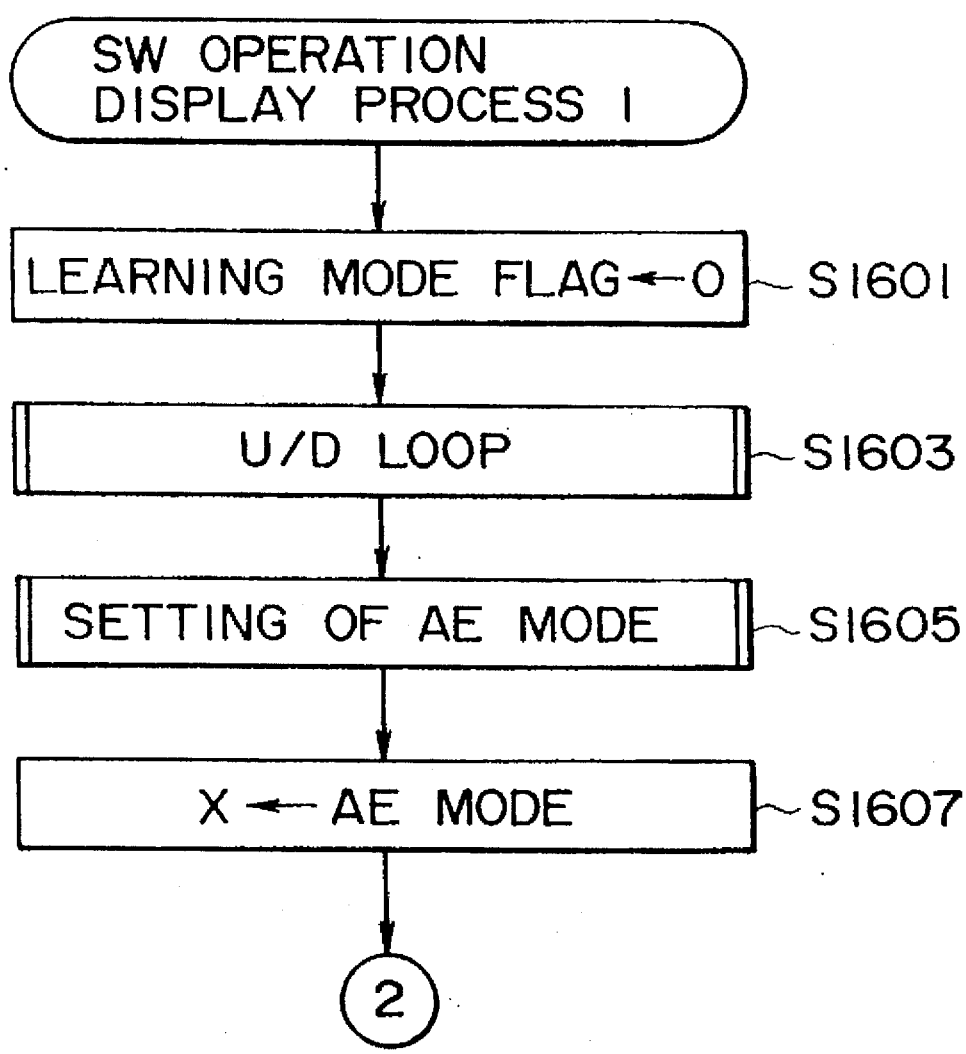
Figure 16C:
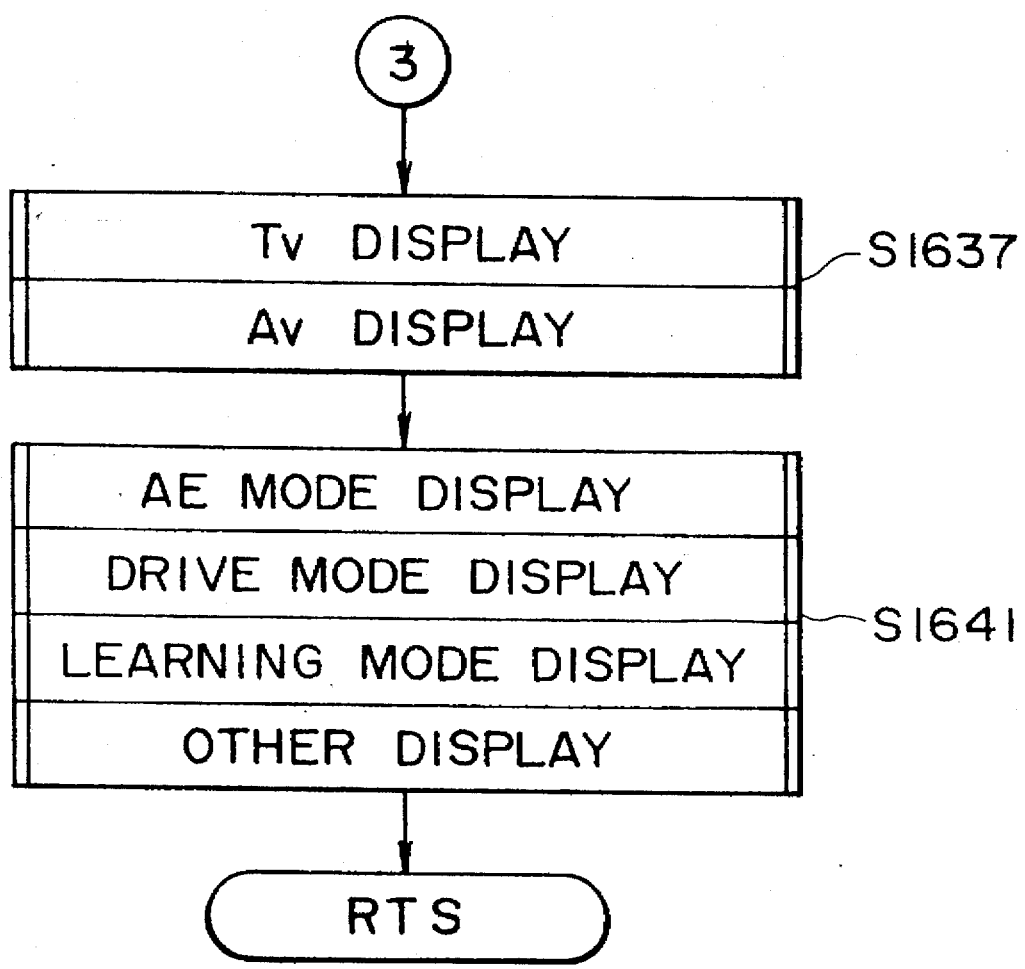

In the POFF loop, the SW operation display loop process is called at first (see FIG. 15). In the SW operation display loop, flags including release SW, photometric SW, main SW, clear SW, UPSW, DOWNSW, drive SW, mode SW, and HYPSW are set to "1" or "0" depending on whether the release switch 72, the photometric switch 70, the main switch 110, the clear switch the UP switch 78, the DOWN switch 80, the drive switch 82, the mode switch 84, and the hyper switch 88 are turned on or off. The various flags that are set depending on the operation of the switches are supplied to the CPU 20, which controls the display of the external display LCD panel 34 and the viewfinder display LCD panel 62 based on the supplied flags (S1211, S1213). If the main switch SW is set to "0", i.e., if the main button 36 is in the OFF position, then only the SW operation display loop is called at a cyclic period of 128 ms (S1211, S1213), and the power-hold mode remains turned off (S1229, S1231, S1233). Even if the main SW is set to "1", i.e., even if the main button 36 is in the PICT position or the ON position, in so far as all of the flags:

(1) release SW,
(2) photometric SW,
(3) HYPSW,
(4) UPSW, and
(5) DOWNSW are set to "0" or a PF mode flag is set to "0", the power-hold mode remains turned off, and only the SW operation display loop is called at intervals of 128 ms (S1217 through S1233, S1211, S1213). The PF mode flag is set to "1" when the camera is being operated on in the special function setting mode (PF mode), which will be described later on. In the PF mode (with MAIN SW set to "1"), therefore, control goes to a RESTART process regardless of the conditions of the operation switches.

If either one of the release switch, the photometric switch, the hyper switch, the UP switch, or the DOWN switch is turned on, i.e., if either one of the flags (1) through (5) above is set to "1", while the POFF loop is being executed, the RESTART process shown in FIGS. 18A and 18B is carried out.

RESTART PROCESS

Figure 13A:
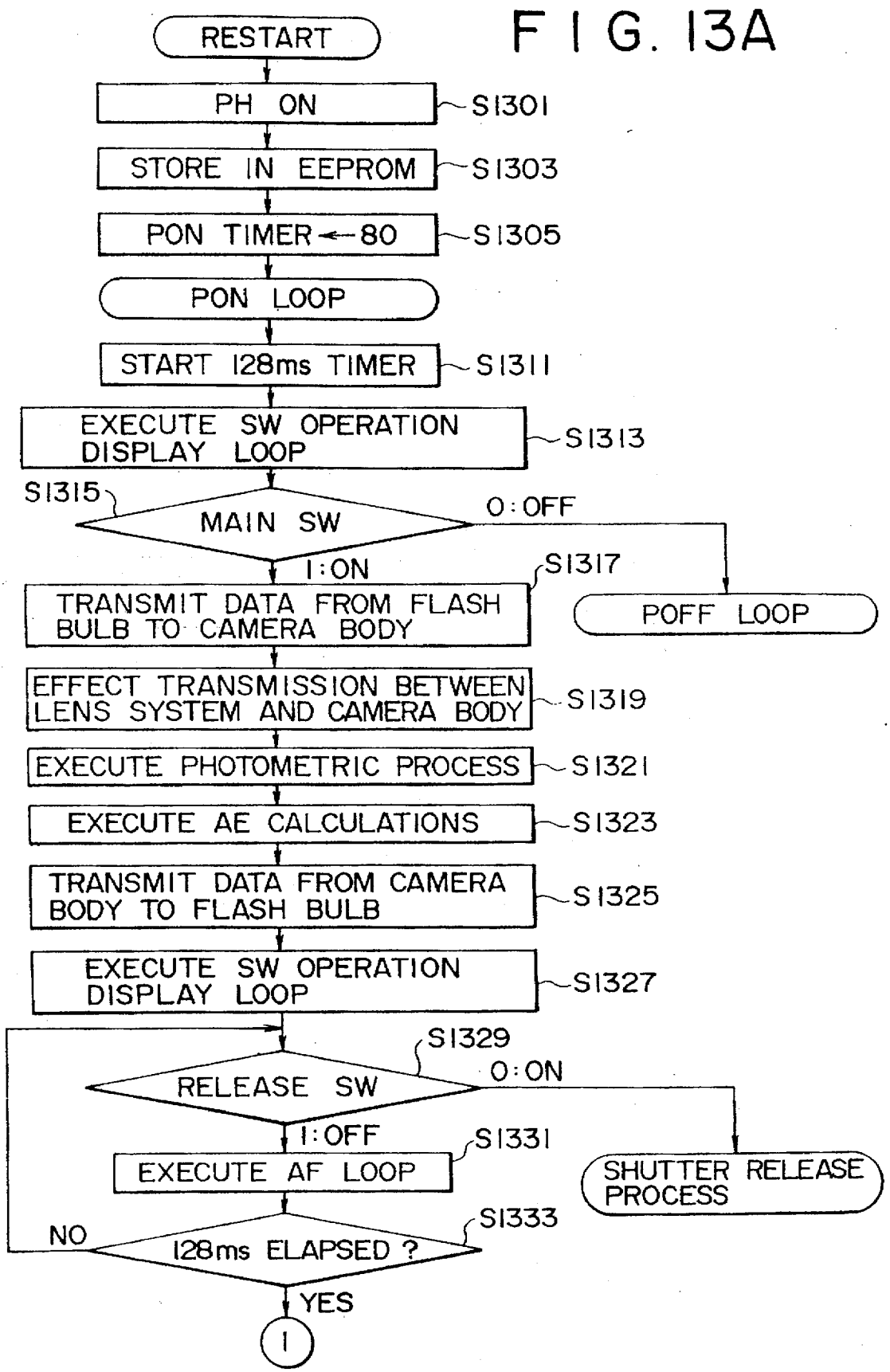
FIG. 13A, 13B illustrate a flowchart of a control sequence when a RESTART PROCESS is called.
Figure 13B:
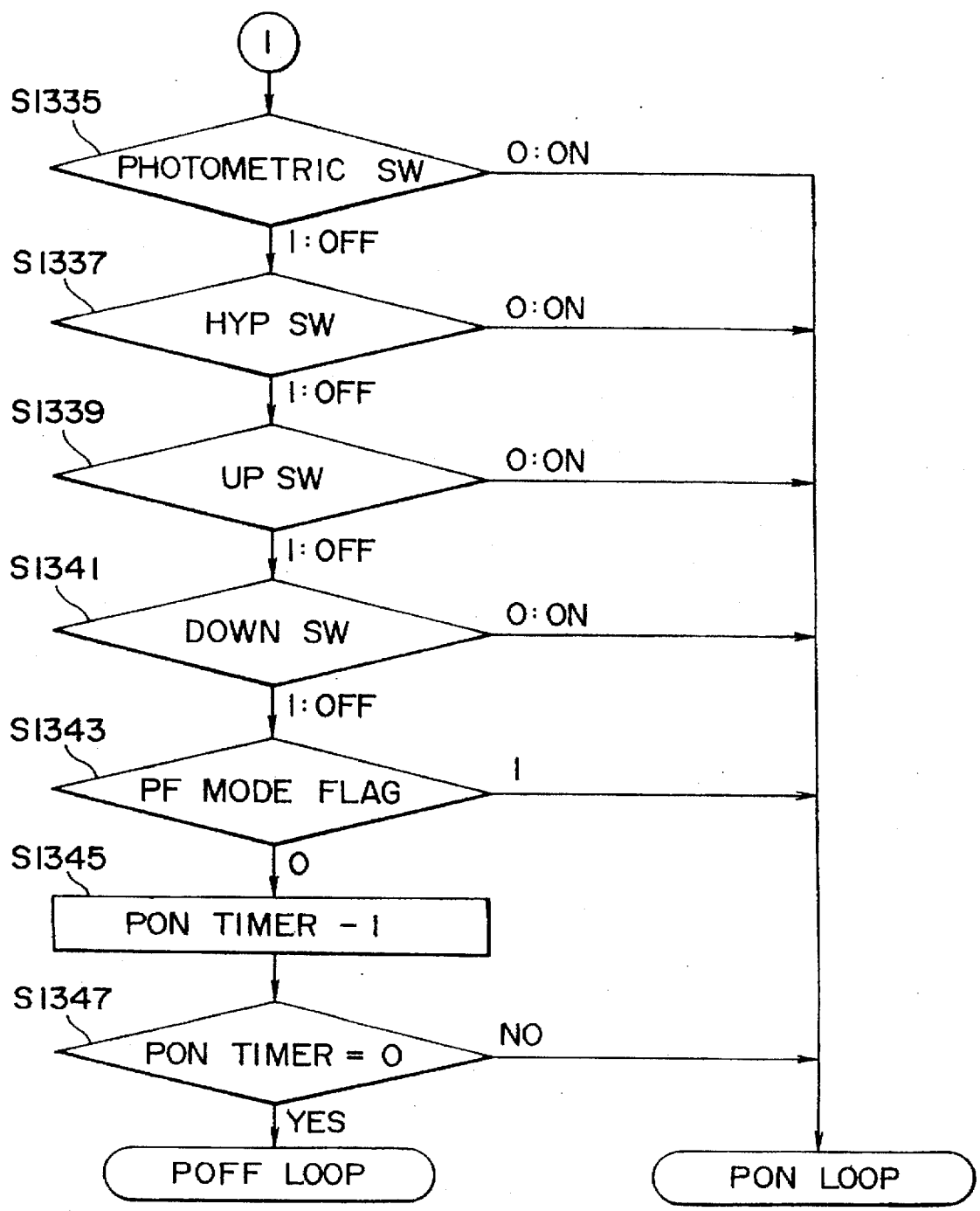

FIGS. 13A and 13B illustrate a flowchart showing the RESTART process. The RESTART process is executed if either one of the flags (1) through (5) above is set to "1" or the PF mode flag is set to "1" while the main SW is set to "1" in the POFF loop shown in FIG. 12. Initially, the power-hold mode is turned on to supply electrical energy to the overall hardware arrangement of the camera in step S1301, and data stored in the EEPROM 106 is read again and written in the (S1303). In step S1305, a counter PON timer is set to the number of times that the PON loop is to be repeated subsequently. Then, control proceeds to the PON loop.

PON LOOP

In the PON loop, AE calculations for calculating a Tv/Av value are carried out based on data communications between the camera body 10 and the lens system 12, data communications between the camera body 10 and an external flash bulb (not shown), a photometric process, and the results of the photometric process. A shutter release process can also be carried out in the PON loop.

First, in order to determine the cyclic period of the PON loop, a 128-ms timer is started (S1311), and the display on the external display LCD panel 34 and the viewfinder display LCD panel 62 is controlled according to the SW operation display loop (S1313). If main SW is set to "1" (S1315: main SW="1"), then data are transmitted from the external flash bulb to the camera body 10 and data communications take place between the camera body 10 and the lens system 12 (S1317, S1319). Then, a normal photometric process is carried out (S1321), and AE calculations are carried out based on photometric data (S1323). Based on the results of the AE calculations, data are transmitted from the camera body 10 to the flash bulb (S1325), after which data including the results of the AE calculations are displayed in the SW operation display loop (S1327).

If the shutter release button 26 is fully pressed (S1329: release SW="0"), the shutter release process is executed. If the release switch 72 is turned off (S1329: release SW="1"), then an AF loop is called. Until the 128-ms timer runs out, the AF loop is repeatedly called while the release SW is being monitored (S1329 through S1333). After the elapse of 128 ms, if all of the photometric switch, the hyper switch, the UP switch, and the DOWN switch are turned off, i.e., photometric SW, HYPSW, UPSW, and DOWNSW are set to "1", if the PF mode flag remains set to "0", indicating that the special function setting mode is not selected (S1335 through S1343), and if the PON loop has been repeated the number of times that has been set in step S1305, then control goes to the POFF loop (S1345 through S1347). Otherwise, the PON loop is repeated.

SHUTTER RELEASE PROCESS

FIG. 14 is a flowchart illustrating the shutter release process. In the shutter release process, a photometric process (S1401), data communications from the flash bulb to the camera body 10 (S1403), AE calculations (S1405) described later on, data communications from the camera body 10 to the flash bulb (S1407) based on the results of the AE calculations, and the SW operation display loop (1409). Thereafter, a series of exposure operations are carried out which include a process of lifting the main mirror and controlling the aperture (S1411), an exposure process (S1413), and a process of winding the film and lowering the mirror (S1417). In the camera of the present invention, after the exposure process, learning mode calculations, described later on, are carried out (S1415) to learn settings made by the user. After the shutter release process, control goes back to the PON loop shown in FIGS. 13A and 13B.

SWITCH OPERATION DISPLAY LOOP PROCESS

FIG. 15 is a flowchart illustrating the SW operation display loop process for controlling the display on the external display LCD panel 34 and the viewfinder display LCD panel 62 in response to operation of the control buttons of the camera. In the SW operation display loop, various processes are carried out and displayed including the display of an ISO film sensitivity and switching between the PF setting mode and other photographing modes in response to operation of the control buttons.

In step S1501, the condition of the various switches that are set by the control buttons of the cameras are read, and various flags (main SW, PF mode flag, mode SW, drive SW, PFOUTM flag) are set based on the read condition of the switches.

When the mode button 40 and the drive button 38 are pressed simultaneously while the camera is in a normal condition ready to take pictures, the ISO film sensitivity is displayed on the external display LCD panel 34. Continued pressing of the mode button 40 and the drive button 38 for a predetermined time causes the camera to enter the PF setting mode, i.e., the special function setting mode. In the PF setting mode, the PF mode flag is set to "1" as described later on. If main SW is set to "0" in the SW operation display loop, then the external display LCD panel 34 and the viewfinder display LCD panel 62 are de-energized (S1521). Then, after a PF cancelling process is carried out (S1523), control returns to the location where the SW operation display loop has been called.

If main SW is set to "1" and the camera is not in the PF setting mode, then the status of mode SW and drive SW are determined. If the mode switch SW and the drive switch SW are both set to "0", then control branches off into different flows depending on the PFOUTM flag. The PFOUTM flag is set to "1" only when the PF setting mode has ended normally after the camera has entered the PF setting mode. Normally, the PFOUTM flag is set to "0". To return to the ordinary exposure mode from the PF setting mode, the mode button 40 and the drive button 38 are simultaneously pressed continuously for a predetermined time. If both mode SW and drive SW are on and hence set to "0", then a PF timer is incremented from 0. If the count of the PF timer is less than "31", then the ISO film sensitivity is displayed on the external display LCD panel 34, and at the same time a remaining period of time until the camera enters the PF mode is graphically displayed as a according to a PF timer display process, as described later on. After the PF timer display process, control returns to the location where the SW operation display loop has been called.

If the PF timer counts "31" or more in step S1513, then the PF mode flag indicating that the camera has entered the PF mode is set to "1", and a PFINM flag is also set to "1". The condition that the PF timer count ="31" corresponds to a time period of about 2 seconds.

If the PF mode flag is set to "1", then control goes from step S1505 go a PF loop the next time the SW operation display loop is called. The PF loop monitors the status of the various switches while in the PF setting mode. The PF loop will be described later on.

In this embodiment, the ISO film sensitivity is displayed only when the mode button 40 and the drive button 38 are simultaneously pressed. However, the external display LCD panel 34 may be controlled such that once the mode button 40 and the drive button 38 have been pressed, the external display LCD panel 34 will display the ISO film sensitivity for a predetermined period of time even when the mode button 40 and the drive button 38 are subsequently released.

If either one of the mode switch and the drive switch is turned off while the ISO film sensitivity is being displayed, i.e., while the remaining period of time until the camera enters the PF mode is still being displayed as a graph, then the PF timer is cleared and set to "0", and the PFOUTM flag is set to "0".

If the mode button 40 and the drive button 38 are continuously pressed upon switching from the PF setting mode to the exposure mode, then since the PFOUTM flag is set to "1", control goes from step S1511 to an SW operation display process 1, and will not return to the PF setting mode. In order to return to the PF setting mode again, it is necessary to release either one of the mode button 40 or the drive button 38 to set the PFOUTM flag to "0" in step S1525, and then to press both the mode button 40 and the drive button 38 simultaneously again. As described above, immediately after switching from the PF setting mode to the exposure mode, the PF setting mode is not immediately started again even if the drive button and the mode button are continuously pressed. Consequently, the camera can be easily operated.

During operation in the normal exposure mode, unless the mode button and the drive button are both pressed, processing regarding the PF setting mode is not carried out, and control goes to the SW operation display process 1 (S1507, S1509, S1525).

SWITCH OPERATION DISPLAY PROCESS

FIGS. 16A, 16B-I, 16B-II, and 16C illustrate a flowchart of the SW operation display process 1. The SW operation display process 1 controls the display of data chosen by the UP/DOWN lever 28 for setting.

First, a learning mode flag is set to "0" in step S1601. In this embodiment, a learning mode inhibit flag is set to "0" (S1925, FIG. 19 or S2611, FIG. 26), indicating permission of a learning mode, and the learning mode flag is set to "1" (S1615, FIG. 16) for effecting a learning mode only when a learning mode (portrait, landscape, moving subject, and close up) is selected, as described later on.

In step S1603, an U/D loop is executed to set and display various data depending on the operation of the UP/DOWN lever 28 as described later in detail. An AE mode setting process, shown in FIG. 35, is called at step S1605 which determines whether the exposure mode, is to be the green mode, the portrait mode, the landscape mode, the moving subject mode, the close up mode, the program mode, the automatic mode, or the manual mode, depending on the data set in the U/D loop shown in FIG. 34 and also on whether the main button 36 is in the PICT or ON position, as described later in detail, and sets a variable "AE mode" to a numerical value X depending on the exposure mode.

Control then branches off into different flows depending on the value of X, i.e., exposure mode (S1607, S1609). In FIG. 16B-I and 16B-II, steps S1611 through S1621 belong to a program shift process as described later on, and steps S1623, S1625 belong to an exposure correction process. If the exposure mode is the green mode or the manual mode, then the above steps are not carried out as no program shift and no exposure correction are effected. In the automatic mode, only the exposure correction is effected and no program shift takes place. In the program mode, it is possible to carry out a program shift though no graph is displayed, and control starts from step S1619.

If the exposure mode is the portrait mode, the landscape mode, the moving subject mode, or the close up mode, then the camera of the present invention learns the amount of a program shift that has been set by the user. The learning function is effective in so far as a film cartridge is loaded in the camera and the learning mode inhibit flag has been set to "0" in the PF setting mode. As long as the above conditions are satisfied, the learning mode flag is set to "1" (S1611 through S1615).

In a P shift graph display process, the amount of a program shift that has been set by the user is displayed as a graph on the external display LCD panel 34 and the viewfinder display LCD panel 62. The amount of a program shift that has been set may be cancelled when the Tv/Av button 30 alone is pressed (see PSHIFT CLEAR PROCESS, FIG. 38, S3805). In step S1619, the program shift may be cancelled as described later in detail.

In step S1621, the letters "Tv" and "Av" and the arcuate overlines 58k, 58m are displayed on the external display LCD panel 34.

As described above, it is possible to set the camera for exposure correction if the exposure mode is the portrait mode, the landscape mode, the moving subject mode, the close up mode, the program mode, or the automatic mode. Depression of the hyper button 52 causes the external display LCD panel 34 and the viewfinder display LCD panel 62 to display a graph for exposure correction. With the graph for exposure correction being displayed, i.e., with the hyper button 52 pressed, the UP/DOWN lever 28 can be turned to set an amount of exposure correction (S1623). The amount of exposure correction thus set can be cleared by pressing the Tv/Av button 30 with the graph for exposure correction being displayed (S1625). Details of the process for displaying and clearing exposure correction will be described later on.

If the exposure mode is the automatic mode, then switching between the shutter speed preference mode and the aperture preference mode can be made by pressing the Tv/Av button 30 (S1627). In the shorter speed preference mode, a Tv value can be altered by turning the UP/DOWN lever 28. In the aperture preference mode, an Av value can be altered by turning the UP/DOWN lever 28. At this time, the external display LCD panel 34 displays the arcuate overlines 58k or 58m over whichever of the Tv value or the Av value is preferred, and the viewfinder display LCD panel 62 displays an underline below whichever of the Tv value or the Av value is preferred (S1629).

If the exposure mode is the manual mode, then an alteration of the manually set Tv/Av value from a calculated optimum exposure value, which is displayed as a graph according to an exposure display process (S1631), can be made. If hyper button 52 alone is pressed in the manual mode, then an optimum exposure value is set which is calculated according to the program. In the manual mode, the Tv/Av value is set by the UP/DOWN lever 28. Whether the Tv or Av value is to be altered by the UP/DOWN lever 28 is determined by the Tv/Av switch 30 as with the automatic mode (S1633). As with the automatic mode, the external display LCD panel 34 displays the arcuate overline 58k or 58m over whichever of the Tv or Av value is varied by the UP/DOWN lever 28, and the viewfinder display LCD panel 62 displays an underline below whichever of the Tv or Av value is preferred (S1635).

The Tv and Av values thus determined are displayed on the external display LCD panel 34 and the viewfinder display LCD panel 62 (S1637). The external display LCD panel 34 and the viewfinder display LCD panel 62 also display the exposure mode and the drive mode, an indication as to whether a learning mode is to take place or not, and various other data according to the modes (S1641).

PF LOOP PROCESS

FIG. 17 is a flowchart of the PF loop process. The PF loop controls the branching into a PF loop 1 for setting and altering various special functions in the PF setting mode, and a process for returning to the normal exposure mode after a function has been set.

A special function (PF) is set by selecting settable items with the mode button 40 and altering the data settings by turning the UP/DOWN button 28. If one minute elapses without setting any special functions during operation in the PF setting mode, then the PF setting mode is cancelled, and control returns to the exposure mode. To this end, if one of the mode switch 84 (S1701), the UP switch 78 (S1703), or the DOWN switch 80 (S1705) is turned on, then a PF end timer is set to "0" (S1707), and if none of the mode switch, the UP switch, and the DOWN switch is turned on, the PF end timer continues to measure time.

When control proceeds from the normal exposure mode to the PF loop in response to simultaneous pressing of the mode button 40 and the drive button 38 for a predetermined period of time, since the PFINM flag has been set to "1" in step S1527 in FIG. 15, control goes from step S1715 in FIG. 17 to a PF display process. In as much as the PFINM flag is set to "0" in the PF display process, the PF display process is executed only when control goes to the PF setting process. Once the mode button 40 or the drive button 38 is released, the PF display process will not be executed during operation in the PF setting mode.

The setting items are changed by the PF loop 1 when the mode switch is turned on, i.e., mode SW is set to "0" (S1711). If both mode SW and drive SW are set to "0" for a predetermined period of time, which is of 2 seconds in this embodiment, then control proceeds to a PF setting end process, in which the special function that has been set is installed, i.e., written in the EEPROM 106. The time until control goes to the PF setting end process is measured and displayed in the same manner as the steps S1513, S1515, S1519 shown in FIG. 15 (S1717, S1719, S1721).

PF DISPLAY PROCESS

FIG. 18 is a flowchart of the PF display process that is executed when control proceeds from the normal exposure mode to the PF setting mode. The PF display process is executed when control enters the PF setting mode after the lapse of a predetermined period of time after the ISO film sensitivity has been displayed by simultaneously pressing the mode button 40 and the drive button 38 while the camera is operating in the normal exposure mode.

If the count of the PF timer reaches a predetermined value (31) or more, i.e., if the mode button 40 and the drive button 38 are continuously pressed for 2 seconds, the PF mode flag and the PFINM flag are set to "1" in step S1527 in FIG. 15. Then, when the SW operation display loop shown in FIG. 15 is executed with the mode button 40 and the drive button 38 being pressed, control goes to the PF loop in step S1505, and goes from step S1715 in the PF loop in FIG. 17 to the PF display process in FIG. 18.

In the PF display process, the letters "PF" are displayed indicating that control has entered the PF setting mode, and a mode SWM flag (described later on) is set to "1". If the Tv/Av button 30 is not pressed at this time (S1803: clear SW="1"), then control returns to the location where the SW operation display loop branched into the PF display process has been called.

The camera of this embodiment is arranged such that all special functions that are set are cleared and default values are set if the Tv/Av button 30 is pressed while "PF" is being displayed on the external display LCD panel 34 by pressing the mode button 40 and the drive button 38. Such a process is executed in steps S1805 through S1815. Depression of the Tv/Av button 30 (S1803: clear SW="0") sets the mode SWM flag to "0" (S1805). In order to set the PF timer to "0" when the process of step S1805 and the following steps are executed for the first time, control branches into different flows depending on a PFINM2 flag in step S1807. Specifically, the PFINM2 flag is set to "0" in a first cycle, and set to "1" in second and subsequent cycles. In the second and subsequent cycles, therefore, the PF timer is not reset. Steps S1811 through S1815 are similar to the steps S1515 through S1519 shown in FIG. 15 or the steps S1717 through S1721 shown in FIG. 17 in that the remaining period of time until control goes to a PF all-clear process to clear settings is displayed as a graph. Upon elapse of a predetermined period of time, i.e., when the count of the PF timer exceeds "31", control goes to the PF all-clear process which changes the settings to the default values.

PF LOOP 1 PROCESS

FIGS. 19A, 19B-I and 19B-II is a flowchart of the PF loop 1 process for controlling the setting of special functions and display of the settings.

The camera of this embodiment is arranged such that if no settings are made for one minute or more during operation in the PF setting mode, all the settings during the operation in the PF setting mode are cancelled, and the settings immediately before the control went to the PF setting mode are retained as they. Were. Therefore, step S1901 determines whether the PF end timer has run for one minute or more. As shown in steps S1701 through S1707 in FIG. 17, the PF end timer is reset each time one of the mode switch, the UP switch, or the DOWN switch for the PF setting mode are judged as being turned on. That is, each time the mode button 40 or the UP/DOWN lever 28 is operated on, the PF end timer is set to "0". If the mode button 40 and the UP/DOWN lever 28 are not operated for one minute or longer, then control proceeds from step S1901 to a PF cancel process.

During operation of the PF setting mode, control goes from step S1901 to step S1903. In step S1903, the PFINM flag is set to "0", and the PF timer is set to a count value "0".

The PFINM flag is set to "1" in step S1527 in FIG. 15 when control goes from the exposure mode to the PF setting mode, causing control to branch to the PF display process in step S1715 in FIG. 17. If the mode button 40 and the drive button 38 remain pressed after control has entered the PF setting mode, then because the PFINM flag is set to "1", control always goes from step S1715 to the PF display process. Once the mode button 40 or the drive button 38 is released, the PF display process is no longer executed, and control proceeds from step S1715 to step S1717, permitting the PF setting end process to be carried out.

For shifting from the PF setting mode to the exposure mode, it is necessary to press the mode button 40 and the drive button 38 simultaneously for a predetermined period of time. The PF timer serves to measure such a predetermined period of time. As can be seen from steps S1711, S1713 in FIG. 17 in connection with step S1903 in FIG. 19, the PF timer is set to "0" once the mode button 40 or the drive button 38 is released.

Then, steps S1905 and S1907 determine whether the UP/DOWN lever 28 is operated on or not. If the UP/DOWN lever 28 is turned to increase designated variable data, then a UPM flag is set to "1" (FIG. 23) in the U/D loop, and if the UP/DOWN lever 28 is turned to reduce designated variable data, then a DOWNM flag is set to "1" (FIG. 23) in the U/D loop (FIG. 22).

If the UP/DOWN lever 28 is not operated, then settable items as special functions are changed when the mode button 40 is pressed in step S1937 of a process called in step S1909. The camera of this embodiment has five items, given below, as special functions that can be changed:

(A) ISO film sensitivity,
(B) Learning mode changing level,
(C) Whether a sound is to be generated or not when the lens system is automatically focused,
(D) Whether a learning mode is to take place or not, and
(E) Clearing of a learning mode.

These five items (A), (B), (C), (D), (E) are selected for setting successively in the order named each time the mode button 40 is pressed in the PF setting mode. When the mode button 40 is pressed once more while the item (E) is being selected, the item (A) is selected again.

The U/D loop is executed only when the mode SWM flag is found to be "0" in step S1911. In the U/D loop, the data of the settable items are changed by turning the UP/DOWN lever 28. In this embodiment, only when one of the mode button 40 or the UP/DOWN lever 28 is operated, can the settable items or the data be changed. Step S1911 determines whether the U/D loop is to be called or not based on the mode SWM flag. The mode SWM flag is set to a different value in a PF mode UP process in step S1909 depending on mode switch 84 as described later in detail.

Steps S1915 through S1927 display an item that is being set and its data according to a value X allocated to the mode. If the item to be set is the item (A) above, then the ISO film sensitivity is displayed. If the item to be set is the item (B), then a numerical value ranging from "0" to "4" corresponding to a combination of a selected learning level and the number of times that the learning mode is to take place is displayed. If the item to be set is the item (C), then a numeral "0" indicating that the electronic buzzer 108 is to be energized when the lens system is in focus or a numeral "1" indicating that the electronic buzzer 108 is not to be energized when the lens system is in focus is displayed, and the electronic buzzer 108 is energized periodically when the numeral "0" is selected or is not energized when the numeral "1" is selected, allowing the user to confirm the setting aurally. If the item to be set is the item (D), then a numeral "0" indicating that a learning mode is to take place or a numeral "1" indicating that a learning mode is not to take place is displayed, and a learning mark 56s is energized or de-energized on the external LCD display 34, allowing the user to confirm the setting visually. If the item to be set is the item (E), then a symbol indicating a selected exposure mode and the letters "CL" indicating that clearing of a learning mode is set are displayed.

The PF loop 1 branches off from the SW operation display process. Therefore, after the PF loop is finished, control returns to the location where the SW operation display process has been called.

PF MODE UP PROCESS

FIG. 19C is a flowchart of the PF mode UP process that is called in step S1909 shown in FIG. 19A. The PF mode UP process is called when the UP/DOWN lever 28 is not turned. When the PF mode UP process starts to be executed, it first determines whether the mode button 40 has been pressed or not (S1931). If mode SW has been set to "1", then the mode SWM flag has been set to "0". Thus, control will proceed from step S1911 to step S1913 in FIG. 19A, making it possible to alter the data with the UP/DOWN lever 28.

If mode SW has been set to "0", then the PF mode is incremented (S1937) to change the settable item as long as the mode SWM flag is set to "0". Since the PF mode is of five types ranging from 0 to 4, when the PF mode reaches 5, it is again set to "0" (S1939). Once the PF mode is incremented, the mode SWM flag is set to "1" (S1943). After the particular settable item has been changed by pressing the mode button 40, the process of changing the setting items is not executed in step S1935 if the mode button 40 remains pressed. In other words, the settable items are not actually changed unless the mode button 40 is released. Therefore, the camera is highly convenient to operate on.

After the above process, control returns to the location where the PF mode UP process has been called.

PF ALL-CLEAR AND PF SETTING END PROCESS

FIG. 20 is a flowchart of the PF all-clear process and the PF setting end process.

The PF all-clear process is executed when the count of the PF timer reaches "31" or more in step S1811 in the PF display process shown in FIG. 18. Specifically, the PF all-clear process is executed when the Tv/Av button 30 is continuously pressed for a predetermined time of 2 seconds after control has entered the PF setting mode by simultaneously pressing the mode button 40 and the drive button 38 for a predetermined period of time, with the external display LCD panel 34 displaying "PF". In the PF all-clear process, all data, the setting of which can be altered in the PF setting mode, are returned to initial values (S2001).

If a DX film is loaded in the camera, then an ISO film sensitivity read from the DX code of the film is set as an initial value. Otherwise, an ISO film sensitivity of 100 is set as a default value. With respect to the learning mode changing level, a changing level =0, the number of times 1 that the learning mode is to take place =3 times, and the number of times 2 that the learning mode is to take place =3 times are set as initial values. With respect to the sound to be generated when the lens system is focused, an initial setting is that the electronic buzzer 108 is to be energized when the lens system is focused. As regards the item as to whether learning is to take place or not, an initial setting is that a learning mode is to take place. In order to clear learning modes with regard to the portrait, landscape, moving subject, and close up exposure modes, all learning mode clear flags corresponding to the respective modes are set to "1".

The above settings are written in the RAM. In the PF setting end process in step S2011 and the following steps, the set data in the RAM are written in the EEPROM 108.

Concerning the items of ISO film sensitivity, the learning mode changing level, whether a sound is to be generated when the lens system is focused, and whether a learning mode is to take place, the data in the that gave been set and altered in the PF setting mode correspond to the data in the EEPROM. Therefore, the data in the RAM are written in the EEPROM (S2011). With respect to the clearing of a learning mode, since only the value of the learning mode clear flag is altered for each mode (S1927, FIG. 19 B-II), GENPSFT (X) and STDYCNT(X) in the RAM are reset to initial data and written in the EEPROM only when the value of the learning mode clear flag (X) corresponding to each mode is "1" (S2013 through S2019).

After the above process, control proceeds to step S2111 in FIG. 21 to reset the various flags and the counter. At this time, the PFOUTM flag indicating that control has shifted from the PF setting mode to the exposure mode is set to "1".

The PF all-clear process branches off from the SW operation display loop. Therefore, when the PF all-clear process comes to an end, control returns to the location where the SW operation display loop has been called.

PF CANCEL PROCESS

FIG. 21 is a flowchart illustrating the PF cancel process.

In the camera of this embodiment, special functions are set in the PF setting mode, and the settings are written in the EEPROM when the mode button 40 and the drive button 38 are simultaneously pressed continuously for a predetermined period of time (see FIGS. 17 and 20), after which the PF setting mode ends. If the PF setting mode is interrupted in another way, i.e., if the main button 36 is shifted into the OFF position during operation in the PF setting mode, or if no settings are made for one minute or more in the PF setting mode, then the data altered in the PF setting mode are not written into the EEPROM 106, but cancelled. In particular, if no settings are made for one minute or more in the PF setting mode, then control automatically shifts from the PF setting mode to the exposure mode. If the PF cancel process is executed, the learning mode clear flag (X) is set to "0" so that the learning mode will not be cleared in any mode (S2101).

The PF cancel process branches off from the SW operation display loop. Therefore, when the PF cancel process comes to an end, control returns to the location where the SW operation display loop has been called.

U/D LOOP PROCESS

FIG. 22 is a flowchart of the U/D loop process for varying data in response to turning of the UP/DOWN lever 28.

If the DOWN switch 80 is turned on, i.e., if DOWNSW checked in step S2401 of FIG. 24 is set to "0", then the DOWNM flag (DOWN memory flag) is set to "1", and the UPM flag (UP memory flag) is set to "0" (S2409), and if UPSW checked in step S2301 is set to "0", then the UPM flag is set to "1", and the DOWNM flag is set to "0" (S2809), as described later in detail. Therefore, if the UP switch 78 is turned on, then an UP loop flag is set to "1", and an UP loop process is carried out and a DOWN loop process is not carried out (S2201 through S2205). If the down switch 80 is turned on, then the UP loop flag is set to "0", and only the DOWN loop process is carried out (S2207 through S2211). After the above process, control returns to the location where the U/D loop has been called.

UP LOOP PROCESS

FIG. 23 is a flowchart of an UP loop process that is called in the U/D loop (FIG. 22).

If the UP switch 78 is turned off (S2301: UPSW="1"), then no data is altered, and the UP memory flag that indicates that the UP switch 78 is turned off is set to "0" (S2305) and control goes back to the U/D loop.

If the UP switch 78 is turned on (S2301: UPSW="0"), then step S2305 determines whether the UP switch 78 was turned on when the UP loop was previously called. If the UP switch 78 was previously turned on (UP memory flag="1"), control goes to an U/D timer loop process. The U/D loop is repeated at a cyclic period of about 64 ms (twice in 128 ms); thus, if data were altered based on only the condition of the UP switch 78 at the time the UP loop is called, e.g., when the UP switch 78 remains turned on, i.e., when the user has turned the UP/DOWN lever 28 in the direction to increase the variable data and keeps it turned in that direction, then the data would be altered in a very short period of time. To prevent such data alteration from happening, if the UP switch 78 or the DOWN switch 80 is continuously turned on, the period is extended in a software implemented manner in the U/D timer loop.

If the UP memory flag is "0", then data are altered in a data U/D process, and the UP memory flag indicating that the UP switch 78 has been turned on is set to "1", and at the same time the DOWN memory flag indicating that the DOWN switch 80 has not been turned on is set to "0", with the count of an U/D timer used in the U/D timer loop being set to "0" (S2305 through S2309).

DOWN LOOP PROCESS

FIG. 24 is a flowchart of a DOWN loop process that is called in the U/D loop (FIG. 22). Steps S2401 through S2409 are substantially the same as those shown in FIG. 23 according to whether the DOWN switch 80 is turned on or off.

U/D TIMER LOOP PROCESS

Steps S2411 through S2417 of FIG. 24 represent the U/D timer loop process.

In the U/D timer loop, if the count of the U/D timer that is incremented each time the U/D timer loop is executed (S2417) reaches "8" or more (S2411), then special function data is altered (S2413). Specifically, if the U/D timer loop is executed 8 times with the UP/DOWN lever 28 turned, the data is altered in a manner depending on the direction in which the UP/DOWN lever 28 is turned. When the data is altered, the U/D timer is reset, and the count thereof is set to "0" (S2415).

DATA U/D PROCESS

FIG. 25-I and 25-II is a flowchart of the DATA U/D process which carries out a data alteration in response to operation of the UP/DOWN lever 28.

If the process is called during operation in the PF setting mode (S2501: the PF mode flag="1"), control branches off into a PF data U/D process in which a special function is changed by the combined operation of the UP/DOWN lever 28 and the mode button 40.

If the process is called and the PF mode flag ="0", then control branches off into different flows depending on an operation button that is pressed in combination with the UP/DOWN lever 28.

If the UP/DOWN lever 28 is turned while the mode button 40 is being pressed, then the exposure mode is changed (S2503, S2505). If the UP/DOWN lever 28 is turned while the drive button 38 is being pressed, then the drive mode is changed (S2507, S2509). If the UP/DOWN lever 28 is turned while the hyper button 52 is being pressed, then the exposure correction is carried out (S2511, S2513). If only the UP/DOWN lever 28 is operated on, then according to a value X:

(1) a program shift is executed when the photographing mode is any one of the portrait, landscape, moving object, close up, and program modes (S2517, S2519), or (2) the Tv value or the Av value is altered when the photographing mode is the automatic or manual mode (S2521, S2523, S2524). Whether the Av value or the Tv value is to be altered is determined by pressing the Tv/Av button 30.

After the above process, control returns to the location where the data U/D process has been called.

DATA U/D PROCESS

FIG. 26 is a flowchart of the PF DATA U/D process which changes data of the items of the PF (special function) in the PF setting mode.

Data of the special function item that has been chosen for setting by the pressing of the mode button 40 (in step S1909 in FIG. 19A and step S1937 in FIG. 19C) is altered with this process according to the allocated value X (S2601, S2603).

If the item to be set is the ISO film sensitivity, then the ISO film sensitivity is changed stepwise by turning the UP/DOWN lever 28 (S2605).

When the Tv/Av button 30 is pressed while the ISO film sensitivity is being set, an initial value is set as the ISO film sensitivity, e.g., a DX value is set according to a DX code of a film if one is loaded in the camera, or an initial value =100 is set otherwise.

If the item to be set is the learning mode changing level, a variable, representing a changing level for learning and corresponding to a combination of a changing amount and the number of times that the learning mode is to take place, can be set to a value ranging from "0" to "4". One step of the changing amount corresponds to a change of Tv or Av by an amount corresponding to about 0.5 Ev, i.e. one step of the changing amount effects a change of the Tv value by 0.5 in the one direction and a change of the Av value in the opposite direction, so that the Ev value is constant. Thus, if the amount of a program shift that is actually set by the user, in use, is equal to or greater than a changing amount that has been set, then it is learned if that exposure is effected a number of times indicated by the "number of times 1" that the learning mode has been set, and if the amount of a program shift that is actually set by the user, in use, is smaller than a changing amount that has been set, then it is learned if that exposure is effected a number of times indicated by the "number of times 2" that the learning mode has been set (S2807).

If the item to be set is whether the AF sound mode is to be turned on or not, then a focusing ON Inhibit flag toggles between "0" and "1" (S2809).

If the item to be set is whether a learning mode Is to be inhibited or not, then the learning mode inhibit flag toggles between "0" and "1" (S2611).

If the item to be set is the clearing of a learning mode, then a picture indicating the photographing mode Is displayed on the external display LCD panel 34, the UP/DOWN lever 28 is turned to select one or all of the four modes of clearing a learning mode, and the Tv/Av button 30 is pressed to set clearing of a learning mode (S2813).

P SHIFT U/D PROCESS

FIG. 27-I and 27-II is a flowchart of a P Shift U/D process for setting a program shift. If the exposure mode is the green mode, then since no program shift can be effected, the process of step S2703 and the steps that follow is not executed (S2701: P shift inhibit flag ="1").

If the UP/DOWN lever 28 is turned in a positive direction, then a program shift (P shift) is possible only when the Tv value is not in excess of a maximum value and the Av value does not reach a minimum value (S2705: TvMAX ="0", S2707: AvMIN ="0"). If the direction bit, stored in the RAM, that represents the direction of a program shift is negative, then 0.5 is subtracted from the amount of a P shift until it becomes 0. When the amount of a P shift becomes 0, the direction bit is made positive (S2717 through S2721). If the direction bit is positive, 0.5 is added to the amount of a P shift unless the amount of a P shift becomes equal to or greater than 15⅛ (S2713, S2715).

If the UP/DOWN lever 28 is turned in a negative direction, then a program shift is possible only when the Tv value is greater than the minimum value and the Av value does not exceed the maximum value. If the P shift direction bit in the RAM is positive, then 0.5 is subtracted from the amount of a P shift (S2727, S2729). If the amount of a P shift becomes negative as a result of the subtraction, then because the data in the RAM are represented by decimal notation, the data are processed such that they will be represented by a negative direction bit and the absolute value of the amount of a P shift (S2729 through S2733). If the direction bit is negative, then 0.5 is added to the amount of a P shift unless it becomes equal to or greater than the maximum value (S2735, S2727).

EXPOSURE CORRECTION U/D PROCESS

FIG. 28 is a flowchart of an exposure correction U/D process.

If the direction in which the UP/DOWN lever 28 is turned is positive, i.e. if the UPLOOP flag is set to "1" in step S2208, then the exposure correction value Xv is incremented by 0.5 until an upper limit Xv=3.0 is reached (S2801 through S2805), and if that direction is negative, i.e. if the UPLOOP flag is set to "0" in step S2209, then Xv is decremented by 0.5 until a lower limit Xv=–8.0 is reached (S2801 through S2807).

P SHIFT GRAPH DISPLAY PROCESS

FIG. 29 is a flowchart of a P shift graph display process for displaying, as a graph, the amount by which a program shift has been set.

To display a program shift as a graph, data in a P shift display table shown in FIG. 31 are read and displayed based on the direction and amount of a shift of the origin and the direction and amount of a program shift that is set with reference to the origin. In FIG. 31, black dots represent energized areas, and black dots with radial lines indicate that the black dots are alternately turned on and off. Data specified by Y and Z in FIG. 31 are displayed on the external display LCD panel 34 and the viewfinder display LCD panel 62.

In FIG. 29, the direction bit and the amount of a shift of the origin corresponding to an exposure mode that has been set are read from the RAM (S2901 through S2905), and the value of Y in FIG. 31 is calculated from the origin direction bit and the amount of the origin shift (S2907 through S2911). Then, the value of Z shown in FIG. 31 is calculated from the P shift direction bit and the amount of the P shift (S2913 through S2917). If the value of Z is less than or equal to zero or equal to or greater than "10", then Z is set to "0" or "10", respectively (S2919 through S2925). Based on the values of Y and Z thus determined, display data of the display table shown in FIG. 31 are written in the RAM for the LCD panels (S2927, S2929).

EXPOSURE CORRECTION DISPLAY PROCESS

FIG. 30-I and 30-II is a flowchart of an exposure correction display process that is called in step S1623 shown in FIG. 16.

Depending on the exposure correction value Xv that has been set, any one of an Xv zero flag, Xv plus flag, and Xv minus flag is set to "1" (S3001 through S3011).

If HYPSW is on, i.e. set to "0", by pressing the hyper button 52, the exposure correction value Xv is displayed as a numeral (S3013, S3015). Then, an exposure correction graph display process is executed in step S3031 and the following steps.

If HYPSW is off, i.e. set to "1", then no graph display is carried out if the exposure correction value Xv is "0" (S3013, S3017, S3019) and control proceeds to step S1624 in the SW operation display process 1.

If the main button 36 is in the PICT position with HYPSW set to "1" (off), then the mark "+" or "−" is displayed on the external display LCD panel 34 and the viewfinder display LCD panel 62 depending on whether Xv is positive or negative (S3021 through S3027).

If the main button 36 is in the ON position with the hyper switch is turned off ("1"), then control goes to an exposure correction graph display step (S3021: PICTSW="1").

In the exposure correction graph display step, the amount of correction is displayed as a graph on the external display LCD panel 34 and the viewfinder display LCD panel 62, using data in an exposure correction graph display table shown in FIG. 40.

Specifically, data of the exposure correction graph display table shown in FIG. 40 is selected based on the exposure correction value Xv, and graduations are displayed on the external display LCD panel 34 and the viewfinder display LCD panel 62, with the data selected from FIG. 40 being displayed thereon. The exposure correction value that can be displayed as a graph ranges from −2.0 Ev to +2.0 Ev, even though the exposure correction value that can be set ranges from 3.0 Ev to +3.0 Ev. If the exposure correction value is outside of the range that can be displayed in the graph, then it is indicated by turning on and off black-dot marks at the ends of the graph.

After the above process, step S1624 in the SW operation display 1 is carried out.

PF TIMER DISPLAY PROCESS

FIG. 32 is a flowchart of the PF timer display process for displaying a time remaining when the control enters the PF setting mode by simultaneously pressing the drive button 38 and the mode button 40, and also when the control leaves the PF setting mode. Switching between the PF setting mode and the exposure mode is effected when the count of the PF timer reaches a predetermined value of 31 or greater (FIGS. 15 and 18). Therefore, based on the numerical value of the PF timer, PF timer display data shown in FIG. 37 is selected and written in a display RAM for enabling the external display LCD panel 34 to display a graph representative of the remaining period of time (S3201, S3203).

AE MODE U/D PROCESS

FIG. 34 is a flowchart of an AE mode U/D process for selecting an exposure mode with the UP/DOWN lever 28.

Control branches off into different flows at step S3401 depending on the direction in which data are changed, i.e., the direction in which the UP/DOWN lever 28 is turned. If UP switch 78 is turned on and therefore the UPLOOP flag is set to "1" in step S2203 of FIG. 22, then the control goes from step S3401 to step S3403. If the down switch 80 is turned on and therefore the UPLOOP flag is set to "0" in step S2209, then the control goes from step S3401 to step S3421.

Depending on whether the main button 36 is in the PICT position or the ON position, the exposure mode becomes the picture mode (PICT mode) or the full-spec mode (FULL mode) at step S3403. As shown in FIG. 33, an exposure mode is selected by setting one digit of 8-bit data to "1" and the other digits to "0". If the 8-bit data of an exposure mode is indicated as "Exposure mode" [8-bit data], then it may be represented in the PICT mode by:

Green mode: [00000001],
Moving subject mode: [00001000], and in the Full by:
Automatic mode [00000010].

If the 8-bit data is indicated by the decimal notation as "Exposure mode" (decimal number), it may be represented Green mode: (1),
Moving subject mode: (3), and
Automatic mode: (2).

As shown in FIG. 33, when the data in the PICT mode, for example, is shifted from Green mode [00000001], it successively becomes:
Portrait mode [00000010],
Landscape mode [00000100],
Moving subject mode [00001000], and
Close up mode [00010000].

In this embodiment, since there are five exposure modes that can be selected in the PICT mode, the maximum value of the 8-bit data is [00010000]. If the value of the PICT mode has reached "16" in step S3405 shown in FIG. 34, then any exposure mode corresponding to data shifted leftwards does not exist. Therefore, the data is reset to 1. Even when the UP/DOWN lever 28 is continuously turned in the direction to alter the data described above, for example, the green mode can be selected following the close up mode. Consequently, the camera can easily be operated.

Steps S3415 through S3419 are the same as the above process with respect to the FULL mode. Steps S3421 through S3433 are basically the same as described above except that the "1" in the 8-bit data is shifted to the right and when the data reaches the value 1, a further confirmation of the down switch 80 by the UP/DOWN lever 28 leads to resetting the data to its maximum value. As can be seen from FIG. 33, this maximum value in the PICT mode is "16" and in the ON mode is "4".

AE MODE SETTING PROCESS

FIG. 35 is a flowchart of the AE mode setting process for converting the value of the PICT mode or the FULL mode that has been set in the AE mode U/D process shown in FIG. 34 into another variable "AE mode".

In the AE mode setting process, the PICT mode is represented by binary numbers from [00000001] to [00010000], and the FULL mode is represented by binary numbers from [00000001] to [00000100]. The AE mode setting process serves to represent the PICT mode or the FULL mode with one variable "AE mode".

First, an initial value of "AE mode" is set according to the position of the main button 36 (S3501, S3503, S3507). Then, a variable N is made to be the same as the value of the PICT mode or the FULL mode that has been set in the AE mode U/D process shown in FIG. 34 (S3505, S3509). Thereafter, the variable N is shifted rightwards until N=1, and the number of times that the variable N is shifted is added to the initial value of "AE mode", thus obtaining the relationship between the AE mode and the exposure mode as shown in FIG. 36.

P SHIFT CLEAR PROCESS

FIG. 38 is a flowchart of a P shift clear process that is called in step S1619 in FIG. 16. When the Tv/Av button 30 alone is pressed, the amount of a program shift that has been set is cancelled, and the program returns to its original position. In the camera of this embodiment, if the Tv/Av button 30 is pressed while the hyper button 52 is being pressed, then the exposure correction is cleared. Therefore, the program shift is cleared only when the hyper button 52 is not pressed (S3801: HYPSW="1").

EXPOSURE CORRECTION CLEAR PROCESS

FIG. 39 is a flowchart of an exposure correction clear process that is called in step S1625 shown in FIG. 16.

The exposure correction value Xv is set to "0" when the hyper button 52 and the Tv/Av button 30 are simultaneously pressed (S3901 through S3905).

MAIN BUTTON POSITIONS AND INITIAL DISPLAY SCREEN

FIGS. 60B and 60C show, by way of example, display screens of the external display LCD panel 34 and the viewfinder display LCD panel 32 at the time the main button 38 is in the PICT position as shown in FIG. Specifically, FIG. 30A shows the main button 36 shifted to the PICT position, and FIGS. 60B and 60C show the display screens of the external display LCD panel 34 and the viewfinder display LCD panel 62 at this time. In this example, the frame 58b in FIG. 60C indicates the portrait mode as the selected exposure mode.

FIGS. 61A through 61C show an example in which the main button 36 is in the ON position. FIGS. 61B and 61C show the display screens of the external display LCD panel 34 and the viewfinder display LCD panel 62 at this time. In this example, as described later in detail, as indicated by the letter "P", the program mode is selected as the exposure mode, and as indicated by the black dot 58f, an exposure correction is set to −0.5 Ev.

FIG. 62 shows, by way of example, a display screen of the external display LCD panel 34 at the time the main button 36 is in the PICT position as with FIG. 60C. In this example, the portrait mode is selected as the exposure mode. It can also be seen from this display screen that a learning function is turned on, and a program shift of +0.5 Ev has already been learned. A positive exposure correction is carried out. The display of a program shift and the display of an exposure correction will be described later in detail.

PF SETTING MODE DISPLAY

FIGS. 63A through 63G show a display screen of the external display LCD panel 34 at the time the camera enters the PF setting mode process. The PF timer display data shown in FIG. 37 is set in the RAM and displayed according to the PF timer display process that is called in step S1519 of FIG. 15 (FIGS. 63A through 63E). Until the camera enters the PF setting mode, the ISO film sensitivity is displayed in step S1517 shown in FIG. 15. All other displayed data are turned off so that only the required data is displayed. The time it takes after nine dots are displayed until they are all turned off is about 2 seconds.

Figure 63A:
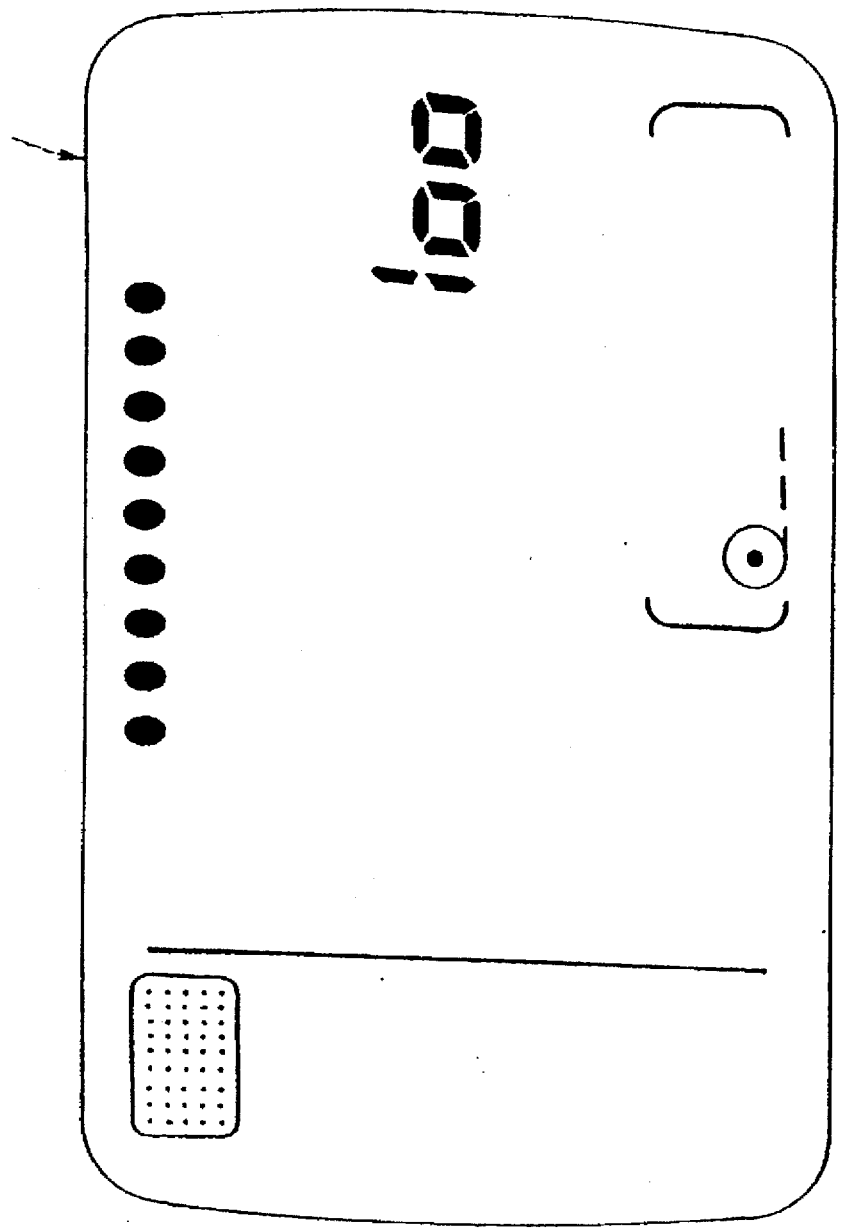
Figure 63B:
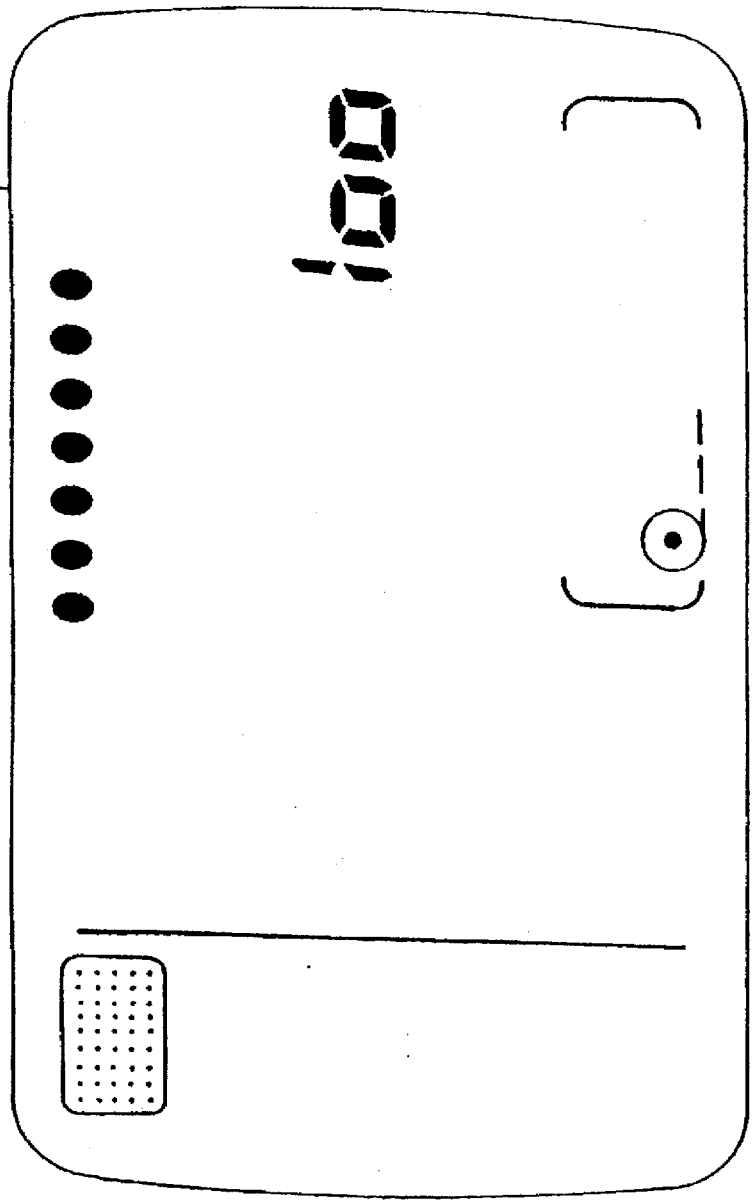
Figure 63C:
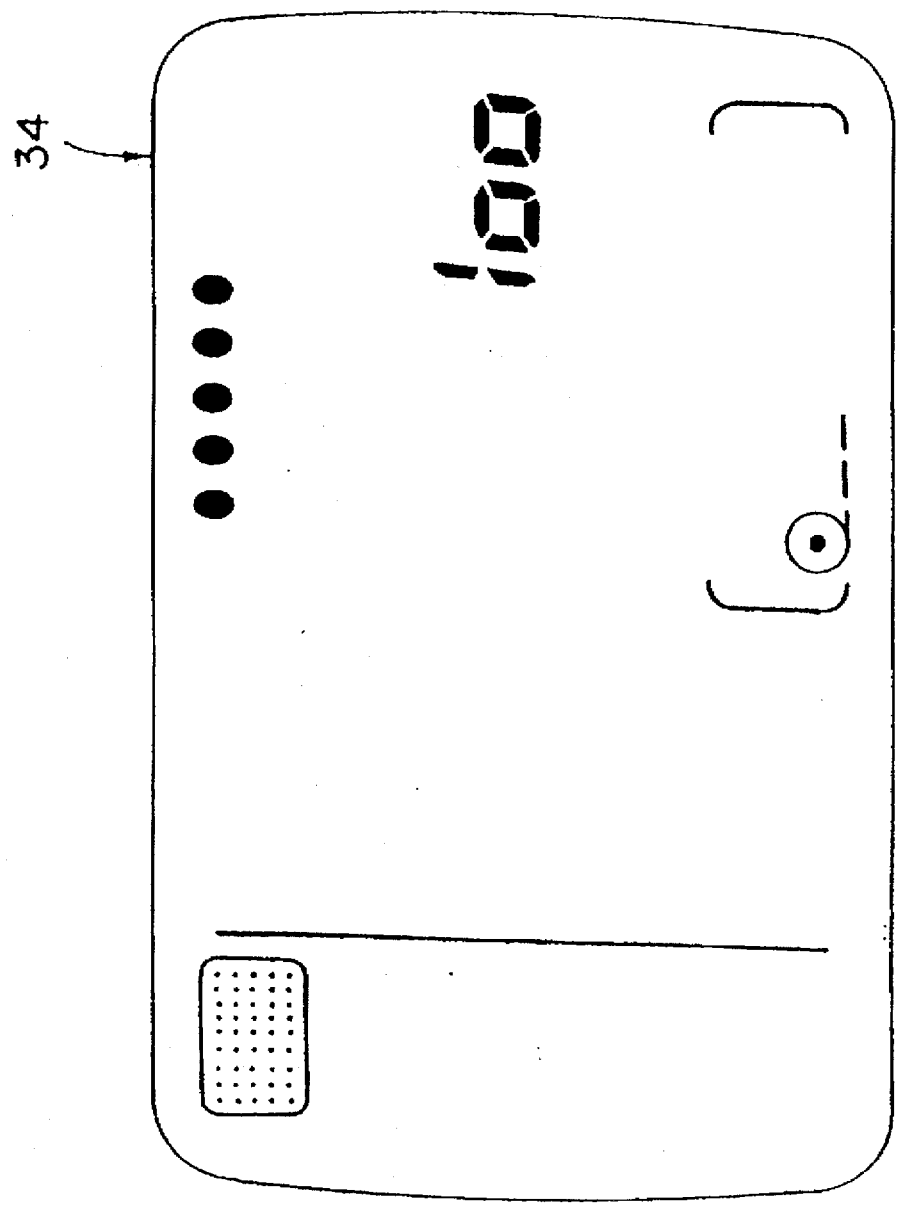
Figure 63D:
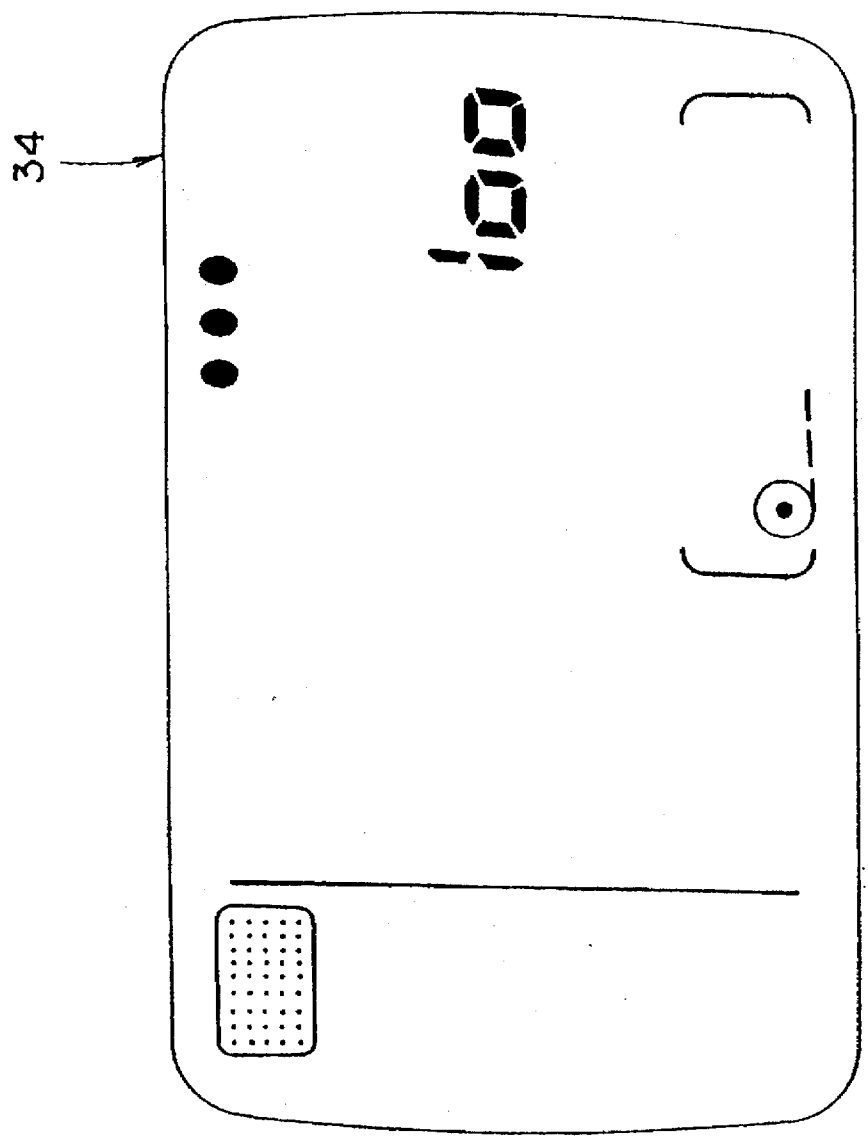
Figure 63E:
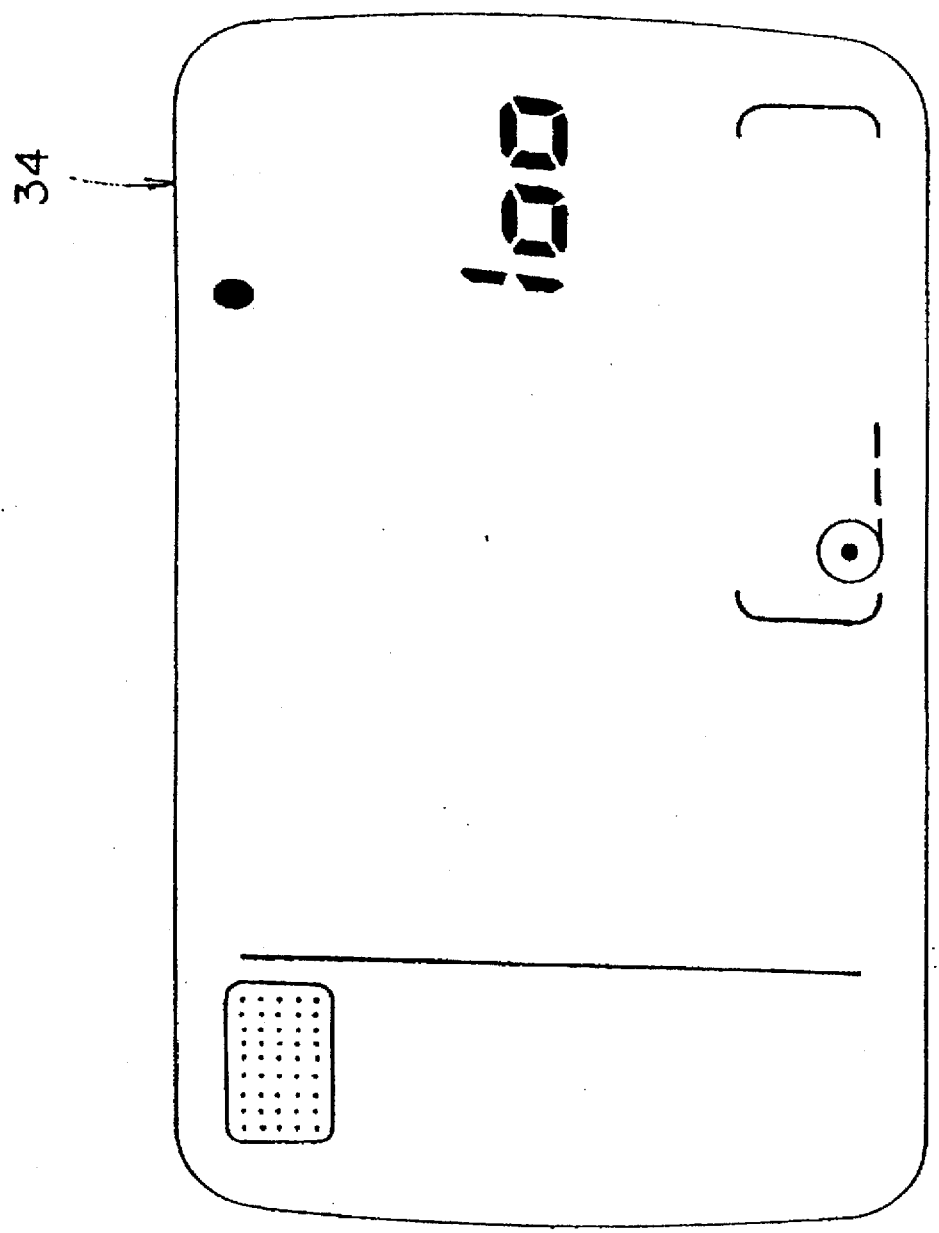
Figure 63F:
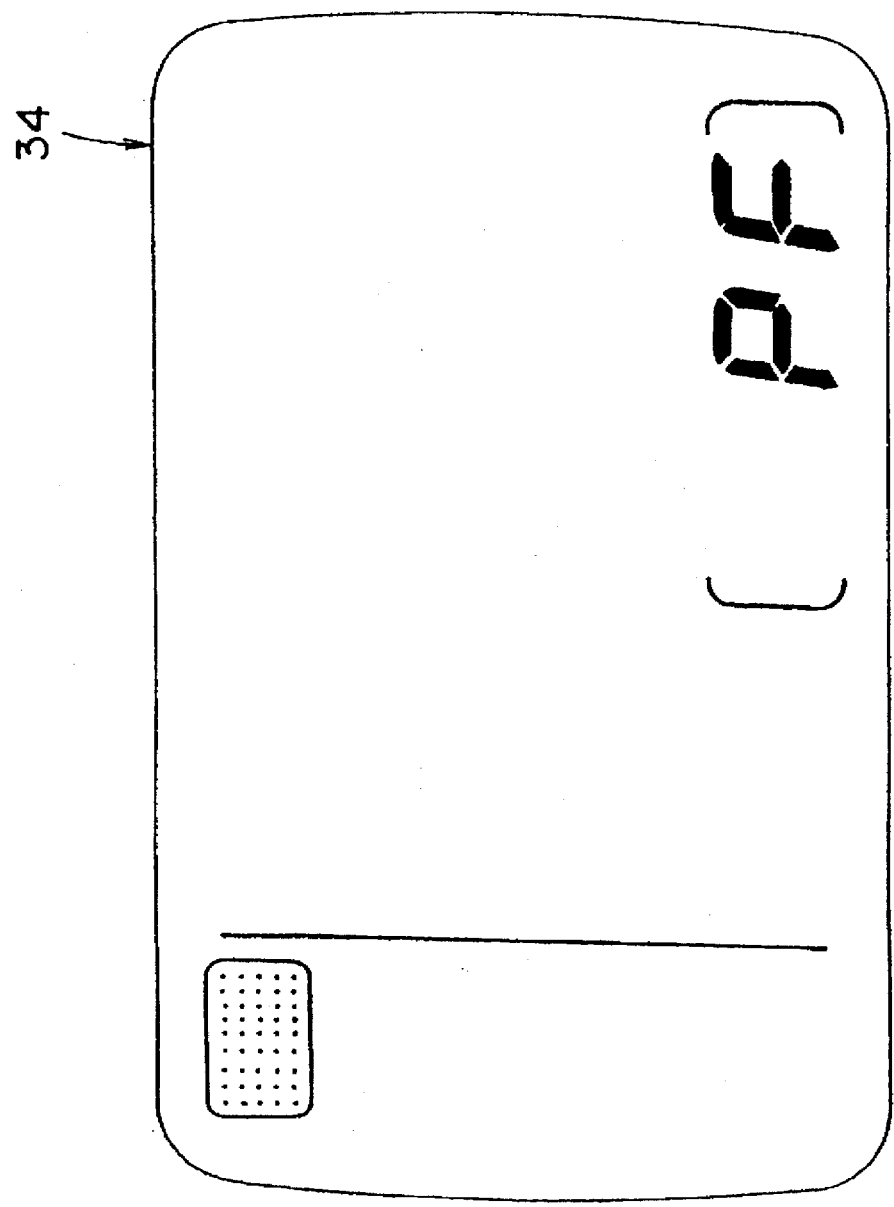
Figure 63G:
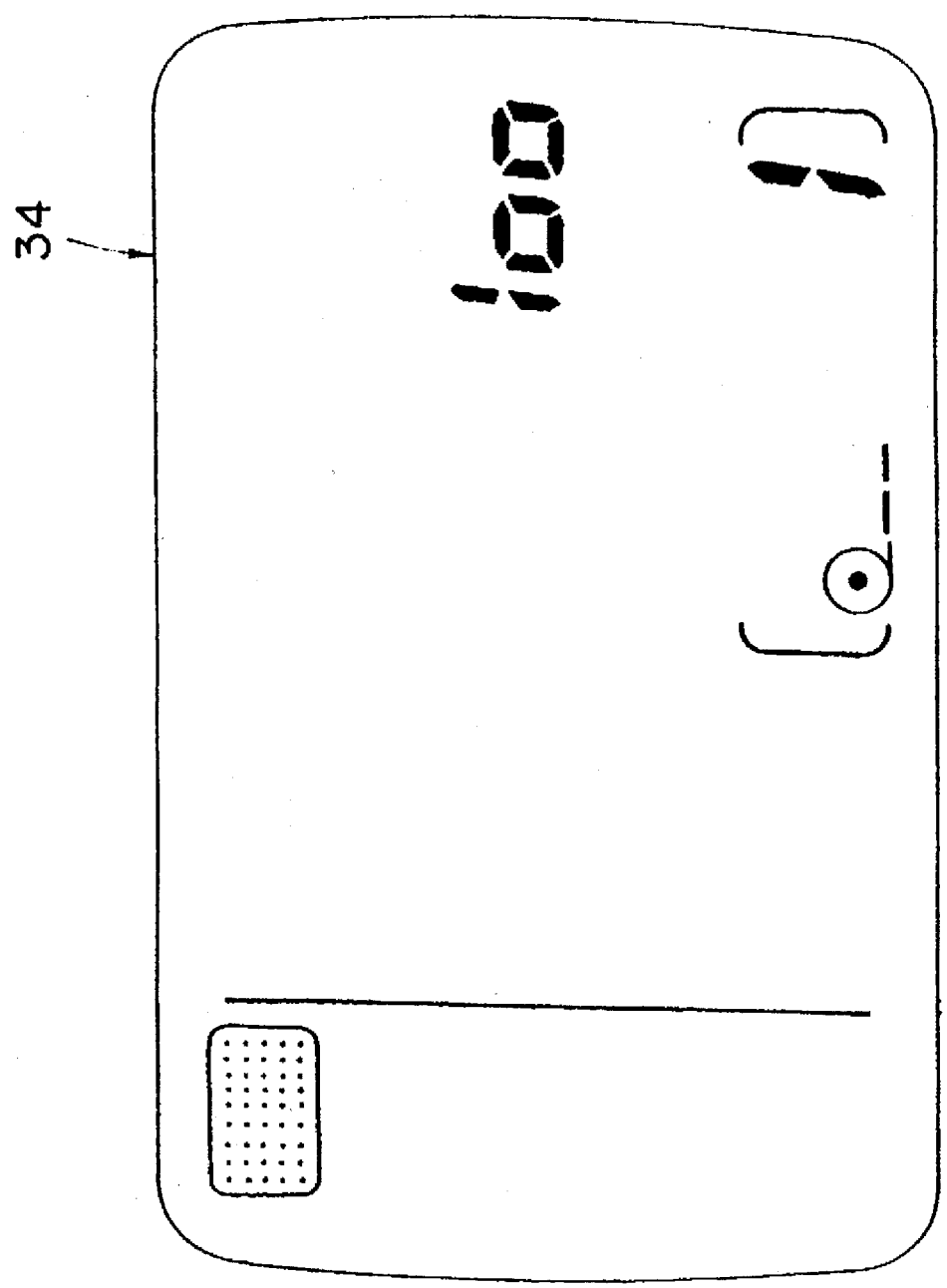

When all the dots are turned off after the elapse of the period of 2 seconds, the PF display process shown in FIG. 18 is executed, displaying "PF" as shown in FIG. 63F. When the mode button 40 and the drive button 38 are released at this time, the displayed "PF" changes to displayed data, which is the first item to be set in the PF setting mode, for altering the ISO film sensitivity (FIG. 63G and FIG. 65A).

DISPLAY OF PF ALL-CLEAR

When the Tv/Av button 30 is pressed while "PF" is being displayed in the PF setting mode, the PF timer display process is called in step S1815 in FIG. 18, thereby displaying the dots again (FIG. 64A). When all the nine dots have turned off after 2 seconds, all the settings in the PF (special function) mode are cleared (FIG. 20: PF ALL-CLEAR process), and the external display LCD panel 34 displays "CL" as shown in FIG. 64B.

SPECIAL FUNCTION SETTING AND DISPLAY

As described above, during operation in the PF setting mode, a settable item is selected by the mode button 40, and the UP/DOWN lever 28 is turned to alter the data in the selected item.

SETTING OF ISO FILM SENSITIVITY

FIGS. 65A and 65B show a display screen for altering the setting of the ISO film sensitivity. The data that has been altered in step S2605 (FIG. 26) of the PF DATA U/D process by operation of the UP/DOWN lever 28 is displayed on the external display LCD 34 in step S1919 shown in FIG. 19B. In the illustrated example, ISO 200 (FIG. 65A) is altered to ISO 100 (FIG. 65B). The external display LCD panel 34 also displays "1" to indicate the item that is being set.

As described above, if the Tv/Av button 30 is pressed during the setting process, the ISO film sensitivity is set to an initial value (DX value or ISO =100).

SETTING OF THE NUMBER OF TIMES THE LEARNING MODE IS TO TAKE PLACE

FIGS. 66A and 66B show a displayed example for setting the number of times learning in the learning mode is to take place for changing of the program. The external display LCD panel 34 displays "2" indicating the item that is being set. A numerical value ranging from 0 to 4 indicative of a changing level as a combination of a learning mode changing amount and the number of times that the learning mode is to take place is set by turning the UP/DOWN lever 28. Such a combination of a learning mode changing amount and the number of times that the learning mode is to take place is set in step S2607 shown in FIG. 26, and is displayed in step S1921 shown in FIG. 19B.

SETTING OF WHETHER A SOUND IS TO BE GENERATED WHEN THE LENS SYSTEM IS FOCUSED

FIGS. 67A and 67B show a displayed example for setting whether the electronic buzzer 108 is to be energized when the lens system is focused. The external display LCD panel 34 displays "3" indicating the item that is being set, and also displays letters "Sd" letting the user know that the setting of sound is being effected. A flag is set to "1" if the electronic buzzer 108 is to be energized and to "0" if not. Since it would be difficult to tell the setting only with the flag, if the flag is set to "1", then the electronic buzzer 108 is energized at predetermined intervals of time together with the display shown in FIG. 67B to enable easier use of the camera. The setting is made in step S2609 shown in FIG. 26, and the display and the energization of the electronic buzzer 108 are carried out in step S1923 shown in FIG. 19B.

FIGS. 68A through 68F show a modified display example for the setting of the electronic buzzer 108 with respect to when the lens system is focused. In the modified example, if the flag indicating that the electronic buzzer 108 is to be energized is set to "1", then letters "Sound" are successively divided and displayed to indicate that a setting has been made to energize the electronic buzzer 108 when the lens system is focused. The letters "Sound" are displayed in a 2-digit display area for normally displaying the Av value, each of the 2 digits being composed of 7 segments. Consequently, it is not necessary to provide special display segments for displaying alphabetical letters. The flag is set in step S2809 shown in FIG. 16, and displayed in step S1923 shown in FIG. 19B.

SELECTION OF LEARNING FUNCTION

FIGS. 69A and 69B show a displayed example of the setting as to whether a program shift is to be learned or not. The external display LCD panel 34 displays "4" indicating the item that is being selected. If the learning mode is to be carried out, i.e., if the learning mode inhibit flag is set to "0", then the notebook picture is displayed for the user to understand the setting operation easily. The learning function is selected in step S2611 shown in FIG. 26, and displayed in step S1925 shown in FIG. 19B. If the flag is altered from "the learning mode is to take place" to "the learning mode is not to take place" after having been in the learning mode, the amount of a program shift that has been learned is not cleared, but fixed.

CLEARING OF LEARNED DATA

FIGS. 70A and 70B show a displayed example in which learned data is cleared. The external display LCD panel 34 displays "5" indicating the item that is being selected, and also alternately turns on and off the notebook picture and the letters "CL". At this time, the UP/DOWN lever 28 is turned to select one or all of the four modes in which the learning function is effective, and the Tv/Av button 30 is pressed to complete the setting for clearing data. When the clearing of learned data is set, the notebook picture is turned off, and the letters "CL" are continuously turned on as shown in FIG. 70B. The clearing of learned data is set in step S2813 shown in FIG. 26, and displayed in step S1927 shown in FIG. 19B.

SELECTION OF EXPOSURE MODE

FIGS. 71A through 71E show data that are displayed on the external display LCD panel 34 when the UP/DOWN lever 28 is turned while the mode button 40 is being pressed when the main button 36 is in the PICT position. The displayed data shown in FIGS. 71A, 71B, 71C, 71D, and 71E correspond respectively to the green mode, the portrait mode, the landscape mode, the moving subject mode, and the close up mode.

FIG. 71F shows displayed data on the viewfinder display LCD panel 62 in the portrait, landscape, and close up modes.

FIG. 71G shows displayed data on the viewfinder display LCD panel 62 in the moving subject mode. In the green mode, data is displayed on the viewfinder display LCD panel 62 in the same manner as in FIG. 76A.

DISPLAY EXAMPLE OF EXPOSURE CORRECTION IN PICT MODE

FIGS. 72A and 72B show, by way of example, data displayed when the main button 36 is in the PICT position, e.g., when the portrait mode is selected.

FIG. 72A shows the displayed data on the viewfinder display LCD panel 62. The amount of a program shift is displayed by graduations and dots. The Tv and Av values that have been calculated based on the shifted program are displayed in an upper region. FIG. 72B shows the displayed data on the external display LCD panel 34. The external display LCD panel 34 also displays, in addition to the data displayed on the viewfinder display LCD panel 62, the count of a frame counter, and the pictures representing the drive mode (photographing mode) and the AE mode.

When the hyper button S2 is pressed, an exposure correction is displayed. FIGS. 73A and 73B show data displayed on the viewfinder display LCD panel 62 and the external display LCD panel 34 when an exposure correction is carried out. In the illustrated example, the exposure correction has a value of −2.0 Ev. Each of the graduations on the display panels corresponds to 0.5 Ev, and the central graduation corresponds to a exposure correction value of 0. In this example, a dot is continuously turned on at the negative end of the graduated scale. The external display LCD panel 34 also numerically displays the exposure correction value −2.0.

The exposure correction value that can be displayed as a graph ranges from −2.0 Ev to +2.0 Ev. However, the exposure correction value that can be set ranges from −3.0 Ev to +3.0 Ev in excess of the graph range (see FIG. 28). If the exposure correction value exceeds the range that can be displayed on the graph, then it is indicated by turning on and off the black-dot marks at the ends of the graph. In FIGS. 74A and 74B, the exposure correction value is −2.5 Ev. In this case, the black dot at the negative end of the graduated scale is alternately turned on and off.

FIGS. 75A and 75B show, by way of example, an exposure mode that is displayed when the hyper button 52 is released after the exposure correction value has been set. In this example, the "−" mark indicating that the exposure correction value is negative is continuously turned on. If the Tv/Av button 30 is pressed while the hyper button 52 is being pressed, then the exposure correction value that has been set is reset to "0".

DISPLAY EXAMPLE OF EXPOSURE CORRECTION IN PROGRAM MODE

FIGS. 76A and 76B show data normally displayed when the exposure mode is the program mode. FIGS. 77A and 77B show data displayed during the setting of an exposure correction whilst the exposure mode is the program mode. FIGS. 78A and 78B show the data displayed after an exposure correction value has been set whilst the exposure mode is the program mode. The normally displayed data does not contain data displayed using graduations and dots. However, once an exposure correction value is set, the correction value is displayed as a graph in addition to the normally displayed data. For the exposure correction in the program mode, exposure correction values can also be displayed beyond the range that can be displayed by the graph by alternately turning on and off a black dot that is at an end of the graph. The black dot that is alternately turned on and off is also displayed in addition to the normally displayed data when the hyper button 52 is released.

In the program mode, a program shift can also be made (not illustrated). If the program is shifted, then overlines are displayed over the letters "Tv" and "Av" on the external display LCD panel 34, and underlines are displayed below the Tv and Av values on the viewfinder LCD panel 62. If the amount of a program shift is 0, then no overlines and underlines are displayed.

DISPLAY EXAMPLE OF EXPOSURE CORRECTION IN AUTOMATIC MODE

FIGS. 79A and 79B show data normally displayed when the exposure mode is the automatic mode. FIGS. 80A and 80B show data displayed during an exposure correction whilst the exposure mode is the automatic mode. FIGS. 81A and 81B show data displayed after an exposure correction value has been set whilst the exposure mode is the automatic mode. The normally displayed data does not contain data displayed using graduations and dots.

The external display LCD 84 can display an arcuate line over the letters "Tv" or "Av", as illustrated, to indicate which of the Tv and Av values has been altered by the UP/DOWN lever 28, i.e., which of the shutter speed preference mode or the aperture preference mode has been selected. The viewfinder display LCD panel 62 displays, as illustrated, an line below the Tv or Av value for indicating the same information. Which of the Tv or Av values is to be altered can be set by the Tv/Av button 30.

The display of exposure correction in the automatic mode is the same as that in the program mode. For the exposure correction in the automatic mode, exposure correction values can also be displayed beyond the range that can be displayed on the graph by alternately turning on and off a black dot that is at an end of the graph. The black dot that is alternately turned on and off is also displayed in addition to the normally displayed data when the hyper button 52 is released.

GRAPH DISPLAY IN MANUAL MODE

FIGS. 82A and 82B show data displayed when seating a Tv value with the UP/DOWN lever 28 when the exposure mode is the manual mode. FIGS. 83A and 83B show data displayed when setting an Av value with the UP/DOWN lever 28 when the exposure mode is the manual mode. FIGS. 84A and 84B show data displayed when the manually set exposure value corresponds to an appropriate exposure value, based on the light measuring process calculated by the camera, when the exposure mode is the manual mode.

In the manual mode, if the Tv value can be altered with the UP/DOWN lever 28, an arcuate overline is displayed over the letters "Tv" displayed on the external display LCD panel 34, and an underline is displayed below the Tv value displayed on the viewfinder display LCD panel 62 (FIGS. 82A and 82B). In FIGS. 83A and 83B, an arcuate overline and an underline is displayed above the letters "Av" and below the Av value. In the manual mode, although no exposure correction is made, a graph is displayed with graduations and dots in addition to the normal display data. In the camera of this embodiment, AE calculations are carried out even in the manual mode. The central position on the displayed graduations serves as a calculated optimum exposure value. If the exposure setting indicates an excessive out of range exposure value, then dots are displayed on the "+" side of the graduations. In as much as one graduation corresponds to 0.5 Ev, the exposure setting shown in FIGS. 82A and 82B indicates an excessive exposure value of 1.0 Ev. The graduations allow dots to be displayed in the range from -2.0 Ev to +2.0 Ev with the optimum exposure value at the range center. If an exposure setting is in excess of that range, the "-" mark is alternately turned on and off, indicating an insufficient exposure value outside of the range, as shown in FIGS. 83C and 83D. Radial lines around the "-" mark in FIGS. 83C and 83D show that the "-" mark is alternately turned on and off. When the exposure setting indicates an excessive exposure value, then the "+" mark is alternately turned on and off.

FIGS. 84A and 84B show displayed data indicating that a manual exposure value setting and a calculated exposure value are the same as each other. To equalize the manual exposure value setting to the calculated exposure value, the UP/DOWN lever 28 is turned to alter the setting in order to reduce the number of dots that are displayed. In addition, an optimum exposure value that is calculated is set when the hyper button 52 is pressed in the manual mode.

AE CALCULATIONS

An AE (automatic exposure mode) calculation subroutine that is called in step S1323 in the RESTART process shown in FIGS. 13A and 13B and in step S1405 in the shutter release process shown in FIG. 14 will be described below with reference to FIGS. 41A, 41B, 41C, and 41D.

In this embodiment, the exposure modes of green mode, portrait mode, landscape mode, moving subject mode, and close up mode can be selected when the main button 38 is in the PICT position and the PICT switch 110b is turned on. Other exposure modes include a normal program mode (a normal program automatic exposure mode in which a shutter speed and an aperture are automatically set based on the result of a photometric process), an automatic mode (a shutter speed preference automatic exposure mode for automatic lens operation in which an aperture is automatically set based on a manually set shutter speed and the result of a photometric process, or an aperture preference automatic exposure mode for automatic lens operation in which a shutter speed is automatically set based on a manually set aperture and the result of a photometric process), and a manual exposure mode. Although not shown, the exposure mode also includes a bulb exposure mode for manual lens operation.

In the AE process, the RAM of the body side CPU 20 is initialized, and various flags relating to the photometric process are also initialized. Thereafter, a lens correction calculation subroutine is called (S4101 through S4105). In the lens correction calculation subroutine, a lens correction calculation process is carried out based on various lens data, according to the type of the lens system, which data will have been supplied from the lens-side CPU 22 (FIG. 11) in "lens communications" in the RESTART process shown in FIG. 13A.

Then, subject luminance data detected by each of sensors (photodetector 94) for divided photometry, converted by the A/D converter 98, is converted into a subject luminance Bv suitable for calculations. A light intensity Lv' from each sensor is determined from the subject luminance Bv and a lens correction value is calculated in step S4105, and then one light intensity Lv' suitable for the subject is calculated according to a divided photometric algorithm (S4107 through S4111).

Thereafter, a light intensity Lv' determined based on a film sensitivity Sv that has been converted for calculations and an exposure correction value Xv for calculations, and values corresponding to a presently set AE mode (number) are put in X (S4113, S4115).

Coefficients a, b, TvL1, etc. corresponding to each AE mode put in X are set in step S4117. These coefficients a, b, TvL1, etc. are stored in the ROM of the body side CPU 20, and are read into the RAM as necessary.

In the portrait mode, the program line schematically shown in FIG. 48A, and into which control branches off with X=1, ⅔ is put in as the coefficient a, which represents the gradient of the program line, and 5⅔ is put in as the coefficient b. Furthermore, a hand induced vibration limit Tvf is put in as a first Tv boundary TvL1, an optimum Av value Avf is put in as a first Av boundary AvL1, and a minimum aperture AvMIN is put in a second Av boundary AvL2. Then, a program calculation subroutine is called in step S4143.

In the landscape mode, the program line schematically shown in FIG. 49A and control branches off with X=2, ⅔ is put in as the coefficient a, and a "landscape coefficient b" is put in as the coefficient b. The "landscape coefficient b" is determined by:

$$(\%)\times Tvf - (\%)\times (AvMIN+1).$$

A minimum shutter speed TvMIN is put in the first Tv boundary TvL1, the minimum aperture AvMIN+1 is put in as the first Av boundary AvL1, and the minimum aperture AvMIN is put in as the second Av boundary AvL2. Then, the program calculation subroutine is called in step S4143.

In the moving subject mode, the program line schematically shown in FIG. 50A, and into which control branches off with X=3, ⅔ is put in as the coefficient a, and 5⅔ is put in as the coefficient b. Furthermore, the hand induced vibration limit Tvf+1 is put in as the first Tv boundary TvL1, the minimum aperture AvMIN+1 is put in as the first Av boundary AvL1, and the minimum aperture AvMIN is put in as the second Av boundary AvL2. Then, the program calculation subroutine is called in step S4143.

In the close up mode, the program line of which is schematically shown in FIG. 51A, into which control branches off with X=4, ⅔ is put in as the coefficient a, and 8⅔ is put in as the coefficient b. Furthermore, the hand induced vibration limit Tvf is put in as the first Tv boundary TvL1, Av6 (F=8) is put in as the first Av boundary AvL1, and the minimum aperture AvMIN+1 is put in as the second Av boundary AvL2. Then, the program calculation subroutine is called in step S4143.

In the program calculation subroutine that is called in step S4143, a control Tv value and a control Av value that are actually used for control are calculated based on the Tv and Av values and the coefficients a and b that are set for each mode (S4119 through S4133 and S4143).

If control branches off into the green mode with X=0, then a program shift inhibit flag is set to "1", inhibiting the program line from being shifted, and a normal program subroutine is called (S4135, S4137). In this normal program subroutine, a control Tv value and a control Av value that are actually used for control are calculated.

If control branches off into the normal program mode with X=5, then the program shift inhibit flag is not set to "1", and the normal program subroutine is called (S4187).

If control branches off into the automatic mode with X=8, an automatic calculation subroutine is called (S4189). If control branches off into the manual mode with X=7, a manual calculation subroutine is called (S4141).

Whether the determined control Tv and control Av values, determined according to the mode selected in step S4117, can be used for control or not is checked by a CHK_TvAv subroutine that is called. If they exceed a controllable range, they are converted into a maximum or minimum value (S4145). The number of EE pulses is then determined based on the Tv and Av values that are finally determined according to the CHK_TvAv subroutine, and data indicative of whether the external flash bulb is to be energized or not, how much intensity of light the external flash bulb is to emit, and whether a rear blind is to be synchronized or not, are transmitted to the external flash bulb (S4147, S4149). The EE pulses are used to stop down the aperture depending on the aperture Av for control. Subsequently, TTL data is set to stop the emission from the flash bulb in response to a quench signal in flash photography, after which control returns.

The normal program routine in step S4137 shown in FIG. 41C will be described below with reference to the flowchart of FIG. 52A. A program diagram explaining the normal program subroutine is shown in FIG. 52B, by way of example, and has the following features:

(1) The hand induced vibration limit Tvf (=TvL1) is set.

(2) It is set so as to be positioned between a program line (see FIG. 49B) relative to the landscape mode which attaches importance to the depth of field, and a program line (see FIG. 50B) relative to the moving subject mode which attaches importance to the shutter speed.

(3) When the hand induced vibration limit Tvf (=TvL1) is exceeded, it is possible to make a program shift by at least one step.

Hand induced vibrations are liable to occur near the hand induced vibration limit Tvf (=TvL1) when f=80 mm and f=28 mm in FIG. 52B. Therefore, in a low Ev range where Tv<Tvf, the shutter speed is fixed at the hand induced vibration limit Tvf and the aperture is opened up to the minimum aperture value. When the aperture is opened, the shutter speed is reduced while keeping the aperture open. The hand induced vibration limit Tvf (=TvL1) at this time is put in as the variable TvL1 and processed.

In the normal program subroutine, a fv calculation subroutine shown in FIG. 42A is called to determine a converted focal length fv into which a focal length f has been converted depending on an apex value.

Then, in step S5203, a calculation Tv is determined according to:

$$Tv=(\%)\times \text{light intensity } Lv + \text{normal coefficient } b$$

where the normal coefficient b=(%)Tvf −(%)(AvMIN+1). This formula is effective to move the program line in the direction of the shutter axis as the normal coefficient b varies while the gradient is kept fixed in the program diagram, as shown in FIG. 52B for example.

Then, it is determined whether the calculation Tv is greater than the maximum shutter speed TvMAX or not. If the calculation Tv is greater than the maximum shutter speed TvMAX, then the maximum shutter speed TvMAX is stored in the RAM of the body side CPU 20, and a Tv-over flag is set to "1" indicating that the maximum shutter speed TvMAX is substituted for the calculation Tv though a shutter speed to be actually set is higher (S5205, S5219, S5221). Then, a CAL_Av subroutine shown in FIG. 44 is called to determine an appropriate calculation Av corresponding to the varied calculation Tv (S5223). Thereafter, and when Av under is set to "0", control goes to step S5215. If the calculation Tv is equal to or smaller than the maximum shutter speed TvMAX in step S5205, then the calculation Tv is compared with the hang induced vibration limit Tvf. If the calculation Tv is smaller than the hand induced vibration limit Tvf, then the hand induced vibration limit Tvf is stored as the calculation Tv in the RAM (S5207, S5225), and control thereafter goes to step S5209. If the calculation Tv is greater than the hand induced vibration limit Tvf in step S5207, then control goes to step S5209.

The step S5209 calls the CAL_Av subroutine shown in FIG. 44 to determine an appropriate calculation Av corresponding to the varied calculation Tv, after which control goes to step S5211. The step S5211 checks an AV-over flag. If the Av-over flag is set to "1", then a CAL_Tv subroutine is called to determine an appropriate calculation Tv corresponding to the varied calculation Av (S5227). Thereafter, control goes to the step S5215. If the Av-over flag is set to "0", then control goes to step S5213 which checks an Av-under flag. If the Av-under flag is set to "1", then the CAL_Tv subroutine is called to determine an appropriate calculation Tv corresponding to the varied calculation Av (S5227). Thereafter, control goes to the step S5215.

In step S5215, a normal P shift calculation subroutine shown in FIG. 46-I and 46-II is called to check whether there is a program shift or not. More specifically, the amount of a program shift that has been set by the user with the UP/DOWN lever 28 is put as the amount of an entire program shift in step S4601, and a P shift direction bit that has been set depending on the direction in which the program shift is made is put as an entire P shift direction bit. Control then goes to step S4603 which checks a P shift inhibit flag. Since no program shift is made in the green mode in this embodiment, the P shift inhibit flag has been set to "1" when the green mode has been selected with X=0 in the AE calculations shown in FIGS. 41A, 41B, 41C, 41D. Therefore, as no program shift is recognized, control returns from step S4603. In the normal program (P) mode, a program shift can be made. Thus, when this mode is selected with X=5, the step S4135 is Jumped, and the P shift inhibit flag is not set to "1". Therefore, a program shift is recognized, and control proceeds to the next step without returning from the step S4603.

In step S5217, the calculation Tv is converted into a value that will actually be used for control, and stored as a control Tv in the RAM of the body-side CPU 20, and the calculation Av is converted into a value that will actually be used for control, and stored as a control Av in the RAM of the body-side CPU 20.

The automatic calculation subroutine in step S4139 shown in FIG. 41C will be described below with reference to the flowchart of FIG. 58. First, step S5801 checks a TrAv mode flag to be set in step S2521 in the data U/D subroutine shown in FIG. 25. If the TrAv mode flag is set to "1", then it is recognized that the aperture preference mode is selected, and control proceeds to step S5311. If the TvAv mode flag is set to "0", then it is recognized that the shutter speed preference mode is selected, and control proceeds to step S5303.

In the shutter speed preference mode, a manually set setting Tv is put in as the control Tv which will actually be used for control (S5303). The setting Tv is converted into a value for calculations and put in as the calculation Tv. The CAL_Av subroutine is called to determine an appropriate calculation Av corresponding to the calculation Tv, and the calculation Av is put in as the control Av (S5305 through S5809), after which control returns. In the aperture preference mode, a manually set setting Av is put in as the control Av (S5311), and the setting Av is put in as the calculation Av. The CAL_Tv subroutine is called to determine an appropriate calculation Tv corresponding to the calculation Av, and the calculation Tv is put in as the control Tv (S5313 through S5317), after which control returns.

The manual calculation subroutine in step S4141 shown in FIG. 41C will be described below with reference to the flowchart of FIG. 54. First, step S5401 checks the TvAv mode flag to be set in step S2521 in the data U/D subroutine shown in FIG. 25. If the TvAv mode flag is set to "1", then since an aperture value can be set with the UP/DOWN lever 28, control proceeds to step S5419. If the TvAv mode flag is set to "0", then since a shutter speed can be set with the UP/DOWN lever 28, control proceeds to step S5403.

To set a shutter speed, the setting Tv that has been set with a ½-series value processed in ½ steps is put in as the control Tv, and the setting Av that has been set with a similar ½-series value is put in as the control Av (S5403, S5405). Then, It is determined whether the hyper (exposure correction) button 52 is pressed or not. If the hyper button 52 is not pressed, control returns with the ½-series value. In this case, frames are exposed with the control Tv, Av based on the manually set value that is processed in ½ steps.

If the hyper switch 88 is turned on in order to obtain an appropriate exposure value based on the photometric value, then the setting Tv of the ½-series value is converted into a calculation Tv that is processed in ⅛ steps. The CAL_Av subroutine is called to determine an appropriate calculation Av corresponding to the calculation Tv, and the calculation Av is processed in ⅛ steps and is put in as the control Av which will actually be used for control (S5409 through S5418). In the manual exposure mode, therefore, when the shutter is released while the hyper button 52 is pressed to turn on the hyper switch 88, frames can be exposed based on a value that has been calculated by the body-side CPU 20 in highly accurate ⅛ steps.

The calculation Av is put in the setting Av and processed into a ½-series value (S5415 through S5417), after which control returns. Therefore, the Av value is subsequently manually increased or reduced as a ½-series value as it can be set manually too.

The processing of the calculation Av into a ½-series value means the rounding of a calculated apex value to ½ steps of an apex value that can be manually set because values are processed in ½ steps in manual calculations whereas values are processed in ⅛ steps in automatic calculations, i.e., because the steps of an apex value that are set by automatic calculations by the body-side CPU 20 are smaller than the steps of an apex value that can manually be set.

To manually set an aperture, the setting Av that has been set with a ½-series value is processed in ½ steps and is put in as the control Av, and the setting Tv that has been set with a similar ½-series value is put in the control Tv (S5419, S5421). Then, it is determined whether the hyper button 52 is pressed or not. If the hyper switch 88 is not turned on, control returns with the ½-series value. In this case, frames are exposed with the control Av, Tv based on the manually set value that is processed in ½ steps.

If the hyper switch 88 is turned on, then the setting Av of the ½-series value is converted into a calculation Av that is processed in ⅛ steps. The CAL_Tv subroutine is called to determine an appropriate calculation Tv corresponding to the calculation Av, and the calculation Av is processed in ⅛ steps and is put in as the control Av which will actually be used for control (S5425 through S5429). In the manual exposure mode, therefore, when the shutter is released while the hyper button 52 is pressed to turn on the hyper switch 88, frames can be exposed based on a value that has been calculated by the body-side CPU 20 in highly accurate ⅛ steps.

The calculation Tv is put in the setting Av and processed into a ½-series value (S5431 through S5433), after which control returns. Therefore, the Av value is subsequently manually increased or reduced as a ½-series value.

PROGRAM CALCULATIONS SUBROUTINE

The program calculations subroutine in step S4148 shown in FIG. 41B will be described below with reference to the flowchart of FIGS. 42A and 42B. In this subroutine, the calculation Tv and the calculation Av are determined depending on one of the portrait, landscape, moving subject, and close up modes that is set by the mode setting process, and converted into the control Tv and the control Av, respectively, which will actually be used for control.

First, the fv calculation subroutine is called in step S4201. In the fv calculation subroutine, a focal length f supplied from the focal length detecting mechanism 102 for the lens system 12 is converted into a value that can be utilized as an apex value, and a converted focal length fv is determined according to the equation:

$$fv = \log(\text{focal length } f)/\log 2.$$

Then, the Tvf calculation subroutine is called, and a hand induced vibration limit Tvf of the shutter speed is determined (S4203) according to the equation:

$$Tvf = (\tfrac{3}{4}) \times fv + 2.$$

Then, the Avf calculation subroutine is called, and a photographing optimum Av value Avf is determined (S4205) according to the equations:

$$Avf = AvMIN + 1 + Avf\text{ shift}$$

$$Avf\text{ shift} = (5/4) \times (6.5 - fv).$$

where, $$0 \leq Avf\text{ shift} \leq 2.$$

The photographing optimum Av value Avf is a value to determine an optimum aperture based on the focal length when a picture is to be taken with a blurred background or in sharp focus with a large depth of field, i.e., an absolute value indicative of how much the aperture is to be reduced from an open aperture.

In step S4207, a calculation Tv is determined according to the formula:

$$\text{coefficient } a \times \text{light intensity } Lv + \text{coefficient } b'$$

using the coefficients a, b corresponding to the AE modes that are set in steps S4119 through S4133 shown in FIG. 41B.

The calculation Tv determined at a predetermined focal length in the selected mode, is compared with the minimum shutter speed TvMIN and the maximum shutter speed TvMAX that are inherent to the camera (S4209, S4211). If the calculation Tv is smaller than the minimum shutter speed TvMIN, then the minimum shutter speed TvMIN is put in as the calculation Tv, and a Tv-under flag is set to "1" indicating that the minimum shutter speed TvMIN is set though a shutter speed slower than the minimum shutter speed TvMIN should be set (S4213), after which control goes to step S4217. If the calculation Tv is larger than the maximum shutter speed TvMAX, then the maximum shutter speed TvMAX is put in as the calculation Tv, and a Tv-over flag is set to "1" indicating that the maximum shutter speed TvMAX is set though a shutter speed faster than the maximum shutter speed TvMAX should be set (S4215), after which control goes to the step S4217.

If the calculation Tv at a predetermined focal length in the selected mode is larger than the minimum shutter speed TvMIN in step S4209 and smaller than the maximum shutter speed TvMAX in step S4211, then both the Tv-under flag and the Tv-over flag are not set to "1", and control goes directly to the step S4217. In step S4217, the CAL_Av (Av calculation) subroutine shown in FIG. 44 is called to determine an appropriate calculation Av corresponding to the calculation Tv based on the Tv calculation.

Step S4219 checks whether the calculation Av determined in the CAL_Av subroutine is of a value in excess of the first Av boundary AvL1 calculated in the selected mode or not. If the calculation Av exceeds the first Av boundary AvL1, then control jumps to step S4243 in which a P shift calculation process is executed to check the direction and amount of a program shift and determine a calculation Tv and a calculation Av that are suitable for the program to be shifted. If the calculation Av is equal to or smaller than the first Av boundary AvL1, then control goes to step S4221 in which the first Av boundary AvL1 is put in as the calculation Av. Since the Av value is thus determined, the CAL_Tv subroutine (FIG. 43) is called to determine a Tv value depending on the calculation Av (S4223).

Step S4225 checks whether the calculation Tv determined in step S4223 is greater than the first Tv boundary TvL1 calculated in step S4203. If the calculation Tv exceeds the first Tv boundary TvL1, then control jumps to the step S4243 in which the P shift calculation process is executed to check the direction and amount of a program shift and determine a calculation Tv and a calculation Av that are suitable for the program to be shifted. If the calculation Tv is equal to or smaller than the first Tv boundary TvL1, then control goes to step S4227 in which the first Tv boundary TvL1 is put in as the calculation Tv. Since the Tv value is thus determined, the CAL_Av subroutine is called again in step S4229 to determine an Av value depending on the calculation Tv.

Then, step S4231 checks whether the calculation Av is larger than the second Av boundary AvL2. If the calculation Av exceeds the second Av boundary AvL2, then control jumps to the step S4243. If not, then control proceeds to step S4233 in which the second Av boundary AvL2 is set as the calculation Av. Since the Av value is thus determined, the CAL_Tv subroutine is called again in step S4235 to determine a calculation Tv depending on the calculation Av. Thereafter, the calculation Tv is compared with the minimum shutter speed TvMIN (S4237). If the calculation Tv is larger than the minimum shutter speed TvMIN, then control jumps to the step S4243. If not, then control proceeds to step S4239 in which the minimum shutter speed TvMIN is put in as the calculation Tv. Since the Tv value is thus determined, the CAL_Av subroutine is called again in step S4241 to determine a calculation Av depending on the calculation Tv.

In step S4243, the P (program) shift calculation subroutine is called to determine the amount of shift of a program line that has previously been stored in the ROM. Then, the calculation Tv is set as the control Tv which will actually be used for control, and the calculation Av is set as the control Av which will actually be used for control (S4245), after which control returns.

CAL_Tv SUBROUTINE

The CAL_Tv (Tv calculation) subroutine for setting an appropriate Tv value and limiting the Tv value to a controllable range will be described below with reference to the flowchart of FIG. 48. First, the Tv-under flag and the Tv-over flag are cleared (S4301), and a value determined according to the formula:

light intensity Lv−calculation Av, is put in as the calculation Tv (S4308).

The above calculation Tv is compared with the minimum shutter speed TvMIN and the maximum shutter speed TvMAX that are inherent to the camera (S4305, S4307). If the calculation Tv is smaller than the minimum shutter speed TvMIN, then the minimum shutter speed TvMIN is set as the calculation Tv, and the Tv-under flag is set to "1" indicating that the minimum shutter speed TvMIN is set though a shutter speed slower than the minimum shutter speed TvMIN should actually be set (S4309), after which control returns. If the calculation Tv is larger than the maximum shutter speed TvMAX, then the maximum shutter speed TvMAX is set as the calculation Tv, and the Tv-over flag is set to "1" indicating that the maximum shutter speed TvMAX is set though a shutter speed faster than the maximum shutter speed TvMAX should actually be set (S4311), after which control returns.

If the calculation Tv is equal to or larger than the minimum shutter speed TvMIN in step S4305, then control goes to the step S4307. If the calculation Tv is equal to or smaller than the maximum shutter speed TvMAX, then control returns. Therefore, the CAL_Tv subroutine limits the shutter speed used in the AE calculation program shift to a controllable range.

CAL_Av SUBROUTINE

The CAL_Av (Av calculation) subroutine for setting an appropriate Av value and limiting the Av value to a controllable range will be described below with reference to the flowchart of FIG. 44. First, the Av-under flag and the Av-over flag are cleared in step S4401, and a value determined according to the formula:

light intensity Lv−calculation Tv is set as the calculation Av (S4403).

The above calculation Av is compared with the minimum aperture AvMIN and the maximum aperture AvMAX (S4405, S4407). If the calculation Av is smaller than the minimum aperture AvMIN, then the minimum aperture AvMIN is set as the calculation Av, and the Av-under flag is set to "1" indicating that the minimum aperture AvMIN is set though the aperture should actually be smaller (S4409), after which control returns. If the calculation Av is larger than the maximum aperture AvMAX, then the maximum aperture AvMAX is set as the calculation Av, and the Av-over flag is set to "1" indicating that the maximum aperture AvMAX is set though the aperture should actually be larger (S4411), after which control returns.

If the calculation Av is equal to or larger than the minimum aperture AvMIN in step S4405, then control goes to the step S4407. If the calculation Av is equal to or smaller than the maximum aperture AvMAX, then control returns. Therefore, the CAL_Av subroutine limits the shutter speed used in the AE calculation program shift to a controllable range.

P SHIFT CALCULATIONS SUBROUTINE

The P (program) shift calculations subroutine shown in FIG. 42B will be described below with reference to the flowchart of FIG. 46-I and 46-II. First, a sub-P shift calculation subroutine is called to determine the amount and direction of a shift of a learned program line in step S4601. When the direction and the amount of an entire program shift has been determined, the P shift inhibit flag is checked (S4603). If the P shift inhibit flag is set to "1", then control returns, and no program shift is made. If the P shift inhibit flag is set to "0", then control proceeds to step S4605 which checks whether the amount of an entire program shift is 0 or not. If the amount of an entire program shift is 0, i.e., if the program line is not to be shifted, then control returns. If the program line is to be shifted, then the entire P shift direction bit is checked to determine the direction of a program shift (S4607).

If the entire P shift direction bit is set to "1" so that the direction of the program shift is negative, e.g., the program line shown in FIGS. 48A and 48B is to be shifted upwardly to the left, then a value produced by subtracting the amount of an entire program shift from the calculation Tv is set as the calculated Tv, thus setting the shutter speed to a slower value (S4323). Then, step S4325 determines whether the calculated Tv Is smaller than the minimum shutter speed TvMIN or not. If smaller, then the minimum shutter speed TvMIN is set to the calculation Tv (S4627), then control goes to step S4615. If not, then control goes directly to step S4615.

If the entire P shift direction bit is set to "0" so that the direction of the program shift is positive, e.g., the program line shown in FIGS. 48A and 48B is to be shifted downwardly to the right, then a value produced by adding the amount of an entire program shift to the calculation Tv is set to the calculation TV. Thus, the shutter speed is set to a faster value (S4609). Then, step S4611 determines whether the calculation Tv is larger than the maximum shutter speed TvMAX or not. If larger, then the maximum shutter speed TvMAX is set to the calculation Tv (S4613), and control goes to step S4615. If not, control goes directly to step S4615.

In step S4615, the CAL__Av subroutine shown in FIG. 44 is called to calculate the calculation Av. Then, the Av-over flag and the Av-under flag are checked in respective steps S4617, S4619. If the Av-over flag is set to "1" or if the Av-under flag is set to "1", control goes to step S4621 in which the CAL__Tv subroutine is called to calculate a Tv value corresponding to the calculation Av at the time. If both the Av-over flag and the Av-under flag are set to "0", then control returns.

The program line shown in FIG. 48B shows in greater detail the program line for the portrait mode as described above with reference to FIG. 48A. The program line has the following features:

(1) The first hand induced vibration limit Tvf (=TvL1) is set for each of the wide and telephoto settings.

(2) The wide range is set for photographing a group of people and a person in a landscape, and allows both the person and the landscape to be photographed in sharp focus when the aperture diameter is reduced.

(3) The telephoto range is set for photographing a portrait and a bust, and allows a person to be photographed in focus when the aperture is open.

(4) The aperture control level is reversed in a normal photographing range.

As described above, the program line in the portrait mode is set such that the aperture is open for shutter speeds ranging from a low shutter speed range to a hand induced vibration limit for the wide and telephoto settings, and the shutter speed is fixed and the aperture is varied to a predetermined value at the hand induced vibration limit. Therefore, the camera is suitable for photographing people in general as well as portraits, with the program line in the portrait mode being set taking into account the prevention of hand induced vibrations. The aperture at the hand induced vibration limit can be reduced by three steps for the wide range, and can be reduced by one step for the telephoto range. Accordingly, the wide range can be set for photographing a group of people and a person in a landscape, allowing both the person and the landscape to be in sharp focus when the aperture is reduced.

The program line shown in FIG. 49B shows in greater detail the program line for the landscape mode as shown in FIG. 49A. The program line has the following features:

(1) It allows the camera to take pictures of close and distant subjects in focus regardless of the focal length.

(2) In a low luminance range, the aperture preference mode is selected for reducing the aperture one step from the open aperture for each of the wide and telephoto settings, and the aperture is reduced to the minimum aperture from the second hand induced vibration limit fv.

(3) By reducing the aperture one step from the open aperture, a shortage of brightness at the edge of the image field is eliminated, and the image performance is improved.

As described above, the program line for the landscape mode is set such that the aperture is reduced one step from the open aperture at the focal length regardless of the focal length for shutter speeds ranging from the low shutter speed range to the hand induced vibration limit. For example, at the focal length of 28 mm, the aperture is reduced one step from AvL2 which is the open aperture for the focal length.

The program line for the landscape mode is set such that it varies with a gradient of 6/2 in a portion G beyond the hand induced vibration limit. As described above, since the Tv value is given by:

$$Tv = \text{coefficient } a \times \text{light intensity } Lv + \text{coefficient } b,$$

and ⅔ is put in as the coefficient a in step S4128 in the landscape mode, the Tv value increases by ⅔ as the light intensity Lv increases by 1. Therefore, the Av and Tv values vary at a ratio of 6:2, i.e., the program line varies with a gradient of 6/2. In FIG. 49B, the numbers in parentheses indicate apex values corresponding to shutter speeds and apertures. The apex values have the same meaning as in FIGS. 48B, 50B, 51B, 52B, and 55C.

The program line shown in FIG. 50B shows in greater detail the program line for the moving subject mode as shown in FIG. 50A. The program line has the following feature:

(1) It sets a third hand induced vibration limit Tvf+1 so that the hand induced vibration limit Tv is increased by one step with respect to the first hand induced vibration limit.

The program line shown in FIG. 51B shows in greater detail the program line for the close up mode as shown in FIG. 51A. The program line has the following features:

(1) In a low luminance range, the program line selects the aperture preference mode for reducing the aperture one step from the open aperture for each of the wide and telephoto settings.

(2) From the hand induced vibration limit, the aperture is set to F8 regardless of the focal length.

As described above, the program line for the close up mode is set such that the aperture is fixed to a predetermined value at shutter speeds ranging from a low shutter speed range to the hand induced vibration limit, and the aperture is varied by about one step and set to F8 at the hand induced vibration limit, with the control being effected with F3 beyond the hand induced vibration limit. Therefore, the camera with the exposure mode can be used with a zoom lens having a macro range and also with a macro lens in the close up mode.

In taking close ups, since the depth of field is reduced, the aperture is reduced excessively and the shutter speed is lowered, tending to cause hand induced vibrations and blurred subject images. With this embodiment, the shutter speed is fixed and the aperture is reduced by about one step at the hand induced vibration limit where hand induced vibrations are most likely to occur. Beyond the hand induced vibration limit, the control is carried out with a not so excessively reduced aperture, thereby reducing the occurrence of hand induced vibrations and blurred subject images.

SUB-P SHIFT CALCULATION SUBROUTINE

The sub-P shift calculation subroutine in step S4601 shown in FIG. 46-I will be described below with reference to the flowchart of FIG. 45. This subroutine determines the amount of shift of the origin and the amount of shift of the program line in the learning mode, i.e., the amount of a shift of the entire program. Additionally, it determines the former program shift direction.

The five modes, i.e., the green mode, the portrait mode, the landscape mode, the moving subject mode, and the close up mode, can be selectively set when the PICT switch 110$b$ is turned on. When the main button 36 is shifted to the PICT position, an AE mode digit from 0 to 4 is respectively assigned according to the table of FIG. 36. The subroutine P shift calculation, in which the subroutine sub-P shift calculation is called, in turn is called in step S4243 of the subroutine calculation. The subroutine program calculation is only called in step S4143 shown in FIG. 41B if a variable X consisting of the AE mode digit, is either 1, 2, 3, or 4. In order to assign four values of a variable from 0 to 3 to the four corresponding release modes, as shown in the data format representation of FIG. 58, the number ((AE mode) −1) is entered in step S4501 as variable X.

The amount of shift of the origin and the origin direction bit which correspond to the read value are read from the RAM (S4503, S4505), and the P shift direction bit is checked to determine whether the direction of a program shift is positive or negative (S4507). If it is positive, then control lumps to step S4511. If it is negative, then the amount of a program shift is regarded as being negative, and is converted into a negative value, i.e., the absolute value thereof is converted into a negative value (S4509).

Step S4511 then checks, from the origin direction bit, how the origin has been varied by the learning mode. If the direction of shift of the origin is negative, then the amount of shift of the origin is converted into a negative value (S4513), i.e., the absolute value thereof is converted into a negative value. If the direction of shift of the origin is positive, then the amount of shift of the origin is not converted, but is used as it is.

The amount of shift of the origin is then added to the amount of program shift, thus determining the amount of an entire shift of the program line (S4515). Step S4517 then determines whether the amount of the entire shift is smaller than 0 or not. If smaller, then control proceeds to step S4519 in which the amount of the entire program shift is converted into an absolute value, and the entire P shift direction bit is set to "1". If the amount of an entire shift is equal to or larger than 0 in step S4517, then control returns. The amount of the entire program shift is converted into an absolute value in step S4519 in order to prevent the values of exposure factors for calculations from becoming negative and the accuracy of each of the exposure factors is set to a ⅛ Ev step to facilitate apex calculations by way of additions and subtractions without taking calculation accuracy into account.

CHK_TvAv SUBROUTINE

Figure 41A:
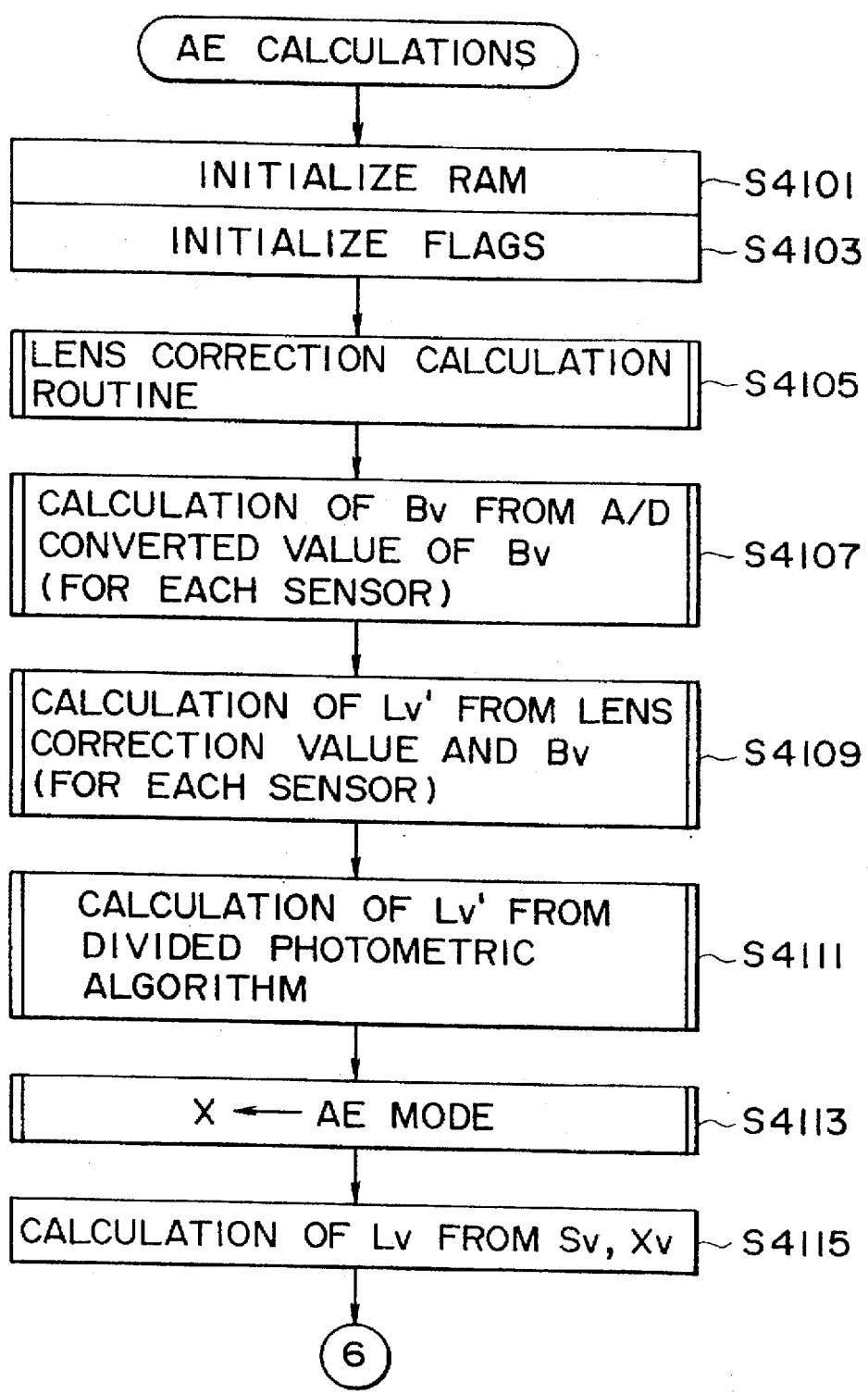
Figure 41D:
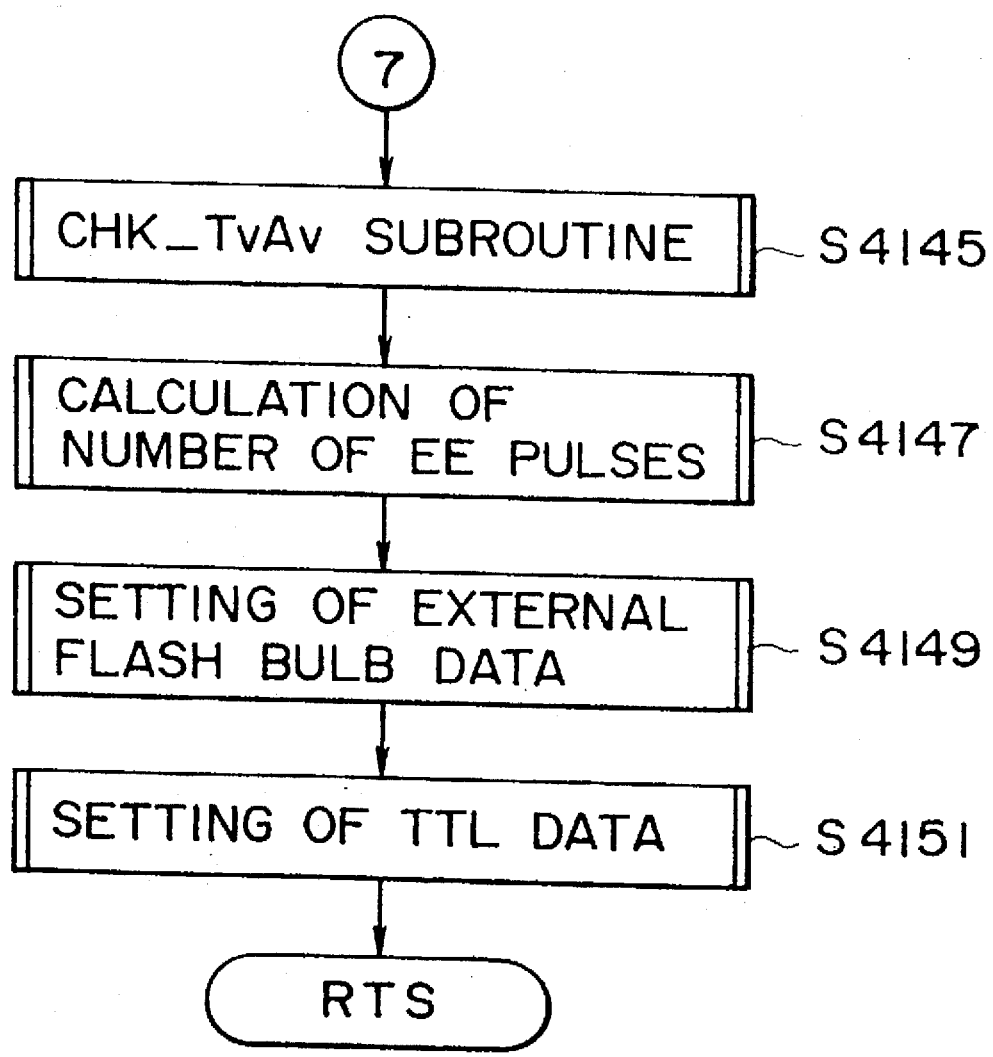

The CHK_TvAv subroutine for detecting whether the calculation Tv and the calculation Av are out of limit values in step S4145 shown in FIG. 41D will be described below with reference to the flowchart of FIG. 47. First, step S4701 determines whether the control Tv value calculated in each mode is equal to the maximum shutter speed TvMAX or not. If equal, then a maximum shutter speed TvMAX flag is set to "1" (S4703). If not, then control jumps to step S4705. Step S4705 determines whether the control Tv value calculated in each mode is equal to the minimum shutter speed TvMIN or not. If equal, then a minimum shutter speed TvMIN flag is set to "1" (S4707). If not, then control jumps to step S4709.

Step S4709 determines whether the control Av value calculated in each mode is equal to the maximum aperture AvMAX or not. If equal, then a maximum aperture AvMAX flag is set to "1" (S4711). If not, then control jumps to step S4713. Step S4713 determines whether the control Av value calculated in each mode is equal to the minimum aperture AvMIN or not. If equal, then a minimum aperture AvMIN flag is set to "1" (S4715). If not, then control returns.

LEARNING

A process relating to the learning mode of the present invention will be described below with reference to FIGS. 55 through 59 and FIGS. 85 through 90.

The learning mode of the present invention is concerned with the status of a program shift in the program exposure mode. More specifically, when the user releases the shutter while the program is being shifted according to the preference of the user, the number of times that the shutter releases with this preference is counted. When this count of the number of times reaches a predetermined number or more, data for shifting the program line in a shift direction by a predetermined amount is stored as learned data. After that data has been stored, a shutter speed and an aperture are set along what is then a substitute program line that has been learned. The learned program line is based on the learned data. Further programs shifts and learning of data for storing is effected with reference to the learned program line.

The term "program shift" in this embodiment means moving a program line (default program line), which is obtained in a normal program exposure process, in a direction parallel to an exposure value Ev line to change a combination of a shutter speed and an aperture although the present invention is not limited to such a "program shift" and a plurality of substitute program lines could be stored. As an example of the specific embodiment, in the program diagram shown in FIG. 55C for a lens having an open F value of 3.5 and a minimum aperture F value of max. 22, when a default program line (3) as a reference program line is shifted in a positive direction by 0.5 Tv or 1.0 Tv, it becomes a program line (4) or (5). Conversely, when the default program line (3) is shifted in a negative direction by 0.5 Tv or 1.0 Tv, it becomes a program line (2) or (1). However, if the shutter speed or the aperture exceeds a controllable range, i.e., if Ev=9, since the program line (4) cannot be shifted further in the positive direction at this point as the aperture has reached an open aperture, no data is effectively learned. When a certain value is added to the shutter speed Tv, a certain value is subtracted from the aperture Av.

Moving an origin on the default program line up to the learned program line, along the exposure value Ev line, is referred to as movement of the origin or shifting of the origin. The amount by which the shutter speed Tv is changed by the movement of the origin is referred to the amount of movement of the origin or the amount of shift of the origin. The direction from the default program line toward the learned program line is referred to as the direction of the origin, and that point, as on the learned substitute program line, is referred to as the learned origin. A program line moved in an origin direction by an origin shift amount with respect to a default program line is used in the learning mode as a reference program line with respect to a program shift. FIG. 55C shows a simple program diagram for an easier understanding of the program shift of the present invention. However, the present invention is not limited to the illustrated program diagram. A program shift and data can be learned in each of the portrait mode, the landscape mode, the moving subject mode, and the close up mode of this embodiment.

The single lens reflex camera is arranged such that the amount and direction of a program (P) shift are set by turning the UP/DOWN lever 28 (UP, DOWN switches 78, 80) so that when the photometric switch 70 is turned on, a shutter speed Tv obtained in the normal program calculation process is varied by the amount of the program shift, and an appropriate aperture Av is calculated again, based on the changed shutter speed Tv and the appropriate exposure value Ev.

In this embodiment, there is an independent learning function available in the four program exposure modes, i.e., the portrait mode, the landscape mode, the moving subject mode, and the close up mode, and the learning function is independently performed when any one of the four exposure modes is selected.

FIGS. 58 and 59 show various data necessary for the learning function, areas of the EEPROM 106 and the RAM for storing such various data, data formats and their relationship, and a format of the RAM. The data necessary for the learning function includes the amount of shift of the origin, the direction of the origin, the learned number of times that the shutter is released, the previous learned direction, the amount of a program shift, and the direction of a program shift.

The amount of a program shift is the absolute value of a shutter speed Tv to be shifted from a reference program line. The relatively higher shutter speeds (including a 0 change in shutter speed) are regarded as positive (+) and the relatively lower shutter speeds are regarded as negative (−) and are distinguished from each other using the P shift direction bit which is "0" when positive and "1" when negative. The reference program line is the learned substitute program line when the results of the learning mode are stored or is the default program line when no results of the learning mode have been stored. The amount of a shift of an origin is the difference between the shutter speed Tv of the shifted or learned program line that is stored and the shutter speed Tv of the default program line. The magnitude of the amount of a shift of the origin is indicated by its absolute value. When the learned program line is on the higher shutter speed side of the default program line, it is regarded as positive and when the learned program line is on the lower shutter speed side of the default program line, it is regarded as negative. These positive and negative conditions are distinguished from each other using the origin direction bit which is "0" when positive and "1" when negative. The learned number of shutter releases is counted each time an exposure is finished, provided that the present direction of a program shift is the same as the previous direction of program shift. The previous direction of program shift is distinguished using previous learned direction bits which are "01" when positive and "10" when negative.

Memory areas for storing the four data, i.e., the amount of a shift of an origin, the origin direction bit, the learned number of times that the shutter is released, and the previous learned direction bits are 2 bytes {STDYCNT(X), GENPSFT(X)} in the EEPROM 108 and 2 bytes {STDYCNT(X), GENPSFT(X)} in the RAM for each of the program exposure mode. Furthermore, a common data area is provided by four bytes {ALLPSFT, SETPSFT, STDYCNT, and GENPSFT}. The amount of a program shift is stored using 0th through 3th bits of SETPSFT. The direction of a program shift is stored using the 7th bit of SETPSFT. The amount of a shift of the origin is stored using 0th through 6th bits of GENPSFT. The origin direction bit is stored using the 7th bit of GENPSFT. The learned number of times that the shutter is released is stored using 0th through 5th bits of STDYCNT, and the previous learned direction bits are stored using 3th and 7th bits of STDYCNT. The amount of an entire program shift, i.e., the amount of a program shift from the origin, is stored using 0th through 6th bits of ALLPSFT, and the entire shift direction bit is stored using the 7th bit of ALLPSFT.

LEARNING MODE DISPLAY DATA

FIGS. 85 through 90 show display data on the external display LCD panel 34 with respect to the status of a program shift and the status of a learning mode when EV=13. These display data are controlled based on the P shift display table shown in FIG. 31 according to the P shift graph display process shown in FIG. 29.

In FIGS. 85, 86, and 90, a displayed black dot 58f above the origin mark 58h indicates that no data has been learned or that the current learned program line is in effect equal to the default program line. FIG. 85 shows a program shift of 0 because only the displayed black dot 58f above the origin mark 58h is turned on. FIG. 86 shows the amount of a program shift which is +1.0 Tv (−1.0 Av). In FIG. 86, the black dot 58f that is alternately turned on and off on the right end indicates the shift amount and the black dot 58f on the left end opposite to the origin mark 58h indicates the origin (either of the default program line or the learned substitute program line). FIG. 90 shows the amount of a program shift which is −1.0 Tv (+1.0 Av). In FIG. 90, the black dot 58f that is alternately turned on and off on the left end indicates the shift amount and the black dot 58f on the right end opposite to the origin mark 58h indicates the origin (either of the default program line or the learned substitute program line).

FIGS. 87 through 89 show that the learning mode origin is +0.5 Tv (−0.5 Av), that is to say that the origin of the current learned substitute program line (data) which has been stored is shifted +0.5 Tv (−0.5 Av). FIG. 87 shows the amount of a program shift of +0.5 Tv from the origin of the learned program line. FIG. 88 shows the amount of a shift of 0 from the origin of the learned program line. FIG. 89 shows the amount of a program shift of −1.5 Tv from the origin of the learned program line.

Although not shown, the viewfinder display LCD panel 32 also displays a triangular mark 58h, graduations 58g, and black dots 58f which correspond respectively to the triangular mark 58h, the graduations 58g, and the black dots 58f on the external display LCD panel 34.

LEARNING MODE CALCULATION PROCESS

A learning mode calculation process will be described in detail below with reference to the flowchart of FIGS. 55A, 55B, 56, 57A, 57B. FIGS. 55A and 55B are a flowchart relating to the learning mode calculation process, which is a subroutine that is called in step S1415 in the shutter release process shown in FIG. 14. In this embodiment, when the shutter release takes place a predetermined number of times in the learning mode and with each program shift in one direction, learned data is stored to give a program line that is varied to become a substitute for the previous program line, i.e. a learned program line.

When the control enters the learning mode calculation process, a learning mode RUN flag for controlling the energization of the learning mode picture 56s is cleared, it is determined whether control is in the learning mode or not, i.e., whether the learning mode flag is "1" or not, and it is determined whether the amount of the present program shift is 0 or not (S5501, S5503, S5505). If the learning mode flag is "0" or if control is in the learning mode but the amount of the present program shift is 0, then the number of times of shutter release that is being learned does not need to be changed, and control thus returns to the shutter release subroutine.

If the learning mode flag is "1" and also if the amount of the present program shift is not 0, then it is determined whether the amount of the present program shift is larger than the learning mode changing amount that has been set in the learning mode changing level setting process shown in FIG. 26 so that the appropriate number of times of shutter release for learning can be set (S5503, S5505, S5507). If the amount of the present program shift is larger than the learning mode changing amount, then the value of "learned number of times 1" of shutter release that has been set in FIG. 26 is installed as the "changed number of times" for shutter release (S5507, S5509). If the amount of the present program shift is equal to or smaller than the learning mode changing amount, then the value of the "learned number of times 2" of shutter release that has been set in FIG. 26 is installed as the "changed number of times" for shutter release (S5507, S5511).

Then, the amount of shift of the origin, the origin direction bit, the current counted value of the learned number of times of shutter release, and the previous learned direction bits are read from the RAM areas STDYCNT(X), GENPSFT(X). These correspond to the selected exposure mode, X being produced by subtracting from the AE mode number X (S5513). The amount of shift of the origin and the origin direction bit are stored in the RAM area GENPSFT, and the current counted value of the learned number of times of shutter release and the previous learned direction bits are stored in the RAM area STDYCNT (S5515 through S5521).

The learning mode RUN flag is then set and 1 is added to the current counted value of the learned number of times of shutter release (S5523, S5525). Thereafter, it is determined whether the new current counted value of the learned number of times of shutter release is smaller than the "changed number of times" value that was set above (S5527). If smaller, then control goes to step S5529 and following in order to up date the stored value of the counted value of the learned number of times shutter release. If the new current counted value of the learned number of times of shutter release is equal to or larger than the "changed number of times" value, control goes to a learning mode U/D (up and down) process shown in FIGS. 57A and 57B.

If the new current counted value of the learned number of times of shutter release is smaller than the "changed number of times", then control proceeds to a learning mode store process 2 provided the direction of the present program shift is the same as the previous direction of program shift (learning direction). That is, the control proceeds to a learning mode store process 2 provided that the present P shift direction bit is "0" (positive) and the previous learned direction bits are "01" (positive) or the present P shift direction bit is "1" (negative) and the previous learned direction bits are "10" (negative) (S5529, S5531 or S5529, S5533). Stated otherwise, each time the shutter is released with the present program shift direction the same, a valve equal to the learned number of times of shutter release is counted. When the present program shift direction is a new direction which is not the same as before, the counted value of the learned number of times of shutter release is reset to "1", and the counted value of the learned number of times of shutter release is incremented each time the shutter is released with the new direction of program shift.

Thus, if the previous learned direction (program shift direction) is negative and the present program shift direction is positive, then, control goes to a learning mode reset process 1 in which the counted value of the learned number of times of shutter release is reset to "1" and the previous learned direction bits are set to "01" (positive) (S5529, S5531, S5541). Then, control goes to the learning mode store process 2 for updating the counted value of the learned number of times of shutter release and also the previous learned direction bits. Conversely, if the previous learned direction (program shift direction) is positive, and the present program shift direction is negative, then, control goes to a learning mode reset process 2 in which the counted value of the learned number of times of shutter release is reset to "1" and the previous learned direction bits are set to "10" (negative) (S5529, S5533, S5551). Then, control goes to the learning mode store process 2.

LEARNING MODE STORE PROCESS 2

The learning mode store process 2 is a process for updating and storing the counted value of the learned number of times of shutter release and the previous learned direction bits. In this process, the amount of a shift of the origin and the origin direction bit are not changed. More specifically, the counted value of the learned number of times of shutter release and the previous learned direction bits are stored in predetermined bits in the RAM area (X) corresponding to the present program exposure mode (X=AE mode number−1) (S5611, S5613). Then, the data stored in the RAM area (X) relating to the learning mode are written in the corresponding 2-byte area of the EEPROM 106 (S5616), after which control returns.

LEARNING MODE U/D PROCESS

The learning mode U/D process stores the results of the learning mode when the current counted value of the learned number of times of shutter release becomes equal to or greater than the appropriate "changed number of times" value so as to execute a shift of the origin. This will be described below with reference to the flowchart shown in FIGS. 57A and 57B and the program diagram of FIG. 55C.

When control enters the learning mode U/D process, the present program shift direction is checked, and if the present program shift direction is positive (the P shift direction bit is "0"), then a learning mode UP process is carried out, and if the present program shift direction is negative (the P shift direction bit is "1"), then a learning mode DOWN process is carried out. It is assumed for the purpose of the following that the present program line is program line (8) in FIG. 55C, being the default program line or a learned program line, so that the black dot 58f above the origin indication mark 58h is energized. The data shown in FIGS. 85 through 90 are displayed when Ev (Lv)=13.

LEARNING MODE UP PROCESS

In the learning mode UP process, the previous learned direction (program shift direction) is checked, and if the previous learned direction is negative (the previous learned direction bits are "10"), meaning that the present program shift direction has changed from the previous direction, the learned amount of shift of the origin and the origin direction bit are not to be updated. Thus, at step S5711 control goes to the learned mode reset process 1 (which is the same as S5541 of FIG. 55B). For example, assuming the present program line is indicated by (3) in FIG. 55C and the previous program shift was −0.5, −1.0 Tv, or less in the direction toward (2) or (1), the present program shift is a relative shift in the positive direction of +0.5, +1.0 Tv, or more in the direction toward (4) or (5). The display of the previous program shift would have been as shown in FIG. 90, and the display of the present program shift would be as shown in FIG. 86.

If the present program shift direction is the same as the previous program shift direction, or no program shift has been made previously (the previous amount of a program shift is 0), then the counted value of the learned number of times of shutter release is set to "0" and the previous learned direction bits are set to "01" (S5711, S5713), after which control proceeds to steps S5715 through S5727 for setting the learned amount of shift of the origin and the amount of program shift. As an example, if the present program line is indicated by (3) in FIG. 55C, and the previous program shift was 0, +0.5, +1.5 Tv, or more in the direction toward (3), (4) or (5), the present program shift is +0.5 Tv or more in the direction toward (5). Thus, if the present default or learned substitute program line is indicated by (3) and the program shift is +1.0 Tv, then the displayed data would be as shown in FIG. 86.

Then, depending on the direction of the origin, i.e., depending on whether the learned program line is in a positive direction, is the same as the default program line, or is in a negative direction with respect to the default program line, 0.5 Tv is added to or subtracted from the amount of a shift of the origin (S5715, S5717, S5719 or S5715, S5721).

If the learned program line is shifted in a positive direction from the default program line, i.e., if the origin direction bit is "0" (positive), and also if the amount of the shift of the origin is less than 2, then 0.5 Tv is added to the amount of a shift of the origin (S5715 through S5719). The added 0.5 Tv is then deducted from the program shift amount, after which control proceeds to a learning mode store process 1 (S5727). Since the maximum value of the amount of a shift of the origin is limited to 2 Tv in this embodiment, when the amount of a shift of the origin is equal to or greater than 2 Tv, a shift of the origin (a shift of the learned program line) is not made, and control jumps from the step S5717 to the learning mode store process 1.

When the above learning mode UP process is carried out, if the default program line is indicated by (8), an already learned program line is indicated by (4), and the program shift is +0.5 Tv in the direction toward (5), then the learned program line changes from (4) to (5). As an example, if +0.5 Tv is added to the amount of shift of the origin in the condition shown in FIG. 86 when the default (or learned) program line is indicated by (3) and the present program shift is +1.0 Tv, then black dots 58f are energized as shown in FIG. 87. Thus, in the learning, the program line changes to the learned program line (4) that has been shifted by +0.5 Tv, and the display indicates that the program shift is +0.5 Tv. When a program shift clear process is carried out, the amount of the present program shift from the learned program line (4) is cleared, with the data displayed as shown in FIG. 88.

If the learned program line is shifted in a negative direction from the default program line, i.e., if the origin direction bit is "1", then 0.5 Tv is subtracted from the amount of a shift of the origin (S5715, S5721). If the amount of a shift of the origin becomes 0, then "0" is put in the origin direction bit, and if the amount of shift of the origin does not become 0, then the origin direction bit remains unchanged. 0.5 Tv is deducted from the program shift amount, and control goes to the learning mode store process 1 (S5723, S5725, S5727 or S5723, S5727).

When the above learning mode UP process is carried out, as an example, if the default program line is indicated by (3), the learned program line is indicated by (2), and the program shift is +0.5, +1.0, +1.5 Tv, or more in the direction toward (3), (4) or (5), then the new learned program line changes to (3).

LEARNING MODE DOWN PROCESS

Control enters the learning mode DOWN process if the program shift direction is negative (P shift direction bit is "1") in step S5701 shown in FIG. 57A.

In the learning mode DOWN process, it is first determined, using the previous learned direction bits, whether the program shift direction has changed from the previous direction or not. If changed (the previous learned direction bits are positive "01"), then at step S5781 control goes to the learning mode reset process 2 (same as S5551 of FIG. 55B) so that no learning takes place so no data are updated (S5731).

If the program shift direction has not changed from the previous direction (the previous learned direction bits are negative "10"), then the counted value of the learned number of times of shutter release is set to "0", and the previous learned direction bits are set to "10" (negative) (S5733).

Then, depending on the direction of the origin, i.e., depending on whether the learned program line is in a positive direction with respect to the default program line, is the same as the default program line, or is in a negative direction with respect to the default program line, a certain value is added to or subtracted from the amount of a shift of the origin (S5735, S5737 or S5735, S5743, S5745).

More specifically, if the direction of the origin is positive, then 0.5 Tv is subtracted from the amount of a shift of the origin (S5735, S5737). Since the amount of a shift of the origin from which 0.5 Tv has been subtracted may be less than 0 (−0.5 Tv), it is determined whether the amount of a shift of the origin is less than 0 (S5739). If less than 0, then the amount of a shift of the origin is converted into its absolute value and the origin direction bit is set to "1" (negative) (S5741), after which control goes to step S5747.

If the amount of a shift of the origin is equal to or greater than 0, then control goes from the step S5739 to the step S5747.

When the learning mode DOWN process is carried out, as an example, if the default program line is indicated by (3), the learned program line is indicated by (4), and the program shift is −0.5, −1.0, −1.5 Tv, or less in the direction toward (3), (2) or (1), then the new learned program line changes to (3). If the learned program line is indicated by (4) and the program shift is −1.5 Tv, the display would be as shown in FIG. 89. Once the learning has been carried out with the above condition, the learned program line becomes (3) and the display would be as shown in FIG. 90.

When the direction of the origin is negative, the amount of a shift of the origin may exceed a limit value of 2 Tv. Therefore, step S5743 determines whether or not the amount of a shift of the origin is equal to or larger than the limit value of 2 Tv. If smaller than the limit value, then 0.5 Tv is added to the amount of a shift of the origin (S5745), and control goes to step S5747. If equal to or larger than the limit value, then control jumps to step S5749.

When the learning mode DOWN process is carried out, as an example, if the default program line is indicated by (3), the learned program line is indicated by (2), and the program shift is −0.5 Tv, or less in the direction toward (1), then the new learned program line changes to (1).

The amount of a program shift from which 0.5 Tv has been subtracted in step S5747 may become 0. If the amount of a program shift becomes 0, the P shift direction bit is changed to "0" (positive) (S5749, S5751), and control goes to the learning mode store process 1. If the amount of a program shift is not 0, then control jumps directly to the learning mode store process 1 (S5749).

LEARNING MODE STORE PROCESSES 1, 2

The learning mode store process 1 for storing the learned condition in the EEPROM 106 will be described below with reference to FIG. 56. The amount of a shift of the origin and the origin direction bit that have been set in the above learning mode UP/DOWN process are stored in predetermined bits in the RAM areas STDYCNT(X), GENPSFT(X) corresponding to the present program exposure mode, after which control goes to the learning mode store process 2 (S3601, S3608).

In the learning mode store process 2, the counted value of the learned number of shutter releases and the previous learned direction bits are stored in predetermined bits in the RAM area (X) corresponding to the present program exposure mode (S5611, S5613). The data stored in the RAM areas STDYCNT(X), GENPSFT(X) relating to the learning mode are written in the corresponding 2-byte areas STDYCNT(X), GENPSFT(X) of the EEPROM 106 (S5615), after which control returns.

With a single lens reflex camera having the learning function of the present invention, the user of the camera may select the portrait mode, the landscape mode, the moving subject mode, or the close up mode as the program exposure mode. In the learning mode, when the user releases the shutter a predetermined number of times while the program is set to shift in a positive or negative direction, the program line is shifted in 0.5 Tv steps in that direction (the origin is moved) to become a learned substitute program line. After the program line has been shifted, data values of shutter speed and aperture are set with reference to the learned substitute program line, and the program can still be further shifted and this program shift can be learned. That is, when the user of the camera shifts the program and releases the shutter, the camera learns the tendency of the user to shift the program each time the shutter is released. After the program shifting tendency has been learned a predetermined number of times, the results of the learned tendency are updated (stored). A shutter speed and an aperture are set based on the results of the learned tendency, and then a new learning can be carried out.

In the above embodiment, it is possible to select a combination of the amount of a program shift and the number of times of occurrence for learning to be effected. However, the amount of a program shift and the number of times for learning to be effected may be independently selected. The number of times for learning to be effected may be varied in two steps across a predetermined amount of shift. However, the number of times for learning to be effected may be varied in three steps or more, or may be varied depending on the amount of a shift.

In this embodiment, the learning mode is changed in 0.5 Tv steps. However, it may be changed in 1.0 Tv steps, 0.3 Tv steps, or other steps, or may be changed to a certain Tv value. While the program process, the program shift process, and the learning and storing process are carried out in the shutter speed preference mode in the above embodiment, the above processes may be carried out in the aperture preference mode. While a general shift of the program line is effected to produce a learned program line in the present embodiment, the learned program line may take the form of another complete program line selected from a plurality of already stored program lines.

As described above, when a user of a camera with the learning function of the present invention releases the shutter a plurality of times while the program line is being shifted in one direction in the program exposure mode, the learning means stores learned program data for shifting the program line by a predetermined amount in that direction, and thereafter a shutter speed and an aperture are set based on the stored learned program data. Therefore, simply by shifting the program according to the user's preference and repeating exposures, a combination of a shutter speed and an aperture which the user prefers, i.e., a learned program line, can be obtained.

What is claimed is:

1. An electronically controlled camera, comprising:
   a zoom lens having a changeable focal length;
   a shutter;
   an aperture;
   a manual setting device for selecting at least a portrait mode from among a plurality of modes; and
   an exposure controller that determines a combination of a shutter speed and an aperture value based on an exposure value, wherein, when said camera operates in said portrait mode, said exposure controller determines said combination of shutter speed and aperture value from among at least:
   (a) combinations of a first aperture value equal to an open aperture value for a currently used focal length of said zoom lens and shutter speeds slower than a hand induced vibration limit;
   (b) combinations of a second aperture value which is greater than said first aperture value and shutter speeds faster than said hand induced vibration limit; and
   (c) combinations of a shutter speed equal to said hand induced vibration limit and aperture values greater than or equal to said first aperture value and less than or equal to said second aperture value.

2. The camera of claim 1, wherein said second aperture value is lower for longer focal lengths of said zoom lens than for shorter focal lengths of said zoom lens.

3. The camera of claim 2, wherein said second aperture value is approximately one aperture value step higher than said first aperture value for a tele setting of said zoom lens, said second aperture value being approximately three aperture value steps higher than said first aperture value for a wide setting of said zoom lens.

4. The camera of claim 1, wherein said hand induced vibration limit is dependent on said currently used focal length of said zoom lens.

5. The camera of claim 1, wherein said exposure controller calculates said hand induced vibration limit based on said currently used focal length of said zoom lens.

6. An electronically controlled camera, comprising:
a zoom lens having a changeable focal length;
a shutter;
an aperture;
a manual setting device for selecting at least a close-up mode from among a plurality of modes; and
an exposure controller that determines a combination of a shutter speed and an aperture value based on an exposure value, wherein, when said camera operates in said close-up mode, said exposure controller determines said combination of shutter speed and aperture value from among at least:
 (a) combinations of a first aperture value which is a predetermined amount greater than an open aperture value for a currently used focal length of said zoom lens and shutter speeds slower than a hand induced vibration limit;
 (b) combinations of a second aperture value which is greater than said first aperture value and shutter speeds faster than said hand induced vibration limit; and
 (c) combinations of a shutter speed equal to said hand induced vibration limit and aperture values greater than or equal to said first aperture value and less than or equal to said second aperture value.

7. The camera of claim 6, wherein said second aperture value is independent of said focal length of said zoom lens.

8. The camera of claim 7, wherein said second aperture value is approximately equal to an aperture setting of f8.

9. The camera of claim 6, wherein said first aperture value is approximately one aperture value step greater than said open aperture value for a currently used focal length of said zoom lens.

10. The camera of claim 6, wherein said hand induced vibration limit is dependent on said currently used focal length of said zoom lens.

11. The camera of claim 6, wherein said exposure controller calculates said hand induced vibration limit based on said currently used focal length of said zoom lens.

12. An electronically controlled camera, comprising:
a zoom lens having a changeable focal length;
a shutter;
an aperture;
a manual setting device for selecting at least a landscape mode from among a plurality of modes; and
an exposure controller that determines a combination of a shutter speed and an aperture value based on an exposure value, wherein, when said camera operates in said landscape mode, said exposure controller determines said combination of shutter speed and aperture value from among at least:
 (a) combinations of a first aperture value which is a predetermined amount greater than an open aperture value for a currently used focal length of said zoom lens and shutter speeds slower than or equal to said hand induced vibration limit; and
 (b) combinations of aperture values greater than said first aperture value and shutter speeds faster than said hand induced vibration limit such that said aperture values are a linear function of said shutter speeds.

13. The camera of claim 12, wherein said first aperture value is approximately one aperture value step greater than said open aperture value for a currently used focal length of said zoom lens.

14. The camera of claim 12, wherein said linear function is dependent on a currently used focal length of said zoom lens.

15. The camera of claim 12, wherein said hand induced vibration limit is dependent on a currently used focal length of said zoom lens.

16. The camera of claim 12, wherein said exposure controller further determines said hand induced vibration limit based on said currently used focal length of said zoom lens.

17. An electronically controlled camera comprising:
a zoom lens having a changeable focal length;
a shutter;
an aperture;
a manual setting device for selecting at least a landscape mode from among a plurality of modes; and
an exposure controller for determining a combination of a shutter speed and an aperture value based on an exposure value, wherein, when said camera operates in said landscape mode, said exposure controller determines said combination of shutter speed and aperture value from among at least:
 (a) combinations of a first aperture value which is a predetermined amount greater than an open aperture value for a currently used focal length of said zoom lens and shutter speeds slower than or equal to said hand induced vibration limit; and
 (b) combinations of aperture values greater than said first aperture value and shutter speeds faster than said hand induced vibration limit, such that said shutter speeds and said aperture values increase in a predetermined ratio as said exposure value increases.

18. The camera of claim 17, wherein said predetermined ratio is approximately equal to 2:6.

19. An electronically controlled camera, comprising:
a zoom lens having a changeable focal length;
a shutter;
an aperture;
a manual setting device for selecting at least one of a portrait mode, a close-up mode and a landscape mode from among a plurality of modes; and
an exposure controller that determines a combination of a shutter speed and an aperture value based on an exposure value, wherein,
when said camera operates in said portrait mode, said exposure controller determines said combination of shutter speed and aperture value from among at least (a) combinations of a first aperture value equal to an open aperture value for a currently used focal length of said zoom lens and shutter speeds slower than a hand induced vibration limit, (b) combinations of a second aperture value which is greater than said first aperture value and shutter speeds faster than said hand induced vibration limit, and (c) combinations of a shutter speed equal to said hand induced vibration limit and aperture values greater than or equal to said first aperture value and less than or equal to said second aperture value, wherein when said camera operates in said close-up mode, said exposure controller determines said combination of shutter speed and aperture value from among at least (a) combinations of a first aperture value which is a predetermined amount greater than an open aperture value for a currently used focal length of said zoom lens and shutter speeds slower than a hand induced vibration limit, (b) combinations of a second aperture value which is greater than said first aperture value and shutter speeds faster than said hand induced vibration limit, and (c) combinations of a shutter speed equal to said hand induced vibration limit and aperture values greater than or equal to said first aperture value and less than or equal to said second aperture value, and wherein when said camera operates in said landscape mode, said exposure controller determines said combination of shutter speed and aperture value from among at least (a) combinations of a first aperture value which is a predetermined amount greater than an open aperture value for a currently used focal length of said zoom lens and shutter speeds slower than or equal to said hand induced vibration limit, and (b) combinations of aperture values greater than said first aperture value and shutter speeds faster than said hand induced vibration limit such that said aperture values are a linear function of said shutter speeds.

* * * * *

UNITED STATES PATENT AND TRADEMARK OFFICE
CERTIFICATE OF CORRECTION

PATENT NO.  : 5,682,558
DATED       : October 28, 1997
INVENTOR(S) : T. KIRIGAYA et al.

It is certified that error appears in the above-identified patent and that said Letters Patent is hereby corrected as shown below:

On the cover, in section [56], "References Cited", "U.S. PATENT DOCUMENTS", insert the following references—

4,525,054 6/1985 SOMEYA et al.;
    4,639,113 1/1987 OHKUBO;
    4,769,668 9/1988 ISHIKAWA et al.;
    4,868,598 9/1989 HARADA et al.;
    4,536,074 8/1985 SOMEYA et al.;
    4,673,277 6/1987 SOMEYA et al.;
    4,616,916 10/1986 SOMEYA et al.;
    4,763,156 8/1988 ISHIKAWA et al.;
    5,325,147 6/1994 KIRIGAYA et al.—.

On the cover, in section [56], "References Cited", "FOREIGN PATENT DOCUMENTS", insert —4199112 7/1992 Japan—.

UNITED STATES PATENT AND TRADEMARK OFFICE
CERTIFICATE OF CORRECTION

PATENT NO. : 5,682,558
DATED : October 28, 1997
INVENTOR(S) : T. KIRIGAYA et al.

It is certified that error appears in the above-identified patent and that said Letters Patent is hereby corrected as shown below:

On the cover, in section [56], "References Cited", "OTHER PUBLICATIONS", insert the following references--;

Patent Abstracts of Japan vol. 16, no. 433 (P-1418), September 10, 1992;
Patent Abstracts of Japan vol. 14, no. 92 (P-1009), February 20, 1990;
Patent Abstracts of Japan vol. 16, no. 532 (P_1448), October 30, 1992--.

Signed and Sealed this

Twenty-first Day of December, 1999

Attest:

Q. TODD DICKINSON

*Attesting Officer*      *Acting Commissioner of Patents and Trademarks*